US012505571B2

(12) United States Patent
Thompson et al.

(10) Patent No.: US 12,505,571 B2
(45) Date of Patent: Dec. 23, 2025

(54) PRIMARY ANALYSIS IN NEXT GENERATION SEQUENCING

(71) Applicant: Element Biosciences, Inc., San Diego, CA (US)

(72) Inventors: Connor Thompson, San Diego, CA (US); Tsung-li Liu, San Diego, CA (US); Semyon Kruglyak, San Diego, CA (US); Minghao Guo, San Diego, CA (US)

( * ) Notice: Subject to any disclaimer, the term of this patent is extended or adjusted under 35 U.S.C. 154(b) by 281 days.

(21) Appl. No.: 18/078,820

(22) Filed: Dec. 9, 2022

(65) Prior Publication Data

US 2023/0326065 A1 Oct. 12, 2023

Related U.S. Application Data

(63) Continuation-in-part of application No. 17/854,042, filed on Jun. 30, 2022, now Pat. No. 11,915,444,
(Continued)

(51) Int. Cl.
*G06T 7/66* (2017.01)
*G06F 18/232* (2023.01)
(Continued)

(52) U.S. Cl.
CPC ............ *G06T 7/66* (2017.01); *G06F 18/232* (2023.01); *G06T 7/30* (2017.01); *G06V 10/751* (2022.01);
(Continued)

(58) Field of Classification Search
CPC ........... G06T 7/66; G06T 7/30; G06F 18/232; G06V 10/751; G06V 10/763; G06V 20/69;
(Continued)

(56) References Cited

U.S. PATENT DOCUMENTS

| 5,159,403 A | 10/1992 | Kosaka |
| 5,558,991 A | 9/1996 | Trainor |

(Continued)

FOREIGN PATENT DOCUMENTS

| CN | 108203847 B | 1/2022 |
| EP | 2423325 B1 | 4/2019 |

(Continued)

OTHER PUBLICATIONS

Anonymous: "MiSEQ: Imaging and Base Calling," Available at https://support.illumina.com/training.html; video slides presented by Jeremy Peirce 2013, With Attached Transcript. 30 Pages.
(Continued)

*Primary Examiner* — Bobbak Safaipour
(74) *Attorney, Agent, or Firm* — Sterne, Kessler, Goldstein Fox P.L.L.C.

(57) ABSTRACT

Image data analysis, and particularly identifying cluster or polony locations for performing base-calling in a digital image of a flow cell during DNA sequencing is described. A method may include generating a first plurality of flow cell images of a cellular sample immobilized on a support by conducting one or more cycles of sequencing reactions. The cellular sample may include a plurality of concatemer molecules therewithin. For the first plurality of flow cell image, pixel intensities, and a respective color purity of each of the pixel intensities may be determined. A base calling template may include base calling locations based on the pixel intensities and the respective color purity of the pixel intensities. The base calling template may be for registering a second plurality of flow cell images of the support in one or more subsequent cycles of the one or more cycles.

20 Claims, 32 Drawing Sheets

Specification includes a Sequence Listing.

Page 2

Related U.S. Application Data which is a continuation of application No. 17/547,602, filed on Dec. 10, 2021, now Pat. No. 11,397,870, which is a continuation of application No. 17/219,556, filed on Mar. 31, 2021, now Pat. No. 11,200,446.

(60) Provisional application No. 63/388,183, filed on Jul. 11, 2022, provisional application No. 63/349,421, filed on Jun. 6, 2022, provisional application No. 63/072,649, filed on Aug. 31, 2020.

(51) Int. Cl.
  *G06T 7/30* (2017.01)
  *G06V 10/75* (2022.01)
  *G06V 10/762* (2022.01)
  *G06V 20/69* (2022.01)

(52) U.S. Cl.
  CPC ............ *G06V 10/763* (2022.01); *G06V 20/69* (2022.01); *G06V 20/693* (2022.01); *G06V 20/695* (2022.01); *G06V 2201/04* (2022.01)

(58) Field of Classification Search
  CPC ............... G06V 20/693; G06V 20/695; G06V 2201/04; G06V 10/762
  See application file for complete search history.

(56) References Cited

U.S. PATENT DOCUMENTS

| | | |
|---|---|---|
| 5,576,448 A | 11/1996 | Van Daele et al. |
| 5,750,341 A | 5/1998 | Macevicz |
| 5,786,894 A | 7/1998 | Shields et al. |
| 5,854,033 A | 12/1998 | Lizardi |
| 5,871,921 A | 2/1999 | Landegren et al. |
| 6,284,497 B1 | 9/2001 | Sabanayagam et al. |
| 6,576,448 B2 | 6/2003 | Weissman et al. |
| 6,608,682 B2 | 8/2003 | Ortyn et al. |
| 6,975,400 B2 | 12/2005 | Ortyn et al. |
| 6,977,153 B2 | 12/2005 | Kumar et al. |
| 7,019,834 B2 | 3/2006 | Sebok et al. |
| 7,170,050 B2 | 1/2007 | Turner et al. |
| 7,211,390 B2 | 5/2007 | Rothberg et al. |
| 7,244,559 B2 | 7/2007 | Rothberg et al. |
| 7,264,929 B2 | 9/2007 | Rothberg et al. |
| 7,279,338 B2 | 10/2007 | Kim et al. |
| 7,302,146 B2 | 11/2007 | Turner et al. |
| 7,315,357 B2 | 1/2008 | Ortyn et al. |
| 7,405,281 B2 | 7/2008 | Xu et al. |
| 7,450,229 B2 | 11/2008 | Ortyn et al. |
| 7,522,757 B2 | 4/2009 | Tsipouras et al. |
| 7,566,537 B2 | 7/2009 | Balasubramanian et al. |
| 7,584,857 B2 | 9/2009 | Böhm et al. |
| 7,640,112 B2 | 12/2009 | Tsipouras et al. |
| 7,671,987 B2 | 3/2010 | Padmanabhan et al. |
| 7,674,309 B2 | 3/2010 | Gargano et al. |
| 7,709,197 B2 | 5/2010 | Drmanac |
| 7,723,116 B2 | 5/2010 | Evans et al. |
| 7,741,463 B2 | 6/2010 | Gormley et al. |
| 7,745,221 B2 | 6/2010 | Butler et al. |
| 7,890,157 B2 | 2/2011 | Jo et al. |
| 8,045,788 B2 | 10/2011 | Watkins et al. |
| 8,053,192 B2 | 11/2011 | Bignell et al. |
| 8,182,989 B2 | 5/2012 | Bignell et al. |
| 8,184,298 B2 | 5/2012 | Popescu et al. |
| 8,189,900 B2 | 5/2012 | Sammak et al. |
| 8,426,209 B2 | 4/2013 | Butler et al. |
| 8,465,922 B2 | 6/2013 | Eid et al. |
| 8,526,704 B2 | 9/2013 | Dobbe |
| 8,563,478 B2 | 10/2013 | Gormley et al. |
| 8,617,538 B2 | 12/2013 | Zoldhelyi et al. |
| 8,760,756 B2 | 6/2014 | Price et al. |
| 8,822,150 B2 | 9/2014 | Bignell et al. |
| 8,885,912 B2 | 11/2014 | Sui |
| 8,932,994 B2 | 1/2015 | Gormley et al. |
| 9,068,916 B2 | 6/2015 | Heng |
| 9,328,378 B2 | 5/2016 | Earnshaw et al. |
| 9,383,320 B2 | 7/2016 | Naito et al. |
| 9,493,818 B2 | 11/2016 | Kazakov et al. |
| 9,512,478 B2 | 12/2016 | Bignell et al. |
| 9,591,268 B2 | 3/2017 | Stoops et al. |
| 9,650,673 B2 | 5/2017 | Drmanac et al. |
| 9,879,312 B2 | 1/2018 | Steemers et al. |
| 9,889,422 B2 | 2/2018 | Smith et al. |
| 9,902,994 B2 | 2/2018 | Gormley et al. |
| 9,944,984 B2 | 4/2018 | Drmanac et al. |
| 10,072,260 B2 | 9/2018 | Happe et al. |
| 10,152,776 B2 | 12/2018 | Langlois et al. |
| 10,155,980 B2 | 12/2018 | Weng et al. |
| 10,184,122 B2 | 1/2019 | Grunenwald et al. |
| 10,246,744 B2 | 4/2019 | Vijayan et al. |
| 10,287,574 B2 | 5/2019 | Goryshin et al. |
| 10,304,189 B2 | 5/2019 | Garcia et al. |
| 10,351,909 B2 | 7/2019 | Drmanac et al. |
| 10,407,722 B2 | 9/2019 | Barany et al. |
| 10,525,437 B2 | 1/2020 | Smith et al. |
| 10,689,696 B2 | 6/2020 | Belitz et al. |
| 10,724,069 B2 | 7/2020 | Chen et al. |
| 10,731,141 B2 | 8/2020 | Iyidogan |
| 10,768,173 B1 | 9/2020 | Arslan et al. |
| 10,953,379 B2 | 3/2021 | Smith et al. |
| 11,028,435 B2 | 6/2021 | Kelley et al. |
| 11,028,436 B2 | 6/2021 | Singer et al. |
| 11,028,438 B2 | 6/2021 | Rearick et al. |
| 11,111,487 B2 | 9/2021 | Jovanovich et al. |
| 11,168,360 B2 | 11/2021 | George et al. |
| 11,200,446 B1 | 12/2021 | Zhou et al. |
| 11,220,707 B1 | 1/2022 | Arslan et al. |
| 11,255,847 B2 | 2/2022 | Schnall-Levin |
| 11,397,870 B2 | 7/2022 | Zhou et al. |
| 11,492,662 B2 | 11/2022 | Glezer et al. |
| 11,915,444 B2 | 2/2024 | Zhou et al. |
| 12,286,670 B2 * | 4/2025 | Legnini ............... C12Q 1/6869 |
| 2002/0076716 A1 | 6/2002 | Sabanayagam et al. |
| 2003/0224419 A1 | 12/2003 | Corcoran et al. |
| 2009/0018024 A1 | 1/2009 | Church et al. |
| 2010/0035252 A1 | 2/2010 | Rothberg et al. |
| 2010/0035454 A1 | 2/2010 | Morgan et al. |
| 2010/0121582 A1 | 5/2010 | Pan et al. |
| 2014/0170679 A1 | 6/2014 | Aitchison et al. |
| 2015/0057947 A1 | 2/2015 | Drmanac et al. |
| 2016/0102348 A1 | 4/2016 | Donnet |
| 2017/0022553 A1 | 1/2017 | Vijayan et al. |
| 2017/0175184 A1* | 6/2017 | Drmanac ............ G01N 15/1404 |
| 2018/0044668 A1 | 2/2018 | Jiang et al. |
| 2018/0251833 A1 | 9/2018 | Daugharthy et al. |
| 2018/0274023 A1 | 9/2018 | Belitz et al. |
| 2019/0119742 A1 | 4/2019 | Zhang et al. |
| 2019/0130999 A1 | 5/2019 | Oppenheim et al. |
| 2019/0194737 A1 | 6/2019 | Ach et al. |
| 2020/0080141 A1 | 3/2020 | Weng et al. |
| 2020/0149095 A1 | 5/2020 | Arslan et al. |
| 2020/0194098 A1 | 6/2020 | Hannigan et al. |
| 2020/0211673 A1 | 7/2020 | Biggins et al. |
| 2020/0216891 A1 | 7/2020 | Francais et al. |
| 2020/0291454 A1 | 9/2020 | Belhocine et al. |
| 2020/0308576 A1 | 10/2020 | Badenhorst et al. |
| 2020/0327377 A1 | 10/2020 | Jaganathan et al. |
| 2020/0392574 A1 | 12/2020 | Drmanac et al. |
| 2021/0150715 A1 | 5/2021 | Garcia et al. |
| 2023/0279382 A1 | 9/2023 | Light et al. |
| 2023/0326064 A1* | 10/2023 | Zhou ................... G06V 20/695 |
| 2024/0011022 A1 | 1/2024 | Zhao et al. |
| 2024/0052398 A1 | 2/2024 | Previte et al. |
| 2024/0084380 A1 | 3/2024 | Arslan et al. |
| 2024/0191225 A1 | 6/2024 | Zhao et al. |
| 2025/0109429 A1* | 4/2025 | Worku ................. C12Q 1/6806 |

FOREIGN PATENT DOCUMENTS

| | | |
|---|---|---|
| EP | 1954818 B2 | 1/2021 |
| WO | WO-2005111236 A1 | 11/2005 |
| WO | WO-2006084132 A2 | 8/2006 |
| WO | WO-2012003374 A2 | 1/2012 |

(56) References Cited

FOREIGN PATENT DOCUMENTS

| WO | WO-2014196863 A1 | 12/2014 |
|---|---|---|
| WO | WO-2015154028 A1 | 10/2015 |
| WO | WO-2016058517 A1 | 4/2016 |
| WO | WO-2016124600 A1 | 8/2016 |
| WO | WO-2018175258 A1 | 9/2018 |
| WO | WO-2019068797 A1 | 4/2019 |
| WO | WO-2019149958 A1 | 8/2019 |
| WO | WO-2020102594 A1 | 5/2020 |
| WO | WO-2020191389 A1 | 9/2020 |
| WO | WO-2021178467 A1 | 9/2021 |
| WO | WO-2021236792 A1 | 11/2021 |
| WO | WO-2022026891 A1 | 2/2022 |
| WO | WO-2023168443 A1 | 9/2023 |
| WO | WO-2023168444 A1 | 9/2023 |
| WO | WO-2024011145 A1 | 1/2024 |
| WO | 2024040058 A1 | 2/2024 |
| WO | 2024040068 A1 | 2/2024 |
| WO | 2024059550 A1 | 3/2024 |

OTHER PUBLICATIONS

Diegelman, A.M. and Kool, E.T., "Chemical and Enzymatic Methods for Preparing Circular Single-stranded DNAs," Current Protocols in Nucleic Acid Chemistry Chapter 5:Unit 5.2.1-5.2.27, Wiley, United States (May 2001).

Eschenmoser, A., "Chemical Etiology of Nucleic Acid Structure," Science 284(5423):2118-2124, American Association for the Advancement of Science, United States (Jun. 1999).

Ferrero, M and Gotor, V., "Biocatalytic Selective Modifications of Conventional Nucleosides, Carbocyclic Nucleosides, and C-Nucleosides," Chemical Reviews 100(12):4319-4348, American Chemical Society, United States (Dec. 2000).

Fire, A and Xu, S.Q., "Rolling Replication of Short DNA Circles," Proceedings of the National Academy of Sciences of the United States of America 92(10):4641-4645, National Academy of Sciences, United States (May 1995).

Floyd, D.L., et al., "Single-particle Kinetics of Influenza Virus Membrane Fusion," Proceedings of the National Academy of Sciences of the United States of America 105(40):15382-15387, National Academy of Sciences, United States (Oct. 2008).

Harris, T.D., et al., "Single-molecule DNA Sequencing of a Viral Genome," Science 320(5872):106-109, American Association for the Advancement of Science, United States (Apr. 2008).

International Search Report and Written Opinion for International Application No. PCT/US2022/052448 mailed May 15, 2023, 16 pages.

International Search Report and Written Opinion for International Application No. PCT/US2022/052449 mailed Mar. 8, 2023, 25 pages.

International Search Report and Written Opinion for International Application No. PCT/US2023/063734 mailed Jul. 17, 2023, 11 pages.

International Search Report and Written Opinion for International Application No. PCT/US2023/063736 mailed Aug. 21, 2023, 16 pages.

Jeong, L.S., et al., "Structure-Activity Relationships of Beta-D-(2S,5R)- and Alpha-D-(2S,5S)-1,3-Oxathiolanyl Nucleosides as Potential Anti-HIV agents," Journal of Medicinal Chemistry 36(18):2627-2638, American Chemical Society, United States (Sep. 1993).

Joneja, A., et al., "Linear Nicking Endonuclease-mediated Strand-displacement DNA Amplification," Analytical Biochemistry 414(1):58-69, Elsevier, United States (Jul. 2011).

Kim, H.O., et al., "1,3-Dioxolanylpurine Nucleosides (2R,4R) and (2R,4S) with Selective Anti-HIV-1 Activity in Human Lymphocytes," Journal of Medicinal Chemistry 36(1):30-37, American Chemical Society, United States (Jan. 1993).

Korostin, D., et al., "Comparative Analysis of Novel MGISEQ-2000 Sequencing Platform vs Illumina HiSeq 2500 for Whole-genome Sequencing", PloS One 15(3):e0230301, Public Library of Science, United States (Mar. 2020).

Lindahl, T and Nyberg, B., "Heat-induced Deamination of Cytosine Residues in Deoxyribonucleic Acid," Biochemistry 13(16):3405-3410, American Chemical Society, United States (Jul. 1974).

Lizardi, P.M., et al., "Mutation Detection and Single-Molecule Counting Using isothermal Rolling-Circle Amplification," Nature Genetics 19(3):225-232, Nature Pub. Co, United States (1998).

Martinez, C.I., et al., "Acyclic Nucleoside Triphosphate Analogs as Terminators in Biocatalytic DNA Replication," Bioorganic & Medicinal Chemistry Letters 7(23):3013-3016 (Dec. 1997).

Martinez, C.I., et al., "An Allylic/acyclic Adenosine Nucleoside Triphosphate for Termination of DNA Synthesis by DNA Template-dependent Polymerases," Nucleic Acids Research 27(5):1271-1274, Oxford University Press, United Kingdom (Mar. 1999).

McNaughton, A.L., et al., "Illumina and Nanopore Methods for Whole Genome Sequencing of Hepatitis B Virus (HBV)," Scientific Reports 9(1):7081, Nature Publishing Group, United Kingdom (May 2019).

Obi, P., et al., "The Design and Synthesis of Circular RNAs," Methods 196:85-103, Duluth, United States (Dec. 2021).

Ruparel, H., et al., "Design and Synthesis of a 3'-O-Allyl Photocleavable Fluorescent Nucleotide as a Reversible Terminator for DNA Sequencing by Synthesis," Proceedings of the National Academy of Sciences of the United States of America 102(17):5932-5937, National Academy of Sciences, United States (Apr. 2005).

Wang, B., et al., "An Adaptive Decorrelation Method Removes Illumina DNA Base-calling Errors Caused by Crosstalk Between Adjacent Clusters," Scientific Reports 11 pages, Nature Publishing Group, United Kingdom (Feb. 2017).

Wang, F., et al., "Tequila-seq: a Versatile and Low-cost Method for Targeted Long-read Rna Sequencing," Nature Communications 14(1):4760,1-15, United Kingdom (Aug. 2023).

Wang, R.Y., et al., "Heat- and Alkali-induced Deamination of Methylcytosine and Cytosine Residues in DNA," Biochimica Et Biophysica Acta 697(3):371-377, Elsevier Pub. Co, Netherlands (Jun. 30, 1982).

Whiteford, N., et al., "Swift: Primary Data Analysis for the Illumina Solexa Sequencing Platform," Bioinformatics 25(17):2194-2199, Oxford University Press, United Kingdom (Sep. 2009).

Bentley, David R., "Whole-genome re-sequencing," Current Opinion in Genetics & Development, vol. 16, No. 6, Dec. 2006; pp. 545-552.

Bentley, David R. et al., "Accurate whole human genome sequencing using reversible terminator chemistry," Nature, vol. 456, Nov. 6, 2008; pp. 53-59.

Eid, John, et al., "Real-Time DNA Sequencing from Single Polymerase Molecules," Science, vol. 323, Jan. 2, 2009; pp. 133-138.

Levene, M.J., et al., "Zero-Mode Waveguides for Single-Molecule Analysis at High Concentrations," Science, vol. 299, Jan. 31, 2003; pp. 682-686.

Ferrero, M., et al., "Biocatalytic Selective Modifications of Conventional Nucleosides, Carbocyclic Nucleosides, and C-Nucleosides," Chemical Reviews, vol. 100, No. 12, Dec. 2000; pp. 4319-4347.

International Search Report and Written Opinion of the International Searching Authority directed to International Patent Application No. PCT/US2021/048439, mailed Nov. 26, 2021; 13 pages.

International Search Report and Written Opinion of the International Searching Authority directed to International Patent Application No. PCT/US2023/067931, mailed Oct. 11, 2023; 12 pages.

\* cited by examiner

Spacer:
Linkers:
11 atom Linker:
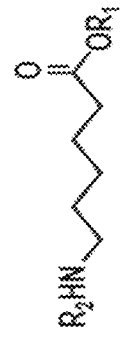
16 atom Linker:
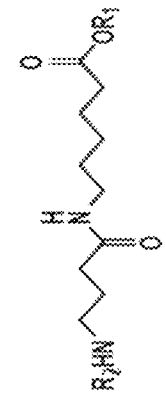
23 atom Linker:
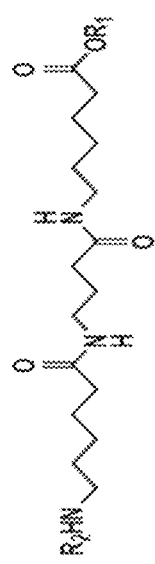
N3 Linker:
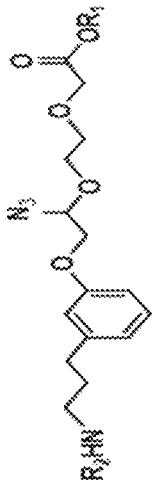
FIG. 21

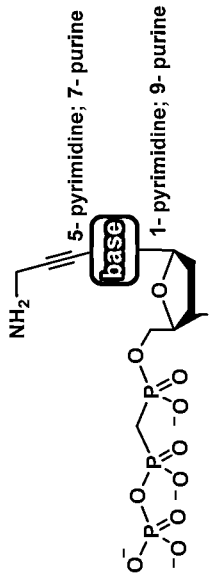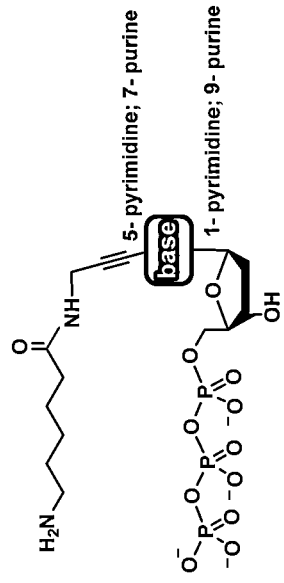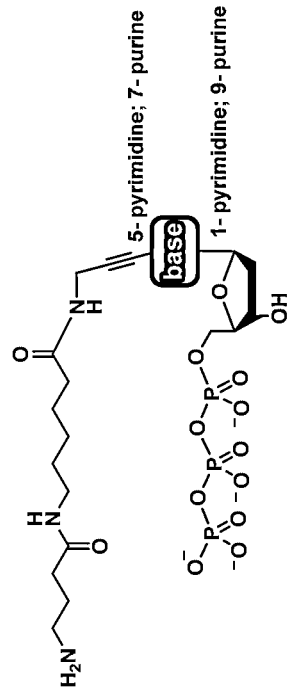
FIG. 23A

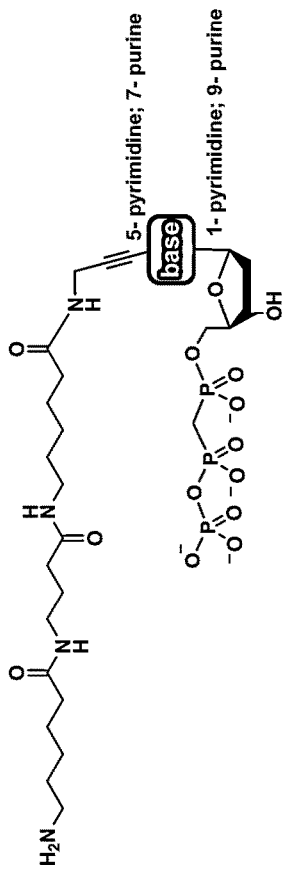
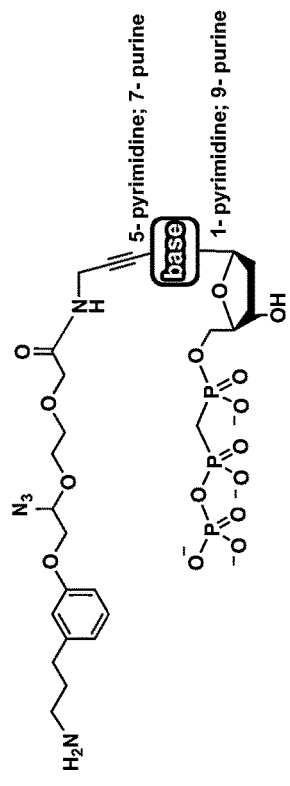
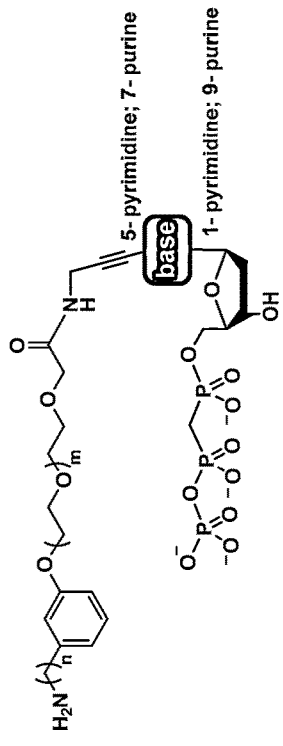
FIG. 23B

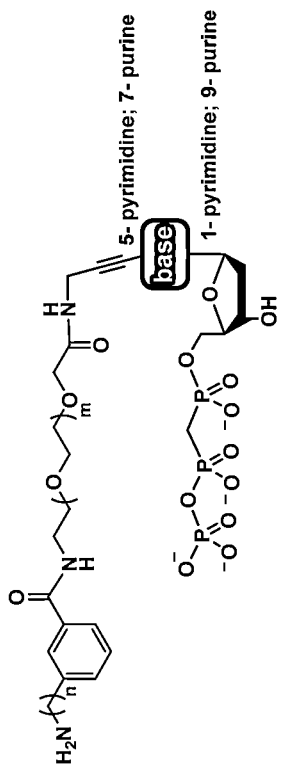
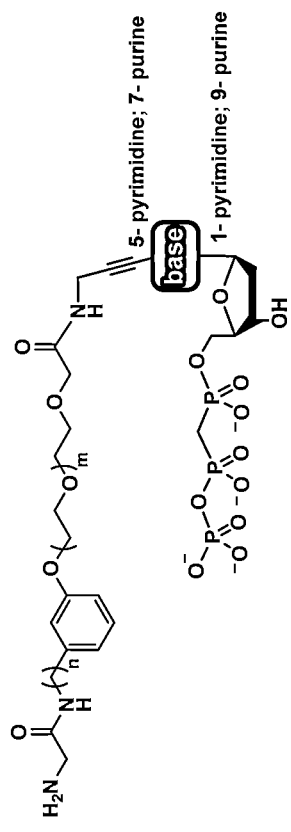
FIG. 23C

PRIMARY ANALYSIS IN NEXT GENERATION SEQUENCING

CROSS-REFERENCE TO RELATED APPLICATIONS

This application is a continuation-in-part of U.S. patent application Ser. No. 17/854,042, filed Jun. 30, 2022, which is a continuation of U.S. patent application Ser. No. 17/547,602, filed Dec. 10, 2021, which is a continuation of U.S. patent application Ser. No. 17/219,556, filed Mar. 31, 2021, which claims priority to U.S. Provisional Patent Application No. 63/072,649, filed Aug. 31, 2020. This application also claims priority to U.S. Provisional Patent Application No. 63/388,183, filed Jul. 11, 2022. This application claims priority to U.S. Provisional Patent Application No. 63/349,421, filed Jun. 6, 2022. The above-mentioned patent applications are hereby incorporated by reference in their entireties.

REFERENCE TO SEQUENCE LISTING SUBMITTED ELECTRONICALLY

The content of the electronically submitted Sequence Listing XML, File Name: 4585_0130004_Sequence-Listing_ST26, Size: 2,064 bytes, and Date of Creation: Jun. 26, 2023, submitted herewith, is hereby incorporated by reference in its entirety.

TECHNICAL FIELD

This disclosure relates generally to image data analysis, and particularly to identifying cluster or polony locations for performing base-calling in a digital image of a flow cell during DNA sequencing.

BACKGROUND

Next generation sequencing-by-synthesis using a flow cell may be used for identifying sequences of DNA. As single-stranded DNA fragments from a sequencing library are flooded across a flow cell, the fragments will randomly attach to the surface of the flow cell, typically due to complementary oligomers bound to the surface of the flow cell or beads present thereon. An amplification process is then performed on the DNA fragments, such that copies of a given fragment form a cluster or polony of denatured, cloned nucleotide strands. In some aspects, a single bead may contain a cluster, and the beads may attach to the flow cell at random locations.

In order to identify the sequence of the strands, the strand pairs are re-built, one nucleotide base at a time. During each base-building cycle, a mixture of single nucleotides, each attached to a fluorescent label (or tag) and a blocker, is flooded across the flow cell. The nucleotides attach at complementary positions on the strands. Blockers are included so that only one base will attach to any given strand during a single cycle. The flow cell is exposed to excitation light, exciting the labels and causing them to fluoresce. Because the cloned strands are clustered together, the fluorescent signal for any one fragment is amplified by the signal from its cloned counterparts, such that the fluorescence for a cluster may be recorded by an imager. After the flow cell is imaged, blockers are cleaved and washed from the flowed nucleotides, more nucleotides are flooded over the flow cell, and the cycle repeats. At each sequencing cycle, one or more images are recorded.

A base-calling algorithm is applied to the recorded images to "read" the successive signals from each cluster, and convert the optical signals into an identification of the nucleotide base sequence added to each fragment. Accurate base-calling requires accurate identification of the cluster centers, to ensure that successive signals are attributed to the correct fragment.

SUMMARY

Provided herein are system, apparatus, article of manufacture, method and/or computer program product aspects, and/or combinations and sub-combinations thereof which computationally improve resolution of an imager beyond its physical resolution limit and/or provide higher-accuracy source location in an image.

As a particular application of such, aspects of methods and systems for identifying a set of base-calling locations in a flow cell are described. These include capturing flow cell images after each sequencing cycle, and identifying candidate cluster centers in at least one of the flow cell images. Intensities are determined for each candidate cluster center. Purities are determined for each candidate cluster center based on the intensities. In some aspects, intensities and/or purities are determined at a sub-pixel level. Each candidate cluster center with a purity greater than the purity of the surrounding candidate cluster centers within a distance threshold is added to a set of base-calling locations. The set of base-calling locations may be referred to herein as a template.

In some aspects, identifying the candidate cluster centers includes labeling each pixel of the flow cell image as a candidate cluster center.

In some aspects, identifying the candidate cluster centers includes detecting a set of potential cluster center locations using a spot-finding algorithm and then identifying additional cluster locations around each potential cluster center location.

Further aspects, features, and advantages of the present disclosure, as well as the structure and operation of the various aspects of the present disclosure, are described in detail below with reference to the accompanying drawings.

BRIEF DESCRIPTION OF THE DRAWINGS/FIGURES

The accompanying drawings, which are incorporated herein and form a part of the specification, illustrate aspects of the present disclosure and, together with the description, further serve to explain the principles of the disclosure and to enable a person skilled in the art(s) to make and use the aspects.

FIG. 21 shows the chemical structure of an exemplary spacer (top), and the chemical structures of various exemplary linkers, including an 11-atom Linker, 16-atom Linker, 23-atom Linker and an N3 Linker (bottom).

FIG. 23A shows the chemical structures of various exemplary linkers joined/attached to nucleotide units.

FIG. 23B shows the chemical structures of various exemplary linkers joined/attached to nucleotide units.

FIG. 23C shows the chemical structures of various exemplary linkers joined/attached to nucleotide units.

Figure 27B:
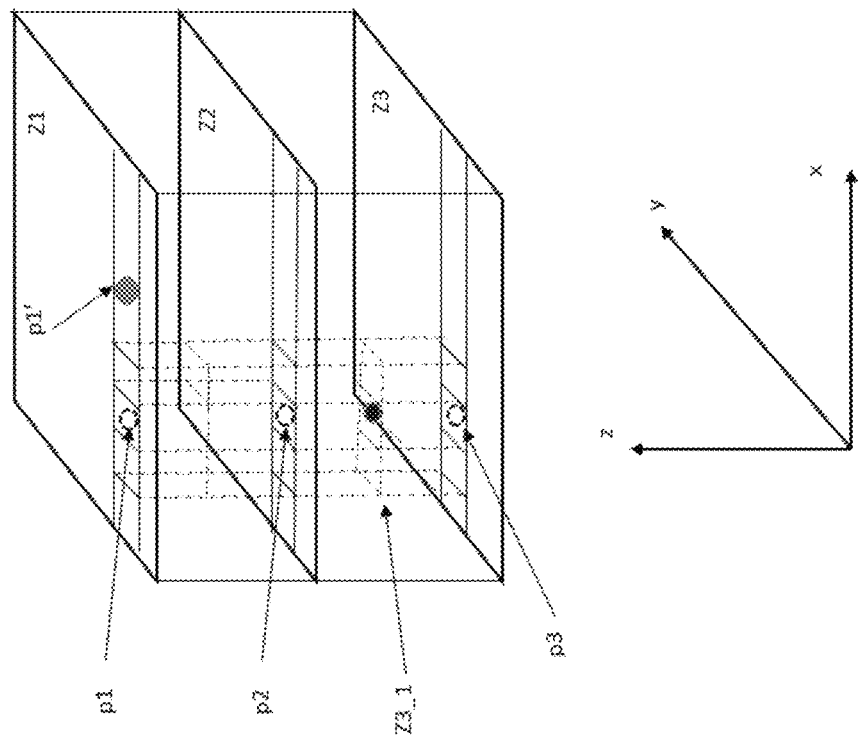
FIG. 27A shows an exemplary support with multiple tiles for immobilizing the cellular sample, according to some aspects.

FIG. 27B a schematic showing of flow cell images at multiple axial locations with base calling locations at some of the axial locations and base calling locations between two predetermined axial locations, according to some aspects.

Figure 28:
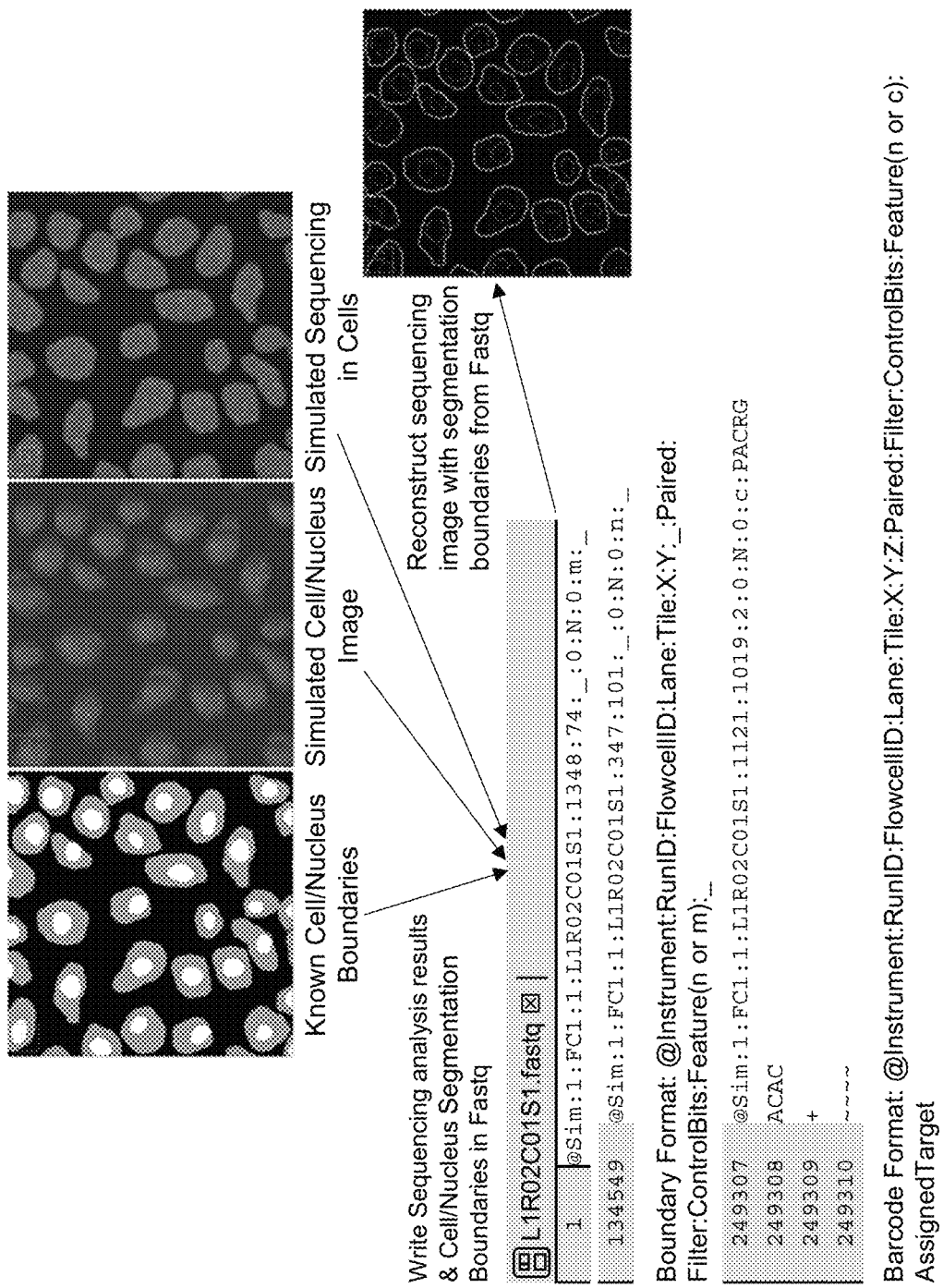

FIG. 28 shows an exemplary data file with data of cellular features and in situ sequencing results and a reconstructed image combining in situ sequencing results with cellular features, according to some aspects.

Figure 29A:
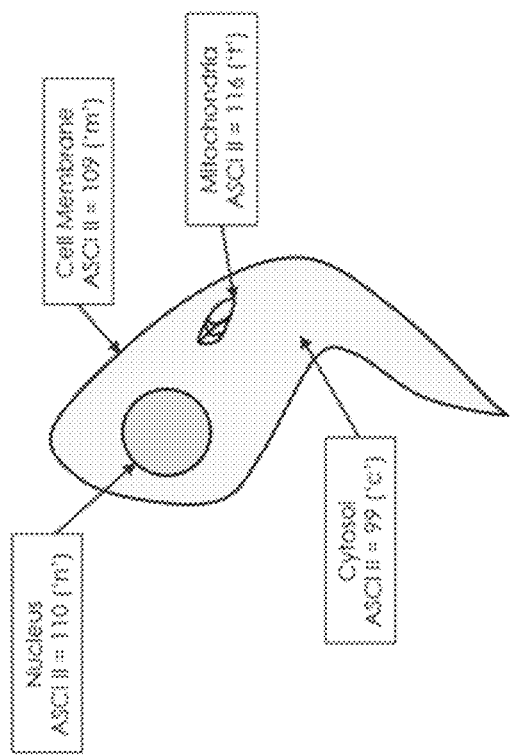

FIG. 29A is a schematic showing of a cell (top) with its major structural elements. The corresponding ASCI II marker of each structural element is shown. Such ASCI II marker can be used in data files disclosed herein so that 3D cell or tissue morphology, for example, from in situ sequencing, can be reconstructed from the data files, according to some aspects. FIG. 29A also shows an exemplary list (bottom) of decoders or indicators that can be used in the data files, according to some aspects.

Figure 29B:
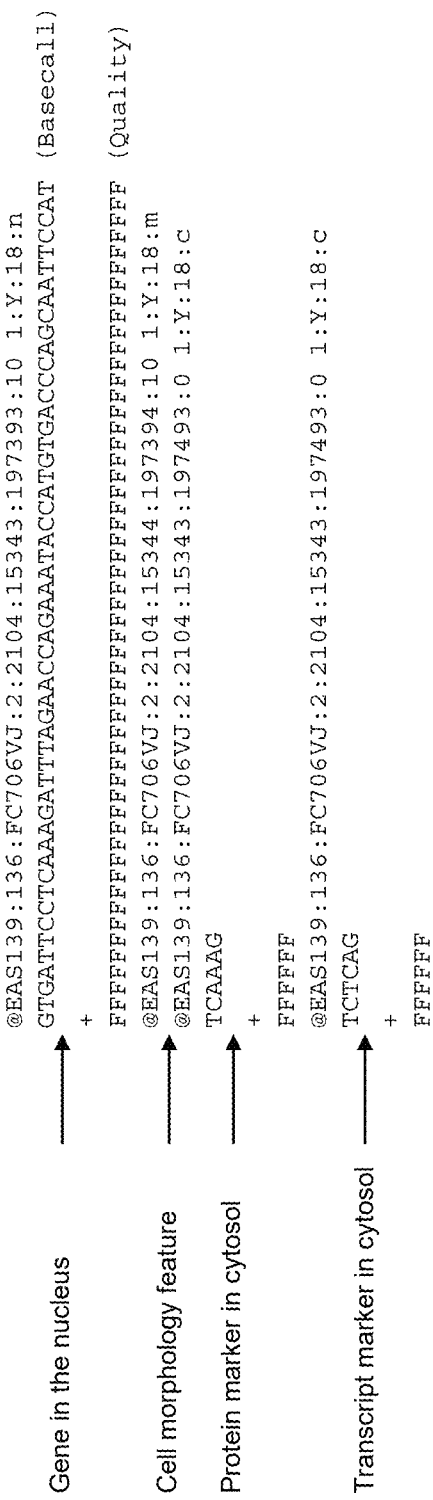

FIG. 29B shows an exemplary data file which utilizes the indicators as listed in FIG. 29A, according to some aspects.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product aspects, and/or combinations and sub-combinations thereof which computationally improve resolution of an imager beyond its physical resolution limit and/or provide higher-accuracy source location in an image. The image processing techniques described herein are particularly useful for base-calling in next generation sequencing, and base-calling will be used as the primary example herein for describing the application of these techniques. However, such imaging analysis techniques may also be particularly useful in other applications where spot-detection and/or CCD imaging is used. For example, identifying the actual center (e.g., source location) of a perceived optical signal has utility in numerous other fields, such as location detection and tracking, astronomical imaging, heat mapping, etc. Additionally, such techniques as described herein may be useful in any other application benefiting from increasing resolution computationally once the physical resolution limits of an imager have been reached.

In DNA sequencing, identifying the centers of clusters or polonies (which are often formed on beads) is sometimes referred to as primary analysis. Primary analysis involves the formation of a template for the flow cell. The template includes the estimated locations of all detected clusters in a common coordinate system. Templates are generated by identifying cluster locations in all images in the first few flows of the sequencing process. The images may be aligned across all the images to provide the common coordinate system. Cluster locations from different images may be merged based on proximity in the coordinate system. Once the template is generated, all further images are registered against it and the sequencing is performed based on the cluster locations in the template.

A variety of algorithms exist for identifying cluster centers in an image. These existing algorithms suffer from a number of shortcomings. As discussed above, cluster centers may appear merged if they are close together. The proximity may be due to precision issues or registration problems. Different clusters may thus be treated as a single cluster, resulting in improper sequence identification or missing out on a sequence.

Additionally, algorithms may require finding clusters across several images to identify the cluster locations for the template. This may require excessive processing time.

Figure 1:
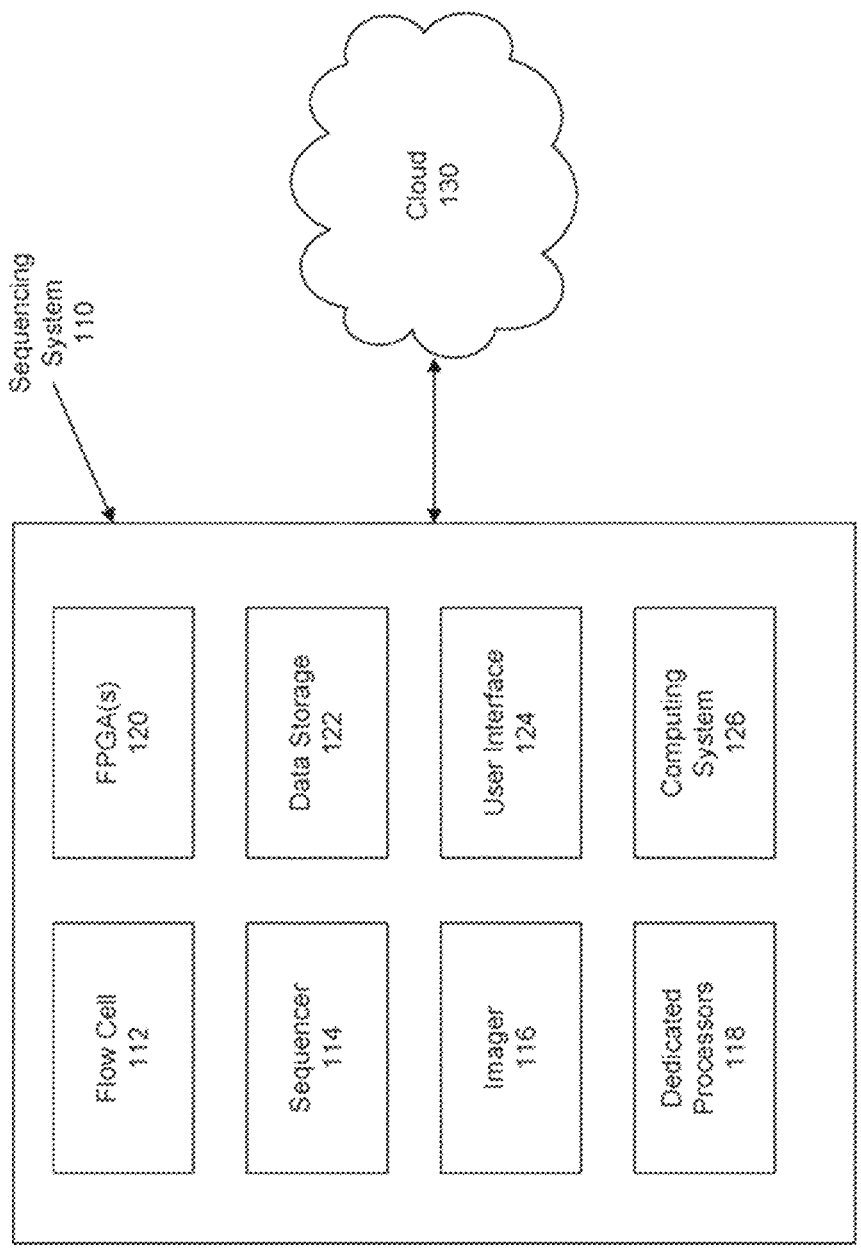
FIG. 1 illustrates a block diagram of a system for identifying cluster locations on a flow cell, according to some aspects

FIG. 1 illustrates a block diagram of a system 100 for identifying cluster locations on a flow cell, according to an aspect. The system 100 has a sequencing system 110 that may include a flow cell 112, a sequencer 114, an imager 116, data storage 122, and user interface 124. The sequencing system 110 may be connected to a cloud 130. The sequencing system 110 may include one or more of dedicated processors 118, Field-Programmable Gate Array(s) (FPGA(s)) 120, and a computer system 126.

In some aspects, the flow cell 112 is configured to capture DNA fragments and form DNA sequences for base-calling on the flow cell. The sequencer 114 may be configured to flow a nucleotide mixture onto the flow cell 112, cleave blockers from the nucleotides in between flowing steps, and perform other steps for the formation of the DNA sequences on the flow cell 112. The nucleotides may have fluorescent elements attached that emit light or energy in a wavelength that indicates the type of nucleotide. Each type of fluorescent element may correspond to a particular nucleotide base (e.g., A, G, C, T). The fluorescent elements may emit light in visible wavelengths.

For example, each nucleotide base may be assigned a color. Adenine may be red, cytosine may be blue, guanine may be green, and thymine may be yellow, for example. The color or wavelength of the fluorescent element for each nucleotide may be selected so that the nucleotides are distinguishable from one another based on the wavelengths of light emitted by the fluorescent elements.

The imager 116 may be configured to capture images of the flow cell 112 after each flowing step. In an aspect, the imager 116 is a camera configured to capture digital images, such as a CMOS or a CCD camera. The camera may be configured to capture images at the wavelengths of the fluorescent elements bound to the nucleotides.

The resolution of the imager 116 controls the level of detail in the flow cell images, including pixel size. In existing systems, this resolution is very important, as it controls the accuracy with which a spot-finding algorithm identifies the cluster centers. One way to increase the accuracy of spot finding is to improve the resolution of the imager 116, or improve the processing performed on images taken by imager 116. The methods described herein may detect cluster centers in pixels other than those detected by a spot-finding algorithm. These methods allow for improved accuracy in detection of cluster centers without increasing the resolution of the imager 116. The resolution of the imager may even be less than existing systems with comparable performance, which may reduce the cost of the sequencing system 110.

In an aspect, the images of the flow cell may be captured in groups, where each image in the group is taken at a wavelength or in a spectrum that matches or includes only one of the fluorescent elements. In another aspect, the images may be captured as single images that captures all of the wavelengths of the fluorescent elements.

The sequencing system 100 may be configured to identify cluster locations on the flow cell 112 based on the flow cell images. The processing for identifying the cluster may be performed by the dedicated processors 118, the FPGA(s) 120, the computing system 126, or a combination thereof. Identifying or determining the cluster locations may involve performing traditional cluster finding in combination with the cluster finding methods described more particularly herein.

General purpose processors provide interfaces to run a variety of program in an operating system, such as Windows™ or Linux™. Such an operating system typically provides great flexibility to a user.

In some aspects, the dedicated processors 118 may be configured to perform steps of the cluster finding methods described herein. They may not be general-purpose processors, but instead custom processors with specific hardware or instructions for performing those steps. Dedicated processors directly run specific software without an operating system. The lack of an operating system reduces overhead, at the cost of the flexibility in what the processor may perform. A dedicated processor may make use of a custom programming language, which may be designed to operate more efficiently than the software run on general purpose processors. This may increase the speed at which the steps are performed and allow for real time processing.

In some aspects, the FPGA(s) 120 may be configured to perform steps of the cluster finding methods described herein. An FPGA is programmed as hardware that will only perform a specific task. A special programming language may be used to transform software steps into hardware componentry. Once an FPGA is programmed, the hardware directly processes digital data that is provided to it without running software. The FPGA instead uses logic gates and registers to process the digital data. Because there is no overhead required for an operating system, an FPGA generally processes data faster than a general purpose processors. Similar to dedicated processors, this is at the cost of flexibility.

The lack of software overhead may also allow an FPGA to operate faster than a dedicated processor, although this will depend on the exact processing to be performed and the specific FPGA and dedicated processor.

A group of FPGA(s) 120 may be configured to perform the steps in parallel. For example, a number of FPGA(s) 120 may be configured to perform a processing step for an image, a set of images, or a cluster location in one or more images. Each FPGA(s) 120 may perform its own part of the processing step at the same time, reducing the time needed to process data. This may allow the processing steps to be completed in real time. Further discussion of the use of FPGAs is provided below.

Performing the processing steps in real time may allow the system to use less memory, as the data may be processed as it is received. This improves over conventional systems may need to store the data before it may be processed, which may require more memory or accessing a computer system located in the cloud 130.

In some aspects, the data storage 122 is used to store information used in the identification of the cluster locations. This information may include the images themselves or information derived from the images captured by the imager 116. The DNA sequences determined from the base-calling may be stored in the data storage 122. Parameters identifying cluster locations may also be stored in the data storage 122.

The user interface 124 may be used by a user to operate the sequencing system or access data stored in the data storage 122 or the computer system 126.

The computer system 126 may control the general operation of the sequencing system and may be coupled to the user interface 124. It may also perform steps in the identification of cluster locations and base-calling. In some aspects, the computer system 126 is a computer system 400, as described in more detail in FIG. 4. The computer system 126 may store information regarding the operation of the sequencing system 110, such as configuration information, instructions for operating the sequencing system 110, or user information. The computer system 126 may be configured to pass information between the sequencing system 110 and the cloud 130.

As discussed above, the sequencing system 110 may have dedicated processors 118, FPGA(s) 120, or the computer system 126. The sequencing system may use one, two, or all of these elements to accomplish necessary processing described above. In some aspects, when these elements are present together, the processing tasks are split between them. For example, the FPGA(s) 120 may be used to perform the cluster center finding methods described herein, while the computer system 126 may perform other processing functions for the sequencing system 110. Those skilled in the art will understand that various combinations of these elements will allow various system aspects that balance efficiency and speed of processing with cost of processing elements.

The cloud 130 may be a network, remote storage, or some other remote computing system separate from the sequencing system 110. The connection to cloud 130 may allow access to data stored externally to the sequencing system 110 or allow for updating of software in the sequencing system 110.

Figure 3:
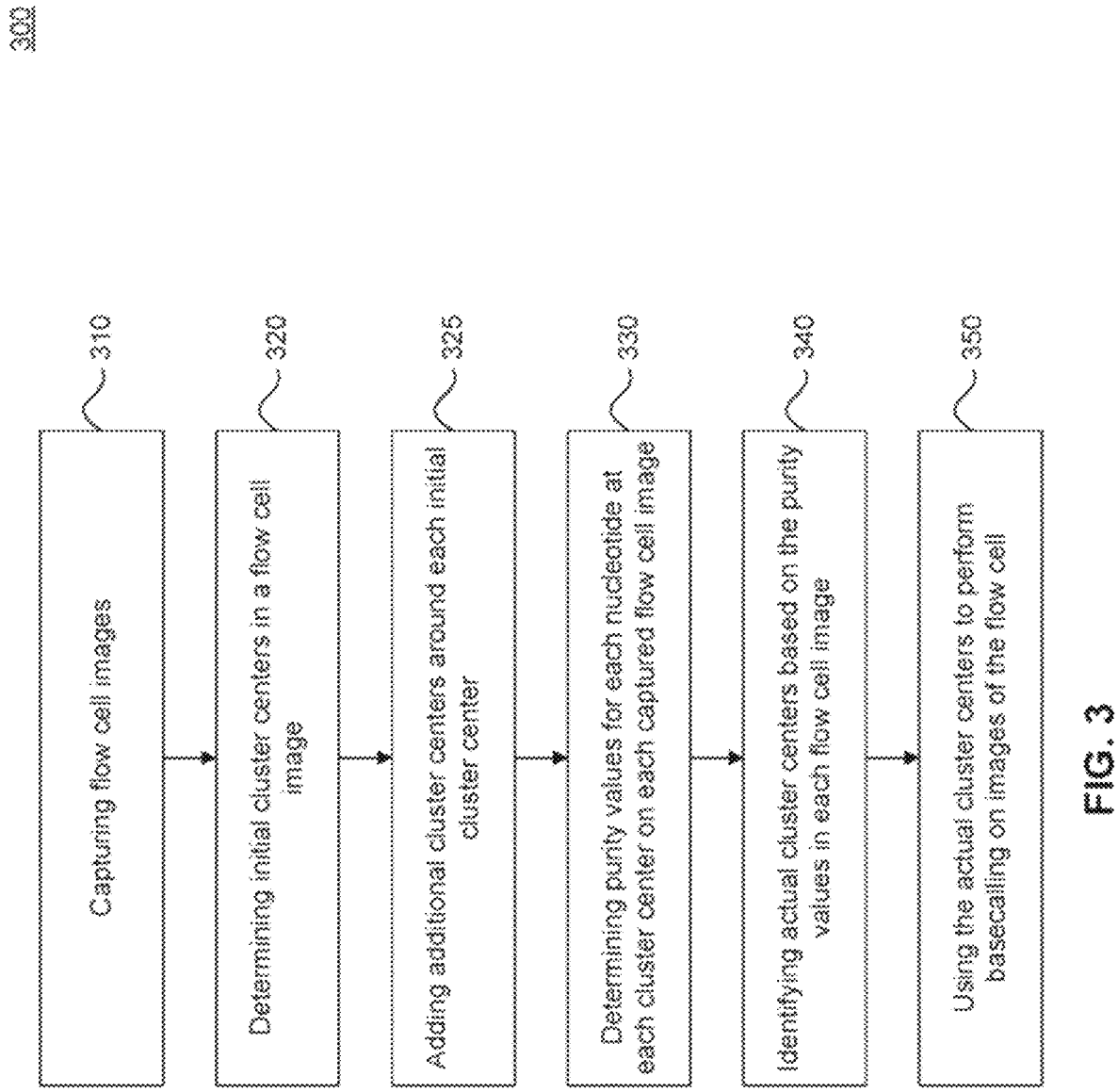
FIG. 3 is a flow chart illustrating a method for identifying locations at which to perform base-calling, according to some aspects.

FIG. 3 is a flow chart illustrating a method 300 for identifying actual cluster center locations at which to perform base-calling. A cluster center in a flow cell image is a location in the image which corresponds to the location of the clonal cluster on the physical flow cell. The wavelength of an optical signal detected at a cluster center correlates to a nucleotide base added to a fragment on the flow cell at that location. In order for a DNA sequence to be determined correctly, the sequentially detected optical signals must be consistently attributed to the correct DNA fragment. Accurately identifying the location of the cluster center thus improves the base-calling accuracy for that fragment. In some aspects, once the actual cluster centers have been identified, such locations may be mapped onto a template for use in subsequent base-call cycles using the same flow cell. The method 300 may be performed by the dedicated processors 118, the FPGA(s) 120, or the computer system 126.

In step 310, flow cell images are captured. The flow cell images may be captured by imager 116, as discussed above. Step 310 may involve capturing one image at a time to be processed by the following steps, or may involve capturing a set of images for simultaneous processing. In an example where a set of images is captured, each image in the set of images may correspond to a different detected wavelength. For example, given the above notation of colors tied to nucleotides, the set of images may include four images, each corresponding to signals captured at a respective one of red, blue, green, and yellow wavelengths, In an example where a single image is captured, that image may include all the detected wavelengths of interest. Each image or set of images may be captured for a single flowing step on the flow cell. In some aspects, the flow cell images are captured with reference to a coordinate system.

Figure 27A:
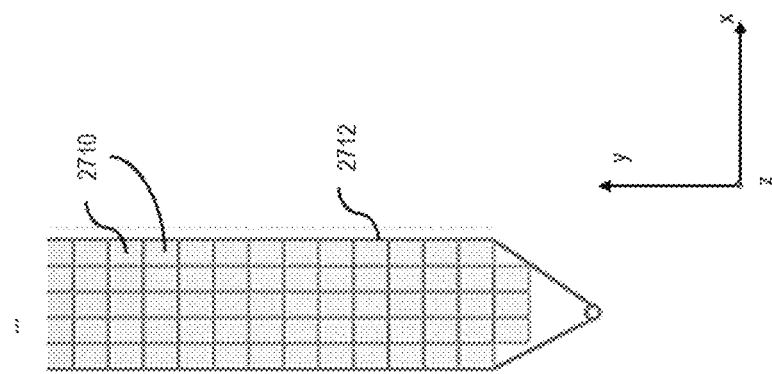

Depending on the sample(s) immobilized on the support (e.g., a flow cell), the flow cell images may include single or multiple axial locations along an axial axis orthogonal to the image plane of the flow cell images. In particular, for three dimensional samples, e.g., cells, tissues, or other in situ samples, the flow cell images can include multiple z-levels (i.e., axial locations) in order to cover the whole sample(s) in 3D. The axial axis can extend from the objective lens of the optical system disclosed herein to the support, e.g., flow cell. The axial axis can be orthogonal to the image plane of the flow cell images. Each axial location of flow cell images may be separated from the adjacent axial location(s) for a predetermined distance, for example, for about 0.1 um to about 15 ums. Each axial location of flow cell images may be separated from the adjacent level(s) for 0.5 um to 10 ums. At each axial location, flow cell images can be acquired from one or more sequencing cycles and/or one or more channels. Each flow cell image may include in its field of view at least part of one or more tiles or subtiles of the flow cell. FIG. 27A shows a portion of a flow cell 2712 with multiple tiles 2710. The image plane is defined by the x and y axis. And the axial axis (i.e., z axis) is orthogonal to the x-y plane. Although the flow cell images, samples, and the axial axis are described in a Cartesian coordinate system as shown in FIGS. 27A-27B, any other coordinate systems can be used to define spatial locations and relationships herein. Other coordinate systems can include but not limited to the polar coordinate system, cylindrical, or spherical coordinate systems.

Figure 2:
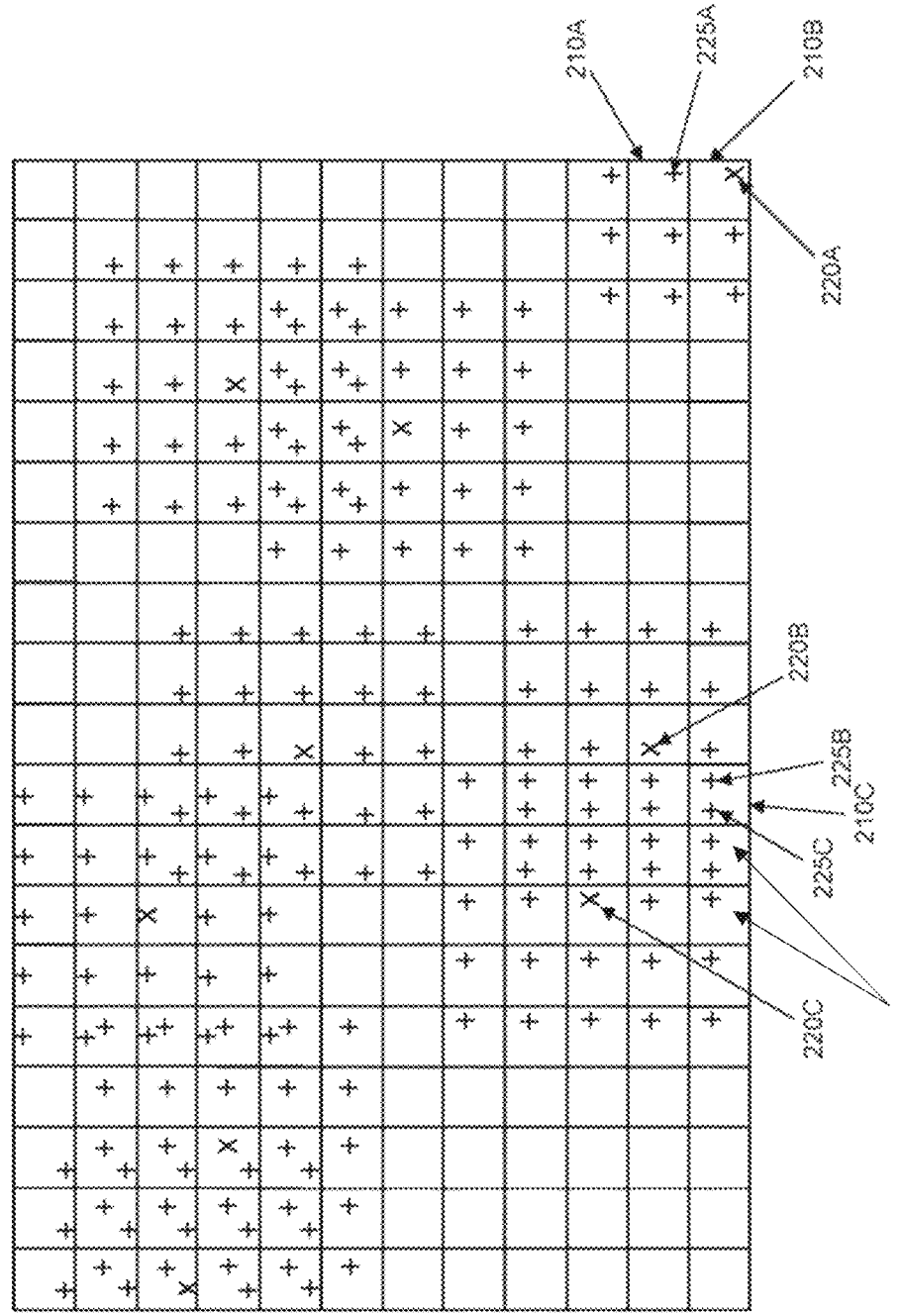
FIG. 2 illustrates an example flow cell image with candidate cluster center centers, according to some aspects.

FIG. 2 illustrates a schematic of a flow cell image 200 with signals from clusters present thereon. The flow cell image 200 is made up of pixels 210, such as pixels 210A, 210B, and 210C. During step 310, the imager records the optical signals received from the flow cell after, for example, excitation of the fluorescent elements bound to fragments on the flow cell, such fragments being located in clonal clusters of fragments.

In step 320, locations of potential cluster centers in the flow cell image are identified. For example, in some aspects, the optical signals imaged in step 310 may be input into a spot-finding algorithm, such that the spot-finding algorithm outputs a set of potential cluster centers. In some aspects, the potential cluster centers may be identified using only a single flow cell image (e.g., one image containing all wavelengths of interest). In some other aspects, the potential cluster centers may be identified from a set of images from a single flowing cycle on the flow cell (e.g., one image at each wavelength of interest). The use of only a flow cell image or set of flow cell images from a single flowing cycle advantageously reduces the amount of processing time, as the spot-finding algorithm need not wait for additional images from future flowing cycles to be obtained.

In still other aspects, the spot-finding algorithm may be applied to images from more than one sequencing cycle, and the potential cluster centers may be found using some combination of those images. For example, the potential cluster centers may be identified by the presence of spots occupying the same location in images from more than one sequencing cycle.

The potential cluster center locations identified by the spot-finding algorithm are depicted with an "X" in FIG. 2, such as potential cluster center locations 220A, 220B, and 220C, Due to the random nature of fragment attachment to the flow cell, some of the clonal clusters may be close together, while other clusters may be further apart or even stand alone. As a result, some "X"s in FIG. 2 are located more closely together than others. Additionally, some pixels may be identified as containing a potential cluster center, while others are not. For example, pixel 210A may be identified as containing a potential cluster center location 225A, while pixel 210B is not initially identified as containing a potential cluster center location 220.

In some aspects, the spot-finding algorithm may identify the potential cluster center locations 220 at a sub-pixel resolution by interpolating across the pixel 210. For example, the potential cluster center location 225A is located in the lower right side of pixel 210A, rather than the center of pixel 210A. Other potential cluster center locations may be located in different areas of their respective pixels 210. For example, potential cluster center location 225B is located in the top right of a pixel, and potential cluster center location 225C is located in the top left of a pixel. Interpolation may be performed by an interpolation function.

In some aspects, the interpolation function is a Gaussian interpolation function known to persons of skill in the art. The sub-pixel resolution may allow the potential cluster locations to be determined, for example, at one-tenth pixel resolution, although other resolutions are also considered. In aspects, for example, the resolution may be one-fourth pixel resolution, one-half pixel resolution, etc. The interpolation function may be configured to determine this resolution.

The interpolation function may be used to fit to the intensity of the light in one or more pixels 210. This interpolation allows the sub-pixel locations to be identified. The interpolation function may be applied across a set of pixels 210 that include a potential cluster center location 220. In an aspect, the interpolation function may be fit to a pixel 210 with a potential cluster center location 220 in it and the surrounding pixels 210 that touch the edges of that pixel 210.

In some aspects, the interpolation function may be determined at a number of points in the image. The resolution determines how many points are located in each pixel 210. For example, if the resolution is one-tenth of a pixel, then along a line perpendicular to the pixel edge there will be nine points calculated across the pixel 210 and one on each edge, dividing the pixel 210 into ten parts. In some aspects, the interpolation function is calculated at each point and the difference between the interpolation function at each point and the pixel intensity is determined. The center of the interpolation function is shifted to minimize the difference between the interpolation function and the intensity in each pixel 210. This sub-pixel interpolation allows the system to achieve a higher resolution with a lower-resolution imager, reducing cost and/or complexity of the system.

In some aspects, the interpolation may be performed on a five-by-five grid. The grid may be centered on pixel center 210 in a pixel with a potential cluster center location.

While some aspects of step 320 use a spot-finding algorithm to identify potential cluster center locations, some other aspects of step 320 initially identify every pixel in the captured flow cell image as a potential cluster center location. For example, in FIG. 2, every pixel 210 may be identified as a potential cluster center location 220. This approach eliminates the need for a spot-finding algorithm, which may simplify the type of processing needed to implement method 300. This approach may be advantageous when massive parallel processing is available, as each potential cluster center location may be processed in parallel. This may reduce processing time, although at the potential cost of additional hardware, such as increased dedicated processors 118 or FPGA(s) 120. In some aspects, an interpolation function may be then used as described above for identifying intensity at a sub-pixel resolution across the entirety of the flow cell image.

As discussed above, a cluster center identifies a location in the image, such as a pixel 210, which corresponds to the location of the clonal cluster on the physical flow cell. The potential cluster center locations 220 are locations in the image where light at one or more wavelengths is detected by the imager. In some cases, it is possible that the physical location of a cluster corresponds to one set of pixels 210, but that the optical signals from that cluster overflow onto additional pixels 210 that are adjacent to that one set, for example due to saturation of the corresponding sensor within the camera (also referred to as "blooming"). Additionally, when clusters are located close together, the optical signals from those clusters may overlap, even if the clusters themselves do not. Identifying the true cluster centers allows the detected signals to be attributed to the correct DNA fragments, and thus improves the accuracy of the base-calling algorithm.

Accordingly, in step 325, additional cluster signal locations 225 are identified around each potential cluster center location 220. These are depicted with a "+" in FIG. 2, such as 225A, 225B, and 225C. These additional cluster signal locations 225 correspond to other locations in the flow cell which may constitute a cluster center, instead of or in addition to locations already identified as potential cluster center locations 220.

In some aspects, additional cluster locations 225 are placed around the potential cluster center locations 220. In some aspects, these additional cluster locations 225 are not initially identified by a spot finding algorithm, but are placed in a pattern around each potential cluster center location 220 that is identified by a spot finding algorithm. The additional cluster locations 225 do not represent actual, detected cluster centers, but rather represent potential locations to check for cluster centers that might otherwise be undetected. Such cluster centers may be undetected due to mixing between signals from proximate cluster centers, errors in the spot finding algorithm, or other effects.

As an example, additional cluster location 225A may be placed in pixel 210A, based on the location of potential cluster center location 220A. In this context, this may mean that the additional cluster location 225A is placed a pixel's width away from the potential cluster center location 220A. Other additional cluster locations 225 are also located around potential cluster center location 220A. It should be understood that additional cluster locations 225 would not be located where pixels 210 do not exist, such as when a potential cluster center location 220 is near the edge of the flow cell image 200.

In some aspects, the additional cluster signal locations 225 are placed in a grid centered around a potential cluster center location 220. The additional cluster locations 225 may be placed spaced apart from each other and the potential cluster center location 220 by a pixel width. In some aspects, the additional cluster locations 225 and the potential cluster center location 220 form a square grid. The grid may have an area of five pixels by five pixels, nine by nine, fifteen by fifteen, or other dimensions.

In some aspects, potential cluster center locations 220 may be close enough together to cause the corresponding grids of additional cluster locations 225 to overlap. This may result in the same pixel 210 containing an additional cluster location 225 from more than one potential cluster center location 220, such that more than one additional cluster location 225 is attributed to the same pixel 210. For example, pixel 210C contains additional cluster location 225B (which was identified based on potential cluster center location 220B), as well as additional cluster location 225C (which was identified base on potential cluster center location 220C).

In some aspects, if the additional cluster locations 225 in the same pixel 210 are close enough together, one of the additional cluster locations 225 is discarded and the other is used to represent both. The two additional cluster locations 225 may be considered as close enough together for such treatment if they are within, for example and without limitation, two tenths of a pixel, one tenth of a pixel, or some other sub-pixel distance.

One of skill in the art will appreciate that if, in step 320, all pixel locations were identified as potential cluster center locations 220, then step 325 may be skipped as there are no other pixels left in the flow cell image to consider in addition to the identified potential cluster center locations.

In some aspects, the potential cluster center locations 220 (and the surrounding additional cluster locations 225, if identified) together constitute a set of all candidate cluster centers. These candidate cluster centers may be processed to identify the actual cluster centers for each captured flow cell image.

Accordingly, once the potential cluster center locations 220 and their surrounding grids of additional cluster locations 225 (i.e., the candidate cluster centers) have been identified, they may be used as a starting point for determining the actual locations of the cluster centers, which may or may not be the same as the originally-identified potential cluster center locations 220.

Returning to FIG. 3, in step 330, a purity value for each candidate cluster center on each captured flow cell image is determined. The purity values may be determined based on the wavelengths of the fluorescent elements bound to the nucleotides and the intensity of the pixels in the captured flow cell images.

At each candidate cluster center, the intensity of the pixel is a combination of the energy or light emitted across the spectral bandwidth of the imager. In some aspects, an amount of energy or light corresponding to the fluorescent spectral bandwidth of each nucleotide base may be found. The purity of each signal corresponding to a particular nucleotide base may be found as a ratio of the amount of energy for one nucleotide base signal to the total amount of energy for each other nucleotide base signal (e.g., the purity of a "red" signal may be determined based on relative intensities of detected red wavelengths for that pixel or sub-pixel as compared to each of detected blue, green, and yellow wavelengths). An overall purity of the pixel may be the largest ratio, the smallest ratio, a mean of the ratios, or a median of the ratios. The calculated purity may then be assigned to that pixel or sub-pixel.

As mentioned above, a set of flow cell images may be captured for a single sequencing cycle. Each image in the set is captured at a different wavelength, each wavelength corresponding to one of the fluorescent elements bound to the nucleotides. The purity of a given cluster center across the set of images may be the highest, lowest, median, or mean purity from the set of purities for the set of images.

In some aspects, the purity of a candidate cluster center may be determined as one minus the ratio of the second highest intensity or energy from the wavelengths for a pixel to the highest intensity or energy from the wavelengths for that pixel. A threshold may be set for what constitutes high or low purity. For example, the highest purity may be one and low purity pixels may have purity values closer to zero. The threshold may be set in between.

In some aspects, the ratio of the two intensities may be modified by adding an offset to both the second highest intensity and the highest intensity. The offset may provide improved accuracy in the quality score. For example, in some cases, the two intensities in the ratio may differ by a small amount of the absolute maximum intensity that is also a large percentage of the highest intensity. As a specific, non-limiting example, the highest intensity may be ten and the lowest intensity may be one with a maximum possible intensity of 1000. The ratio in this case will be 0.1, which results in a purity of 0.9. Without more, this potentially reads as a high quality score. This contrasts with an intensity of, for example, 500 for the highest intensity and 490 for the second highest intensity. This example has about the same absolute difference, but the ratio is close to one and the purity is close to zero. In the first case, the purity is misleading, as the low overall intensity suggests that no polony is present. In the second case, the purity is more accurate and indicates that the pixel is displaying intensity or energy from two different cluster centers that are located nearby.

The offset may be a value added to the intensities in the ratio to resolve such issues. For example, if the offset is ten percent of the maximum amplitude, in the example above, the offset is 100 and the first ratio becomes 101 over 110, which is much closer to one, resulting in a purity near zero, which accurately reflects the small delta between the two wavelength intensities. In the second ratio, the ratio is 600 over 590, which is still close to one, again resulting in a purity near zero.

As another example of incorporating the offset, if the highest intensity is 800 and the lowest intensity is one, the purity without the offset is close to one, as the ratio is almost zero. If the offset is again 100, the ratio becomes 101 over 900. This lowers the purity slightly from one to about 0.89. While this may decrease the purity, the calculated purity is still high. The offset value may be set to reduce this impact. For example, the offset in another case may be 10. Using the previous example of a highest intensity of ten and a lowest intensity of one, the purity because one minus $10/11$, or around 0.09, which is accurately reflects the small difference between the intensities. In the example where the highest intensity is 600 and the lowest intensity is 590, the purity is one minus 600/610, or around 0.016, which is again reflective of the small difference between the intensities. In the example where the highest intensity is 800 and the lowest intensity is one, the purity is one minus $11/810$, or around 0.99, which is a much smaller decrease in purity and is reflects the large difference between the intensities.

In step 340, the actual cluster centers are identified based on the purity values calculated for the candidate cluster centers for the flow cell. The actual cluster centers may be a subset of the candidate cluster locations identified in steps 320 and 325.

In some aspects, the actual cluster centers are identified by comparing the purity for each candidate cluster center across the flow cell image to nearby candidate cluster centers within that same image. In some aspects, given two candidate cluster centers that are being compared, the candidate cluster center with the greater purity is kept. In some aspects, candidate cluster centers are only compared to other candidate cluster centers within a certain distance. For example, this distance threshold may be based on the pixel size and the size of the clusters of a given nucleotide.

For example, if the average size of a cluster is four pixel widths/heights, then the distance threshold may be two pixel widths/heights, as any candidate cluster centers within two pixel widths/heights of each other likely either belong to the same cluster or have a higher intensity (indicating that the candidate cluster center is actually on the edge of two separate clusters).

In some aspects where purity is calculated across multiple flow cell cycles, determining that a candidate cluster center consistently has a purity that is higher than the surrounding candidate cluster centers across multiple flow cell images may further strengthen the likelihood that the location is an actual cluster center. Lower purity may indicate that the signal detected in the candidate cluster center is not an actual cluster center, but noise, mixing of other signals, or some other phenomenon.

In step 350, the actual cluster centers are used to perform base-calling on flow cell images. For example, the wavelength detected from an actual cluster center may be determined, which is in turn correlated to a particular nucleotide base (e.g., A, G, C, T). That nucleotide base is then logged as having been added to the sequence corresponding to the actual cluster center.

Through successive iterations of sequencing cycles and fluorescence wavelength identification at actual cluster centers in successive flow cell images, the sequence for the DNA fragment corresponding to each actual cluster center on the flow cell may be built.

In some aspects, a template is formed from the actual cluster centers identified for a single sequencing cycle. The actual cluster locations in the template may then be used to identify where to perform base-calling in images from subsequent sequencing cycles.

Flow cell images captured in different sequencing cycles may have registration issues due to shifting in the position of the flow cell or the imager between the sequencing cycles. Accordingly, in some aspects, step 350 may include a registration step to properly align successive images. This ensures that the actual cluster centers on the template accurately map to the same locations on each flow cell image, thus improving accuracy of the base-calling.

In some aspects where a template is used to identify actual cluster centers in subsequent images, only the data corresponding to relevant locations in those subsequent images need be maintained and/or processed. This decrease in the amount of data processed increases the speed and/or efficiency of the processing, such that accurate results may be obtained more quickly than in legacy systems. Additionally, a decrease in the amount of data stored decreases the amount of storage needed for a sequencer, thus decreasing the amount and/or cost of resources needed.

Additionally, some legacy systems require comparing different images to one another to identify cluster locations. This comparison may include applying a spot-finding algorithm to images from multiple flow cell cycles, and then comparing the spot-finding results across the images. This may require storing images or spot-finding results for each of multiple sequencing cycles. Method 300 may improve the processing and storage efficiency of cluster finding because the images do not need to be compared directly. Instead, the images may be processed in real time and only the purity information and/or final template location need be stored.

The sequencing cycle and image creation processes often run faster than the spot-finding and base-calling programs that analyze the images. This disparity in execution time may require storing the flow cell images after each sequencing cycle, or a delay in the sequencing cycle while waiting for some or all of the image analysis processes to complete.

The use of FPGAs allows for increased speed of processing without sacrificing accuracy. Implementing portions or all of the processes described herein on FPGAs reduces processor overhead and may allow for parallel processing on the FPGAs. For example, each possible cluster location may be processed by a different FPGA, or a single FPGA configured to process the possible cluster locations in parallel at the same time. When properly implemented, this may allow for real-time processing. Real-time processing has the advantage that the image may be processed as it is generated. The FPGA will be ready to process the next image by the time the sequencing system has prepared the flow cell. The sequencing system will not need to wait for the post-processing and the entire process of primary analysis may be completed in a fraction of the time. Additionally, because the entire image has been processed as it is received, the only information that need be stored is data for performing base-calling. Instead of storing every image, only the purity or intensity for particular pixels need be stored. This greatly reduces the need for data storage in the sequencing system or for remote storage of the images.

In some aspects, the entire process, including image registration, intensity extraction, purity calculation, base-calling, and other steps, is performed by FPGAs. This may provide the most compact implementation and provides the speed and throughput necessary for real-time processing.

In some aspects, the processing responsibilities are shared, such as between the FPGAs and an associated computer system. For example, in some aspects, the FPGAs may handle image registration, intensity extraction, and purity calculations. Then, the FPGAs then hand the information off to the computer system for base-calling. This approach balances the load between the FPGAs and computer system resources, including scaling down the communication between FPGAs and computer system. It also provides flexibility for software on the computer system to handle base-calling with quick algorithm tune-ups capabilities. Such an approach may provide real-time processing.

Those skilled in the art will recognize that different configurations of the FPGAs, dedicated processors, and the computer system may be used to perform the various steps. The selection of a given configuration may be based on the flow cell image size, imager resolution, the number of images to process, desired accuracy, and the necessary speed. The implementation cost and hardware cost for the FPGAs, dedicated processors, and computer system may also impact the choice of configuration.

As a non-limiting example comparing performance between existing methods and aspects of the methods described herein, tests were run on two example flow cells, one with a low density of clusters and one with a high density of clusters. For the comparison, the tests were run using each method to target a specific average error rate for false positives on clusters identified.

For the low-density flow cell, the average error rate was 0.3%. Existing methods identified around 78,000 cluster centers, while the methods described herein identified around 98,000 cluster centers. For the high-density flow cell, the average error rate was 1.1%. Existing methods identified around 63,000 cluster centers, while the methods described herein identified around 170,0000 clusters.

The results suggest that the methods described herein effectively identify more clusters than existing methods. Further, even at the same error rate, when the density of the clusters on the flow cell increases, the methods disclosed herein perform even better, identifying almost three times as many clusters. In some aspects, this may allow for flow cells to be flowed at a higher density without the performance loss that is typically experienced in existing methods.

In Situ Sequencing

In some aspects, the methods, systems, and media for determining base calling locations can be utilized in in situ sequencing, e.g., of 3D volumetric samples. In in situ sequencing described herein, the RNA is not extracted from the cellular sample and sequencing information does not need to be tracked and mapped back to an image of the cellular sample. Rather, RNA is retained inside the cellular sample to permit direct imaging of the spatial location of target RNAs within the cells. Additionally, RNA within the cellular sample is not fragmented and enrichment of target RNA is not necessary. Use of target-specific and/or random-sequence reverse transcription primers enables detection of both poly-A and non-poly-A RNAs in either uni-plex or multi-plex modes.

In some aspects, in situ sequencing herein comprises repeatedly conducting multiple sequencing cycles of the same region of the template molecules (e.g., concatemer molecules). By conducting reiterative sequencing cycles (e.g., a small number of less than 30 or 40 cycles comparing to reads of over 100 cycles), the RNA content of the cellular sample can be discovered. Compared to long read sequencing workflows, the reiterative short sequencing cycles described herein use a reduced amount of sequencing reagents which reduces cost and saves time. Methods for conducting reiterative short (e.g., 2-40 cycles) sequencing cycles has many uses including but not limited to detecting specific RNAs of interest, mutant RNA sequences, splice variants, and their abundance levels thereof.

The concatemers herein carry tandem repeat units of a cDNA-of-interest, the universal sequencing primer binding site, and the target barcode sequence. The concatemers are sequenced inside the cellular sample where multiple sequencing cycles (e.g., 2-40 cycles) are conducted for each round and multiple rounds of short read sequencing is conducted. The full length of the target barcode and cDNA region are not sequenced. Instead, at least a portion of the target barcode region is reiteratively sequenced. In some aspects, it is not necessary to sequence the cDNA region. In some aspects, the target barcode and a portion of the cDNA region are reiteratively sequenced. In some aspects, it is not necessary to sequence the entire length of the cDNA region. In some aspects, it is not necessary to assemble the sequencing reads or to obtain a full length sequence of the cDNAs-of-interest. The redundant sequencing information obtained from the short sequencing reads herein may advantageously obviate the need to sequence the complementary strand of the concatemer. Thus pairwise sequencing is not necessary.

Additionally, in some aspects, a short portion of the cDNA region in the concatemer is re-sequenced at least once (e.g., reiterative sequencing) from the same start position to generate overlapping sequencing reads that can be aligned to a reference sequence. For example, the same portion of the concatemer molecule can be sequenced at least two, three, four, five, or up to 50 times. The start sequencing site can be any location of the concatemer and is dictated by the sequencing primers which are designed to anneal to a selected position within the concatemer. The reiterative short sequencing reads increase the redundancy of sequencing information for individual bases in the cDNA region. Reiteratively sequencing one strand of the concatemer template molecule provides enough base coverage to reveal the presence of target RNAs in the cellular sample so that pairwise sequencing of the complementary strand is not necessary.

A concatemer template molecule may include multiple sequencing primer binding sites along the same concatemer molecule which can be used to generate multiple usable sequencing reads for increased sequencing depth. Together, reiteratively sequencing one strand of the concatemer templates may increase sequencing base coverage and sequencing depth compared to sequencing a one-copy template molecule.

The in situ sequencing described herein can be conducted in uni-plex or multi-plex modes. Two or more different target RNAs can be detected and imaged simultaneously inside a cellular sample using different reverse transcription primers, different target-specific padlock probes, and universal sequencing primers. For example, the presence of a housekeeping RNA and at least one target RNA in a cellular sample can be simultaneously detected and imaged using any of the reiterative short read sequencing methods described herein.

3D Base Calling Templates

In some aspects, disclosed herein are methods for generating a base calling template of cellular sample(s) in in situ sequencing. The base calling template may comprise base calling locations from a single 2D plane, multiple 2D planes, or a 3D space. The base calling template may be generated using flow cell images within the single 2D plane, the multiple 2D planes, or the 3D space. The base calling template may be used to register flow cell images acquired within the single 2D plane, the multiple 2D planes, or the 3D space to a common coordinate system.

Traditional 2D flow cell images can show clusters or polonies from flattened samples and base callings can be performed using their corresponding image intensities. The optical system can be tuned to image the clusters or polonies while they are in-focus ("in-focus" herein may include substantially in-focus and/or within the depth of field for acquiring the corresponding flow cell image(s)). However, in situ samples such as cells or tissue can have a thickness along the axial or z direction that cannot be in-focus within a single 2D image. A stack of multiple 2D flow cell images may be required to cover clusters or polonies at different axial locations. Interferences may occur in the stack of flow cell images, such as from out-of-focus polonies and background signal from cellular components. For example, a polony that locates at a first axial location can appear in a first flow cell image and it may also generate a blob of signal in a second flow cell image taken at an adjacent axial location of the first flow cell image where the polony is out-of-focus. The blob of signal may interfere with intensities of polonies at or near the same x-y location in the second flow cell image, thus deteriorating the accuracy and reliability of base callings of in situ samples. Further, the same polony may be included in both polony maps corresponding to the two adjacent axial locations thereby causing inaccurate base calling results. As such, there is a need for generating accurate and reliable base calling templates for polonies or clusters from 3D volumetric samples so that they can be used for 3D base callings.

The techniques disclosed herein advantageously generate a 3D base calling template (i.e., polony map) for in situ sequencing analysis. Based on the characteristics of the polonies or clusters in flow cell images, the techniques herein efficiently remove out-of-focus polonies and background objects without effecting in-focus polonies or clusters in the flow cell images and eventually in the 3D polony map. The 3D polony map can be used for extracting polony intensities for base callings. Comparing with a single flattened 2D polony map, the 3D polony map advantageously retains information of polonies and clusters that may be attenuated or completed removed in the 2D polony map. In some aspects, the 3D polony map herein is not limited to generating base calling locations only at the predetermined axial locations for generating flow cell images. The 3D polony map may include subpixel resolution along the axial axis so that base calling locations can be between two adjacent axial locations for flow cell images. The 3D polony map can be generated in a few early sequencing cycles and used in subsequent sequencing cycles so that the additional computational load of recalculating new polony maps and the storage space for storing the new polony maps can be minimized. In some aspect, the techniques disclosed herein advantageously utilize images that retain background information for accurate and efficient registration of the polonies or clusters to images showing one or more cellular features.

Figure 5:
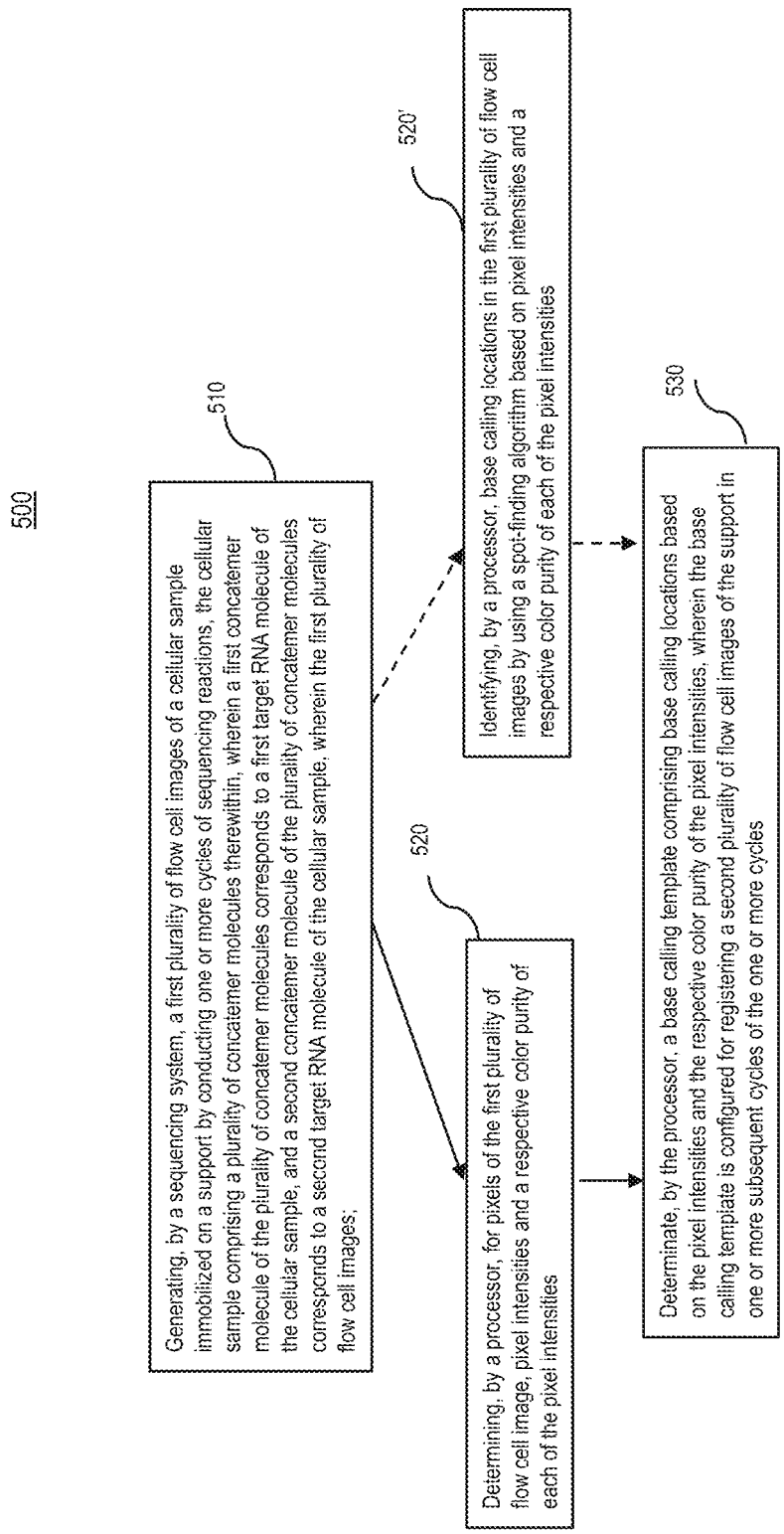
FIG. 5 is a flow chart illustrating a method for identifying locations at which to perform bas-calling, according to some aspects.

FIG. 5 shows a flow chart of an exemplary aspect of the methods 500 for generating a base calling template for in situ sequencing by identifying base calling locations that are included in the base calling template. The methods 500 can include some or all of the operations disclosed herein. The operations may but is not limited to be performed in the order that is described herein.

The methods 500 can be performed by one or more processors (e.g., 404 in FIG. 4) disclosed herein. In some aspects, the processor can include one or more of: a processing unit, an integrated circuit, or their combinations. For example, the processing unit can include a central processing unit (CPU) and/or a graphic processing unit (GPU). The integrated circuit can include a chip such as a field-programmable gate array (FPGA). In some aspects, the processor can include the computing system 400.

In some aspects, some or all operations in methods 500 can be performed by the FPGA(s). In aspects when some operations are performed by FPGA(s), the data after an operation performed by the FPGA(s) can be communicated by the FPGA(s)s to the CPU(s) so that CPU(s) can perform subsequent operation(s) in method 500 using such data. Similarly, data can also be communicated from the CPU(s) to the FPGA(s) for processing by the FPGA(s). In some aspects, all the operations in method 500 can be performed by CPU(s). Alternatively, the operations performed by CPU(s) can be performed by other processors such as the dedicated processors, or GPU(s). In some aspects, all the operations in methods 500 can be performed by FPGA(s).

In some aspects, some or all operations of the methods 500 are performed during or before a sequencing cycle N in a sequencing run. A base calling template, e.g., a polony map, can be generated using information obtained from some or all of cycles 1 to N. Polonies or clusters from one or more channels within such cycles can be included in the template in a reference coordinate system, while flow cell images of cycle N and/or its subsequent cycles are yet to be captured or being currently captured. In some aspects, cycle N is the current cycle. N can be any non-zero integer, e.g., 3, 4, 5, 6, or 10.

As disclosed herein, "base calling template" and "polony map" are equivalent and can be used interchangeably. The base calling template or polony map can include one or more base calling locations as disclosed herein. The base calling template or polony map disclosed herein can be either 2D or 3D. When all the base calling locations within a base calling template or polony map are in a same 2D plane, the base calling template or polony map is 2D. When some of the base calling locations are not in a same 2D plane but in a 3D space, the base calling template or polony map is 3D.

Although 2D and/or 3D Cartesian coordinate systems are used to define spatial locations herein, various alternative coordinate systems can be used to define spatial locations and relationships. Some exemplary coordinate systems other than the Cartesian system can include but not limited to the polar coordinate system, cylindrical, or spherical coordinate systems. Other coordinate systems can include homogeneous or non-homogenous coordinate system.

In some aspects, the method 500 can include an operation of providing the cellular sample harboring a plurality of RNA which comprises the first target RNA molecule and the second target RNA molecule.

In some aspects, the cellular sample is fixed and permeabilized. In some aspects, the cellular sample harbors 2-25 different target RNA molecules, or harbors 25-50 different target RNA molecules, or harbors 50-75 different target RNA molecules, or harbors 75-100 different target RNA molecules. In some aspects, the cellular sample harbors more than 100 different target RNA molecules, or more than 250 different target RNA molecules, or more than 500 different target molecules, or more than 1000 different target RNA molecules, or more. In some aspects, the cellular sample harbors more than 10,000 different target RNA molecules. In some aspects, the cellular sample comprises a whole cell, a plurality of whole cells, an intact tissue or an intact tumor. In some aspects, the cellular sample comprises a fresh cellular sample, a freshly-frozen cellular sample, a sectioned cellular sample, an FFPE cellular sample, or a sectioned FFPE cellular sample. In some aspects, the cellular sample is deposited onto a solid support. In some aspects, the cellular sample is deposited onto a solid support which is passivated with a coating that promotes cell adhesion. In some aspects, the cellular sample is deposited on a support that lacks immobilized capture oligonucleotides. In some aspects, the cellular sample is cultured before or after depositing the cellular sample onto the solid support. In some aspects, the cellular sample is cultured prior to conducting step (b) which is described below. In some aspects, the cellular sample comprises an expanded cellular sample that has been cultured in a simple or complex cell culture media. In some aspects, the cellular sample is not cultured or expanded prior to generating inside the cellular sample a plurality of cDNA molecules.

In some aspects, the method 500 can include an operation of generating inside the cellular sample a plurality of cDNA molecules which include a first target cDNA molecule that corresponds to the first target RNA molecule and a second target cDNA molecule that corresponds to the second target RNA molecule.

In some aspects, the operation of generating the plurality of cDNA molecules comprises generating at least 2-10,000 different target cDNA molecules that correspond to 2-10,000 different target RNA molecules. In some aspects, the operation of generating the cDNA molecules comprises contacting the plurality of RNA inside the cellular sample with (i) a plurality of reverse transcription primers, (ii) a plurality of reverse transcriptase enzymes, and (iii) a plurality of nucleotides, under a condition suitable for conducting a reverse transcription reaction to generate a plurality of cDNA molecules (e.g., a plurality of first strand cDNA molecules) in the cellular sample (e.g., FIG. 7).

In some aspects, the plurality of reverse transcription primers comprises a first sub-population of target-specific reverse transcription primers that hybridize selectively to the first target RNA, and comprises a second sub-population of target-specific reverse transcription primers that hybridize selectively to the second target RNA. In some aspects, the first and second sub-population of target-specific reverse transcription primers have the same sequence or different sequences.

In some aspects, the entire length of the first sub-population of target-specific reverse transcription primers hybridize to a first target RNA molecule. In some aspects, the first sub-population of target-specific reverse transcription primers comprise tailed primers having a portion that hybridizes to a first target RNA molecule and a portion that does not hybridize to a first target RNA molecule. In some aspects, the first sub-population of target-specific reverse transcription primers comprise at least a portion having a poly-T sequence. In some aspects, the first sub-population of target-specific reverse transcription primers comprise at least a portion having a random sequence and/or at least a portion having a target-specific sequence.

In some aspects, the entire length of the second sub-population of target-specific reverse transcription primers hybridize to a second target RNA molecule. In some aspects, the second sub-population of target-specific reverse transcription primers comprise tailed primers having a portion that hybridizes to a second target RNA molecule and a portion that does not hybridize to a second target RNA molecule. In some aspects, the second sub-population of target-specific reverse transcription primers comprise at least a portion having a poly-T sequence. In some aspects, the second sub-population of target-specific reverse transcription primers comprise at least a portion having a random sequence and/or at least a portion having a target-specific sequence.

In some aspects, a target RNA molecule that is hybridized to a cDNA molecule can be subjected to enzymatic degradation using a ribonuclease under a condition suitable for degrading RNA in an RNA/DNA duplex. In some aspects, a target RNA molecule that is hybridized to a cDNA molecule is not subjected to enzymatic degradation.

In some aspects, the method 500 further comprises an operation of contacting the plurality of cDNA molecules in the cellular sample with a plurality of target-specific padlock probes which includes at least a first plurality of first target-specific padlock probes and a second plurality of second target-specific padlock probes. In some aspects, the method comprises contacting the plurality of cDNA molecule in the cellular sample with at least 2-10,000 different target-specific padlock probes.

In an alternative aspect, cDNA is not generated from RNA inside the cellular sample. In some aspects, the methods 500 comprise an operation of contacting RNA inside the cell with a plurality of target-specific padlock probes and generating circularized padlock probes. In some aspects, the method comprises an operation of contacting the plurality of RNA molecules in the cellular sample with a plurality of target-specific padlock probes which includes at least a first plurality of target-specific padlock probes and a second plurality of target-specific padlock probes. In some aspects, the method comprises contacting the plurality of cDNA molecule in the cellular sample with at least 2-10,000 different target-specific padlock probes. In some aspects, a target RNA molecule can be subjected to enzymatic degradation using a ribonuclease. In some aspects, a target RNA molecule is not subjected to enzymatic degradation.

In some aspects, individual padlock probes in the plurality of first target-specific padlock probes comprise first and second terminal regions (e.g., first and second padlock binding arms), wherein the first terminal region selectively hybridizes to a first region of the first target cDNA molecule (or the first target RNA molecule), and the second terminal region selectively hybridizes to a second region of the first target cDNA molecule (or the first target RNA molecule). In some aspects, contacting the plurality of cDNA molecule comprises: hybridizing the first and second terminal regions of the first target-specific padlock probes to proximal positions on the first target cDNA molecule (or the first target RNA molecule) to form a circularized first target-specific padlock probe having a nick or gap between the hybridized first and second terminal regions (e.g., FIG. 7, left). In some aspects, the first target-specific padlock probe comprises a first target barcode sequence (target BC-1) that corresponds to and uniquely identifies the first target cDNA sequence (or the first target RNA sequence). In some aspects, the first target-specific padlock probe comprises a first target barcode sequence that is located adjacent to one of the regions of the first target-specific padlock probe that selectively hybridizes to the first target cDNA molecule (or the first target RNA sequence). In some aspects, the first target-specific padlock probe comprises at least one universal adaptor sequence, such as for example a universal sequencing primer binding site (or a complementary sequence thereof). In some aspects, the first target-specific padlock probe comprises a universal primer binding site for a rolling circle amplification primer (or a complementary sequence thereof). In some aspects, the first target-specific padlock probe comprises a universal compaction oligonucleotide binding site (or a complementary sequence thereof).

In some aspects, individual padlock probes in the plurality of second target-specific padlock probes comprise first and second terminal regions (e.g., first and second padlock binding arms), wherein the first terminal region selectively hybridizes to a first region of the second target cDNA molecule (or the second target RNA molecule), and the second terminal region selectively hybridizes to a second region of the second target cDNA molecule (or the second target RNA molecule). In some aspects, the contacting of step (c) comprises: hybridizing the first and second terminal regions of the second target-specific padlock probes to proximal positions on the second target cDNA molecule (or the second target RNA molecule) to form a circularized second target-specific padlock probe having a nick or gap between the hybridized first and second terminal regions (e.g., FIG. 7, right). In some aspects, the second target-specific padlock probe comprises a second target barcode sequence (target BC-2) that corresponds to and uniquely identifies the second target cDNA sequence (or the second target RNA sequence). In some aspects, the second target-specific padlock probe comprises a second target barcode sequence that is located adjacent to one of the regions of the second target-specific padlock probe that selectively hybridizes to the second target cDNA molecule (or the second target RNA sequence). In some aspects, the second target-specific padlock probe comprises at least one universal adaptor sequence, such as for example a universal sequencing primer binding site (or a complementary sequence thereof). In some aspects, the second target-specific padlock probe comprises a universal primer binding site for a rolling circle amplification primer (or a complementary sequence thereof). In some aspects, the second target-specific padlock probe comprises a universal compaction oligonucleotide binding site (or a complementary sequence thereof).

In some aspects, the first target barcode sequence (target BC-1) and the second target barcode sequence (target BC-2) have different sequences and can be used to conduct multiplex RNA detection and sequencing. In some aspects, the first target barcode sequence (target BC-1) and the second target barcode sequence (target BC-2) have the same sequence and can be used to conduct uni-plex RNA detection and sequencing.

In some aspects, the first and second target-specific padlock probes comprise a universal sequencing primer binding site and a target barcode sequence that are adjacent to each other so that the target barcode region of the concatemer is sequenced first. The target barcode sequence can be any length, for example 3-15 bases, or 15-25 bases, or 25-40 bases, or longer.

In some aspects, the operation of contacting the plurality of RNA molecules in the cellular sample with the plurality of target-specific padlock probes comprises: hybridizing the first and second terminal regions of the first target-specific padlock probes to proximal positions on the first target cDNA molecule or the first target RNA molecule to form a circularized first target-specific padlock probe having a nick or gap between the hybridized first and second terminal regions.

Figure 6:
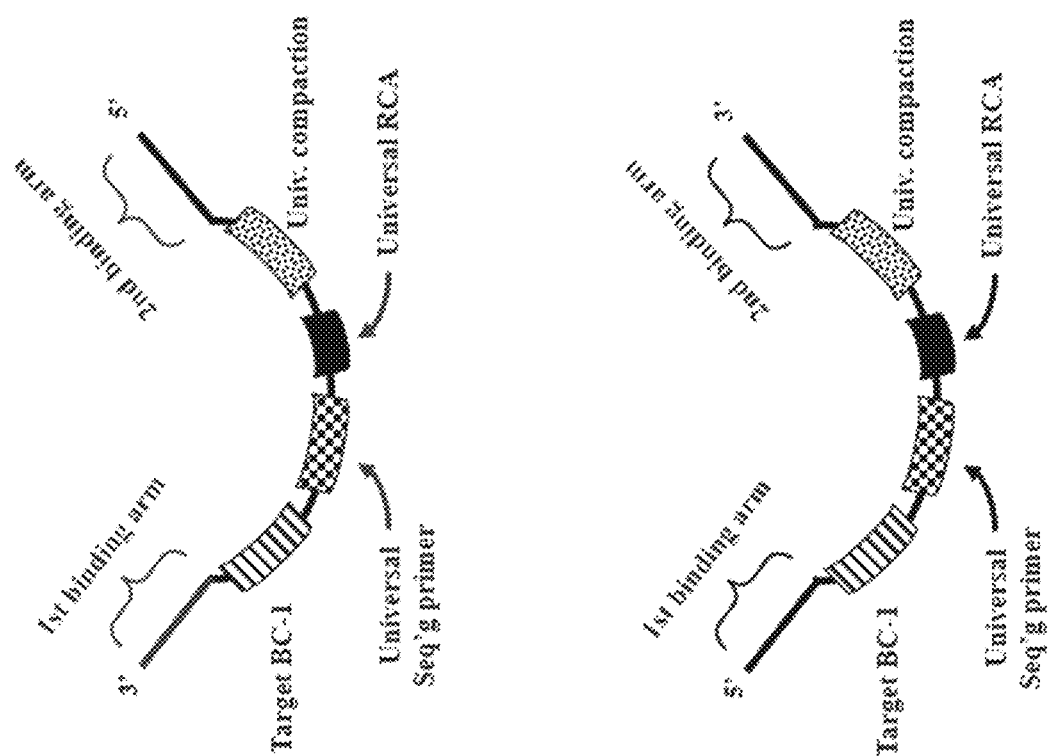
FIG. 6 is a schematic showing exemplary aspects of padlock probes.

FIG. 6 is a schematic showing exemplary aspects of padlock probes. In some aspects, a padlock probe comprises a single-stranded nucleic acid molecule having two terminal regions (e.g., first and second binding arms) and an internal region. In some aspects, the first terminal region of an individual padlock probe has a first target-specific sequence that selectively hybridizes to a first region of a target RNA or target cDNA molecule, and the second terminal region of the individual padlock probe has a second target-specific sequence that selectively hybridizes to a second region of the same target RNA or target cDNA molecule. In some aspects, the internal region of a padlock comprises a target barcode sequence (e.g., Target BC-1 or Target BC-2, left and right schematics respectively) which corresponds to a given target RNA or target cDNA. In some aspects, the target barcode sequence uniquely identifies the target RNA or target cDNA. In some aspects, the internal region of a padlock comprises a universal primer binding site for a sequencing primer (or a complementary sequence thereof). In some aspects, the internal region of a padlock comprises a universal primer binding site for a rolling circle amplification primer (or a complementary sequence thereof). In some aspects, the internal region of a padlock comprises a universal binding site for a compaction oligonucleotide binding (or a complementary sequence thereof). In some aspects, the internal region of a padlock probe includes a target barcode sequence and at least one universal primer binding site (e.g., for binding a sequencing primer, for binding a rolling circle amplification primer and/or for binding a compaction oligonucleotide) in any arrangement and orientation (FIG. 6, top and bottom).

Figure 7:
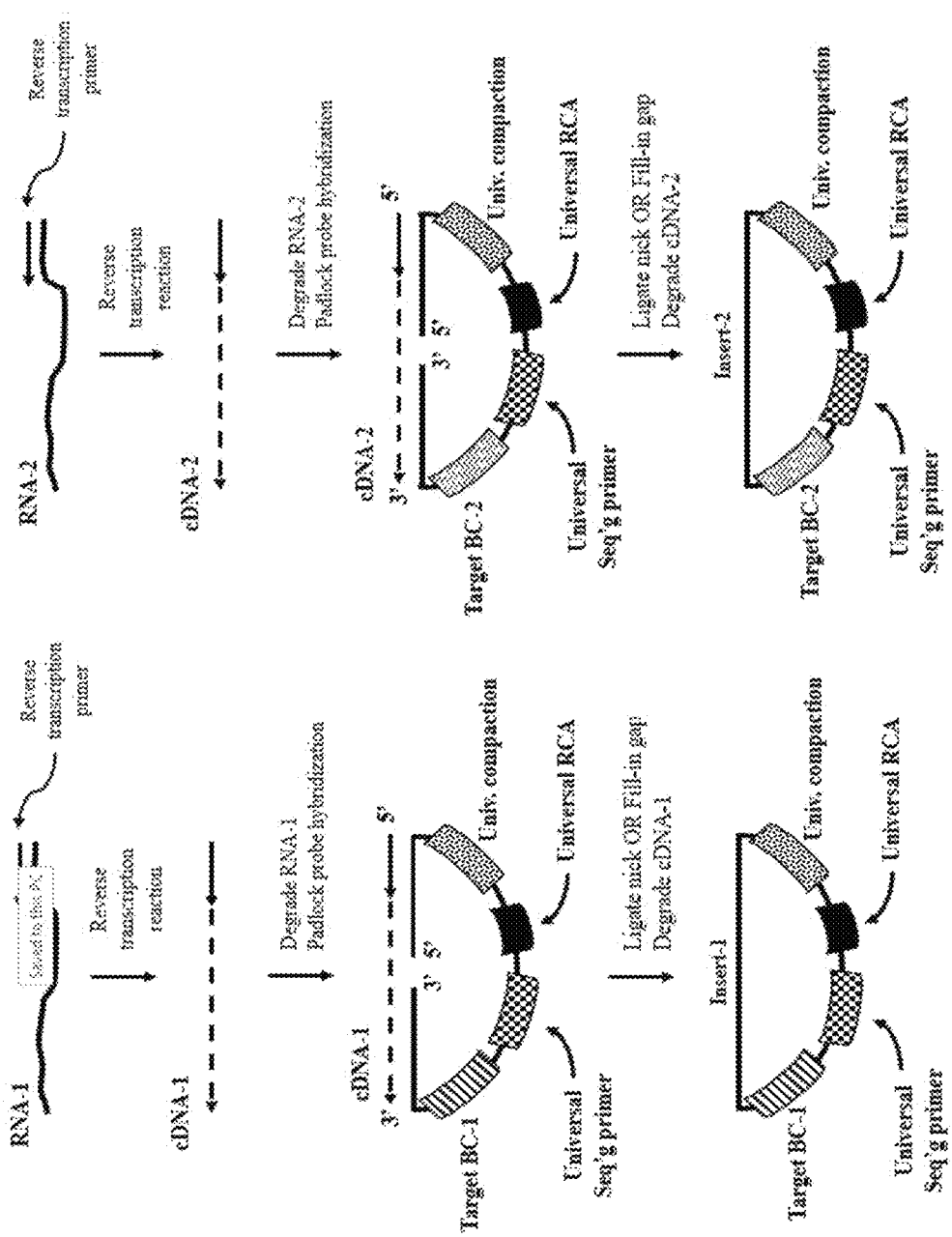
FIG. 7 is a schematic showing a workflow for generating inside a cell circularized padlock probes, comprising generating first and second cDNAs from first and second target RNA molecules (respectively), hybridizing first and second padlock probes to the first and second cDNA molecules (respectively) to generate first and second circularized padlock probes (respectively).

FIG. 7 is a schematic showing a workflow for generating inside a cell circularized padlock probes, comprising generating first and second cDNAs from first and second target RNA molecules (respectively), hybridizing first and second padlock probes to the first and second cDNA molecules (respectively) to generate first and second circularized padlock probes (respectively). The first padlock probe comprises (i) a first target barcode sequence (target BC-1) that uniquely identifies the first target RNA or the first target cDNA, (ii) a first sequencing primer binding site (or a complementary sequence thereof), (iii) a universal binding site for an amplification primer (universal RCA) (or a complementary sequence thereof), and (iv) a universal binding site for a compaction oligonucleotide (or a complementary sequence thereof). The second padlock probe comprises (i) a second target barcode sequence (target BC-2) that uniquely identifies the second target RNA or the second target cDNA, (ii) a second sequencing primer binding site (or a complementary sequence thereof), (iii) a universal binding site for an amplification primer (universal RCA) (or a complementary sequence thereof), and (iv) a universal binding site for a compaction oligonucleotide (or a complementary sequence thereof).

Figure 8:
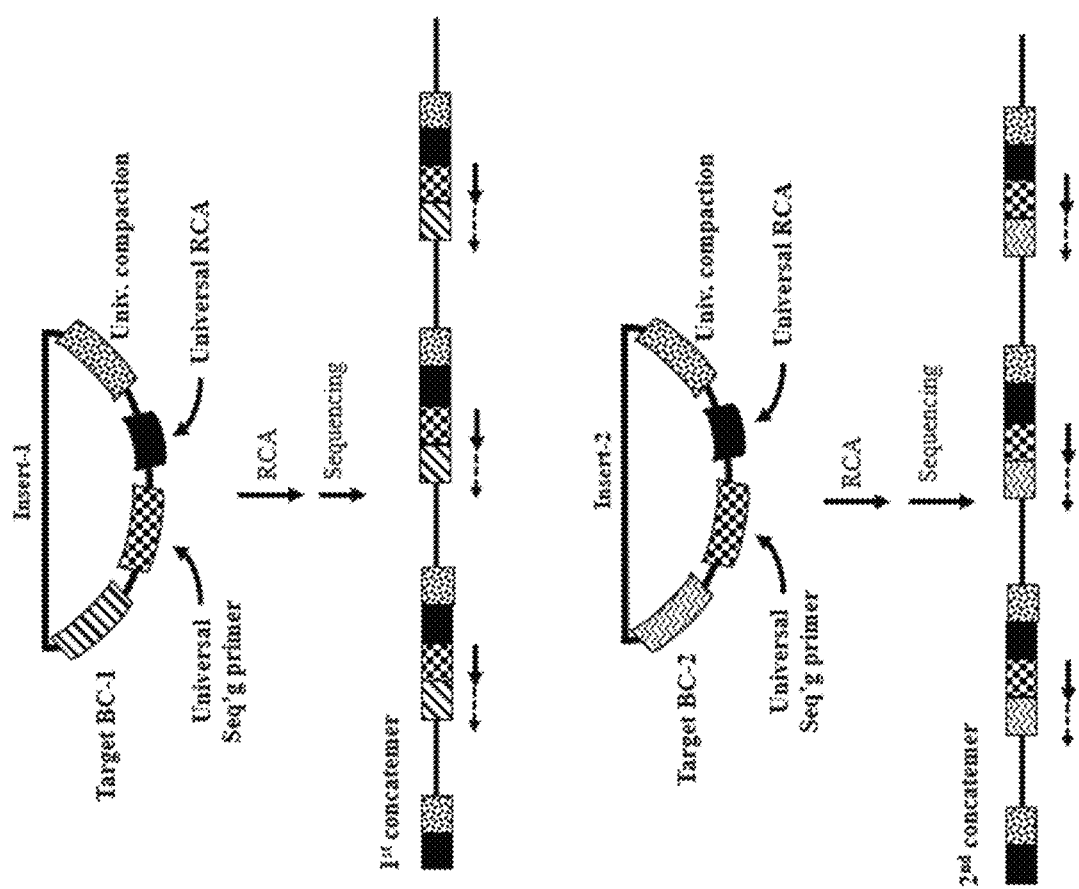
FIG. 8 is a schematic showing a rolling circle and sequencing workflow inside a cell, comprising generating first and second concatemers by conducting rolling circle amplification using first and second covalently closed circular molecules (respectively).

In some aspects, the methods 500 include an operation of closing the nick or gap in the at least first and second circularized target-specific padlock probes by conducting an enzymatic reaction, thereby generating at least a first covalently closed circular padlock probe and a second covalently closed circular padlock probe inside the cellular sample. In some aspects, the closing the nick in the first and second circularized padlock probes comprises conducting an enzymatic ligation reaction. In some aspects, closing the gap in the first and second circularized padlock probes comprises conducting a polymerase-catalyzed fill-in reaction using the first or second target cDNA molecule (or the first or second RNA molecule) as a template, and conducting an enzymatic ligation reaction. In some aspects, the method comprises closing the nick or gap in at least 2-10,000 circularized target-specific padlock probes by conducting one or more enzymatic reactions, thereby generating at least 2-10,000 covalently closed circular padlock probes inside the cellular sample. FIG. 8 shows exemplary covalently closed circular padlock probes.

In some aspects, the methods 500 includes an operation of conducting a rolling circle amplification reaction inside the cellular sample using the first and second covalently closed circular padlock probes as template molecules, thereby generating a plurality of concatemer molecules including at least a first concatemer molecule that corresponds to a first target RNA molecule, and the plurality of concatemer molecules includes at least a second concatemer molecule that corresponds to a second target RNA molecule. In some aspects, the first concatemer molecule comprises tandem repeat units, wherein a unit comprises a sequence that corresponds to the first target cDNA (or the first target RNA), the first target barcode sequence, and the universal sequencing primer binding site (or a complementary sequence thereof). In some aspects, the second concatemer molecule comprises tandem repeat units, wherein a unit comprises a sequence that corresponds to the second target cDNA (or the second target RNA), the second target barcode sequence, and the universal sequencing primer binding site (or a complementary sequence thereof).

In some aspects, the rolling circle amplification reaction herein comprises contacting the covalently closed circularized padlock probes with an amplification primer (e.g., a universal rolling circle amplification primer), a strand-displacing DNA polymerase, and a plurality of nucleotides, under a condition suitable for hybridizing individual amplification primers to a covalently closed padlock probe, and under a condition suitable for conducting primer extension using the covalently closed padlock probe as a template molecule to generate a nucleic acid concatemer. In some aspects, the method comprises conducting a rolling circle amplification reaction inside the cellular sample using the at least 2-10,000 covalently closed circular padlock probes as template molecules, thereby generating at least 2-10,000 concatemer molecules that correspond to at least 2-10,000 target RNA molecules. In some aspects, the plurality of concatemers that are generated inside the cellular sample collapse into a DNA nanoball having a shape and size that is more compact compared to a non-collapsed concatemer.

In some aspects, the methods 500 includes an operation 510 of generating a plurality of flow cell images of a cellular sample immobilized on a support by conducting one or more cycles of sequencing reactions.

The plurality of flow cell images can be the first plurality of flow cell images acquired in the one or more cycles of sequencing reactions. The one or more cycles can be any cycles during a sequencing run. The one or more cycles can be earlier cycles, e.g., cycle 1-cycle 10 or cycle 1-cycle 5, during the sequencing run.

In some aspects, the cellular sample include a plurality of concatemer molecules there within. The first concatemer molecule(s) of the plurality of concatemer molecules may correspond to a first target RNA molecule of the cellular sample. The second concatemer molecule(s) of the plurality of concatemer molecules may correspond to a second target RNA molecule of the cellular sample.

In some aspects, the cellular sample can be cultured on the support. In some aspects, the methods 500 comprise an operation of culturing the cellular sample on the support under a condition suitable for expanding the cellular sample for 2-10 generations or more. The cultured cellular sample can generate a colony of cells. In some aspects, the cellular sample comprise one or more in situ samples. In some aspects, the cellular sample comprises one or more cells or tissue. In some aspects, the methods can comprise culturing the cellular sample to confluence or non-confluence. In some aspects, the methods comprise culturing the cellular sample on the support in a simple or complex cell culture media. For example, the cell culture media comprises D-MEM high glucose (e.g., from Thermo Fisher Scientific, catalog No. 11965118), fetal bovine serum (e.g., 10% FBS; for example from Thermo Fisher Scientific, catalog No. A3160402), MEM non-essential amino acids (e.g., 0.1 mM MEM, for example from Thermo Fisher Scientific, catalog No. 11140050), L-glutamine (e.g., 6 mM L-glutamine, for example from Thermo Fisher Scientific, catalog No. A2916801), MEM sodium pyruvate (e.g., 1 mM sodium pyruvate, for example from Thermo Fisher Scientific, catalog No. 11360070), and an antibiotic (e.g., 1% penicillin-streptomycin-glutamine, for example from Thermo Fisher, catalog No. 10378016). In some aspects, the methods comprise culturing the cellular sample at a humidity and temperature that is suitable for culturing the cell(s) on the support. Exemplary suitable conditions comprise approximately 37° C. with a humidified atmosphere of approximately 5-10% carbon dioxide in air. The cellular sample can be cultured with suitable aeration with oxygen and/or nitrogen.

In any of the methods described herein, the cellular sample harbors a plurality of RNA which include target RNA and/or non-target RNA. In some aspects, cells typically produce RNA by gene expression which includes transcription of DNA (e.g., genomic DNA) into RNA molecules. The transcribed RNA can undergo splicing or may not be spliced. The transcribed RNA can be translated into a polypeptide (e.g., coding RNA), or do not undergo translation but can be processed into tRNA or rRNA (e.g., non-coding RNA).

In some aspects, the cellular sample can include a plurality of RNA there within. The RNAs can be inside individual cells of the cellular sample. The plurality of RNA can be harbored by the cellular sample. The RNAs can include target and non-target RNA. In some aspects, the plurality of RNA harbored by the cellular sample comprises wild type RNA, mutant RNA or splice variant RNA. In some aspects, the plurality of RNA harbored by the cellular sample comprises pre-spliced RNA, partially spliced RNA, or fully spliced RNA. In some aspects, the plurality of RNA harbored by the cellular sample comprises coding RNA, non-coding RNA, mRNA, tRNA, rRNA, microRNA (miRNA), mature microRNA, or immature microRNA. In some aspects, the plurality of RNA harbored by the cellular sample comprises housekeeping RNA, cell-specific RNA, tissue-specific RNA or disease-specific RNA. In some aspects, the plurality of RNA harbored by the cellular sample comprises RNA expressed by one or more cells in response to a stimulus such as heat, light, a chemical or a drug. In some aspects, the plurality of RNA harbored by the cellular sample comprises RNA found in healthy cells or diseased cells. In some aspects, the plurality of RNA harbored by the cellular sample comprises RNA transcribed from transgenic DNA sequences that are introduced into the cellular sample using recombinant DNA procedures. For example, the RNA can be transcribed from a transgenic DNA sequence that is controlled by an inducible or constitutive promoter sequence. In some aspects, the plurality of RNA harbored by the cellular sample comprises RNA that is transcribed from DNA sequences that are not transgenic.

In some aspects, the operation 510 includes, in each of the one or more cycles, imaging optical color signals emitted from the nucleotide reagents that are bound to the plurality of concatemer molecules. The imaging operation may be performed by an optical system or an imager 116 of the sequencing system 100 herein. The first plurality of flow cell images may comprise optical color signals emitted from the nucleotide reagents that are bound to the plurality of concatemer molecules.

In some aspects, the operation 510 includes an operation of sequencing the plurality of concatemer molecules inside the cellular sample, which comprises sequencing the first concatemer molecule by conducting no more than a predetermined number of sequencing cycles (e.g., 2-30 cycles) to generate a plurality of first sequencing read products, and sequencing the second concatemer molecule by conducting no more than the predetermined number of sequencing cycles to generate a plurality of second sequencing read products (FIG. 8). In some aspects, the sequencing operation comprises sequencing no more than the predetermined number of bases (e.g., 2-30 bases) of the first concatemer molecules to generate a plurality of first sequencing read products, and which comprises sequencing no more than the predetermined number of sequencing cycles bases of the second concatemer molecules to generate a plurality of second sequencing read products. In some aspects, the method comprises sequencing the at least 2-10,000 concatemer molecules inside the cellular sample, which comprises conducting no more than the predetermined number of sequencing cycles on the 2-10,000 concatemer molecules to generate a plurality of sequencing read products.

In some aspects, only the first target barcode region of the first concatemer molecules are sequenced (e.g., FIG. 8, top). In some aspects, at least a portion or the full length of the first target barcode of the first concatemer molecules are sequenced (e.g., FIG. 8, top). In some aspects, the first target barcode is sequenced and a portion of the first cDNA region (or the first RNA region) of the first concatemer molecules are sequenced. In some aspects, at least a portion of the first cDNA region (or the first RNA region) of the first concatemer molecules are sequenced.

In some aspects, only the second target barcode region of the second concatemer molecules are sequenced (e.g., FIG. 8, bottom). In some aspects, at least a portion or the full length of the second target barcode of the second concatemer molecules are sequenced (e.g., FIG. 8, bottom). In some aspects, the second target barcode is sequenced and a portion of the second cDNA region (or the second RNA region) of the second concatemer molecules are sequenced. In some aspects, at least a portion of the second cDNA region (or the second RNA region) of the second concatemer molecules are sequenced.

In some aspects, the sequencing operation comprises contacting the plurality of concatemer molecules inside the cellular sample with (i) a plurality of universal sequencing primers, (ii) a plurality of sequencing polymerases, and (iii) a plurality of nucleotide reagents, under a condition suitable for hybridizing the plurality of universal sequencing primers to their respective universal sequencing primer binding sites on the concatemers. In some aspects, the sequencing operation further comprises conducting no more than the predetermined number of sequencing cycles (e.g., 2-30 cycles) to generate at least a first plurality of sequencing read products by sequencing at least the first target barcode region (Target BC-1), and optionally conducting no more than the predetermined number of sequencing cycles to generate at least a second plurality of sequencing read products by sequencing at least the second target barcode region (Target BC-2). In some aspects, the nucleotide reagents comprise multivalent molecules, nucleotides and/or nucleotide analogs.

In some aspects, the sequencing operation comprises sequencing at least a portion of the first and second nucleic acid concatemers using an optical imaging system comprising a field-of-view (FOV) greater than 1.0 mm².

In some aspects, the plurality of first and second sequencing read products are detectable by imaging, and wherein the sequencing comprises decoding the plurality of first and second sequencing read products from the images obtained during the no more than the predetermined number of sequencing cycles.

In some aspects, the plurality of the first and second sequencing read products are detectable by imaging, and wherein the sequencing comprises simultaneously imaging the plurality of first and second detectable sequencing read products in the cellular sample (co-localization of the first and second sequencing read products).

Figure 9:
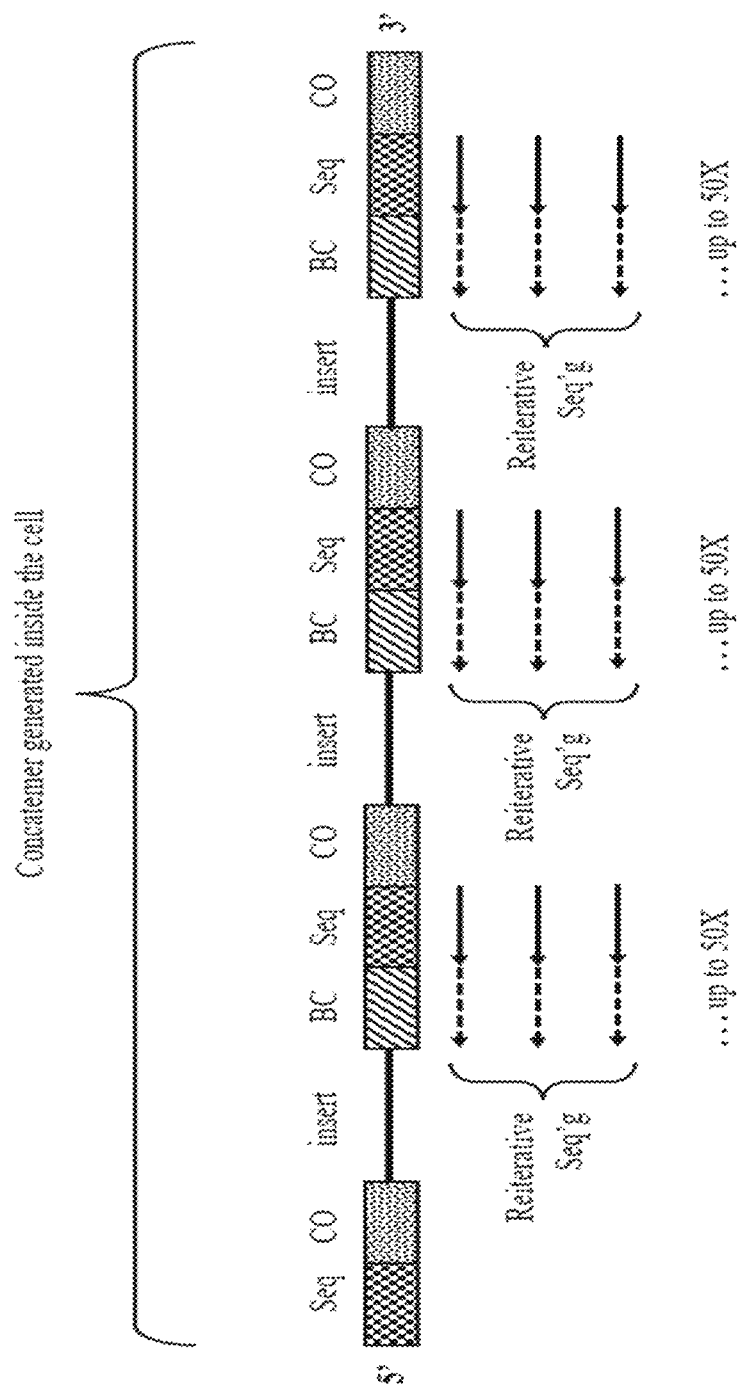
FIG. 9 is a schematic showing an exemplary workflow for sequencing a concatemer that is generated inside the cell.
Figure 10:
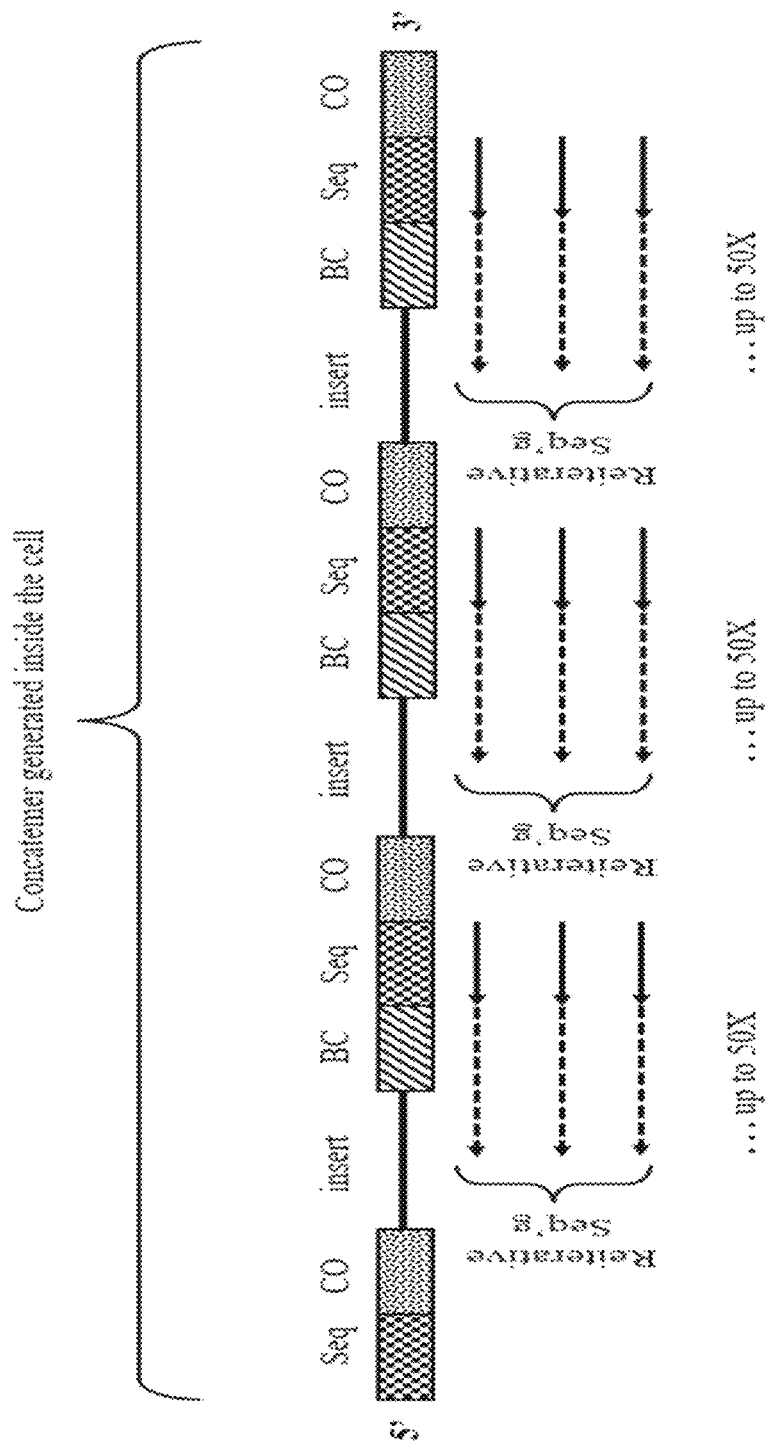
FIG. 10 is a schematic showing an exemplary workflow for sequencing a concatemer that is generated inside the cell.

The exemplary sequencing read products are shown as dashed arrows in FIGS. 8-10. The first sequencing read products may include the first target barcode sequence and optionally a portion of the first insert sequence. The first sequencing read products may include the complementary strand or reverse complementary strand of the target barcode sequence and optionally a portion of the insert sequence.

FIG. 8 is a schematic showing a rolling circle and sequencing workflow inside a cell, comprising generating first and second concatemers by conducting rolling circle amplification using first and second covalently closed circular molecules (respectively). The first and second concatemers are subjected to a sequencing workflow using universal sequencing primers, sequencing polymerases, and a plurality of nucleotide reagents.

FIG. 9 is a schematic showing an exemplary workflow for sequencing a concatemer that is generated inside the cell. The concatemer includes tandem repeat units where each unit comprises: (i) a universal sequencing primer binding site (Seq), (ii) universal compaction oligonucleotide binding site (CO), (iii) an insert sequence that corresponds to a given target cDNA, and (iv) a target barcode sequence that corresponds to the given target cDNA (BC). In some aspects, universal sequencing primers (solid arrows) hybridize to the universal sequencing primer binding sites and no more than 30 sequencing cycles are conducted to generate a plurality of first sequencing read products (dashed arrows), where the first sequencing read products include only the target barcode sequence. The plurality of first sequencing read products are removed from the concatemer, and the sequencing is repeated where no more than 30 sequencing cycles are conducted to generate another plurality of first sequencing read products (dashed arrows), where the first sequencing read products include only the target barcode sequence. The plurality of first sequencing read products are removed from the concatemer, and the sequencing is once again repeated where no more than 30 sequencing cycles are conducted to generate another plurality of first sequencing read products (dashed arrows), where the first sequencing read products include only the target barcode sequence. In some aspects, the reiterative sequencing can be conducted up to 50 times. The sequences of all of the first sequencing read products can be determined and aligned with a first reference sequence (e.g., reference barcode sequence) to confirm the presence of the first target RNA molecules inside the cellular sample.

In some aspects, the methods 500 include an operation of removing the plurality of first sequencing read products from the first concatemer molecules and retaining the first concatemer molecules in the cellular sample, and removing the plurality of second sequencing read products from the second concatemer molecules and retaining the second concatemer molecules in the cellular sample. In some aspects, the first and second concatemer molecules remain in the cellular sample, but the complementary strand or reverse complementary strand as the sequencing read products are removed.

In some aspects, the methods 500 comprises an operation of reiteratively sequencing the plurality of concatemers by repeating, for n times, the operation of 510 and the operation of removing the plurality of first sequencing read products from the first concatemer molecules and retaining the first concatemer molecules in the cellular sample, and removing the plurality of second sequencing read products from the second concatemer molecules and retaining the second concatemer molecules in the cellular sample.

In some aspects, the methods 500 comprises reiteratively sequencing the plurality of concatemers by repeating, for n time, the operation of sequencing the first concatemer molecule(s) and the second concatemer molecule(s) by conducting no more than the predetermined number of sequencing cycles to generate a plurality of first and second sequencing read products and the operation of removing the plurality of first sequencing read products from the first concatemer molecules and retaining the first concatemer molecules in the cellular sample, and removing the plurality of second sequencing read products from the second concatemer molecules and retaining the second concatemer molecules in the cellular sample.

In some aspects, the sequences of the plurality of first sequencing read products confirms the presence of the first target RNA molecules in the cellular sample, and wherein the sequences of the plurality of second sequencing read products confirms the presence of the second target RNA molecules in the cellular sample.

In some aspects, reiteratively sequencing at least one region of the concatemer comprises repeating n times the sequencing and removing operations, and n can be in the ranges of 1 to 20, 1 to 30, 1 to 100, or even larger integer ranges.

An example of reiterative sequencing is shown in a schematic in FIGS. 9-12. Reiterative sequencing can help reduce sequencing errors and improve sequencing accuracy and reliability.

In some aspects, at least one concatemer is sequenced by non-reiterative sequencing. In some aspects, at least one concatemer is sequenced by repeating once or twice the sequencing and removing operations.

FIG. 10 is a schematic showing an exemplary workflow for sequencing a concatemer that is generated inside the cell. The concatemer includes tandem repeat units where each unit comprises: (i) a universal sequencing primer binding site (Seq), (ii) universal compaction oligonucleotide binding site (CO), (iii) an insert sequence that corresponds to a given target cDNA, and (iv) a target barcode sequence that corresponds to the given target cDNA (BC). In some aspects, universal sequencing primers (solid arrows) hybridize to the universal sequencing primer binding sites and no more than 30 sequencing cycles are conducted to generate a plurality of first sequencing read products (dashed arrows), where the first sequencing read products include the target barcode sequence and a portion of the insert sequence. The plurality of first sequencing read products are removed from the concatemer, and the sequencing is repeated where no more than 30 sequencing cycles are conducted to generate another plurality of first sequencing read products (dashed arrows), where the first sequencing read products include the target barcode sequence and a portion of the insert sequence. The plurality of first sequencing read products are removed from the concatemer, and the sequencing is once again repeated where no more than 30 sequencing cycles are conducted to generate another plurality of first sequencing read products (dashed arrows), where the first sequencing read products include the target barcode sequence and a portion of the insert sequence. In some aspects, the reiterative sequencing can be conducted up to 50 times. The sequences of all of the first sequencing read products can be determined and aligned with a first reference sequence (e.g., reference barcode sequence and the insert sequence that corresponds to the target RNA) to confirm the presence of the first target RNA molecules inside the cellular sample.

Figure 11:
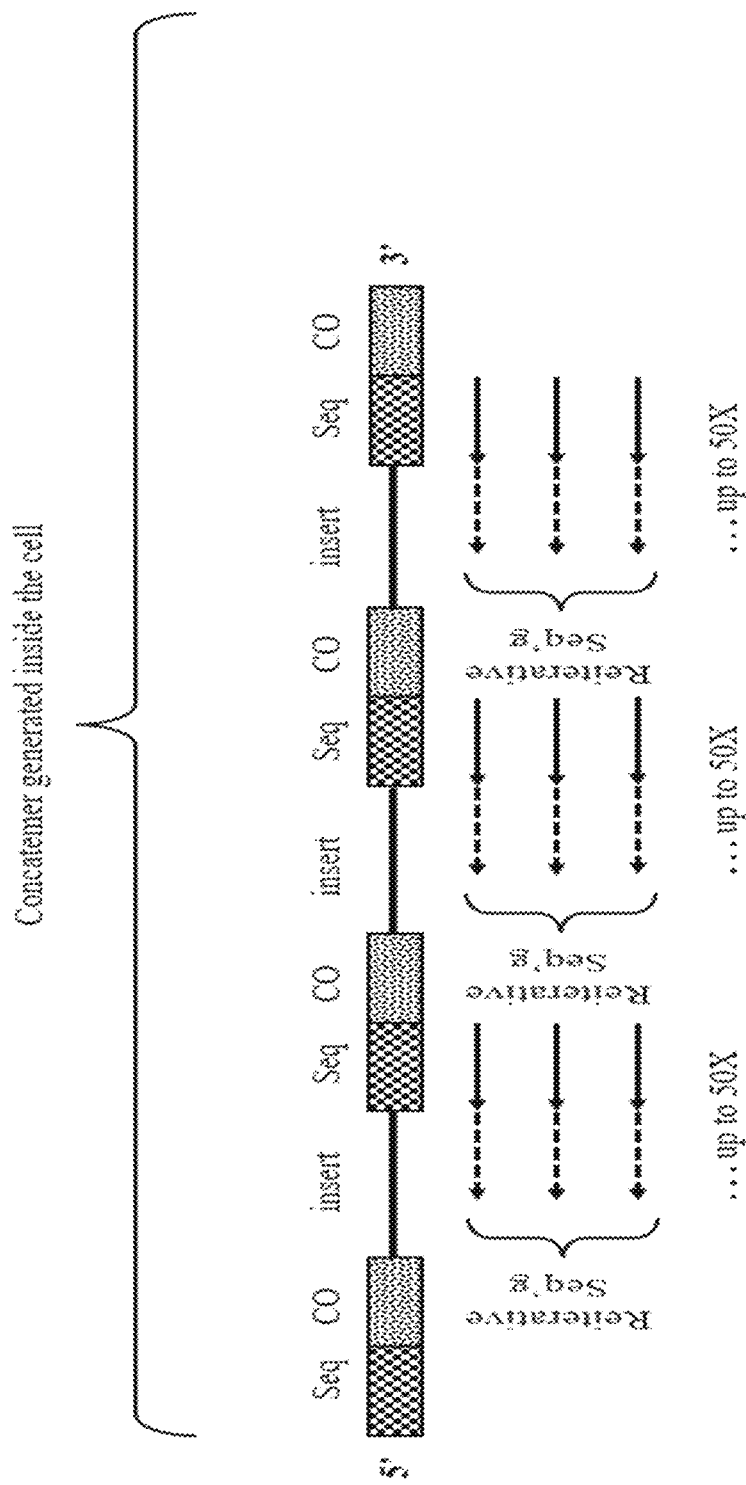
FIG. 11 is a schematic showing an exemplary workflow for sequencing a concatemer that is generated inside the cell.

FIG. 11 is a schematic showing an exemplary workflow for sequencing a concatemer that is generated inside the cell. The concatemer includes tandem repeat units where each unit comprises: (i) a universal sequencing primer binding site (Seq), (ii) universal compaction oligonucleotide binding site (CO), and (iii) an insert sequence that corresponds to a given target cDNA. In some aspects, universal sequencing primers (solid arrows) hybridize to the universal sequencing primer binding sites and no more than 30 sequencing cycles are conducted to generate a plurality of first sequencing read products (dashed arrows), where the first sequencing read products include a portion of the insert sequence. The plurality of first sequencing read products are removed from the concatemer, and the sequencing is repeated where no more than 30 sequencing cycles are conducted to generate another plurality of first sequencing read products (dashed arrows), where the first sequencing read products include a portion of the insert sequence. The plurality of first sequencing read products are removed from the concatemer, and the sequencing is once again repeated where no more than 30 sequencing cycles are conducted to generate another plurality of first sequencing read products (dashed arrows), where the first sequencing read products include a portion of the insert sequence. In some aspects, the reiterative sequencing can be conducted up to 50 times. The sequences of all of the first sequencing read products can be determined and aligned with a first reference sequence (e.g., the insert sequence that corresponds to the target RNA) to confirm the presence of the first target RNA molecules inside the cellular sample.

Figure 12:
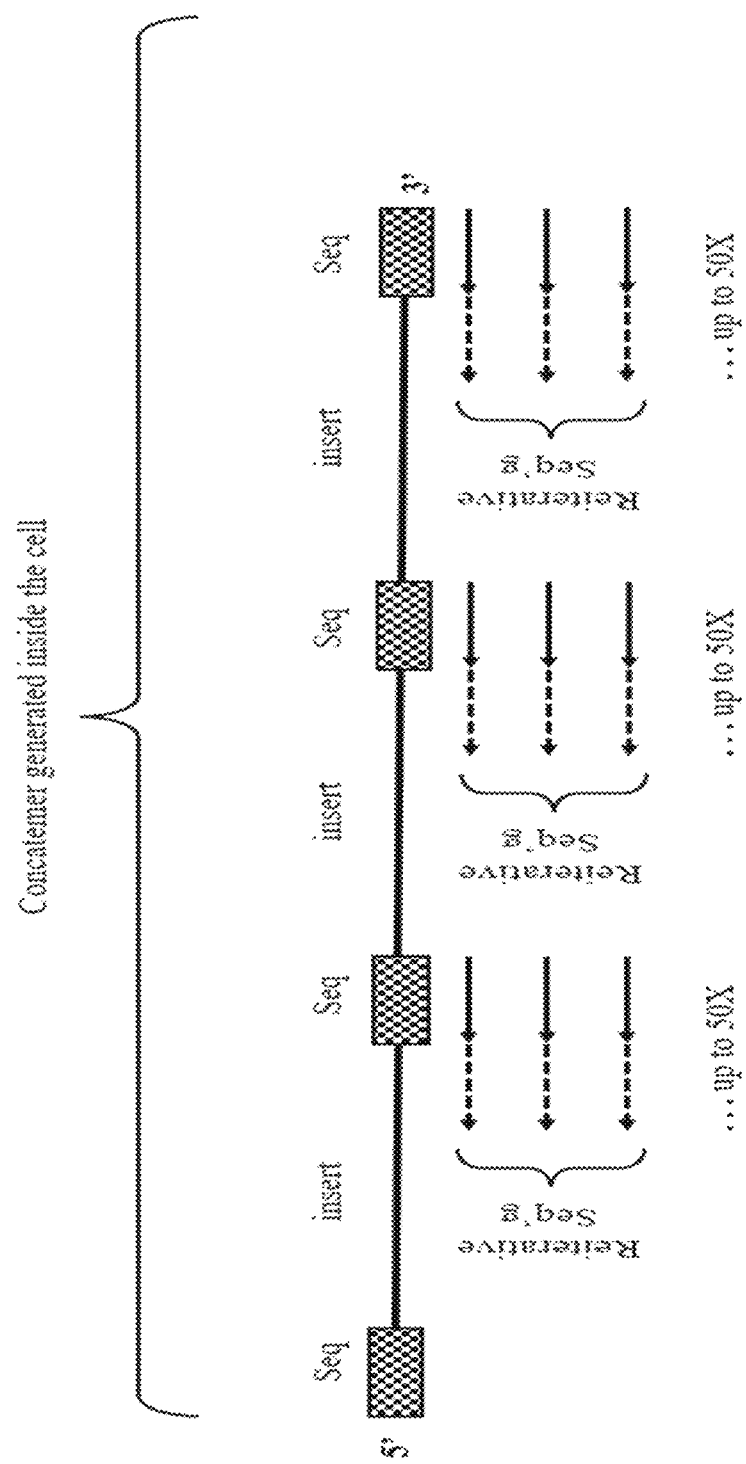
FIG. 12 is a schematic showing an exemplary workflow for sequencing a concatemer that is generated inside the cell.

FIG. 12 is a schematic showing an exemplary workflow for sequencing a concatemer that is generated inside the cell. The concatemer includes tandem repeat units where each unit comprises: (i) a universal sequencing primer binding site (Seq) and (ii) an insert sequence that corresponds to a given target cDNA. In some aspects, universal sequencing primers (solid arrows) hybridize to the universal sequencing primer binding sites and no more than 30 sequencing cycles are conducted to generate a plurality of first sequencing read products (dashed arrows), where the first sequencing read products include a portion of the insert sequence. The plurality of first sequencing read products are removed from the concatemer, and the sequencing is repeated where no more than 30 sequencing cycles are conducted to generate another plurality of first sequencing read products (dashed arrows), where the first sequencing read products include a portion of the insert sequence. The plurality of first sequencing read products are removed from the concatemer, and the sequencing is once again repeated where no more than 30 sequencing cycles are conducted to generate another plurality of first sequencing read products (dashed arrows), where the first sequencing read products include a portion of the insert sequence. In some aspects, the reiterative sequencing can be conducted up to 50 times. The sequences of all of the first sequencing read products can be determined and aligned with a first reference sequence (e.g., the insert sequence that corresponds to the target RNA) to confirm the presence of the first target RNA molecules inside the cellular sample.

In some aspects, the operation 510 include, in each of the one or more cycles, sequencing only the first target barcode sequence region of the first concatemer molecule, thereby generating the first sequencing read product. In some aspects, the operation 510 can include, in each of the one or more cycles, sequencing some or all of the first target barcode sequence region and at least a portion of the first insert sequence of the first concatemer, thereby generating the first sequencing read product.

In some aspects, the operation 510 can include, in each of the one or more cycles, sequencing only the second target barcode sequence region of the second concatemer, thereby generating the second sequencing read product. In some aspects, the operation 510 can include, in each of the one or more cycles, sequencing the second target barcode sequence region and at least a portion of the second insert sequence of the second concatemer, thereby generating the second sequencing read product.

In some aspects, the operation 510 include, in each of the one or more cycles, sequencing only the first target barcode sequence region of the first concatemer molecule and the second target barcode sequence region of the second concatemer but not any portion of first insert sequence of the first concatemer or any portion of second insert sequence of the second concatemer, thereby generating the first sequencing read product and the second sequencing read product. In some aspects, the operation 510 can include, in each of the one or more cycles, sequencing some or all of the first target barcode sequence region and at least a portion of the first insert sequence of the first concatemer, thereby generating the first sequencing read product.

In some aspects, each of the plurality of concatemer molecules immobilized on the support corresponds to a polony. In some aspects, each of the plurality of concatemer molecules immobilized on the support corresponds to a base calling location of the base calling template. Two or more different concatemer molecules of the plurality of concatemer molecules may have different insert sequences. An exemplary insert sequence is shown in FIG. 8. Different insert sequences correspond to different target RNA molecules or target cDNA molecules.

The nucleotide diversity of a population of immobilized concatemer molecules can refer to the relative proportion of nucleotides A, G, C and T/U that are present in a sequencing cycle. A high or balanced diversity data can generally include barcode and/or insert regions having approximately equal proportions of all four nucleotides represented in each cycle of a sequencing run. A low or unbalanced diversity data can generally include barcode and/or sequence-of-interest (insert) regions having a high proportion of certain nucleotides and low proportion of other nucleotides. To overcome the problem of low diversity libraries, a small amount of a high diversity library prepared from PhiX bacteriophage is typically mixed with the library-of-interest (e.g., PhiX spike-in library) and sequenced together on the same flow cell. While the PhiX library spike-in library can provide nucleotide diversity it also occupies space on the flow cell thereby replacing the target libraries carrying the sequence-of-interest and reduces the amount of sequencing data obtainable from the target libraries (e.g., reduces sequencing throughput). Another method to overcome the problem of low diversity libraries can be to prepare target library molecules having some index and/or barcode sequence that is designed to be color-balanced, thus with high diversity. However it may be desirable to design a large number of index or barcode sets, for example a set of concatemers for 16-plex, 24-plex, 96-plex or larger plexy levels. It can be challenging to design index or barcode sequences for large sample index sets where all of the sample index or barcode sequences are color-balanced.

The flow cell images herein may comprise optical signals emitted from nucleotide reagents bound to a balanced diversity of nucleotide bases of A, G, C and T/U among the plurality of concatemer molecules immobilized on the support. The plurality of flow cell images herein may comprise optical signals emitted from nucleotide reagents bound to a unbalanced diversity of nucleotide bases of A, G, C and T/U among the plurality of concatemer molecules immobilized on the support. The balanced or unbalanced diversity of bases may be determined in a particular sequencing cycles or in multiple sequencing cycles, e.g., cycles to encompass the barcode sequence herein.

Having a balanced diversity of bases may advantageously facilitate generating the base calling template more accurately and reliably than using unbalanced diversity of bases in one or more sequencing cycles. In some aspects, the barcode sequences herein may be determined so that it may provide balanced diversity of bases in one or more sequencing cycles.

In some aspects, the second plurality of flow cell images comprises optical signals emitted from nucleotide reagents bound to a unbalanced diversity of nucleotide bases of A, G, C and T/U among the plurality of concatemer molecules immobilized on the support in the one or more subsequent cycles.

The unbalanced diversity of nucleotide bases of A, G, C and T/U among the plurality of concatemer molecules may comprises: a percentage of (1) a number of one or more types of nucleotide bases to (2) a total number of bases of all the polonies within the field of view, and the percentage is less than 20%, 15%, 10%, 5%, 3%, 2%, or 1% in the one or more cycles.

The balanced diversity of nucleotide bases of A, G, C and T/U among the plurality of concatemer molecules comprises: a percentage of (1) a number of each type of nucleotide bases to (2) a total number of bases of all the polonies within the field of view in the one or more cycles, and the percentage is more than 5%, 8%, 10%, 12%, 15%, 18%, or 20%. For example, the unbalanced diversity of nucleotide bases includes nucleotide bases A that is about 5% of the total number of all nucleotide bases among the concatemers of a cycle. As another example, the unbalanced diversity of nucleotide bases includes nucleotide base C that is about 8% and T that is about 1% of the total number of all nucleotide bases among the concatemers molecules of a cycle.

During a single sequencing run, base calling locations, i.e., polonies or clusters, may shift, rotate, or otherwise spatially transform in flow cell images obtained from different cycles and/or cross channels. As a result, a template is needed to ensure that base calling locations in a sequencing run are spatially aligned and base calls are accurately assigned to corresponding polonies or clusters, template molecules, and samples. It can be advantageous to generate the template early in a sequencing run and allow registration of base calling locations in all sequencing cycles after the template has been generated. Early generation of the template can also advantageously reduce delay in primary analysis of flow cell images in subsequent cycles and allow real-time analysis while the sequencing run is still in progress. For example, if the template is generated from the first 3-5 cycles, primary analysis can be performed in real-time after flow cell images in cycle 6 are acquired, and can be in parallel with sequencing and imaging operations in cycle 7. Similarly analysis of each cycle after cycle 6 can be performed while its subsequent sequencing cycles are still in progress. As such, the primary analysis can be completely shortly after if not when the sequencing run is completed.

Methods for Conducting In Situ Batch-Specific Sequencing

In some aspects, the methods 500 are configured for conducting in situ sequencing and its analysis which includes in situ multiplex and multi-omics detection and identification using coded padlocks probes as disclosed herein. The padlock probes can be designed to selectively detect target RNA.

The RNA-specific padlock probes may selectively hybridize to cDNA that corresponds to target RNA. The RNA-specific probes may carry barcodes that uniquely identify the cDNA. In some aspects, the RNA-specific padlock probes may also carry batch-specific sequencing primer binding sites.

Different types (e.g., 2 or more) of padlock probes may be used to generate concatemers which having multiple copies of batch-specific sequencing binding sites and barcodes. The concatemers can collapse into DNA nanoballs having compact shape and size that produce increased signal intensity and color differentiation during sequencing.

For in situ sequencing, the limit of optical resolution may impede the ability to perform highly multiplex sequencing. The batch-specific sequencing primer binding sites on the padlock probes may enable sequencing a desired subset (e.g., a batch) of the concatemers using selected batch-specific sequencing primers to reduce over-crowding signals and images, so that the cellular sample can be prepared at a higher density of cells per unit imaging space (than what existing in situ sequencing methods use) and sequencing throughput may be improved using batch-sequencing when compared with exiting in situ sequencing methods. The use of batch-specific sequencing primers produces optical images that are intense and resolvable. By conducting multiple rounds of sequencing on the same cellular sample using different batch-specific sequencing primers may enable multiplex sequencing to reveal numerous target RNAs.

The batch-specific sequencing described herein may have many uses. For example, the number of spots that are imaged and associated with sequencing can be counted. The counted spots can be used as a measure of RNA levels in a cellular sample.

In some aspects, the methods 500 may be configured for determining base calling template in in situ batch-specific sequencing applications. In some aspects, the methods in the context of in situ batch-specific sequencing comprise an operation of providing the cellular sample deposited on the solid support, wherein the cellular sample harbors (i) a first plurality of DNA amplicons (e.g., first concatemers) that correspond to a first target cDNA or RNA molecule, and (ii) a second plurality of DNA amplicons (e.g., second concatemers) that correspond to a second target cDNA or RNA molecule.

In some aspects, the operation 510 in in situ batch-specific sequencing comprises an operation of sequencing the first plurality of DNA amplicons inside the cellular sample under a condition that inhibits sequencing the second plurality of DNA amplicons, wherein sequencing the first plurality of DNA amplicons inside the cellular sample comprises generating a plurality of first sequencing read products, and wherein the sequences of the first sequencing read products are aligned with a first target reference sequence to confirm the presence of the first target RNA in the cellular sample. In some aspects, the first amplicons can be reiteratively sequenced by conducting no more than 2-30 sequencing cycles, or can be reiteratively sequenced by conducting 1-250 sequencing cycles.

In some aspects, the operation 510 in in situ batch-specific sequencing may further comprise an operation of sequencing the second plurality of DNA amplicons inside the cellular sample under a condition that inhibits sequencing the first plurality of DNA amplicons, wherein sequencing the second plurality of DNA amplicons inside the cellular sample comprises generating a plurality of second sequencing read products, wherein the sequences of the second sequencing read products are aligned with a second target reference sequence to confirm the presence of the second target RNA in the cellular sample. In some aspects, the second amplicons can be reiteratively sequenced by conducting no more than 2-30 sequencing cycles, or can be reiteratively sequenced by conducting 1-250 sequencing cycles.

In some aspects, the methods 500 in in situ batch-specific sequencing comprises an operation of providing the cellular sample deposited on the solid support, wherein the cellular sample harbors the first plurality of target RNA and the second plurality of target RNA. In some aspects, the first plurality of target RNA encode a first polypeptide. In some aspects, the second plurality of target RNA encode a second polypeptide. In some aspects, the cellular sample is fixed and permeabilized.

In some aspects, the cellular sample harbors 2-25 different target RNA molecules, or harbors 25-50 different target RNA molecules, or harbors 50-75 different target RNA molecules, or harbors 75-100 different target RNA molecules. In some aspects, the cellular sample harbors more than 100 different target RNA molecules, or more than 250 different target RNA molecules, or more than 500 different target molecules, or more than 1000 different target RNA molecules, or more. In some aspects, the cellular sample harbors more than 10,000 different target RNA molecules. In some aspects, the cellular sample comprises a whole cell, a plurality of whole cells, an intact tissue or an intact tumor. In some aspects, the cellular sample comprises a fresh cellular sample, a freshly-frozen cellular sample, a sectioned cellular sample, or an FFPE cellular sample. In some aspects, the cellular sample is deposited onto a solid support. In some aspects, the cellular sample is deposited onto a solid support which is passivated with a coating that promotes cell adhesion. In some aspects, the cellular sample is deposited on a support that lacks immobilized capture oligonucleotides. In some aspects, the cellular sample is cultured prior to conducting step (b) which is described below.

In some aspects, the cellular sample harbors 2-25 different target polypeptide molecules, or harbors 25-50 different target polypeptide molecules, or harbors 50-75 different target polypeptide molecules, or harbors 75-100 different target polypeptide molecules. In some aspects, the cellular sample harbors more than 100 different target polypeptide molecules, or more than 250 different target polypeptide molecules, or more than 500 different target molecules, or more than 1000 different target polypeptide molecules, or more. In some aspects, the cellular sample harbors more than 10,000 different target polypeptide molecules. The target polypeptide molecules are encoded by the target RNA molecules.

Figure 13:
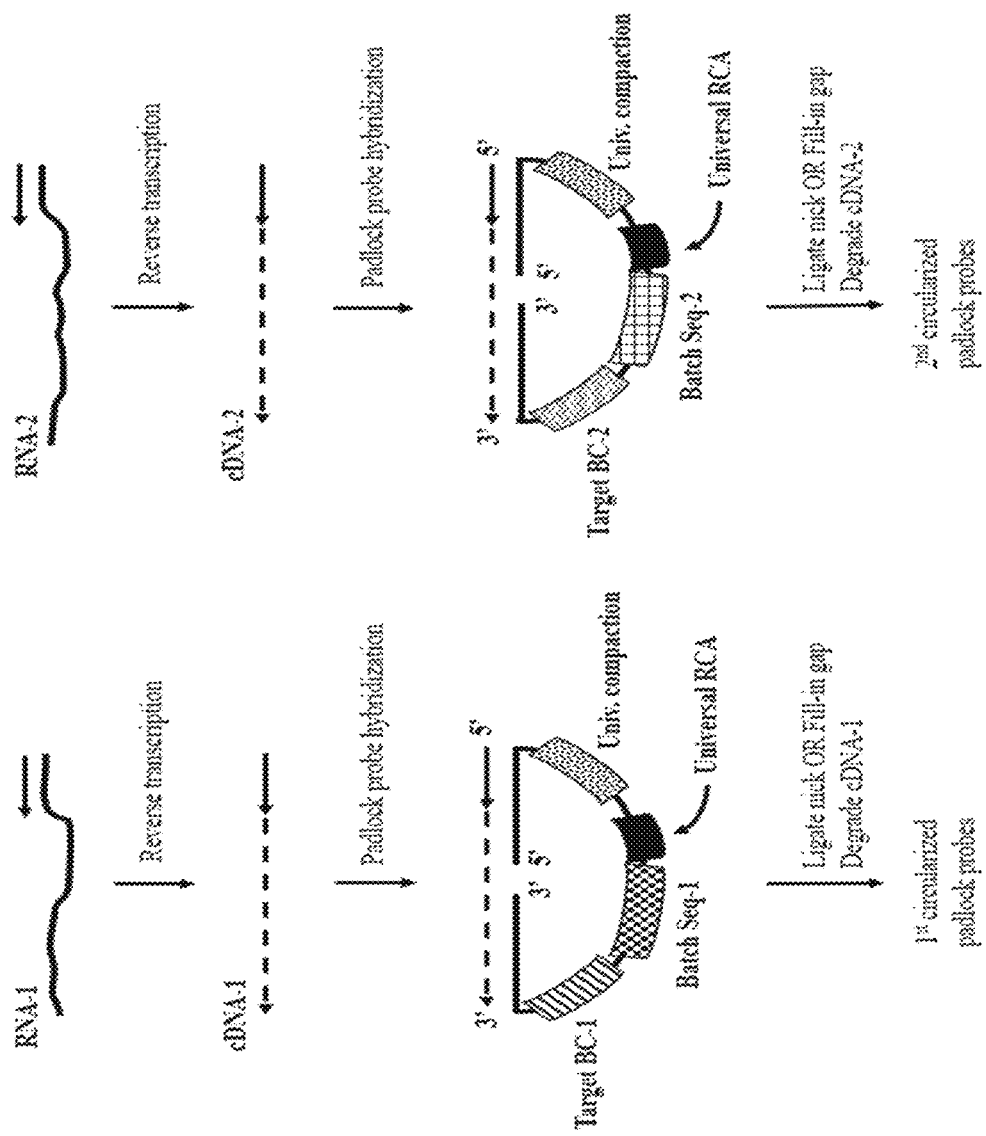
FIG. 13 is a schematic showing a workflow for generating circularized padlock probes, comprising generating first and second cDNAs from first and second target RNA molecules (respectively), hybridizing first and second padlock probes to the first and second cDNA molecules (respectively) to generate first and second circularized padlock probes (respectively).

In some aspects, the methods 500 in in situ batch-specific sequencing comprises an operation of generating inside the cellular sample a plurality of cDNA by (i) generating at least a first plurality of target cDNA from the first plurality of target RNA, and (ii) generating at least a second plurality of target cDNA from the second plurality of target RNA (e.g., FIG. 13). In some aspects, the first target cDNAs correspond to the first target RNA molecules. In some aspects, the second target cDNAs correspond to the second target RNA molecules. In some aspects, the method comprises generating at least 2-10,000 different target cDNA molecules that correspond to 2-10,000 different target RNA molecules. In some aspects, the operation of generating inside the cellular sample a plurality of cDNA comprises an operation of contacting the plurality of RNA inside the cellular sample with (i) a plurality of reverse transcription primers, (ii) a plurality of reverse transcriptase enzymes, and (iii) a plurality of nucleotides, under a condition suitable for conducting a reverse transcription reaction to generate a plurality of cDNA molecules (e.g., a plurality of first strand cDNA molecules) in the cellular sample. In some aspects, the plurality of reverse transcription primers comprises a first sub-population of target-specific reverse transcription primers that hybridize selectively to the first target RNA, and/or comprises a second sub-population of target-specific reverse transcription primers that hybridize selectively to the second target RNA. In some aspects, the plurality of reverse transcription primers comprises a first sub-population of random-sequence reverse transcription primers that hybridize to the first target RNA, and/or comprises a second sub-population of random-sequence reverse transcription primers that hybridize to the second target RNA.

In some aspects, the methods 500 in in situ batch-specific sequencing comprises an operation of generating inside the cellular sample a plurality of DNA concatemers which correspond to the first and second plurality of target RNA molecules, comprising: (1) generating a first plurality of covalently closed circular padlock probes by contacting the first plurality of target cDNA with a first plurality of padlock probes, wherein the contacting is conducted under a condition suitable for hybridizing the first and second binding arms of the first padlock probes to proximal positions on their respective first target cDNA molecules to form a first plurality of circularized padlock probes each having a nick or gap between the hybridized first and second binding arms, wherein the first padlock probes include a (i) a first target barcode sequence (target BC-1) that uniquely identifies the first target RNA or cDNA, (ii) a first batch-specific sequencing primer binding site (Batch Seq-1) (or a complementary sequence thereof), and (iii) a universal binding site for an amplification primer (universal RCA) (or a complementary sequence thereof) (e.g., FIG. 13, left side); (2) enzymatically closing the nick or gap in the first plurality of covalently closed circular padlock probes to form a first plurality of covalently closed padlock probes; and (3) conducting rolling circle amplification inside the cellular sample using the first covalently closed circular padlock probes as template molecules, thereby generating a first plurality of concatemer molecules that correspond to the first plurality of target RNA or cDNA molecules. In some aspects, the rolling circle amplification reaction can be conducted in the presence or absence of a plurality of compaction oligonucleotides. In some aspects, the method comprises contacting the plurality of cDNA molecule in the cellular sample with at least 2-10,000 different target-specific padlock probes. In some aspects, the first padlock probe further comprises a universal compaction oligonucleotide binding site (or a complementary sequence thereof). In some aspects, the closing the nick in the first circularized padlock probes comprises conducting an enzymatic ligation reaction. In some aspects, closing the gap in the first circularized padlock probes comprises conducting a polymerase-catalyzed fill-in reaction using the first target cDNA molecule as a template, and conducting an enzymatic ligation reaction. In some aspects, the method comprises closing the nick or gap in at least 2-10,000 circularized target-specific padlock probes by conducting an enzymatic reaction, thereby generating at least 2-10,000 covalently closed circular padlock probes inside the cellular sample. In some aspects, each concatemer molecule in the first plurality comprises tandem repeat units, wherein a unit comprises the sequence of the first target cDNA and (i) the first target barcode sequence (target BC-1) that uniquely identifies the first target RNA, (ii) the first batch-specific sequencing primer binding site (Batch Seq-1) (or a complementary sequence thereof), and (iii) the universal binding site for an amplification primer (universal RCA) (or a complementary sequence thereof). In some aspects, the unit further comprises the universal compaction oligonucleotide binding site (or a complementary sequence thereof).

In some aspects, the methods 500 in in situ batch-specific sequencing comprises an operation of generating inside the cellular sample a plurality of DNA concatemers which correspond to the second plurality of target RNA molecules, comprising: (1) generating a second plurality of covalently closed circular padlock probes by contacting the second plurality of target cDNA with a second plurality of padlock probes, wherein the contacting is conducted under a condition suitable for hybridizing the first and second binding arms of the second padlock probes to proximal positions on their respective second target cDNA molecules to form a second plurality of circularized padlock probes each having a nick or gap between the hybridized first and second binding arms, wherein the second padlock probes include a (i) a second barcode sequence (target BC-2) that uniquely identifies the second target cDNA or RNA, (ii) a second batch-specific sequencing primer binding site (Batch Seq-2) (or a complementary sequence thereof) wherein the sequence of the second batch-specific sequencing primer binding site differs from the sequence of the first batch-specific sequencing primer binding site, and (iii) the universal binding site for an amplification primer (universal RCA) (or a complementary sequence thereof) (e.g., FIG. 13, right side); (2) enzymatically closing the nick or gap in the second plurality of covalently closed circular padlock probes to form a second plurality of covalently closed padlock probes; and (3) conducting rolling circle amplification inside the cellular sample using the second covalently closed circular padlock probes as template molecules, thereby generating a second plurality of concatemer molecules that correspond to the second plurality of target RNA molecules. In some aspects, the rolling circle amplification reaction can be conducted in the presence or absence of a plurality of compaction oligonucleotides. In some aspects, the method comprises contacting the plurality of cDNA molecule in the cellular sample with at least 2-10,000 different target-specific padlock probes. In some aspects, the second padlock probe further comprises a universal compaction oligonucleotide binding site (or a complementary sequence thereof). In some aspects, the closing the nick in the second circularized padlock probes comprises conducting an enzymatic ligation reaction. In some aspects, closing the gap in the second circularized padlock probes comprises conducting a polymerase-catalyzed fill-in reaction using the second target cDNA molecule as a template, and conducting an enzymatic ligation reaction. In some aspects, the method comprises closing the nick or gap in at least 2-10,000 circularized target-specific padlock probes by conducting an enzymatic reaction, thereby generating at least 2-10,000 covalently closed circular padlock probes inside the cellular sample. In some aspects, each concatemer molecule in the second plurality comprises tandem repeat units, wherein a unit comprises the sequence of the second target cDNA and (i) the second target barcode sequence (target BC-2) that uniquely identifies the second target cDNA or RNA, (ii) the second batch-specific sequencing primer binding site (Batch Seq-2) (or a complementary sequence thereof), and (iii) the universal binding site for an amplification primer (universal RCA) (or a complementary sequence thereof). In some aspects, the unit further comprises the universal compaction oligonucleotide binding site (or a complementary sequence thereof).

Figure 14:
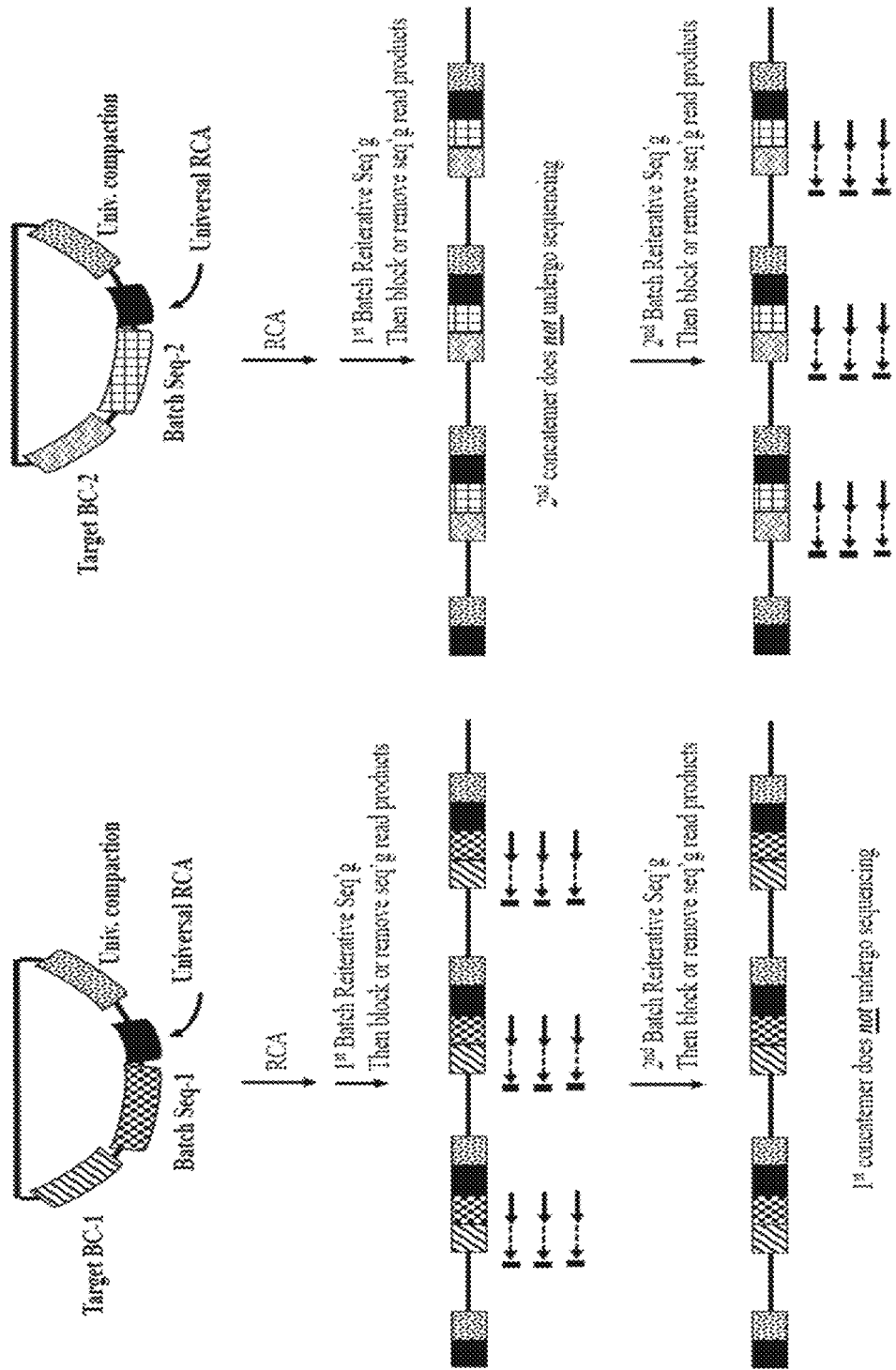
FIG. 14 is a schematic showing a rolling circle and sequencing workflow comprising generating first and second concatemers by conducting rolling circle amplification using first and second covalently closed circular molecules (respectively).

In some aspects, conducting one or more cycles of sequencing reactions in in situ batch-specific sequencing comprises: sequencing the first plurality of concatemer molecules inside the cellular sample under a condition that inhibits sequencing the second plurality of concatemers (e.g., FIG. 14). In some aspects, sequencing the first plurality of concatemers inside the cellular sample comprises conducting no more than 2-30 sequencing cycles to generate a plurality of first sequencing read products, wherein the sequences of the first sequencing read products are aligned with a first target reference sequence to confirm the presence of the first target RNA in the cellular sample. In some aspects, sequencing the first plurality of concatemers inside the cellular sample comprises conducting 1-250 sequencing cycles to generate a plurality of first sequencing read products, wherein the sequences of the first sequencing read products are aligned with a first target reference sequence to confirm the presence of the first target RNA in the cellular sample.

In some aspects, in the first concatemer molecules, only the first target barcode region (target BC-1) is sequenced. In some aspects, in the first concatemer molecules, at least a portion or the full length of the first target barcode (target BC-1) is sequenced. In some aspects, in the first concatemer molecules, the first target barcode (target BC-1) is sequenced and a portion of the first cDNA region is sequenced.

In some aspects, sequencing the first concatemers in in situ batch-specific sequencing comprises step (1) contacting the first plurality of concatemer molecules inside the cellular sample with (i) a plurality of first batch-specific sequencing primers, (ii) a plurality of sequencing polymerases, and (iii) a plurality of nucleotide reagents, under a condition suitable for hybridizing the plurality of first batch-specific sequencing primers to their respective first batch-specific sequencing primer binding sites on the first concatemers. In some aspects, the sequencing further comprises step (2) conducting no more than 2-30 sequencing cycles to generate a first plurality of sequencing read products using the first concatemers as template molecules.

In some aspects, the sequencing operation in in situ batch-specific sequencing herein comprises sequencing at least a portion of the first nucleic acid concatemers using an optical imaging system comprising a field-of-view (FOV) greater than 1.0 $mm^2$.

In some aspects, the plurality of first sequencing read products are detectable by imaging, and wherein the sequencing comprises decoding the plurality of first sequencing read products from the images obtained during the no more than 2-30 sequencing cycles, or from the images obtained during the 1-250 sequence cycles.

In some aspects, the methods 500 in in situ batch-specific sequencing comprise removing the plurality of first sequencing read products from the first concatemer molecules and retaining the first concatemer molecules inside the cellular sample. In some aspects, a 3' blocking moiety can be added to the first sequencing read products to inhibit further sequencing reactions. For example, a nucleotide analog can be incorporated where the nucleotide analog inhibits incorporation of a subsequent nucleotide. Exemplary blocking nucleotide analogs include dideoxynucleotide or a nucleotide having a 2' or 3' chain terminating moiety.

In some aspects, the methods in in situ batch-specific sequencing further comprise: reiteratively sequencing the plurality of first concatemers by repeating steps (d) and (e) at least once. In some aspects, reiterative sequencing is optional.

In some aspects, sequencing the first concatemers in in situ batch-specific sequencing comprises step (1) contacting the first plurality of concatemer molecules inside the cellular sample with (i) a plurality of first batch-specific sequencing primers, (ii) a plurality of sequencing polymerases, and (iii) a plurality of nucleotide reagents, under a condition suitable for hybridizing the plurality of first batch-specific sequencing primers to their respective first batch-specific sequencing primer binding sites on the first concatemers. In some aspects, the sequencing further comprises step (2) conducting no more than 2-30 sequencing cycles to generate a first plurality of sequencing read products using the first concatemers as template molecules. In some aspects, the sequencing further comprises step (3) removing the first plurality of sequencing read products from the first concatemers and retaining the plurality of first concatemers inside the cellular sample. In some aspects, the sequencing further comprises step (4) repeating steps (1)-(3) at least once (e.g., FIG. 14). In some aspects, step (4) comprises repeating steps (1)-(3) at least 2 times, at least 3 times, at least 4 times, at least 5 times, at least 6 times, at least 7 times, at least 8 times, at least 9 times, or at least 10 times. In some aspects, step (4) comprises repeating steps (1)-(3) up to 10 times, up to 20 times, up to 30 time, up to 40 times, or up to 50 times.

In some aspects, the reiterative sequencing of the first concatemers can be conducting using a sequencing-by-binding procedure, labeled and/or non-labeled chain-terminating nucleotides, or multivalent molecules. Descriptions of these three sequencing methods is described herein.

In some aspects, the plurality of universal sequencing primers can be hybridized to concatemer template molecules with a hybridization reagent comprising an SSC buffer (e.g., 2× saline-sodium citrate) buffer with formamide (e.g., 10-20% formamide). The hybridization conditions comprise a temperature of about 20-30° C., for about 10-60 minutes.

In some aspects, the plurality of sequencing read products can be removed from the concatemers and the plurality of concatemers can be retained inside the cellular sample using a de-hybridization reagent comprising an SSC buffer (e.g., saline-sodium citrate) buffer, with or without formamide, at a temperature that promotes nucleic acid denaturation such as for example 30-90° C.

In some aspects, the methods 500 in in situ batch-specific sequencing further comprise sequencing the second plurality of concatemer molecules inside the cellular sample under a condition that inhibits sequencing the first plurality of concatemers (e.g., FIG. 14). In some aspects, sequencing the second plurality of concatemers inside the cellular sample comprises conducting no more than 2-30 sequencing cycles to generate a plurality of second sequencing read products, wherein the sequences of the second sequencing read products are aligned with a second target reference sequence to confirm the presence of the second target RNA in the cellular sample. In some aspects, sequencing the second plurality of concatemers inside the cellular sample comprises conducting 1-250 sequencing cycles to generate a plurality of second sequencing read products, wherein the sequences of the second sequencing read products are aligned with a second target reference sequence to confirm the presence of the second target RNA in the cellular sample.

In some aspects, in the second concatemer molecules, only the second target barcode region (target BC-2) is sequenced. In some aspects, in the second concatemer molecules, at least a portion or the full length of the second target barcode (target BC-2) is sequenced. In some aspects, in the second concatemer molecules, the second target barcode (target BC-2) is sequenced and a portion of the second cDNA region is sequenced.

In some aspects, the sequencing the second concatemers comprises step (1) contacting the second plurality of concatemer molecules inside the cellular sample with (i) a plurality of second batch-specific sequencing primers, (ii) a plurality of sequencing polymerases, and (iii) a plurality of nucleotide reagents, under a condition suitable for hybridizing the plurality of second batch-specific sequencing primers to their respective second batch-specific sequencing primer binding sites on the second concatemers. In some aspects, the sequencing further comprises step (2) conducting no more than 2-30 sequencing cycles to generate a second plurality of sequencing read products using the second concatemers as template molecules.

In some aspects, the sequencing of sequencing the second plurality of concatemer molecules comprises sequencing at least a portion of the second nucleic acid concatemers using an optical imaging system comprising a field-of-view (FOV) greater than 1.0 mm2.

In some aspects, in the sequencing of the second plurality of concatemer molecules, the plurality of second sequencing read products are detectable by imaging, and wherein the sequencing comprises decoding the plurality of second sequencing read products from the images obtained during the no more than 2-30 sequencing cycles, or from the images obtained during the 1-250 sequencing cycles.

In some aspects, the methods 500 in batch-specific in situ sequencing further comprise removing the plurality of second sequencing read products from the second concatemer molecules and retaining the second concatemer molecules inside the cellular sample. In some aspects, a 3' blocking moiety can be added to the second sequencing read products to inhibit further sequencing reactions. For example, a nucleotide analog can be incorporated where the nucleotide analog inhibits incorporation of a subsequent nucleotide. Exemplary blocking nucleotide analogs include dideoxynucleotide or a nucleotide having a 2' or 3' chain terminating moiety.

In some aspects, the methods 500 in batch-specific in situ sequencing further comprise reiteratively sequencing the plurality of second concatemers by repeating (1) sequencing the second plurality of concatemer molecules inside the cellular sample under a condition that inhibits sequencing the first plurality of concatemers and (2) removing the plurality of second sequencing read products from the second concatemer molecules and retaining the second concatemer molecules inside the cellular sample at least once. In some aspects, reiterative sequencing is optional.

In some aspects, the sequencing the second concatemers comprises step (1) contacting the second plurality of concatemer molecules inside the cellular sample with (i) a plurality of second batch-specific sequencing primers, (ii) a plurality of sequencing polymerases, and (iii) a plurality of nucleotide reagents, under a condition suitable for hybridizing the plurality of second batch-specific sequencing primers to their respective second batch-specific sequencing primer binding sites on the second concatemers. In some aspects, the sequencing further comprises step (2) conducting no more than 2-30 sequencing cycles to generate a first plurality of sequencing read products using the second concatemers as template molecules. In some aspects, the sequencing further comprises step (3) removing the first plurality of sequencing read products from the second concatemers and retaining the plurality of second concatemers inside the cellular sample. In some aspects, the sequencing further comprises step (4) repeating steps (1)-(3) at least once (e.g., FIG. 14). In some aspects, step (4) comprises repeating steps (1)-(3) at least 2 times, at least 3 times, at least 4 times, at least 5 times, at least 6 times, at least 7 times, at least 8 times, at least 9 times, or at least 10 times. In some aspects, step (4) comprises repeating steps (1)-(3) up to 10 times, up to 20 times, up to 30 time, up to 40 times, or up to 50 times.

In some aspects, the reiterative sequencing of the second concatemers of step (i) can be conducting using a sequencing-by-binding procedure, labeled and/or non-labeled chain-terminating nucleotides, or multivalent molecules. Descriptions of these three sequencing methods is described below.

In some aspects, the plurality of nucleotide reagents used in the operations comprise a plurality of nucleotides that are detectably labeled or non-labeled. In some aspects, individual nucleotides are linked to a detectable reporter moiety. In some aspects, the detectable reporter moiety comprises a fluorophore. In some aspects, the plurality of detectably labeled nucleotide analogs comprise a plurality of chain terminating nucleotides, where the chain terminating moiety is linked to the 3' nucleotide sugar position to form a 3' blocked nucleotide analog. In some aspects, the chain terminating moiety can be removed to convert the 3' blocked nucleotide analog to an extendible nucleotide having a 3' OH group on the sugar. In some aspects, the labeled nucleotide analogs are linked to a different fluorophore that corresponds to the nucleo-bases adenine, cytosine, guanine, thymine or uracil, where the different fluorophores emit a fluorescent signal. In some aspects, a sequencing cycle comprises (1) contacting the concatemer/sequencing primer duplex with a sequencing polymerase and a detectably labeled chain terminating nucleotide under a condition suitable for polymerase-catalyzed incorporation of the detectably labeled chain terminating nucleotide into the terminal end of the sequencing primer, (2) detecting and imaging the fluorescent signal and color emitted by the incorporated chain terminating nucleotide, and (3) removing the chain terminating moiety (e.g., unblocking) and the fluorophore from the incorporated nucleotide and retaining the concatemer/sequencing primer duplex. In some aspects, no more than 2-30 sequencing cycles are conducted on the plurality of concatemers inside the cellular sample to generate a plurality of sequencing read products. In some aspects, the sequence of the first sequencing read product can be determined and aligned with a first reference sequence to confirm the presence of the first target RNA molecules inside the cellular sample. In some aspects, the sequence of the second sequencing read product can be determined and aligned with a second reference sequence to confirm the presence of the second target RNA molecules inside the cellular sample.

In some aspects, the sequences of the first and second sequencing read products can be aligned after each round of generating the first and second sequencing read products which are no more than 30 bases in length, or after generating a set of reiterative sequencing read products wherein the first and second sequencing read products which are no more than 30 bases in length. In some aspects, the sequencing reactions are conducted on a sequencing apparatus having a detector that captures fluorescent signals from the sequencing reactions inside the cellular sample. The sequencing apparatus can be configured to relay the fluorescent signal data captured by the detector to a computer system that is programmed to display images of different fluorescent spots which are co-located in the cellular sample, where individual fluorescent spots correspond to different target RNA molecules. In some aspects, when the sequencing is conducted using different fluorescently-labeled nucleotide reagents that correspond to different nucleo-bases (e.g., A, G, C, T/U), then the images can have different color fluorescent spots co-located in the same cellular sample at different sequencing cycles.

In some aspects, out-of-sync phasing and/or pre-phasing events can occur during synchronized sequencing reactions on clonally amplified template amplicons, where the sequencing reactions comprise polymerase-catalyzed sequencing reactions employing detectably labeled chain terminator nucleotides. In some aspects, a sequencing reaction on one template molecule in the clonally-amplified template molecules moves ahead (e.g., pre-phasing) or fall behind (e.g., phasing) of the sequencing of the other template molecules within the clonally-amplified template molecules. During sequencing, a fluorescent signal is typically detected which corresponds to incorporation of a labeled chain terminator nucleotide. Thus, phasing and pre-phasing events can be detected and monitored using incorporation of a labeled chain terminator nucleotide.

In some aspects, the plurality of nucleotide reagents of steps (d) and (g) comprise a plurality of multivalent molecules each comprising a core attached to a plurality of nucleotide-arms, wherein the nucleotide-arms are attached to a nucleotide unit. In some aspects, individual multivalent molecules are labeled with a detectably reporter moiety. In some aspects, the detectable reporter moiety comprises a fluorophore. In some aspects, the core of the multivalent molecule is labeled with a fluorophore, and wherein the fluorophore which is attached to a given core of the multivalent molecule corresponds to the nucleotide base (e.g., adenine, guanine, cytosine, thymine or uracil) of the nucleotide arm. In some aspects, at least one of the nucleotide arms of the multivalent molecule comprises a linker and/or nucleotide base that is attached to a fluorophore, and wherein the fluorophore which is attached to a given nucleotide base corresponds to the nucleotide base (e.g., adenine, guanine, cytosine, thymine or uracil) of the nucleotide arm. In some aspects, a sequencing cycle comprises (1) contacting the concatemer/sequencing primer duplex with a first sequencing polymerase to form a complexed polymerase, (2) contacting the complexed polymerase with a detectably labeled multivalent molecule under a condition suitable for binding a complementary nucleotide unit of the multivalent molecule to the complexed polymerase thereby forming a multivalent-binding complex, and the condition is suitable for inhibiting incorporation of the complementary nucleotide unit into the terminal end of the sequencing primer, (3) detecting and imaging the fluorescent signal and color emitted by the bound detectably labeled multivalent molecule, (4) removing the first sequencing polymerase and the bound detectably labeled multivalent molecule, and retaining the concatemer/sequencing primer duplex, (5) contacting the retained concatemer/sequencing primer duplex with a second sequencing polymerase and a non-labeled chain terminating nucleotide under a condition suitable for polymerase-catalyzed incorporation of the non-labeled chain terminating nucleotide into the terminal end of the sequencing primer, and (6) removing the chain terminating moiety (e.g., unblocking) and retaining the concatemer/sequencing primer duplex. In some aspects, no more than 2-30 sequencing cycles are conducted on the plurality of concatemers inside the cellular sample to generate a plurality of sequencing read products. In some aspects, the sequence of the first sequencing read product can be determined and aligned with a first reference sequence to confirm the presence of the first target RNA molecules inside the cellular sample. In some aspects, the sequence of the second sequencing read product can be determined and aligned with a second reference sequence to confirm the presence of the second target RNA molecules inside the cellular sample. In some aspects, the sequences of the first and second sequencing read products can be aligned after each round of generating the first and second sequencing read products which are no more than 30 bases in length, or after generating a set of reiterative sequencing read products wherein the first and second sequencing read products which are no more than 30 bases in length. In some aspects, the sequencing reactions are conducted on a sequencing apparatus having a detector that captures fluorescent signals from the sequencing reactions inside the cellular sample. The sequencing apparatus can be configured to relay the fluorescent signal data captured by the detector to a computer system that is programmed to display images of different fluorescent spots which are co-located in the cellular sample, where individual fluorescent spots correspond to different target RNA molecules. In some aspects, individual cycle times can be achieved in less than 30 minutes. In some aspects, the field of view (FOV) can exceed 1 mm$^2$ and the cycle time for scanning large area (>10 mm$^2$) can be less than 5 minutes.

FIG. 13 is a schematic showing a workflow for generating circularized padlock probes, comprising generating first and second cDNAs from first and second target RNA molecules (respectively), hybridizing first and second padlock probes to the first and second cDNA molecules (respectively) to generate first and second circularized padlock probes (respectively). The first padlock probe comprises (i) a first target barcode sequence (target BC-1) that uniquely identifies the first target RNA, (ii) a first batch-specific sequencing primer binding site (Batch Seq-1) (or a complementary sequence thereof), (iii) a universal binding site for an amplification primer (universal RCA) (or a complementary sequence thereof), and (iv) a universal binding site for a compaction oligonucleotide (or a complementary sequence thereof). The second padlock probe comprises (i) a second target barcode sequence (target BC-2) that uniquely identifies the second target RNA, (ii) a second batch-specific sequencing primer binding site (Batch Seq-2) (or a complementary sequence thereof), (iii) a universal binding site for an amplification primer (universal RCA) (or a complementary sequence thereof), and (iv) a universal binding site for a compaction oligonucleotide (or a complementary sequence thereof).

FIG. 14 is a schematic showing a rolling circle and sequencing workflow comprising generating first and second concatemers by conducting rolling circle amplification using first and second covalently closed circular molecules (respectively). The first and second concatemers are subjected to a first sequencing workflow using first batch-specific sequencing primers, sequencing polymerases, and a plurality of nucleotide reagents. The first concatemers undergo reiterative sequencing but the second concatemers do not. The first and second concatemers are subjected to a second sequencing workflow using second batch-specific sequencing primers, sequencing polymerases, and a plurality of nucleotide reagents. The second concatemers undergo reiterative sequencing but the first concatemers do not.

The methods 500 can comprise an operation 520 of determining pixel intensities and a respective color purity of each of the pixel intensities for pixels of the first plurality of flow cell image. The operation 520 can be performed by the processor 404 disclosed herein. Each of the pixel intensities can comprise an intensity of the pixel and/or one or more subpixel intensities of the subpixels corresponding to the pixel. For example, the subpixels can be within the pixel. The respective color purity of each of the pixel intensities can comprise: one color purity of the pixel and/or one or more color purities corresponding to the one or more subpixel intensities of the corresponding pixel. Each respective color purity of individual pixel intensity of the pixel intensities can comprise: the respective color purity for one or more color channels.

In in situ batch-specific sequencing, the operation 520 can be repeated for the corresponding plurality of flow cell images of individual batches. For example, if there are 4 batches, operation 520 can be performed 4 times and each time for flow cell images only from the same batch.

In some aspects, the operation 520 of determining pixel intensities and a respective color purity can comprise: determining pixel intensities and a respective color purity for each of such pixels at a first axial location, and determining pixel intensities and a respective color purity for each of such pixels at a second axial location. The first and second axial locations can be at different predetermined axial locations for generating the flow cell images. For example, the first axial location can be at z=0, and the second axial location can be at its adjacent z level, which is z=0.1, 0.2, or 0.3 um.

In some aspects, "pixel" can be a 2D spatial element of a digital image (e.g., a flow cell image) as known to one skilled in the art. In some aspects in the context of in situ sequencing, "pixel" is a 3D spatial element equivalent to "voxel" as known to one skilled in the art. In aspects where "pixel" is a 3D spatial element when the flow cell images may still be 2D but with a depth of field that is greater than 0.3 um to 2 um. In aspects where "pixel" is a 3D spatial element when the flow cell images may still be 2D but with a depth of field that is greater than 0.5 um, 0.6 um, 0.7 um, 0.8 um, 0.9 um, 1 um, 1.1 um, 1.2 um, 1.3 um, 1.5 um, 1.8 um, 2 um, 2.2 um, 2.5 um, 2.8 um, 3 um, 3.5 um, 3.8 um, 4 um, 4.5 um, 4.8 um, 5 um, 5.5 um, 6 um, 6.5 um, 7 um, 8 um, 9 um or more. The 2D flow cell images may be stacked in the third dimension orthogonal to the image plane to cover a 3D volume. In some aspects, the flow cell images are within a single 2D plane or multiple 2D planes, and each flow cell image is with a focal depth in a third dimension. In some aspects, the pixel is two dimensional. The pixel may be within the image plane. In some aspects, the pixel is three dimensional. The pixel may have two dimensions within the image plane and a third dimension parallel with the axial axis (i.e., z axis).

Determining the pixel intensities can comprise: determining each channel intensity in a set of channel intensities, each channel corresponding to a respective different fluorescent wavelength. Such determination can be based on a comparison of a set of channel intensities at the corresponding pixel or one or more subpixel locations.

Determining the respective color purity of each of the pixel intensities can comprise: determining a ratio of (1) a signal corresponding to a particular type of nucleotide base and an optional first constant to (2) a total amount of signal for other types of nucleotide bases and an optional second constant. The first and second constants may be different or identical. In some aspects, determining the respective color purity of each of the pixel intensities can at least partly include the operation 330 disclosed herein.

The methods 500 can comprise an operation 530 of determining a base calling template comprising the base calling locations based on the pixel intensities and the respective color purity of the pixel intensities determined in operation 520.

In some aspects, the flow cell images herein are acquired at a single axial location. In some aspects, the flow cell images are acquired at a plurality of predetermined axial locations. The plurality of predetermined axial locations may comprise 2 to 500 predetermined axial locations. FIG. 27B shows three exemplary predetermined axial locations. In some aspects, the plurality of predetermined axial locations comprises 2 to 30 predetermined axial locations. In some aspects, the plurality of predetermined axial locations comprises 2 to 20 predetermined axial locations. Each of the plurality of predetermined axial locations may be spaced 0.1 to 500 um apart from its adjacent neighboring axial location thereof. Predetermined axial locations may be spaced apart by an identical distance that is within the range of 0.1 to 500 um. Predetermined axial locations may be spaced apart by different distances within the range of 0.1 to 500 um. Each of the plurality of predetermined axial locations may be spaced 1, 2, 3, 4, 5, 6, 7, 8, 9, 10, 11, 12, 13, 14, or 15 um apart from an adjacent neighboring axial location thereof.

The flow cell images may include the first and/or the second plurality of flow cell images. In some aspects, the base calling locations are at a same axial location. In other words, the base calling locations may be in 2D. In some aspects, at least some of the base calling locations are at different axial locations or z levels. In other words, the base calling locations are in 3D. The different axial locations of the base calling locations may be at some or all of the predetermined axial locations for the flow cell images. In some aspects, at least some of the axial locations of the base calling locations are different from any of the plurality of predetermine axial locations of flow cell images. In some aspects, at least some of the different axial locations of the base calling locations are in between two adjacent predetermined axial locations of the plurality of predetermine axial locations. The first or second plurality of flow cell images may be from 2, 3, 4, 5, or 6 different color channels.

The one or more cycles within which the flow cell images are acquired for generating the base calling template may comprise 1, 2, 3, 4, 5, 6, 7, 8, 9, 10, or more cycles. The one or more cycles comprises 1 to 50 cycles. The one or more cycles comprises 1 to 6 cycles, 2-5 cycles, or 2-6 cycles.

Each of the first or second plurality of flow cell images comprises a field of view orthogonal to the axial axis (i.e., z axis). In some aspects, the field of view of each of the first or second plurality of flow cell images is identical in an image plane. The field of view of each of the first or second plurality of flow cell image may cover at least a portion of a tile of a flow cell. In some aspects, the first or second plurality of flow cell images comprises an identical image resolution. The axial axis may extend from an objective lens to the support. The axial axis is orthogonal to an image plane, and wherein the field of view is within the image plane.

The method of any one of the preceding claims, wherein a density of the plurality of concatemer molecules on the support is $10^1$-$10^{12}$ per mm$^2$.

The method of any one of the preceding claims, wherein a density a density of the plurality of concatemer molecules on the support on the support is $10^2$-$10^8$ per mm$^2$.

As disclosed herein, the operation 530 of determining a base calling template based on the pixel intensities and the respective color purity of the pixel intensities may comprise: for each of the pixels or subpixels, determining whether or not the respective color purity is greater than a color purity of other pixels or subpixels within a distance threshold. In response to determining that the respective color purity is greater than the color purity of other pixels or subpixels within the distance threshold, adding or confirming a location of the corresponding pixel or subpixel in the base calling template. In response to determining that the respective color purity is no greater than the color purity of the other pixels or subpixels within the distance threshold, making no changes to the base calling template, and move on to a next pixel to repeat the determining operation until all the pixels or at least a subset of the pixels have been through the similar determining operation.

In some aspects, the operation 530 is configured to remove duplicative polonies, out-of-focus polonies and/or other optical signals interfering with intensities of in-focus polonies such as background signal from cellular components.

The distance threshold can be customized to optimize the effect of eliminating interference signals (e.g., out-of-focus and/or duplicative polonies) while keeping weaker or larger polonies that are not duplicative or out-of-focus. The distance threshold can be determined as between centers of two polonies. In some aspects, the distance threshold can be determined as between centers of two pixels or subpixels.

When the two polonies are within a single 2D plane, the distance threshold is in 2D. In aspects when the two pixels or subpixels are at multiple 2D planes or within a three 3D space (e.g., in situ sequencing), the distance threshold is in 3D. For example, as shown in FIG. 27B, a polony, p2, at pixel (x1, y1, z2) may have a second polony, p1 at pixel (x1, y1, z1) and a third polony, p3, at (x1, y1, z3) that are within the 3D distance threshold. The 3D distance threshold may determine a cylinder around polony p2. Z1, z2, and z3 are predetermine axial locations for acquiring flow cell images, and are separated by about 2 um apart. Polony p1' is out of the 3D distance threshold. For the three polonies within the distance threshold, p1 has the lowest purity so that p1 can be removed as either a duplicate or out-of-focus polony. The base calling location is determined to be between the predetermined axial location of z3 and z2, and at z3_1. The axial location z3_1 can be determined by linear interpolation or weighting by the respective purity of multiple polonies, e.g., p2 and p3. The axial location z3_1 can be closer to p2 if p2 has a higher color purity than p1. In this aspect, each pixel is 3D and may include a thickness in the axial axis. In some aspects, where two or more polonies are within the distance threshold along the axial location, only one of them is selected. The only polony may be selected based on weighting, interpolation, averaging, or various statistical or mathematical functions.

The 3D distance threshold may comprises 1, 2, 3 or more distance elements, and each distance element may correspond to a distance in x, y, or z directions. For example, the 3D distance threshold may include 3 identical distance elements in x, y, and z directions so that the 3D distance threshold determines a spherical region, and polonies within the sphere are within the distance threshold. As another example, distance element in z direction can be different from that in x or y direction, so that polonies within the cylinder, ellipsoid, or spheroid are within the distance threshold. The distance threshold may comprises various number of elements (e.g., in different non-Cartesian coordinate systems) that can be converted into three distance elements in x, y, or z directions in a Cartesian coordinate system as shown in FIGS. 27A-B.

In some aspects, the distance threshold can be customized based on the image resolution in x, y, and/or z direction. In some aspects, the distance threshold can be customized based on the image resolution in x, y, and/or z direction and the size of polonies or clusters. The image resolution in z direction may be the distance between flow cell images at two adjacent z levels. For example, flow cell images at two adjacent z levels may be 1 um to 10 um apart from each other, and the z resolution may be determined as the gap thereof.

In some aspects, the 3D distance threshold comprises a first element distance along an axial axis (i.e., z axis) and a second element distance in a plane that is orthogonal to the axial axis. In some aspects, the 3D distance threshold comprises a first element distance along an axial axis (i.e., z axis) and a second element distance and a third element distance in a plane that is orthogonal to the axial axis. In some aspects, the first element distance is different from the second and/or third element distance. In some aspects, the first element distance is identical to the second and/or third element distance.

The operation of determining a base calling template can include at least partly the operation of 340.

After the base calling template is determined, it can be configured for registering flow cell images, e.g., the second plurality of flow cell images of the flow cell device in one or more cycles subsequent to the one or more cycles. In some aspects, the second plurality of flow cell images are of the in situ sample in one or more cycles subsequent to the cycles for generating the base calling template. The second plurality of flow cell images may be acquired at multiple axial locations.

In some aspects, the method 500 can further comprise an operation of generating the second plurality of flow cell images. The second plurality of flow cell images can be generated in one or more cycles subsequent to the one or more cycles corresponding to generation of the base calling template.

In some aspects, the methods 500 can further comprise an operation of registering or align the second plurality of flow cell images from the one or more subsequent sequencing cycles to the base calling template. In some aspects, the operation of registering the second plurality of flow cell images can comprise generating coordinates of polonies in the second plurality of flow cell images in a common coordinate system. The base calling template is also in the common coordinate system. In some aspects, the operation of registering the second plurality of flow cell images can utilize a plurality of transformations corresponding to subtiles of a flow cell image (e.g., at each individual axial location or 2D plane) to estimate the image transformation of an entire flow cell image. The operation of registering the flow cell images can comprise generating the transformation of subtitles which provide an estimation of the image transformation of the flow cell image in 2D. Information in the neighboring subtiles can be used when determining each individual transformation of a subtile. In some aspects, when transformation along the axial axis can be negligible (e.g., less than 0.05 um, 0.02 um, 0.001 um, 0.0001 um or more), 2D transformation can reliably register or align the flow cell images to the base calling template. In some aspects, when transformation along the axial axis needs to be included (e.g., greater than 0.05 um, 0.02 um, 0.001 um, 0.0001 um or more), 2D transformation within the x-y plane can be combined with a shifting along axial axis (e.g., z axis) to register or align the second flow cell images to the base calling template. Transformation along axial axis may be reliably represented by shifting based on the physical characteristics of an optical system.

In some aspects, the operation of registering the second plurality of flow cell images can utilize a plurality of 3D transformations corresponding to sub-volumes of the volumetric sample (e.g., at multiple individual axial locations or 2D planes) to estimate the image transformation of a flow cell image. The operation of registering the flow cell images can comprise generating the transformations which provide an estimation of the image transformation of the flow cell image in 3D. Information in the neighboring volumes or sub-volumes can be used when determining each individual transformation.

In some aspects, the coordinates of polonies can be saved in a one dimensional vector or list. Each entry of the vector or list can include a unique identification of a polony, its coordinates, and other relevant information, such as the pixel intensities in one or more channels of a cycle.

In some aspects, the methods 500 can further comprise an operation of performing base calling of the second plurality of flow cell images at the base calling locations in the base calling template using signals from the registered second plurality of flow cell images. In some aspects, the methods 500 can further comprise an operation of performing base calling of the second plurality of flow cell images at only some or all of the base calling locations in the base calling template. In other words, the base calling template functions as a polony map that identifies all the accurate polony locations on the flow cell and ignores other signal locations that are unlikely to be polonies so that base calls from duplicative polonies or other interfering signals can be avoided. The base calls in primary analysis herein can be based on registered image intensities in the common coordinate system. As disclosed herein, the base calling locations can be at subpixel locations in x, y, and/or z directions.

The operation of performing base calling of the second plurality of flow cell images can include at least partly the operation 350 in FIG. 3.

In some aspects, a base calling location in the base calling template that is not at any of the predetermined axial location of flow cell images may be obtained similar as subpixel base calling location in the x-y plane. In some aspects, interpolation along the axial axis may be used to determine a subpixel location. A subpixel location along the axial axis may be any axial location that is between two adjacent z levels of flow cell images. Interpolation along the axial axis may use any interpolation functions disclosed for 2D interpolation in the x-y plane. In some aspects, other various interpolation functions may be used. In some aspects, linear interpolation along the axial axis may be used based on the optical characteristics of a microscope. In some aspects, no interpolation is used and base calling locations can be at predetermined axial locations for the flow cell images. In some aspects, the predetermined axial locations may be adjusted relative to the size of the cellular sample so that no interpolation is needed.

The subpixel intensities herein may have 2, 3, 4, 5, 6, 7, 8, 9, 10, 12, 13, 14, 15, 16, 17, 18, 19, or 20 different axial locations that are along the axial axis. The subpixel intensities herein may have 2, 3, 4, 5, 6, 7, 8, 9, 10, 12, 13, 14, 15, 16, 17, 18, 19, or 20 different axial locations that are between two adjacent axial locations among the plurality of predetermined axial locations. The subpixel intensities herein may have 2-15 different axial locations that are along the axial axis. The subpixel intensities herein may have 1-15 different axial locations that are between two adjacent axial locations among the plurality of predetermined axial locations. Each of the subpixel intensities may have 1 to 80 different axial locations that are along the axial axis and are between two adjacent axial locations among the plurality of predetermined axial locations. In some aspects, the subpixel resolution along axial direction may be based on the size of the cellular sample and the density of the concatemers along the axial axis.

The density of the concatemer molecules on the support can be about $10^1$-$10^{12}$ per mm2. The density of the concatemer molecules on the support can be about $10^2$-$10^8$ per mm$^2$. The density of the concatemer molecules on the support can be about $10^4$-$10^8$ per mm$^2$. The density of the concatemer molecules on the support can be about $10^2$-$10^5$ per mm$^2$. The density of the concatemer molecules on the support can be 101-$10^{12}$ per mm$^2$. The density of the concatemer molecules on the support can be $10^2$-$10^8$ per mm$^2$. The density of the concatemer molecules on the support can be $10^4$-$10^8$ per mm$^2$. The density of the concatemer molecules on the support can be $10^2$-$10^5$ per mm$^2$.

In some aspects, the methods 500 may include an operation 520' in replacement of operation 520. The operation 520' may comprise identifying base calling locations in the first plurality of flow cell images by using a spot-finding algorithm based on pixel intensities and a respective color purity of each of the pixel intensities. The difference between operation 520 and 520' are described in relation to methods 300. In some aspects, operation 520 may treat some or all pixels of the flow cell images as candidate base calling locations, and determine base calling locations among the candidate base calling locations by adding each determined base calling location to the base calling template. In some aspect, operation 520' comprises inputting the optical signals of flow cell images into the spot-finding algorithm, such that the spot-finding algorithm outputs a set of potential candidate base calling locations. The spot finding algorithm may work in 3D so that it can take flow cell images from multiple z levels and output a set of potential candidate base calling locations. The set of potential candidate base calling locations may be at least two different z locations.

Data Files of Sequencing Results and Cellular Features

Traditional data files of sequencing results, such as FastQ file, generally include base calls and their corresponding quality scores. Sequencing, for example, of in situ cells or tissue poses additional challenges and complexity to the sequencing system and sequencing analysis than traditional 2D sequencing. Sequencing of in situ samples relies on traditional spatial biology for determination of spatial information of the sequencing results. Currently, sequencing data are collected on one instrument, e.g., the sequencing system, and spatial biology data can be collected on a different instrument, e.g., a traditional microscope with various cell staining. As such, spatial information and sequencing results are stored in different data file formats thereby requiring multiple software and/or processes for analyzing sequencing results in connection with spatial information. Further, images containing sequencing and cellular features may be saved in complex data formats and pose a challenge on storage space. There is a need for spatial biology data to seamlessly integrate with sequencing data to facilitate in situ sequencing analysis.

Aspects of the present disclosure provide data files. The data files herein can comprise sequencing results. The data files herein can comprise multiple base calls, similar as traditional data files, e.g., traditional FastQ files. The base calls may be generated from primary analysis of flow cell images at a single axial location (i.e., z location). FIG. 28 shows a simulated flow cell image (top right) of in situ cells with polonies as small bright spots (e.g., a couple of pixels big). In some aspects, the base calls may be obtained from sequencing analysis of flow cell images at multiple axial locations or in a 3D space.

In aspects of the present disclosure, the data files and corresponding formats herein can advantageously include spatial biology information content and compress complex image datasets into a single data format. The data files disclosed herein can advantageously include information specific to 3D sequencing so that such data files can be conveniently and more efficiently utilized for 3D sequencing analysis. Other advantages of systems and methods disclosed herein include but are not limited to: allowing 3D cellular features such as cell or tissue morphology to be efficiently reconstructed from the data files; simplifying biomarkers information and its data processing in data files; enabling simpler and more convenient data learning from a single file type so that information from various assay types can be seamlessly integrated; and enabling data compression while retaining critical information content across different assay types.

In some aspects, the base calls are generated from polonies in one or more sequencing cycles. In some aspects, the base calls are generated from polonies in short sequencing reads comprising only 1 to 50 cycles, 2 to 30 cycles, 2 to 20 cycles, or 2 to 60 cycles.

In some aspects, the base calls may comprises one or more base calls of barcode sequence(s). In some aspects, the base calls may comprises one or more base calls of index sequence(s). In some aspects, the base calls may comprises one or more base calls of insert sequence(s) of interest. In some aspects, the base calls may only comprise base calls from barcode sequence(s). In some aspects, the base calls may only comprises base calls from index sequence(s). In some aspects, the base calls lack bases of insert sequence(s) of interest.

The data files herein may include quality indicators corresponding to some or all of the base calls. The quality indicators may comprise quality scores of the base calls.

The data files may include spatial coordinates of the base calls on the support. Additionally, the data files may include data of one or more cellular features. The cellular features may be of the cellular sample immobilized on the support. The base calls may be generated from sequencing of the cellular sample immobilized on the support. The data of the cellular features may be obtained from the same in situ sample that has been sequenced to generate the base calls in the data files. The data of each of the one or more cellular features may comprise a cellular feature indicator. The cell feature indicator may be configured to indicate a cell element selected from: a nucleus, a membrane, a cytosol, and a mitochondria. The cell feature indicator may be configured to indicate a cell element selected from: a nucleus boundary and a membrane boundary. For example, "m" may indicate mitochondria or membrane, "c" may indicate cytosol, "n" may indicate nucleus. The data file may include spatial coordinates of the cellular feature on the support. The spatial coordinates of the base calls and the spatial coordinates of the cellular features may be in a same coordinate system. The spatial coordinates of each of the cellular features may comprise multiple sets of spatial coordinates. The data of one or more cellular features may be separated into multiple entries, each entry of the multiple entries corresponds to a spatial location on the support. The spatial location may be in 2D or 3D. The data of one or more cellular features may be separated into multiple entries and each entry of the multiple entries may correspond to a set of spatial coordinates. The set of spatial coordinates may comprise: an x coordinate, y coordinate, z coordinate, or their combinations. Each set of spatial coordinates is configured to indicate a unique location in 2D or 3D. For example, a cellular feature may be cell membrane(s) of one or more cells. Each pixel in the images that is on the cell membrane can be an entries, and all the multiple entries together determines the 3D spatial locations of the cell membrane(s). Although 2D and/or 3D Cartesian coordinate systems are used to define spatial locations in 2D or 3D space herein, various coordinate systems can be used to define spatial locations and relationships herein. Some exemplary coordinate systems other than Cartesian systems can include but not limited to the polar coordinate system, cylindrical, or spherical coordinate systems. Other coordinate systems can include homogeneous or non-homogenous coordinate system.

The spatial coordinates of the base calls or of the cellular features may be in 3D. The spatial coordinates of the base calls and the spatial coordinates of the one or more cellular features may comprise an x coordinate, y coordinate, z coordinate, or their combinations.

In some aspects, the base calls, quality indicators, one or more cellular features, spatial coordinates of the base calls, or spatial coordinates of the cellular features comprise: one or more letters, one or more numbers, one or more symbols, or a combination thereof.

The data file may be a text file. The datafile may be a FastQ file. The data file may be encoded using various encoding format for text files. The data file may be ASCII encoded. The data file may be in 8-bit, 12-bit, 16-bit, 18-bit, 32-bit, or 36-bit coded format.

In some aspects, the data files comprise one or more sequencing parameters and values thereof corresponding to the cellular features. The one or more sequencing parameters may comprise a target sequence. The one or more sequencing parameters may comprise a name of a sequencing system. The one or more sequencing parameters may comprise an identification of a sequencing run. The one or more sequencing parameters may comprise an identification of a flow cell. The one or more sequencing parameters may comprise a lane number or lane identification of a flow cell. The one or more sequencing parameters may comprise a tile number or a subtile number.

In some aspects, the data files comprise one or more separators. Each of the one or more separators may be configured for separating the one or more cellular features and/or separating the base calls from the one or more cellular features. Each of the one or more separators may include: a letter, a number, a symbol, or a combination thereof. In some aspects, the data of one or more cellular features is separated by the one or more separators based on the spatial coordinates of the cellular features. In some aspects, each entry each entry of the multiple entries of the one or more cellular features are separated by one or more separators.

In some aspects, the data files herein comprise a data format that is identical to or compatible with data files generated by a next generation sequencing (NGS) system and containing base calls, e.g., traditional FastQ files. In some aspects, at least part of the data files herein may be analyzed or processed by software or computer programs that are configured to process traditional sequencing data files, e.g., FastQ files. For example, the sequencing result portion of the data files herein, which includes at least the base calls, and optionally their corresponding quality scores can be analyzed or processed by software or computer programs that are configured to process traditional sequencing data files, e.g., FastQ files.

In some aspects, for an individual cellular sample, e.g., a sample with multiple in situ cells immobilized on a flow cell, the sequencing results of the sample may be included in a first data file, e.g., a traditional FastQ file, and the data of the corresponding cellular features of the sample, may be includes in the same first data file, or a second different data file. The second data file may still have the data format that is compatible or identical to the first data file to facilitate the user to combine information in the first and second data files without the need to reformat the data file(s), convert the data file(s), or otherwise process the data files. For example, traditional data of the cellular features may be in JPEG, PNG, TIFF, or other digital image encoded formats so that data processing is warranted to extract spatial coordinates of the cellular features. Further, the extracted spatial coordinates may need to be converted to 8-bit or other encoding compatible with traditional FastQ. The data file and its format disclosed herein can advantageously include spatial biology information and in situ sequencing results. The data files disclosed herein can advantageously include information specific to in situ sequencing so that such data files can be conveniently and more efficiently utilized for in situ sequencing analysis which combines in situ sequencing information with corresponding cellular features. Other advantages of systems and methods disclosed herein include but are not limited to: allowing in situ cell or tissue morphology to be efficiently reconstructed from data files; simplifying biomarkers information and its data processing in data files; enabling simpler and more convenient data learning from a single file type so that information from various assay types can be seamlessly integrated; and enabling significant data compression while retaining critical information content across different assay types.

In some aspects, the data file is configured for reconstruction of images comprising the one or more cellular features and the base calling results, and the one or more cellular features and the base calling results are aligned or registered with respective to each other. FIG. 28 shows an exemplary reconstructed image (bottom right) aligning sequencing results with segmentations of cell membrane and nucleus membrane. As such, the data file can advantageously allow users of traditional sequencing results, e.g., base calls, to perform sequencing analysis based on the cellular features.

FIG. 29A shows an exemplary cell and some of its structural elements. Unique cell feature indicators can be used in the data files disclosed herein to represent the nucleus, membrane, cytosol, and mitochondria. The data file disclosed herein can also include one or more first parameters and their values related to a sequencing system; and one or more second parameters and their values related to imaging parameters. Such first and second parameters and their values can be used to uniquely indicate the sequencing hardware, software, or other sequencing related processes. As shown in FIG. 29B, the letter "n" and its ASCII code can be used to indicate that the base calling results that comes after the letter "n" are obtained from the nucleus of the cell. The letter "m" can indicate that information included after this letter belongs to cell morphology. Such information can end when a next separate "@" appears, as shown in FIG. 29B.

For each cell feature indicator, the data file may further include a sub-feature indicator to further include distinct features within the same cell feature indicator. For example, as shown in FIG. 29B, the cell feature indicator for cytosol is "c." For different elements within the cytosol, such as protein, the data file can include a sub-feature indicator. The sub-feature indicator can be a different letter or various unique combination of letters and numbers. For example, the data file in FIG. 29B uses a protein marker that is a combination of different nucleotides. The combination of nucleotides can be a flexible length or a fixed length, e.g., 5. Similarly, the data file in FIG. 29B uses a transcript marker that is a combination of different nucleotides.

An exemplary list of indicators that the data file can use is listed in FIG. 29A. In some aspects, each cell feature indicator, parameter, the value of the parameter disclosed herein can comprise: one or more letters, one or more numbers, one or more symbols, or a combination thereof.

The data file can also include one or more separators. Each separator can be used to separate two different entries in the data file. For example, a traditional separator of "+" can be used to separate base calling results and the quality scores as shown in FIG. 29B. As another example, the separators can include "@" ":" and one or more spaces as shown in FIG. 29B.

The data file can further comprises an index sequence as shown in FIGS. 29A-29B.

Disclosed herein are methods of generating the data files. The methods of generating the data files can include some or all of the operations disclosed herein.

The methods of generating the data files can include some or all of the operations disclosed herein. The operations may but is not limited to be performed in the order that is described herein.

The methods of generating the data files can be performed by one or more processors (e.g., 404 in FIG. 4) disclosed herein. In some aspects, the processor can include one or more of: a processing unit, an integrated circuit, or their combinations. For example, the processing unit can include a central processing unit (CPU) and/or a graphic processing unit (GPU). The integrated circuit can include a chip such as a field-programmable gate array (FPGA). In some aspects, the processor can include the computing system 400.

In some aspects, some or all operations in methods of generating the data files can be performed by the FPGA(s). In aspects when some operations are performed by FPGA(s), the data after an operation performed by the FPGA(s) can be communicated by the FPGA(s)s to the CPU(s) so that CPU(s) can perform subsequent operation(s) in methods of generating the data files using such data. Similarly, data can also be communicated from the CPU(s) to the FPGA(s) for processing by the FPGA(s). In some aspects, all the operations in methods of generating the data files can be performed by CPU(s). Alternatively, the operations performed by CPU(s) can be performed by other processors such as the dedicated processors, or GPU(s). In some aspects, all the operations in methods of generating the data files can be performed by FPGA(s). In some aspects, some or all operations of the methods of generating the data files are performed during or before a sequencing cycle M in a sequencing run. In some aspect, M is less than 5, 10, 20, 30, 40, 50, or 60.

The operations may be performed in but is not limited to the order that is described herein. The methods of generating the data files herein can include generating, by an optical system, one or more images comprising one or more cellular features therein. The one or more images may include optical signals from the one or more cellular features. The one or more images may include increase contrast for the one or more cellular features. For example, the one or more images may be microscopic images of staining of the cellular sample on the support. In some aspects, the one or more images are acquired after the sequencing reads have been completed. In some aspects, the one or more images are acquired after flow cell images for generating the base calls have been acquired using the sequencing system as shown in FIG. 1.

FIG. 28 shows a simulated image (top middle) of the cellular sample with simulated staining of the cell and the nucleus.

The methods for generating data files may include an operation of determining spatial coordinates of each of the one or more cellular features in the one or more images. The determination operation may use various image processing algorithms for segmentation, contour tracing, or the like. FIG. 28 shows an exemplary segmentation (top left) derived from the image showing cellular features such as nucleus and cell membrane (top middle). Spatial coordinates can be determined using the segmentation image.

The methods for generating the data files herein may include an operation of generating data of one or more cellular features based on the determined spatial coordinates. For each of the one or more cellular features, the operation of generating data based on the determined spatial coordinates comprises: generating a cellular feature indicator; and inserting the spatial coordinates of the cellular feature. Such generating and inserting operations can be for multiple entries of the cellular features, and each entry corresponds to a non-repetitive spatial location in 2D or 3D. Such generating and inserting operations can be reiterative to include part or all of the multiple entries of the specific cellular feature. FIG. 28 shows two exemplary entries for boundary, one is from the membrane and the other is from the nucleus boundary, at line 1 and line 134549, respectively. The exemplary format for including the entry is also shown in FIG. 28 as:

Boundary Format: @Instrument:RunID:FlowcellID:Lane:Tile:X:Y:_:Paired:Filter:ControlBits:Feature(n or m):_

The data file may comprise a data format that is identical to or compatible with data files generated by a next generation sequencing (NGS) system and containing base calls.

The methods for generating the data files herein may include an operation of generating data of one or more cellular features based on the determined spatial coordinates in the data format that is identical to or compatible with the data format generated by a next generation sequencing (NGS) system that contains base calls. In some aspects, such operation of generating the data of one or more cellular features comprises, for each of the one or more cellular features, performing a number of iterations of operations, comprising: (i) inserting a cellular feature indicator of the cellular feature; (ii) inserting a set of spatial coordinates of the spatial coordinates of the cellular feature; (iii) inserting one or more sequencing parameters and values thereof corresponding to the cellular feature; (iv) inserting at least one of the one or more separators, or a combinations thereof. In some aspects, such operation of generating the data of one or more cellular features comprises, for each of the one or more cellular features, performing a number of iterations of operations, comprising: (v) inserting base calls; (vi) inserting quality indicators corresponding to the base calls; and (vii) inserting spatial coordinates of the base calls; or a combination thereof. FIG. 28 shows an exemplary entry of base calls from at least part of a barcode sequence at lines 249307-249309. "PACRG" is the target protein/gene of the barcode. The exemplary barcode format may be:
@Instrument:RunID:FlowcellID:Lane:Tile:X:Y:Z:Paired:Filter:ControlBits:Feature(n or c):AssignedTarget The quality scores may be inserted after a separator "+" in a subsequent line.

In some aspects, the methods for generating the data files herein may include an operation of generating, by a sequencing system, a first plurality of flow cell images of the cellular sample immobilized on the support similar as operation 510.

In some aspects, the methods for generating the data files herein may include an operation of generating base calls based on the first plurality of flow cell images of the cellular sample as disclosed herein.

In some aspects, the exact format for inserting barcodes or other base calls, and the exact format for inserting boundaries or the cellular features includes but is not limited to the exemplary formats disclosed herein. Their formats can be customized based on various factors including for example, the type of the cellular sample being sequenced, the coordinate system being used for defining spatial locations, the characteristics of the flow cell, etc.

Computer Systems

Figure 4:
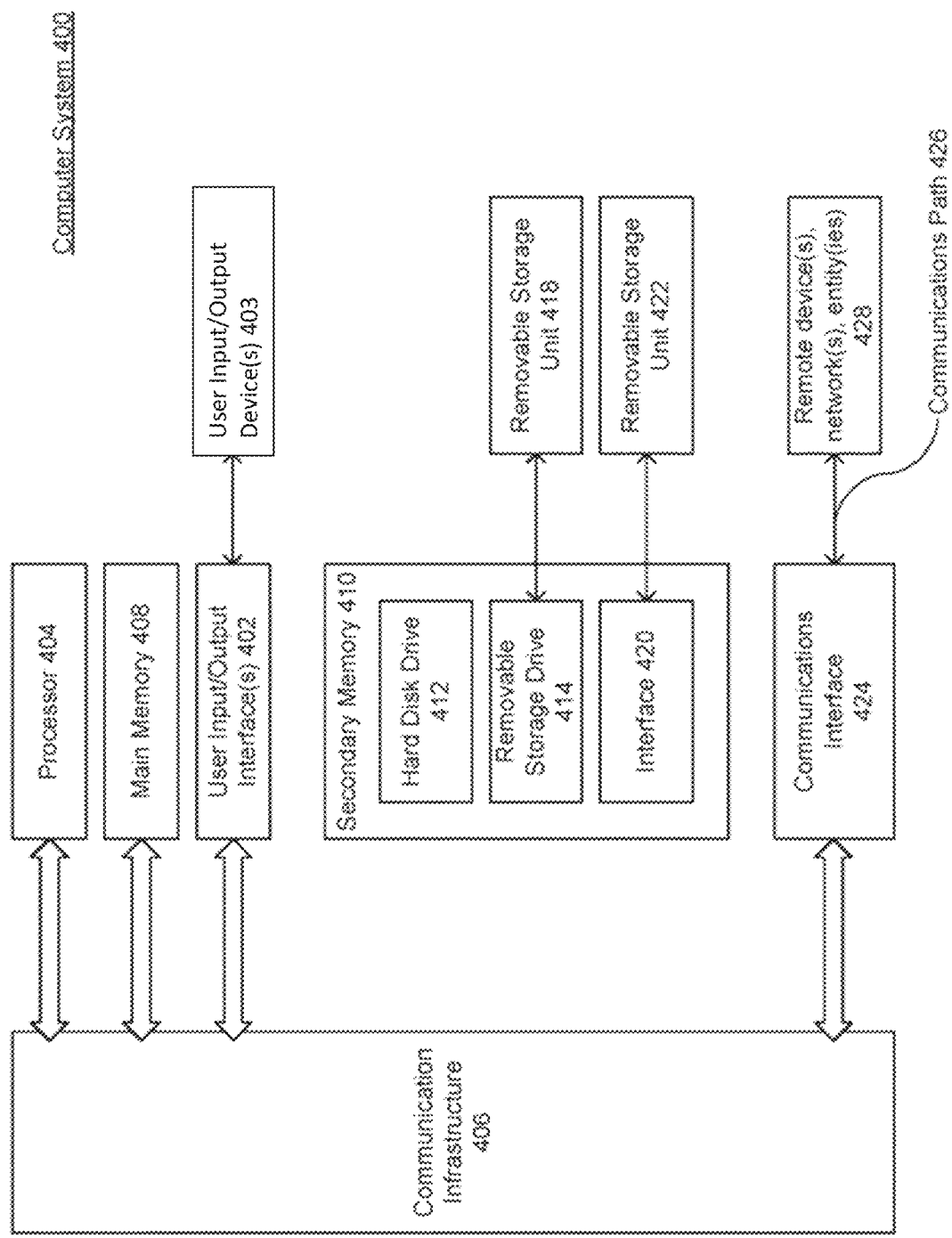
FIG. 4 illustrates a block diagram of a computer that may be used to perform various aspects of the present disclosure, according to some aspects.

Various aspects may be implemented, for example, using one or more computer systems, such as computer system 400 shown in FIG. 4. One or more computer systems 400 may be used, for example, to implement any of the aspects discussed herein, as well as combinations and sub-combinations thereof.

Computer system 400 may include one or more processors (also called central processing units, or CPUs), such as a processor 404. Processor 404 may be connected to a bus or communication infrastructure 406.

Computer system 400 may also include user input/output device(s) 403, such as monitors, keyboards, pointing devices, etc., which may communicate with communication infrastructure 406 through user input/output interface(s) 402. The user input/output devices 403 may be coupled to the user interface 124 in FIG. 1.

One or more of processors 404 may be a graphics processing unit (GPU). In an aspect, a GPU may be a processor that is a specialized electronic circuit designed to process mathematically intensive applications. With capabilities of general-purpose computing on graphics processing units (GPGPU), the GPU may be particularly useful in at least the image recognition and machine learning aspects described herein.

Additionally, one or more of processors 404 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or secondary memory 410. Secondary memory 410 may include, for example, a main storage drive 412 and/or a removable storage device or drive 414. Main storage drive 412 may be a hard disk drive or solid-state drive, for example. Removable storage drive 414 may be a floppy disk drive, a magnetic tape drive, a compact disk drive, an optical storage device, tape backup device, and/or any other storage device/drive.

Removable storage drive 414 may interact with a removable storage unit 418.

Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communication path 426, which may be wired and/or wireless (or a combination thereof), and which may include any combination of LANs, WANs, the Internet, etc. Control logic and/or data may be transmitted to and from computer system 400 via communication path 426. In some aspects, communication path 426 is the connection to the cloud 130, as depicted in FIG. 1. The external devices, etc. referred to by reference number 428 may be devices, networks, entities, etc. in the cloud 130.

Computer system 400 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 400 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PUP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Expressjs, Backbone.js, Ember.js, DHTMLX, Vue, React, Electron, and so on, among many other non-limiting examples.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 4. In particular, aspects may operate with software, hardware, and/or operating system implementations other than those described herein.

It is to be appreciated that the Detailed Description section, and not any other section, is intended to be used to interpret the claims. Other sections may set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects may perform functional blocks, steps, operations, methods, etc. using orderings different from those described herein.

References herein to "one aspect," "an aspect," "an example aspect," "some aspects," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In some aspects, when sequencing with detectably labeled multivalent molecules, step (2) in which multivalent-binding complexes are formed and step (3) in which the bound detectably labeled multivalent molecules are imaged and detected, the conditions are gentle compared to sequencing workflows that employ detectable labeled chain terminating nucleotides. For example, steps (2) and (3) can be conducted at a gentle temperature of about 35-45° C., or about 39-42° C. Steps (2) and (3) can be conducted at a gentle temperature which can help retain the compact size and shape of a DNA nanoball during multiple sequencing cycles (e.g., up to 30 cycles) which can improve FWHM (full width half maximum) of a spot image of the DNA nanoball inside a cellular sample. In some aspects, the DNA nanoball does not unravel during multiple sequencing cycles. In some aspects, the spot image of the DNA nanoball does not enlarge during multiple sequencing cycles. In some aspects, the spot image of the DNA nanoball remains a discrete spot during multiple sequencing cycles. The spot image can be represented as a Gaussian spot and the size can be measured as a FWHM. A smaller spot size as indicated by a smaller FWHM typically correlates with an improved image of the spot. In some aspects, the FWHM of a nanoball spot can be about 10 um or smaller.

In some aspects, out-of-sync phasing and/or pre-phasing events can occur during synchronized polymerase-catalyzed sequencing reactions employing detectably labeled multivalent molecules. During sequencing, a fluorescent signal can be detected which corresponds to binding of complementary nucleotide unit of a multivalent molecule to the complexed polymerase thereby forming a multivalent-binding complex. Thus, phasing and pre-phasing events can be detected and monitored using binding of labeled multivalent molecules. In some aspects, when conducting up to 30 sequencing cycles with detectably labeled multivalent molecules, the phasing and/or pre-phasing rate can be less than about 5%, or less than about 1%, or less than about 0.01%, or less than about 0.001%. By contrast, the phasing and/or pre-phasing rates for conducting up to 30 sequencing cycles using labeled chain terminator nucleotides can be about 5%.

In any of the methods described herein, the plurality of RNA or cDNA inside the cellular sample can be amplified to generate amplicons of the RNA or cDNA where the amplicons comprise concatemers. In some aspects, the plurality of RNA or cDNA molecules inside the cellular sample can be amplified by conducting a padlock probe circularization and rolling circle amplification workflow. In some aspects, the methods comprise contacting the plurality of RNA or cDNA molecules inside the cellular sample with a plurality of padlock probes, including a first plurality of target-specific padlock probes that hybridize with first target RNA or cDNA molecules, and a second plurality of target-specific padlock probes that hybridize with second target RNA or cDNA molecules.

In some aspects, the padlock probes comprise single-stranded oligonucleotides. In some aspects, the padlock probes comprise DNA, RNA, or DNA and RNA. In some aspects, individual padlock probes comprise an internal region between the first and second terminal regions, where the internal region comprises at least one universal adaptor sequence including a sample barcode sequence, an amplification primer binding site, a sequencing primer binding site, a compaction oligonucleotide binding site and/or a surface capture primer binding site (FIG. 6). In some aspects, the padlock probes comprise at least one target barcode sequence that corresponds to a given target RNA or target cDNA to which the padlock probes binds. In some aspects, the padlock probes comprise at least one unique identification sequence (e.g., unique molecular index (UMI)). In some aspects, the padlock probes comprise at least one restriction enzyme recognition sequence.

In some aspects, individual padlock probes comprise first and second terminal regions (e.g., first and second binding arms) that hybridize to portions of target RNA or target cDNA molecules to form a plurality of RNA-padlock probe complexes or a plurality of cDNA-padlock probe complexes, wherein individual complexes have the first and second terminal probe regions hybridized to proximal regions of an RNA or cDNA molecule to form a nick or gap between the first and second terminal probe ends. In some aspects, the first terminal region of an individual padlock probe has a first target-specific sequence that selectively hybridizes to a first region of a target RNA or cDNA molecule, and the second terminal region of the individual padlock probe has a second target-specific sequence that selectively hybridizes to a second region of the same target RNA or cDNA molecule, where a nick or gap is formed between the hybridized first and second terminal regions, thereby circularizing the padlock probe (e.g., FIG. 7).

In some aspects, the padlock probes comprise canonical nucleotides and/or nucleotide analogs. In some aspects, the padlock probes are modified to confer resistance to nuclease degradation (e.g., ribonuclease degradation). For example, the padlock probes comprise at least one phosphorothioate diester bond at their 5' ends which can render the padlock probes resistant to nuclease degradation. In some aspects, the padlock probes comprise 2-5 or more consecutive phosphorothioate diester bonds at their 5' ends. In some aspects, the padlock probes comprise at least one ribonucleotide and/or at least one 2'-O-methyl, 2'-O-methoxyethyl (MOE), 2' fluoro-base nucleotide. In some aspects, the padlock probes comprise phosphorylated 3' ends. In some aspects, the padlock probes comprise at least one locked nucleic acid (LNA) base. In some aspects, the padlock probes comprise a phosphorylated 5' end (e.g., using a polynucleotide kinase).

In some aspects, individual padlock probes in a set of padlock probes (e.g., a plurality of padlock probes) comprise first and second terminal regions that hybridize to the same target regions of the target RNA or cDNA molecules to form a plurality of RNA-padlock probe complexes or a plurality of cDNA-padlock probe complexes having the same RNA or cDNA sequence.

In some aspects, a set of padlock probes (e.g., a plurality of padlock probes) comprise at least two sub-sets of padlock probes. In some aspects, individual padlock probes in a first subset of padlock probes comprise first and second terminal regions that hybridize to the same target regions (e.g., a first target region) of the target RNA or cDNA molecules to form a first plurality of RNA-padlock probe complexes or a first plurality of cDNA-padlock probe complexes having the same RNA or cDNA sequence. In some aspects, individual padlock probes in a second subset of padlock probes comprise first and second terminal regions that hybridize to the same target regions (e.g., a second target region) of the target RNA or cDNA molecules to form a second plurality of RNA-padlock probe complexes or a second plurality of cDNA-padlock probe complexes having the same cDNA sequence. In some aspects, the first and second sub-sets of padlock probes hybridize to different target regions of the same target RNA or cDNA molecules. In some aspects, the first and second sub-sets of padlock probes hybridize to different target regions of different target RNA or cDNA molecules. In some aspects, the set of padlock probes comprise 2-10 sub-sets of padlock probes, or 10-25 sub-sets of padlock probes, or 25-50 sub-sets of padlock probes, or up to 100 sub-sets of padlock probes. In some aspects, the set of padlock probes comprise at least 100 sub-sets of padlock probes, at least 500 sub-sets of padlock probes, at least 1000 sub-sets of padlock probes, at least 10,000 sub-sets of padlock probes, or more sub-sets of padlock probes.

In some aspects, the nicks can be enzymatically ligated to generate covalently closed circular padlock probes. In some aspects, the ligase enzyme can discriminate between matched and mis-matched hybridized ends to ensure target-specific hybridization. In some aspects, the ligation reaction comprises use of a ligase enzyme, including a T3, T4, T7 or Taq DNA ligase enzyme.

In some aspects, the size of the gap between the hybridized first and second terminal regions is 1-25 bases. The 3'OH end of hybridized padlock probe can serve as an initiation site for a polymerase-catalyzed fill-in reaction (e.g., gap fill-in reaction) using the target cDNA molecule (or the target RNA molecule) as a template. After the fill-in reaction, the remaining nick can be enzymatically ligated to generate covalently closed circular padlock probes.

In some aspects, the gap-filling reaction comprises contacting the circularized padlock probe with a DNA polymerase and a plurality of nucleotides. In some aspects, the DNA polymerase comprises *E. coli* DNA polymerase I, Klenow fragment of *E. coli* DNA polymerase I, T7 DNA polymerase, or T4 DNA polymerase. In some aspects, the ligase enzyme can discriminate between matched and mis-matched hybridized ends to ensure target-specific hybridization. In some aspects, the ligation reaction comprises use of a ligase enzyme, including a T3, T4, T7 or Taq DNA ligase enzyme.

In any of the methods described herein, the plurality of covalently closed circular padlock probes can be subjected to a rolling circle amplification reaction to generate a plurality of concatemer molecules each having two or more tandem copies of a unit wherein the unit comprises a target sequence that corresponds to a target RNA molecules and any additional sequence(s) carried by the padlock probes including universal adaptor sequence(s), unique molecular index sequence(s) and/or restriction enzyme recognition sequence(s).

In some aspects, the rolling circle amplification reaction comprises contacting the covalently closed circularized padlock probes with an amplification primer (e.g., a universal rolling circle amplification primer), a strand-displacing DNA polymerase, and a plurality of nucleotides, under a condition suitable for hybridizing individual amplification primers to a covalently closed padlock probe, and under a condition suitable for conducting primer extension using the covalently closed padlock probe as a template molecule to generate a nucleic acid concatemer. In some aspects, the plurality of nucleotides in the rolling circle amplification reaction comprise any mixture of two or more of dATP, dGTP, dCTP, dTTP and/or dUTP. In some aspects, any of the rolling circle amplification reactions described herein can be conducted in the presence or in the absence of a plurality of compaction oligonucleotides.

In some aspects, when the rolling circle amplification reaction includes a plurality of nucleotide which includes dUTP, the resulting concatemer can be cross-linked to a cross-linking reactive group by treating the cellular sample with a succinimide ester (NHS), maleimide (Sulfo-SMCC), imidoester (DMP), carbodiimide (DCC, EDC) or phenyl azide. In some aspects, polymerization of the cross-linking reactive group can be initiated with light or UV light. In some aspects, the resulting concatemer can be cross-linked to a matrix by treating the cellular sample with a cross-linked agarose, cross-linked dextran or cross-linked polyethylene glycol (PEG), polyacrylamide, cellulose alginate or polyamide. In some aspects, the PEG comprises a sulfo-NHS ester moiety at one or both ends, for example a PEGylated bis(sulfosuccinimidyl)suberate) (e.g., BS(PEG)9 from Thermo Fisher Scientific, catalog No. 21582).

In some aspects, the rolling circle amplification reaction can be conducted at a constant temperature (e.g., isothermal) wherein the constant temperature is at room temperature to about 30° C., or about 30-40° C., or about 40-50° C., or about 50-65° C.

In some aspects, the DNA polymerase having a strand displacing activity can be selected from a group consisting of phi29 DNA polymerase, large fragment of Bst DNA polymerase, large fragment of Bsu DNA polymerase, and Bca (exo-) DNA polymerase, Klenow fragment of *E. coli* DNA polymerase, T5 polymerase, M-MuLV reverse transcriptase, HIV viral reverse transcriptase, or Deep Vent DNA polymerase. In some aspects, the phi29 DNA polymerase can be wild type phi29 DNA polymerase (e.g., MagniPhi from Expedeon), or variant EquiPhi29 DNA polymerase (e.g., from Thermo Fisher Scientific), and chimeric QualiPhi DNA polymerase (e.g., from 4basebio).

In some aspects, the rolling circle amplification primers can be modified to increase resistance to nuclease degradation. In some aspects, the rolling circle amplification primers comprise at least one phosphorothioate diester bond at their 5' ends which can render the amplification primers resistant to exonuclease degradation. In some aspects, the rolling circle amplification primers comprise 2-5 or more consecutive phosphorothioate diester bonds at their 5' ends. In some aspects, the rolling circle amplification primers comprise at least one ribonucleotide and/or at least one 2'-O-methyl or 2'-O-methoxyethyl (MOE) nucleotide.

In some aspects, the rolling circle amplification reaction can be conducted in the presence of a plurality of compaction oligonucleotides which, when hybridized to a concatemer molecule, compacts the size and/or shape of the concatemer to form a compact nanoball. In some aspects, the compaction oligonucleotides comprise single stranded oligonucleotides having a first region at one end that hybridizes to a portion of a concatemer molecule and a second region at the other end that hybridizes to another portion of the same concatemer molecule, where hybridization of the compaction oligonucleotide to a given concatemer compacts the size and/or shape of the concatemer.

The compaction oligonucleotides include a 5' region, an optional internal region (intervening region), and a 3' region. The 5' and 3' regions of the compaction oligonucleotide can hybridize to any portions of the concatemer. The 5' and 3' regions of the compaction oligonucleotide can hybridize to different portions of the concatemer to pull together distal portions of the concatemer causing compaction of the concatemer to form a DNA nanoball. For example, the 5' region of the compaction oligonucleotide is designed to hybridize to a first portion of the concatemer molecule (e.g., a universal compaction oligonucleotide binding site), and the 3' region of the compaction oligonucleotide is designed to hybridized to a second portion of the concatemer molecule (e.g., a universal compaction oligonucleotide binding site). Inclusion of compaction oligonucleotides during RCA can promote formation of DNA nanoballs having tighter size and shape compared to concatemers generated in the absence of the compaction oligonucleotides. The compact and stable characteristics of the DNA nanoballs improves in situ sequencing accuracy by increasing signal intensity and the nanoballs retain their shape and size during multiple sequencing cycles.

In some aspects, the compaction oligonucleotides comprise single stranded oligonucleotides comprising DNA, RNA, or a combination of DNA and RNA. The compaction oligonucleotides can be any length, including 20-150 nucleotides, or 30-100 nucleotides, or 40-80 nucleotides in length.

In some aspects, the compaction oligonucleotides comprises a 5' region and a 3' region, and optionally an intervening region between the 5' and 3' regions. The intervening region can be any length, for example about 2-20 nucleotides in length. The intervening region comprises a homopolymer having consecutive identical bases (e.g., AAA, GGG, CCC, TTT or UUU). The intervening region comprises a non-homopolymer sequence.

The 5' region of the compaction oligonucleotides can be wholly complementary or partially complementary along its length to a first portion of a concatemer molecule. The 3' region of the compaction oligonucleotides can be wholly complementary or partially complementary along its length to a second portion of a concatemer molecule. The 5' region of the compaction oligonucleotides can hybridize to a first universal sequence portion of a concatemer molecule. The 3' region of the compaction oligonucleotides can hybridize to a second universal sequence portion of a concatemer molecule.

In some aspects, the 5' region of the compaction oligonucleotide can have the same sequence as the 3' region. The 5' region of the compaction oligonucleotide can have a sequence that is different from the 3' region. In some aspects, the 3' region of the compaction oligonucleotide can have a sequence that is a reverse sequence of the 5' region. In some aspects, the 5' region of the compaction oligonucleotide can have a sequence that is a reverse sequence of the 3' region.

In some aspects, the 3' region of any of the compaction oligonucleotides can include an additional three bases at the terminal 3' end which comprises 2'-O-methyl RNA bases (e.g., designated mUmUmU) or the terminal 3' end lacks additional 2'-O-methyl RNA bases.

In some aspects, the compaction oligonucleotides comprise one or more modified bases or linkages at their 5' or 3' ends to confer certain functionalities. In some aspects, the compaction oligonucleotides comprise at least one phosphorothioate linkages at their 5' and/or 3' ends to confer exonuclease resistance. In some aspects, at least one nucleotide at or near the 3' end comprises a 2' fluoro base which confers exonuclease resistance. In some aspects, the 3' end of the compaction oligonucleotides comprise at least one 2'-O-methyl RNA base which blocks polymerase-catalyzed extension. For example, the 3' end of the compaction oligonucleotide comprises three bases comprising 2'-O-methyl RNA base (e.g., designated mUmUmU). In some aspects, the compaction oligonucleotides comprise a 3' inverted dT at their 3' ends which blocks polymerase-catalyzed extension. In some aspects, the compaction oligonucleotides comprise 3' phosphorylation which blocks polymerase-catalyzed extension. In some aspects, the internal region of the compaction oligonucleotides comprise at least one locked nucleic acid (LNA) which increases the thermal stability of duplexes formed by hybridizing a compaction oligonucleotide to a concatemer molecule. In some aspects, the compaction oligonucleotides comprise a phosphorylated 5' end (e.g., using a polynucleotide kinase).

In some aspects, the compaction oligonucleotide comprises the sequence 5'-CATGTAATGCACGTACTTTCAGGGTAAA-CATGTAATGCACGTACTTTCAGGGT-3' (SEQ ID NO: 1). In some aspects, the compaction oligonucleotides includes an additional three bases at the terminal 3' end which comprises 2'-O-methyl RNA bases (e.g., designated mUmUmU) or the terminal 3' end lacks additional 2'-O-methyl RNA bases.

In some aspects, the compaction oligonucleotides can include at least one region having consecutive guanines. For example, the compaction oligonucleotides can include at least one region having 2, 3, 4, 5, 6 or more consecutive guanines. In some aspects, the compaction oligonucleotides comprise four consecutive guanines which can form a guanine tetrad structure (see FIG. 25). The guanine tetrad structure can be stabilized via Hoogsteen hydrogen bonding. The guanine tetrad structure can be stabilized by a central cation including potassium, sodium, lithium, rubidium or cesium.

Figure 25:
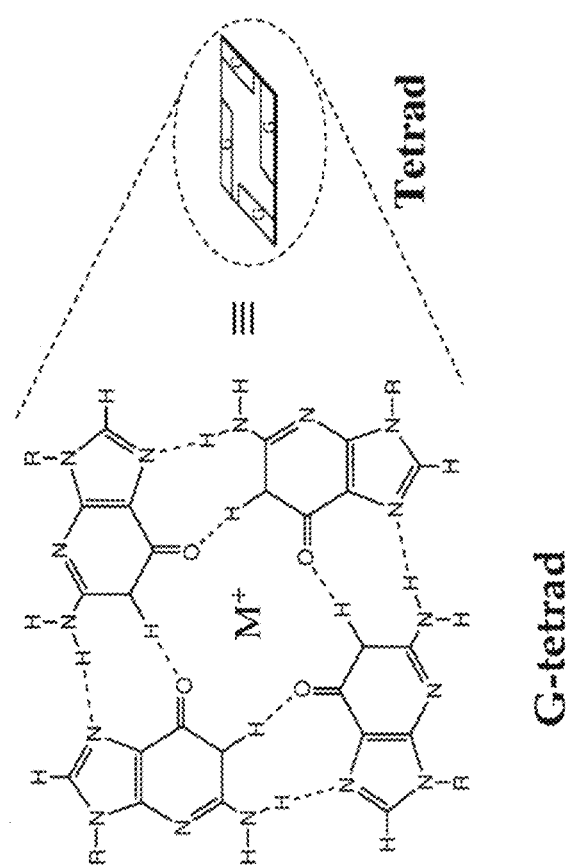
FIG. 25 is a schematic of a guanine tetrad (e.g., G-tetrad).
Figure 26:
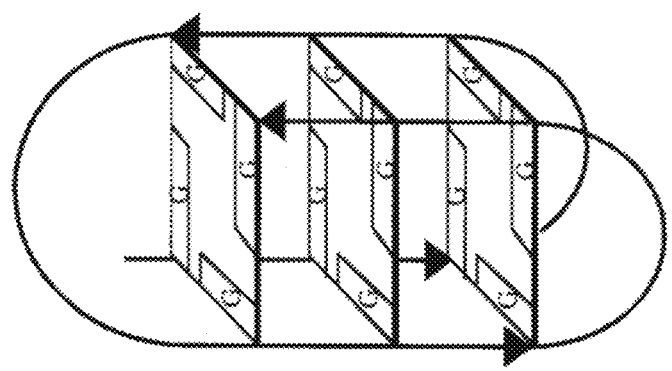
FIG. 26 is a schematic of an exemplary intramolecular G-quadruplex structure.

At least one compaction oligonucleotide can form a guanine tetrad (FIG. 25) and hybridize to the universal binding sequences in a concatemer which can cause the concatemer to fold to form an intramolecular G-quadruplex structure (FIG. 26). The concatemers can self-collapse to form compact nanoballs. Formation of the guanine tetrads and G-quadruplexes in the nanoballs may increase the stability of the nanoballs to retain their compact size and shape which can withstand changes in pH, temperature and/or repeated flows of reagents during sequencing inside the cellular sample.

In some aspects, the plurality of compaction oligonucleotides in the rolling circle amplification reaction have the same sequence. Alternatively, the plurality of compaction oligonucleotides in the rolling circle amplification reaction comprise a mixture of two or more different populations of compaction oligonucleotides having different sequences.

In some aspect, the immobilized concatemer template molecule can self-collapse into a compact nucleic acid nanoball. The nanoballs can be imaged and a FWHM measurement can be obtained to give the shape/size of the nanoballs.

In some aspects, inclusion of compaction oligonucleotides in the rolling circle amplification reaction can promote collapsing of a concatemer into a DNA nanoball. Conducting RCA with compaction oligonucleotides helps retain the compact size and shape of a DNA nanoball during multiple sequencing cycles which can improve FWHM (full width half maximum) of a spot image of the DNA nanoball inside a cellular sample. In some aspects, the DNA nanoball does not unravel during multiple sequencing cycles. In some aspects, the spot image of the DNA nanoball does not enlarge during multiple sequencing cycles. In some aspects, the spot image of the DNA nanoball remains a discrete spot during multiple sequencing cycles. The spot image can be represented as a Gaussian spot and the size can be measured as a FWHM. A smaller spot size as indicated by a smaller FWHM typically correlates with an improved image of the spot. In some aspects, the FWHM of a nanoball spot can be about 10 um or smaller.

The single-stranded concatemers collapse into compact DNA nanoballs, where each nanoball carries numerous tandem copies of a polynucleotide unit along their lengths, where the polynucleotide unit includes a sequence-of-interest (e.g., that corresponds to target RNA or target cDNA) and at least a universal sequencing primer binding site. Each polynucleotide unit can bind a sequencing primer, a sequencing polymerase and a detectably-labeled nucleotide reagent (e.g., detectably labeled multivalent molecules), to form a detectable sequencing complex (e.g., a detectable ternary complex). Each nanoball carries numerous detectable sequencing complexes. Thus, the compact nature of the nanoballs increases the local concentration of detectably-labeled nucleotide reagents that are used during the sequencing workflow which increases the signal intensity emitted from a nanoball to give a discrete detectable signal which can be imaged as a fluorescent spot inside the cellular sample. Each spot corresponds to a concatemer and each concatemer corresponds to a target RNA molecule in the cellular sample. Multiple spots can be detected and imaged simultaneously in the cellular sample. The DNA nanoballs having compact shape and size that produce increased signal intensity and color differentiation during sequencing.

In any of the methods described herein, the cellular sample comprises a whole cell, a plurality of whole cells, an intact tissue or an intact tumor. In some aspects, the cellular sample comprises a fresh cellular sample, a freshly-frozen cellular sample, a sectioned cellular sample, or an FFPE cellular sample. In some aspects, the cellular sample comprise one or more living cells or non-living cells.

In some aspects, the cellular sample can be obtained from a virus, fungus, prokaryote or eukaryote. In some aspects, the cellular sample can be obtained from an animal, insect or plant. In some aspects, the cellular sample comprises one or more virally-infected cells.

In some aspects, the cellular sample can be obtained from any organism including human, simian, ape, canine, feline, bovine, equine, murine, porcine, caprine, lupine, ranine, piscine, plant, insect or bacteria.

In some aspects, the cellular sample can be obtained from any organ including head, neck, brain, breast, ovary, cervix, colon, rectum, endometrium, gallbladder, intestines, bladder, prostate, testicles, liver, lung, kidney, esophagus, pancreas, thyroid, pituitary, thymus, skin, heart, larynx, or other organs.

In any of the methods described herein, the term "simple cell media" or related terms refers to a cell media that typically lacks ingredients to support cell growth and/or proliferation in culture. Simple cell media can be used for example to wash, suspend, or dilute the cellular sample. Simple cell media can be mixed with certain ingredients to prepare a cell media that can support cell growth and/or proliferation in culture. A simple cell media comprises any one or any combination of two or more of a buffer, a phosphate compound, a sodium compound, a potassium compound, a calcium compound, a magnesium compound and/or glucose. In some aspects, the simple cell media comprises PBS (phosphate buffered saline), DPBS (Dulbecco's phosphate-buffered saline), HBSS (Hank's balanced salt solution), DMEM (Dulbecco's Modified Eagle's Medium), EMEM (Eagle's Minimum Essential Medium), and/or EBSS. In some aspects, the cellular sample can be placed in a simple cell media prior to or during the step of conducting any of the nucleic acid methods described herein.

In any of the methods described herein, the term "complex cell media" or related terms refers to a cell media that can be used to support cell growth and/or proliferation in culture without supplementation or additives. Complex cell media can include any combination of two or more of a buffering system (e.g., HEPES), inorganic salt(s), amino acid(s), protein(s), polypeptide(s), carbohydrate(s), fatty acid(s), lipid(s), purine(s) and their derivatives (e.g., hypoxanthine), pyrimidine(s) and their derivatives, and/or trace element(s). Complex cell media includes fluids obtained from a fluid or tissue extract. Complex cell media includes artificial cell media. In some aspects, complex cell media can be a serum-containing media, for example complex cell media includes fluids such as fetal bovine serum, blood plasma, blood serum, lymph fluid, human placental cord serum and amniotic fluid. In some aspects, complex cell media can be a serum-free media, which are typically (but not necessarily) defined cell culture media. In some aspects, complex cell media can be a chemically-defined media which typically (but not necessarily) include recombinant polypeptides, and ultra-pure inorganic and/or organic compounds. In some aspects, complex cell media can be a protein-free media which include for example MEM (minimal essential media) and RPMI-1640 (Roswell Park Memorial Institute). In some aspects, the complex cell media comprises IMDM (Iscove's Modified Dulbecco's Medium. In some aspects, the complex cell media comprises DMEM (Dulbecco's Modified Eagle's Medium). In some aspects, the cellular sample can be placed in a complex cell media prior to or during the step of conducting any of the nucleic acid methods described herein.

In any of the methods described herein, the cellular sample comprises a fixed cellular sample. In some aspects, the cellular sample can be treated with a fixation reagent (e.g., a fixing reagent) that preserves the cell and its contents to inhibit degradation and can inhibit cell lysis. For example, the fixation reagent can preserve RNA harbored by the cellular sample. In some aspects, the fixation reagent inhibits loss of nucleic acids from the cellular sample.

In some aspects, the fixation reagent can cross-link the RNA to prevent the RNA from escaping the cellular sample. In some aspects, a cross-linking fixation reagent comprises any combination of an aldehyde, formaldehyde, paraformaldehyde, formalin, glutaraldehyde, imidoesters, N-hydroxysuccinimide esters (NHS) and/or glyoxal (a bifunctional aldehyde).

In some aspects, the fixation reagent comprises at least one alcohol, including methanol or ethanol. In some aspects, the fixation reagent comprises at least one ketone, including acetone. In some aspects, the fixation reagent comprises acetic acid, glacial acetic acid and/or picric acid. In some aspects, the fixation reagent comprises mercuric chloride. In some aspects, the fixation reagent comprises a zinc salt comprising zinc sulphate or zinc chloride. In some aspects, the fixation reagent can denature polypeptides.

In some aspects, the fixation reagent comprises 4% w/v of paraformaldehyde to water/PBS. In some aspects, the fixation reagent comprises 10% of 35% formaldehyde at a neutral pH. In some aspects, the fixation reagent comprises 2% v/v of glutaraldehyde to water/PBS. In some aspects, the fixation reagent comprises 25% of 37% formaldehyde solution, 70% picric acid and 5% acetic acid.

In some aspects, the cellular sample can be fixed on the support with 4% paraformaldehyde for about 30-60 minutes and washed with PBS.

In some aspects, the cellular sample can be stained, de-stained or un-stained.

In any of the methods described herein, the cellular sample comprises a permeabilized cellular sample. In some aspects, the methods comprise treating the cellular sample with a permeabilization reagent that alters the cell membrane to permit penetration of experimental reagents into the cells. For example, the permeabilization reagent removes membrane lipids from the cell membrane. In some aspects, the cellular sample can be treated with a permeabilization reagent which comprises any combination of an organic solvent, detergent, chemical compound, cross-linking agent and/or enzyme. In some aspects, the organic solvents comprise acetone, ethanol, and methanol. In some aspects, the detergents comprise saponin, Triton X-100, Tween-20, sodium dodecyl sulfate (SDS), an N-lauroylsarcosine sodium salt solution, or a nonionic polyoxyethylene surfactant (e.g., NP40). In some aspects, the cross-linking agent comprises paraformaldehyde. In some aspects, the enzyme comprises trypsin, pepsin or protease (e.g. proteinase K). In some aspects, the cells can be permeabilized using an alkaline condition, or an acidic condition with a protease enzyme. In some aspects, the permeabilization reagent comprises water and/or PBS.

For example, the fixed cells can be permeabilized with 70% ethanol for about 30-60 minutes, and the permeabilizing reagent can be exchanged with PBS-T (e.g., PBS with 0.05% Tween-20). In some aspects, the cells can be post-fixed with 3% paraformaldehyde and 0.1% glutaraldehyde for about 30-60 minutes, and washed with PBS-T multiple times.

In any of the methods described herein, the cellular sample is infused with a swellable polyelectrolyte hydrogel (U.S. Pat. No. 10,309,879 and Chen 2015 Science 347:543, the contents of these documents are incorporated by reference in their entireties). In some aspects, a fixed and permeabilized cellular sample can be infused with sodium acrylate, acrylamide and a cross-linker N—N'-methylenebisacrylamide. In some aspects, ammonium persulfate (APS) initiator and tetramethylethylenediamine (TEMED) accelerator were infused to achieve polymerization. In some aspects, the cellular sample can be infused with proteinase K for proteolysis and incubated in a digestion buffer. In some aspects, the gel inside the cellular sample can be swelled by addition of water.

In any of the methods described herein, the plurality of RNAs inside cellular sample can be converted to cDNA. In some aspects, the methods comprise contacting the plurality of RNA inside the fixed and permeabilized cellular sample with (i) a plurality of reverse transcription primers, (ii) a plurality of reverse transcriptase enzymes, and (iii) a plurality of nucleotides, under a condition suitable for conducting a reverse transcription reaction to generate a plurality of cDNA molecules (e.g., a plurality of first strand cDNA molecules) in the cellular sample. In some aspects, synthesis of second strand cDNA molecules is omitted. In some aspects, the RNA inside the cellular sample is not converted into cDNA, where the RNA is hybridized to target-specific padlock probes.

In some aspects, the reverse transcriptase enzyme exhibits RNA-dependent DNA polymerase activity. In some aspects, the reverse transcriptase enzyme comprises a reverse transcriptase enzyme from AMV (avian myeloblastosis virus), M-MuLV (moloney murine leukemia virus), or HIV (human immunodeficiency virus). In some aspects, the reverse transcriptase enzyme comprises a recombinant enzyme that exhibits reduced RNase H activity, for example REVERTAID (e.g., from Thermo Fisher Scientific, catalog No. EP0441). In some aspects, the reverse transcriptase can be a commercially-available enzyme, including MULTISCRIBE (e.g., from Thermo Fisher Scientific, catalog #4311235), THERMOSCRIPT (e.g., from Thermo Fisher Scientific, catalog #12236-014), or ARRAYSCRIPT (e.g., from Ambion, catalog No. AM2048). In some aspects, the reverse transcriptase enzyme comprises SUPERSCRIPT II (e.g., catalog No. 18064014), SUPERSCRIPT III (e.g., catalog No. 18080044), or SUPERSCRIPT IV enzymes (e.g., catalog No. 18090010) (all SUPERSCRIPT enzymes from Invitrogen). In some aspects, the reverse transcription reaction can include an RNase inhibitor.

In some aspects, the reverse transcription primers comprise a single-stranded oligonucleotide comprising DNA, RNA, or chimeric DNA/RNA. In some aspects, the reverse transcription primers Any combination of adenine (A), thymine (T), guanine (G), cytosine (C), uracil (U) and/or inosine (I). In some aspects, the reverse transcription primers can be any length, for example 5-25 bases, or 25-50 bases, or 50-75 bases, or 75-100 bases in length or longer. The reverse transcription primers each comprise a 5' end and 3' end. In some aspects, the 3' end of the reverse transcription primers can include a 3' OH moiety which serves as a nucleotide polymerization initiation site in a polymerase-catalyzed primer extension reaction. In some aspects, the 3' end of the reverse transcription primers have a chain terminating moiety which blocks a polymerase-catalyzed primer extension reaction. The chain terminating moiety can be removed to convert the 3' sugar position to an extendible 3'OH.

In some aspects, the reverse transcription primers are modified to confer resistance to nuclease degradation (e.g., ribonuclease degradation). For example, the reverse transcription primers comprise at least one phosphorothioate diester bond at their 5' ends which can render the reverse transcription primers resistant to nuclease degradation. In some aspects, the reverse transcription primers comprise 2-5 or more consecutive phosphorothioate diester bonds at their 5' ends. In some aspects, the plurality of reverse transcription primers comprise at least one ribonucleotide and/or at least one 2'-O-methyl, 2'-O-methoxyethyl (MOE), 2' fluoro-base nucleotide. In some aspects, the reverse transcription primers comprise phosphorylated 3' ends. In some aspects, the reverse transcription primers comprise locked nucleic acid (LNA) bases. In some aspects, the reverse transcription primers comprise a phosphorylated 5' end (e.g., using a polynucleotide kinase).

In some aspects, the entire length of a reverse transcription primer can hybridize to a portion of an RNA molecule. In some aspects, individual reverse transcription primers comprise a 3' region having a sequence that hybridizes to a portion of an RNA molecule and a 5' region that carries a tail that does not hybridize to an RNA molecule. In some aspects, the 5' tail comprises a universal adaptor sequence including any one or any combination of two or more of a sample barcode sequence, an amplification primer binding site, a sequencing primer binding site, a compaction oligonucleotide binding site and/or a surface capture primer binding site. In some aspects, the 5' tail comprises a unique identification sequence (e.g., unique molecular index (UMI). In some aspects, the 5' tail comprises a restriction enzyme recognition sequence. In some aspects, individual reverse transcription primers comprise at least a portion of the 3' region having a homopolymer sequence, for example poly-A, poly-T, poly-C, poly-G or poly-U. In some aspects, the reverse transcription primers can hybridize to any portion of an RNA molecule, including the 5' or the 3' end of the RNA molecule, or an internal portion of the RNA molecule.

In some aspects, the plurality of reverse transcription primers comprises a first sub-population of target-specific reverse transcription primers that hybridize selectively to the first target RNA (e.g., targeted transcriptomics). In some aspects, the plurality of reverse transcription primers further comprise a second sub-population of target-specific reverse transcription primers that hybridize selectively to the second target RNA. In some aspects, the target-specific reverse transcription primers comprise a pre-determined sequence at the 3' region which hybridizes to a target RNA molecule. In some aspects, the pre-determined sequence portion of the reverse transcription primers can be 4-20 bases, or 20-40 bases, or 40-50 bases in length.

In some aspects, the first sub-population of target-specific reverse transcription primers can selectively hybridize to an RNA transcribed in the cellular sample by a housekeeping gene. In some aspects, selection of the housekeeping gene may be dependent upon the type of cellular sample to be used for the in situ methods described herein. Exemplary housekeeping genes include glyceraldehyde-3-phosphate dehydrogenase (GAPDH), beta-actins (ACTB), tubulins, PPIA (peptidyl-prolyl cis-trans isomerase), NME4 (NME/NM23 nucleoside diphosphate kinase 4), SMARCAL1 (SWI/SNF related matrix associated actin dependent regulator of chromatin, subfamily A like 1), and POMK (protein-O-mannose kinase). The skilled artisan can design the first sub-population of target-specific reverse transcription primers to hybridize to RNA transcripts from any of the numerous housekeeping genes.

In some aspects, the second sub-population of target-specific reverse transcription primers can selectively hybridize to an RNA transcribed from a gene that is expressed in the cellular sample being examined (e.g., a cell-specific or tissue-specific RNA).

In some aspects, the plurality of reverse transcription primers comprises a first sub-population of random-sequence reverse transcription primers that hybridize to the first target RNA (e.g., whole transcriptomics). In some aspects, the plurality of reverse transcription primers further comprises a second sub-population of random-sequence reverse transcription primers that hybridize to the second target RNA. In some aspects, the reverse transcription primers comprise a random and/or degenerate sequence at the 3' region which hybridizes to an RNA molecule. In some aspects, the random-sequence or the degenerate-sequence portion of the reverse transcription primers can be 4-20 bases, or 20-40 bases, or 40-50 bases in length.

Sequencing Polymerases

In any of the methods described herein, sequencing polymerases can be used for conducting sequencing reactions. In some aspects, the sequencing polymerase(s) is/are capable of binding and incorporating a complementary nucleotide opposite a nucleotide in a concatemer template molecule. In some aspects, the sequencing polymerase(s) is/are capable of binding a complementary nucleotide unit of a multivalent molecule opposite a nucleotide in a concatemer template molecule. In some aspects, the plurality of sequencing polymerases comprise recombinant mutant polymerases.

Examples of suitable polymerases for use in sequencing with nucleotides and/or multivalent molecules include but are not limited to: Klenow DNA polymerase; *Thermus aquaticus* DNA polymerase I (Taq polymerase); KlenTaq polymerase; Candidatus altiarchaeales archaeon; Candidatus Hadarchaeum Yellowstonense; Hadesarchaea archaeon; Euryarchaeota archaeon; Thermoplasmata archaeon; *Thermococcus* polymerases such as *Thermococcus litoralis*, bacteriophage T7 DNA polymerase; human alpha, delta and epsilon DNA polymerases; bacteriophage polymerases such as T4, RB69 and phi29 bacteriophage DNA polymerases; *Pyrococcus furiosus* DNA polymerase (Pfu polymerase); *Bacillus subtilis* DNA polymerase III; *E. coli* DNA polymerase III alpha and epsilon; 9 degree N polymerase; reverse transcriptases such as HIV type M or O reverse transcriptases; avian myeloblastosis virus reverse transcriptase; Moloney Murine Leukemia Virus (MMLV) reverse transcriptase; or telomerase. Further non-limiting examples of DNA polymerases include those from various Archaea genera, such as, Aeropyrum, Archaeglobus, Desulfurococcus, *Pyrobaculum, Pyrococcus*, Pyrolobus, Pyrodictium, *Staphylothermus, Stetteria, Sulfolobus, Thermococcus*, and Vulcanisaeta and the like or variants thereof, including such polymerases as are known in the art such as 9 degrees N, VENT, DEEP VENT, THERMINATOR, Pfu, KOD, Pfx, Tgo and RB69 polymerases.

Sequencing-by-Binding

In any of the methods described herein, the sequencing comprises conducting sequencing-by-binding (SBB) reactions inside the cellular sample, where the cDNA amplicons are the concatemer molecules. In some aspects, the sequencing-by-binding (SBB) procedure employs non-labeled chain-terminating nucleotides. In some aspects, a cycle of sequencing-by-binding (SBB) comprises the steps of (a) sequentially contacting a primed concatemer (e.g., a concatemer annealed to a plurality of sequencing primers) with at least two separate mixtures under ternary complex stabilizing conditions, wherein the at least two separate mixtures each include a polymerase and a nucleotide, whereby the sequentially contacting results in the primed concatemer being contacted, under the ternary complex stabilizing conditions, with nucleotide cognates for first, second and third base type base types in the template; (b) examining the at least two separate mixtures to determine whether a ternary complex formed; and (c) identifying the next correct nucleotide for the primed concatemer, wherein the next correct nucleotide is identified as a cognate of the first, second or third base type if ternary complex is detected in step (b), and wherein the next correct nucleotide is imputed to be a nucleotide cognate of a fourth base type based on the absence of a ternary complex in step (b); (d) adding a next correct nucleotide to the primer of the primed concatemer after step (b), thereby producing an extended primer; and (e) repeating steps (a) through (d) at least once on the primed concatemer that comprises the extended primer. Exemplary sequencing-by-binding methods are described in U.S. Pat. Nos. 10,246,744 and 10,731,141 (where the contents of both patents are hereby incorporated by reference in their entireties).

Nucleotides and Chain-Terminating Nucleotides

In any of the methods described herein, any of the sequencing methods described herein can employ at least one nucleotide. The nucleotides comprise a base, sugar and at least one phosphate group. In some aspects, at least one nucleotide in the plurality comprises an aromatic base, a five carbon sugar (e.g., ribose or deoxyribose), and one or more phosphate groups (e.g., 1-10 phosphate groups). The plurality of nucleotides can comprise at least one type of nucleotide selected from a group consisting of dATP, dGTP, dCTP, dTTP and dUTP. The plurality of nucleotides can comprise at a mixture of any combination of two or more types of nucleotides selected from a group consisting of dATP, dGTP, dCTP, dTTP and/or dUTP. In some aspects, at least one nucleotide in the plurality is not a nucleotide analog. In some aspects, at least one nucleotide in the plurality comprises a nucleotide analog.

In some aspects, in any of the methods for sequencing described herein, at least one nucleotide in the plurality of nucleotides comprise a chain of one, two or three phosphorus atoms where the chain is typically attached to the 5' carbon of the sugar moiety via an ester or phosphoramide linkage. In some aspects, at least one nucleotide in the plurality is an analog having a phosphorus chain in which the phosphorus atoms are linked together with intervening O, S, NH, methylene or ethylene. In some aspects, the phosphorus atoms in the chain include substituted side groups including O, S or BH3. In some aspects, the chain includes phosphate groups substituted with analogs including phosphoramidate, phosphorothioate, phosphordithioate, and O-methylphosphoroamidite groups.

In some aspects, in any of the methods for sequencing described herein, at least one nucleotide in the plurality of nucleotides comprises a terminator nucleotide analog having a chain terminating moiety (e.g., blocking moiety) at the sugar 2' position, at the sugar 3' position, or at the sugar 2' and 3' position. In some aspects, the chain terminating moiety can inhibit polymerase-catalyzed incorporation of a subsequent nucleotide unit or free nucleotide in a nascent strand during a primer extension reaction. In some aspects, the chain terminating moiety is attached to the 3' sugar hydroxyl position where the sugar comprises a ribose or deoxyribose sugar moiety. In some aspects, the chain terminating moiety is removable/cleavable from the 3' sugar hydroxyl position to generate a nucleotide having a 3'OH sugar group which is extendible with a subsequent nucleotide in a polymerase-catalyzed nucleotide incorporation reaction. In some aspects, the chain terminating moiety comprises an alkyl group, alkenyl group, alkynyl group, allyl group, aryl group, benzyl group, azide group, amine group, amide group, keto group, isocyanate group, phosphate group, thio group, disulfide group, carbonate group, urea group, or silyl group. In some aspects, the chain terminating moiety is cleavable/removable from the nucleotide, for example by reacting the chain terminating moiety with a chemical agent, pH change, light or heat. In some aspects, the chain terminating moieties alkyl, alkenyl, alkynyl and allyl are cleavable with tetrakis(triphenylphosphine) palladium(0) (Pd(PPh3)4) with piperidine, or with 2,3-Dichloro-5,6-dicyano-1,4-benzo-quinone (DDQ). In some aspects, the chain terminating moieties aryl and benzyl are cleavable with H2 Pd/C. In some aspects, the chain terminating moieties amine, amide, keto, isocyanate, phosphate, thio, disulfide are cleavable with phosphine or with a thiol group including beta-mercaptoethanol or dithiothritol (DTT). In some aspects, the chain terminating moiety carbonate is cleavable with potassium carbonate (K2CO3) in MeOH, with triethylamine in pyridine, or with Zn in acetic acid (AcOH). In some aspects, the chain terminating moieties urea and silyl are cleavable with tetrabutylammonium fluoride, pyridine-HF, with ammonium fluoride, or with triethylamine trihydrofluoride.

In some aspects, in any of the methods for sequencing described herein, at least one nucleotide in the plurality of nucleotides comprises a terminator nucleotide analog having a chain terminating moiety (e.g., blocking moiety) at the sugar 2' position, at the sugar 3' position, or at the sugar 2' and 3' position. In some aspects, the chain terminating moiety comprises an azide, azido or azidomethyl group. In some aspects, the chain terminating moiety comprises a 3'-O-azido or 3'-O-azidomethyl group. In some aspects, the chain terminating moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri (hydroxyproyl)phosphine (THPP). In some aspects, the cleaving agent comprises 4-dimethylaminopyridine (4-DMAP).

In some aspects, in any of the methods for sequencing described herein, the nucleotide comprises a chain terminating moiety which is selected from a group consisting of 3'-deoxy nucleotides, 2',3'-dideoxynucleotides, 3'-methyl, 3'-azido, 3'-azidomethyl, 3'-O-azidoalkyl, 3'-O-ethynyl, 3'-O-aminoalkyl, 3'-O-fluoroalkyl, 3'-fluoromethyl, 3'-difluoromethyl, 3'-trifluoromethyl, 3'-sulfonyl, 3'-malonyl, 3'-amino, 3'-O-amino, 3'-sulfhydral, 3'-aminomethyl, 3'-ethyl, 3'butyl, 3'-tert butyl, 3'-Fluorenylmethyloxycarbonyl, 3' tert-Butyloxycarbonyl, 3'-O-alkyl hydroxylamino group, 3'-phosphorothioate, and 3-O-benzyl, or derivatives thereof.

In some aspects, in any of the methods for sequencing described herein, the plurality of nucleotides comprises a plurality of nucleotides labeled with detectable reporter moiety. The detectable reporter moiety comprises a fluorophore. In some aspects, the fluorophore is attached to the nucleotide base. In some aspects, the fluorophore is attached to the nucleotide base with a linker which is cleavable/removable from the base. In some aspects, at least one of the nucleotides in the plurality is not labeled with a detectable reporter moiety. In some aspects, a particular detectable reporter moiety (e.g., fluorophore) that is attached to the nucleotide can correspond to the nucleotide base (e.g., dATP, dGTP, dCTP, dTTP or dUTP) to permit detection and identification of the nucleotide base.

In some aspects, in any of the methods for sequencing nucleic acid molecules described herein, the cleavable linker on the nucleotide base comprises a cleavable moiety comprising an alkyl group, alkenyl group, alkynyl group, allyl group, aryl group, benzyl group, azide group, amine group, amide group, keto group, isocyanate group, phosphate group, thio group, disulfide group, carbonate group, urea group, or silyl group. In some aspects, the cleavable linker on the base is cleavable/removable from the base by reacting the cleavable moiety with a chemical agent, pH change, light or heat. In some aspects, the cleavable moieties alkyl, alkenyl, alkynyl and allyl are cleavable with tetrakis(triphenylphosphine)palladium(0) (Pd(PPh3)4) with piperidine, or with 2,3-Dichloro-5,6-dicyano-1,4-benzo-quinone (DDQ). In some aspects, the cleavable moieties aryl and benzyl are cleavable with H2 Pd/C. In some aspects, the cleavable moieties amine, amide, keto, isocyanate, phosphate, thio, disulfide are cleavable with phosphine or with a thiol group including beta-mercaptoethanol or dithiothritol (DTT). In some aspects, the cleavable moiety carbonate is cleavable with potassium carbonate (K2CO3) in MeOH, with triethylamine in pyridine, or with Zn in acetic acid (AcOH). In some aspects, the cleavable moieties urea and silyl are cleavable with tetrabutylammonium fluoride, pyridine-HF, with ammonium fluoride, or with triethylamine trihydrofluoride.

In some aspects, in any of the methods for sequencing described herein, the cleavable linker on the nucleotide base comprises cleavable moiety including an azide, azido or azidomethyl group. In some aspects, the cleavable moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl)phosphine (THPP). In some aspects, the cleaving agent comprises 4-dimethylaminopyridine (4-DMAP).

In some aspects, in any of the methods for sequencing described herein, the chain terminating moiety (e.g., at the sugar 2' and/or sugar 3' position) and the cleavable linker on the nucleotide base have the same or different cleavable moieties. In some aspects, the chain terminating moiety (e.g., at the sugar 2' and/or sugar 3' position) and the detectable reporter moiety linked to the base are chemically cleavable/removable with the same chemical agent. In some aspects, the chain terminating moiety (e.g., at the sugar 2' and/or sugar 3' position) and the detectable reporter moiety linked to the base are chemically cleavable/removable with different chemical agents.

Multivalent Molecules

Figure 16:
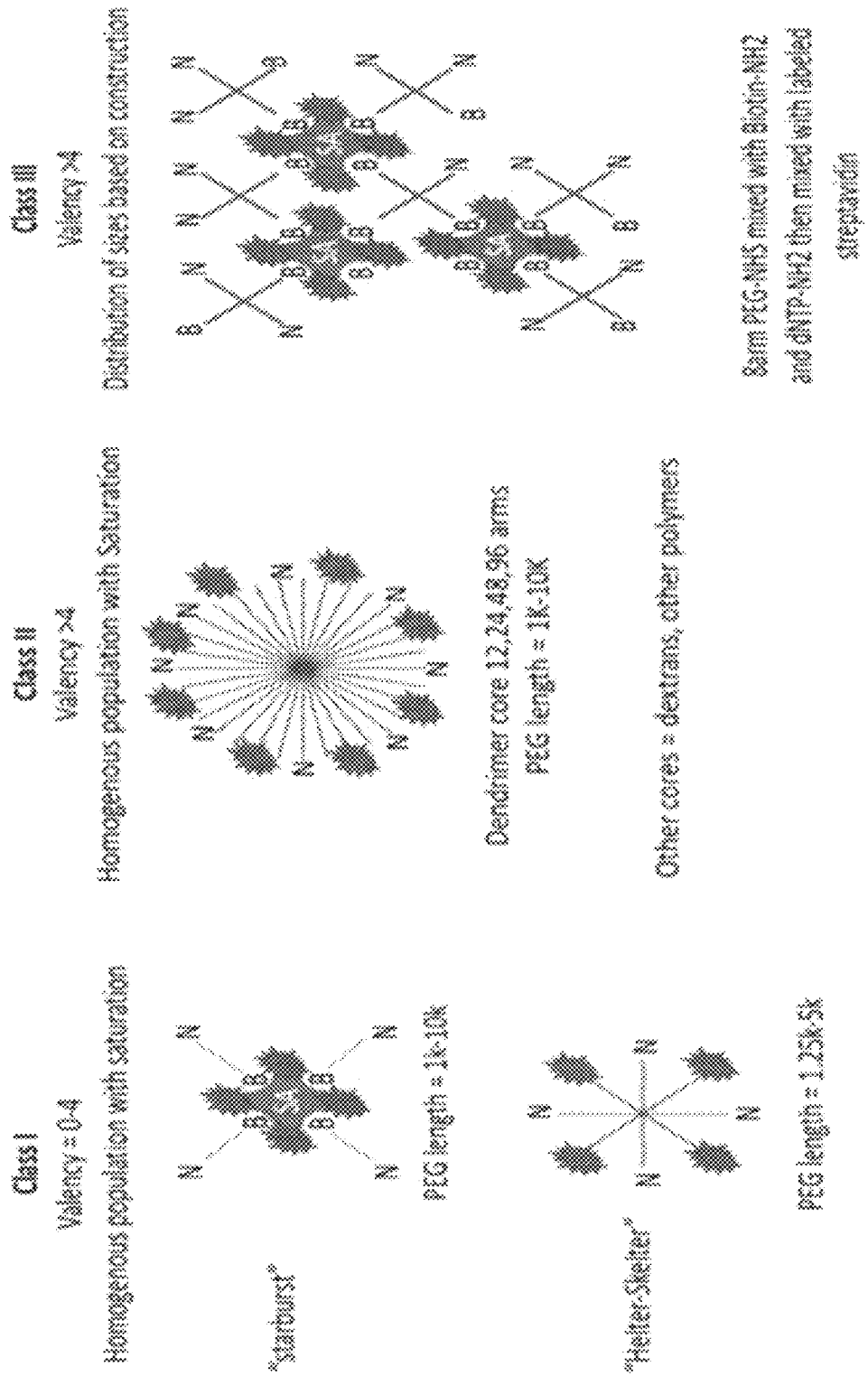
FIG. 16 is a schematic of various exemplary configurations of multivalent molecules.

In any of the methods described herein, the sequencing employs at least one multivalent molecule which comprises a plurality of nucleotide arms attached to a core and having any configuration including a starburst, helter skelter, or bottle brush configuration (e.g., FIG. 16). The multivalent molecule comprises: (1) a core; and (2) a plurality of nucleotide arms which comprise (i) a core attachment moiety, (ii) a spacer comprising a PEG moiety, (iii) a linker, and (iv) a nucleotide unit, wherein the core is attached to the plurality of nucleotide arms, wherein the spacer is attached to the linker, wherein the linker is attached to the nucleotide unit. In some aspects, the nucleotide unit comprises a base, sugar and at least one phosphate group, and the linker is attached to the nucleotide unit through the base. In some aspects, the linker comprises an aliphatic chain or an oligo ethylene glycol chain where both linker chains having 2-6 subunits. In some aspects, the linker also includes an aromatic moiety. An exemplary nucleotide arm is shown in FIG. 20. Exemplary multivalent molecules are shown in FIG. 16-20. An exemplary spacer is shown in FIG. 21 (top) and exemplary linkers are shown in FIGS. 21 (bottom) and FIG. 22. Exemplary nucleotides attached to a linker are shown in FIG. 23A-23D. An exemplary biotinylated nucleotide arm is shown in FIG. 24.

In some aspects, a multivalent molecule comprises a core attached to multiple nucleotide arms, and wherein the multiple nucleotide arms have the same type of nucleotide unit which is selected from a group consisting of dATP, dGTP, dCTP, dTTP and dUTP.

In some aspects, a multivalent molecule comprises a core attached to multiple nucleotide arms, where each arm includes a nucleotide unit. The nucleotide unit comprises an aromatic base, a five carbon sugar (e.g., ribose or deoxyribose), and one or more phosphate groups (e.g., 1-10 phosphate groups). The plurality of multivalent molecules can comprise one type multivalent molecule having one type of nucleotide unit selected from a group consisting of dATP, dGTP, dCTP, dTTP and dUTP. The plurality of multivalent molecules can comprise at a mixture of any combination of two or more types of multivalent molecules, where individual multivalent molecules in the mixture comprise nucleotide units selected from a group consisting of dATP, dGTP, dCTP, dTTP and/or dUTP.

In some aspects, the nucleotide unit comprises a chain of one, two or three phosphorus atoms where the chain is typically attached to the 5' carbon of the sugar moiety via an ester or phosphoramide linkage. In some aspects, at least one nucleotide unit is a nucleotide analog having a phosphorus chain in which the phosphorus atoms are linked together with intervening O, S, NH, methylene or ethylene. In some aspects, the phosphorus atoms in the chain include substituted side groups including O, S or BH3. In some aspects, the chain includes phosphate groups substituted with analogs including phosphoramidate, phosphorothioate, phosphordithioate, and O-methylphosphoroamidite groups.

In some aspects, the multivalent molecule comprises a core attached to multiple nucleotide arms, and wherein individual nucleotide arms comprise a nucleotide unit which is a nucleotide analog having a chain terminating moiety (e.g., blocking moiety) at the sugar 2' position, at the sugar 3' position, or at the sugar 2' and 3' position. In some aspects, the nucleotide unit comprises a chain terminating moiety (e.g., blocking moiety) at the sugar 2' position, at the sugar 3' position, or at the sugar 2' and 3' position. In some aspects, the chain terminating moiety can inhibit polymerase-catalyzed incorporation of a subsequent nucleotide unit or free nucleotide in a nascent strand during a primer extension reaction. In some aspects, the chain terminating moiety is attached to the 3' sugar hydroxyl position where the sugar comprises a ribose or deoxyribose sugar moiety. In some aspects, the chain terminating moiety is removable/cleavable from the 3' sugar hydroxyl position to generate a nucleotide having a 3'OH sugar group which is extendible with a subsequent nucleotide in a polymerase-catalyzed nucleotide incorporation reaction. In some aspects, the chain terminating moiety comprises an alkyl group, alkenyl group, alkynyl group, allyl group, aryl group, benzyl group, azide group, amine group, amide group, keto group, isocyanate group, phosphate group, thio group, disulfide group, carbonate group, urea group, or silyl group. In some aspects, the chain terminating moiety is cleavable/removable from the nucleotide unit, for example by reacting the chain terminating moiety with a chemical agent, pH change, light or heat. In some aspects, the chain terminating moieties alkyl, alkenyl, alkynyl and allyl are cleavable with tetrakis(triphenylphosphine)palladium(0) (Pd(PPh3)4) with piperidine, or with 2,3-Dichloro-5,6-dicyano-1,4-benzo-quinone (DDQ). In some aspects, the chain terminating moieties aryl and benzyl are cleavable with H2 Pd/C. In some aspects, the chain terminating moieties amine, amide, keto, isocyanate, phosphate, thio, disulfide are cleavable with phosphine or with a thiol group including beta-mercaptoethanol or dithiothritol (DTT). In some aspects, the chain terminating moiety carbonate is cleavable with potassium carbonate (K2CO3) in MeOH, with triethylamine in pyridine, or with Zn in acetic acid (AcOH). In some aspects, the chain terminating moieties urea and silyl are cleavable with tetrabutylammonium fluoride, pyridine-HF, with ammonium fluoride, or with triethylamine trihydrofluoride.

In some aspects, the nucleotide unit comprises a chain terminating moiety (e.g., blocking moiety) at the sugar 2' position, at the sugar 3' position, or at the sugar 2' and 3' position. In some aspects, the chain terminating moiety comprises an azide, azido or azidomethyl group. In some aspects, the chain terminating moiety comprises a 3'-O-azido or 3'-O-azidomethyl group. In some aspects, the chain terminating moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl) phosphine (THPP). In some aspects, the cleaving agent comprises 4-dimethylaminopyridine (4-DMAP).

In some aspects, the nucleotide unit comprising a chain terminating moiety which is selected from a group consisting of 3'-deoxy nucleotides, 2',3'-dideoxynucleotides, 3'-methyl, 3'-azido, 3'-azidomethyl, 3'-O-azidoalkyl, 3'-O-ethynyl, 3'-O-aminoalkyl, 3'-O-fluoroalkyl, 3'-fluoromethyl, 3'-difluoromethyl, 3'-trifluoromethyl, 3'-sulfonyl, 3'-malonyl, 3'-amino, 3'-O-amino, 3'-sulfhydral, 3'-aminomethyl, 3'-ethyl, 3'butyl, 3'-tert butyl, 3'-Fluorenylmethyloxycarbonyl, 3' tert-Butyloxycarbonyl, 3'-O-alkyl hydroxylamino group, 3'-phosphorothioate, and 3-O-benzyl, or derivatives thereof.

In some aspects, the multivalent molecule comprises a core attached to multiple nucleotide arms, wherein the nucleotide arms comprise a spacer, linker and nucleotide unit, and wherein the core, linker and/or nucleotide unit is labeled with detectable reporter moiety. In some aspects, the detectable reporter moiety comprises a fluorophore. In some aspects, a particular detectable reporter moiety (e.g., fluorophore) that is attached to the multivalent molecule can correspond to the base (e.g., dATP, dGTP, dCTP, dTTP or dUTP) of the nucleotide unit to permit detection and identification of the nucleotide base.

In some aspects, at least one nucleotide arm of a multivalent molecule has a nucleotide unit that is attached to a detectable reporter moiety. In some aspects, the detectable reporter moiety is attached to the nucleotide base. In some aspects, the detectable reporter moiety comprises a fluorophore. In some aspects, a particular detectable reporter moiety (e.g., fluorophore) that is attached to the multivalent molecule can correspond to the base (e.g., dATP, dGTP, dCTP, dTTP or dUTP) of the nucleotide unit to permit detection and identification of the nucleotide base.

In some aspects, the core of a multivalent molecule comprises an avidin-like or streptavidin-like moiety and the core attachment moiety comprises biotin. In some aspects, the core comprises a streptavidin-type or avidin-type moiety which includes an avidin protein, as well as any derivatives, analogs and other non-native forms of avidin that can bind to at least one biotin moiety. Other forms of avidin moieties include native and recombinant avidin and streptavidin as well as derivatized molecules, e.g. non-glycosylated avidin and truncated streptavidins. For example, avidin moiety includes de-glycosylated forms of avidin, bacterial streptavidin produced by *Streptomyces* (e.g., *Streptomyces avidinii*), as well as derivatized forms, for example, N-acyl avidins, e.g., N-acetyl, N-phthalyl and N-succinyl avidin, and the commercially-available products EXTRAVIDIN, CAPTAVIDIN, NEUTRAVIDIN and NEUTRALITE AVIDIN.

In some aspects, any of the methods for sequencing nucleic acid molecules described herein can include forming a binding complex, where the binding complex comprises (i) a polymerase, a nucleic acid concatemer molecule duplexed with a primer, and a nucleotide, or the binding complex comprises (ii) a polymerase, a nucleic acid concatemer molecule duplexed with a primer, and a nucleotide unit of a multivalent molecule. In some aspects, the binding complex has a persistence time of greater than about 0.1, 0.2, 0.3, 0.4, 0.5, 0.6, 0.7, 0.8, 0.9 or 1 second. The binding complex has a persistence time of greater than about 0.1-0.25 seconds, or about 0.25-0.5 seconds, or about 0.5-0.75 seconds, or about 0.75-1 second, or about 1-2 seconds, or about 2-3 seconds, or about 3-4 second, or about 4-5 seconds, and/or wherein the method is or may be carried out at a temperature of at or above 15° C., at or above 20° C., at or above 25° C., at or above 35° C., at or above 37° C., at or above 42° C. at or above 55° C. at or above 60° C., or at or above 72° C., or at or above 80° C., or within a range defined by any of the foregoing. The binding complex (e.g., ternary complex) remains stable until subjected to a condition that causes dissociation of interactions between any of the polymerase, template molecule, primer and/or the nucleotide unit or the nucleotide. For example, a dissociating condition comprises contacting the binding complex with any one or any combination of a detergent, EDTA and/or water. In some aspects, the present disclosure provides said method wherein the binding complex is deposited on, attached to, or hybridized to, a surface showing a contrast to noise ratio in the detecting step of greater than 20. In some aspects, the present disclosure provides said method wherein the contacting is performed under a condition that stabilizes the binding complex when the nucleotide or nucleotide unit is complementary to a next base of the template nucleic acid, and destabilizes the binding complex when the nucleotide or nucleotide unit is not complementary to the next base of the template nucleic acid.

In some aspects, in any of the sequencing methods that employ multivalent molecules, the binding of the plurality of first complexed polymerases with the plurality of multivalent molecules forms at least one avidity complex, the method comprising the steps: (a) binding a first nucleic acid primer, a first sequencing polymerase, and a first multivalent molecule to a first portion of a concatemer template molecule thereby forming a first binding complex, wherein a first nucleotide unit of the first multivalent molecule binds to the first sequencing polymerase; and (b) binding a second nucleic acid primer, a second sequencing polymerase, and the first multivalent molecule to a second portion of the same concatemer template molecule thereby forming a second binding complex, wherein a second nucleotide unit of the first multivalent molecule binds to the second sequencing polymerase, wherein the first and second binding complexes which include the same multivalent molecule forms an avidity complex. In some aspects, the first sequencing polymerase comprises any wild type or mutant polymerase described herein. In some aspects, the second sequencing polymerase comprises any wild type or mutant polymerase described herein. The concatemer template molecule comprises tandem repeat sequences of a sequence of interest and at least one universal sequencing primer binding site. The first and second nucleic acid primers can bind to a sequencing primer binding site along the concatemer template molecule. Exemplary multivalent molecules are shown in FIGS. 16-20.

In some aspects, in any of the sequencing methods that employ multivalent molecules, the method includes binding the plurality of first complexed polymerases with the plurality of multivalent molecules to form at least one avidity complex, the method comprising the steps: (a) contacting the plurality of sequencing polymerases and the plurality of nucleic acid primers with different portions of a concatemer nucleic acid concatemer molecule to form at least first and second complexed polymerases on the same concatemer template molecule; (b) contacting a plurality of multivalent molecules to the at least first and second complexed polymerases on the same concatemer template molecule, under conditions suitable to bind a single multivalent molecule from the plurality to the first and second complexed polymerases, wherein at least a first nucleotide unit of the single multivalent molecule is bound to the first complexed polymerase which includes a first primer hybridized to a first portion of the concatemer template molecule thereby forming a first binding complex (e.g., first ternary complex), and wherein at least a second nucleotide unit of the single multivalent molecule is bound to the second complexed polymerase which includes a second primer hybridized to a second portion of the concatemer template molecule thereby forming a second binding complex (e.g., second ternary complex), wherein the contacting is conducted under a condition suitable to inhibit polymerase-catalyzed incorporation of the bound first and second nucleotide units in the first and second binding complexes, and wherein the first and second binding complexes which are bound to the same multivalent molecule forms an avidity complex; and (c) detecting the first and second binding complexes on the same concatemer template molecule, and (d) identifying the first nucleotide unit in the first binding complex thereby determining the sequence of the first portion of the concatemer template molecule, and identifying the second nucleotide unit in the second binding complex thereby determining the sequence of the second portion of the concatemer template molecule. In some aspects, the plurality of sequencing polymerases comprise any wild type or mutant sequencing polymerase described herein. The concatemer template molecule comprises tandem repeat sequences of a sequence of interest and at least one universal sequencing primer binding site. The plurality of nucleic acid primers can bind to a sequencing primer binding site along the concatemer template molecule. Exemplary multivalent molecules are shown in FIGS. 16-20.

FIG. 16 is a schematic of various exemplary configurations of multivalent molecules. Left (Class I): schematics of multivalent molecules having a "starburst" or "helter-skelter" configuration. Center (Class II): a schematic of a multivalent molecule having a dendrimer configuration. Right (Class III): a schematic of multiple multivalent molecules formed by reacting streptavidin with 4-arm or 8-arm PEG-NHS with biotin and dNTPs. Nucleotide units are designated 'N', biotin is designated 'B', and streptavidin is designated 'SA'.

Figure 17:
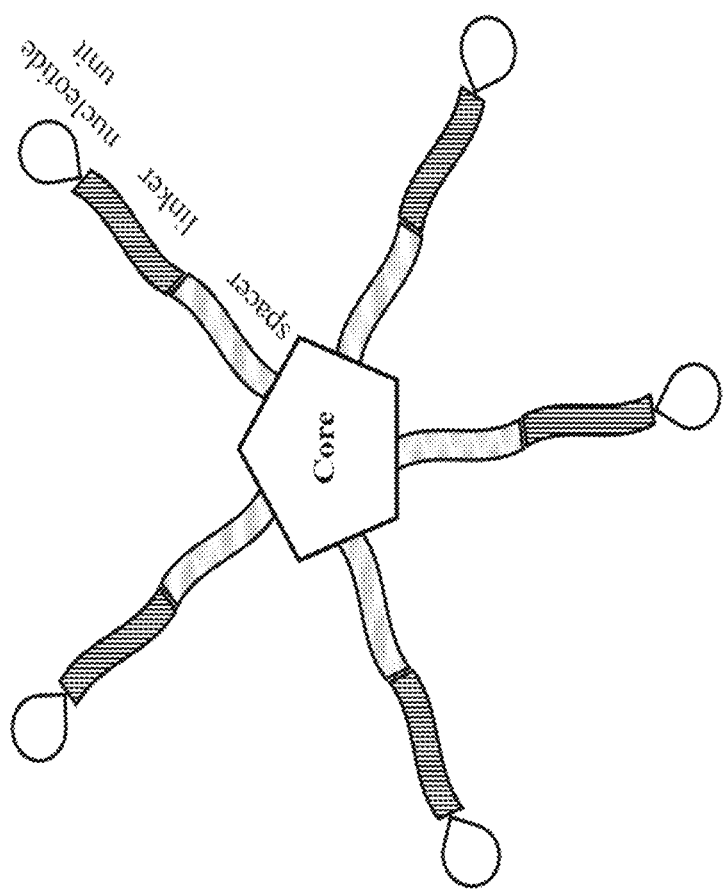
FIG. 17 is a schematic of an exemplary multivalent molecule comprising a generic core attached to a plurality of nucleotide-arms.

FIG. 17 is a schematic of an exemplary multivalent molecule comprising a generic core attached to a plurality of nucleotide-arms.

Figure 18:
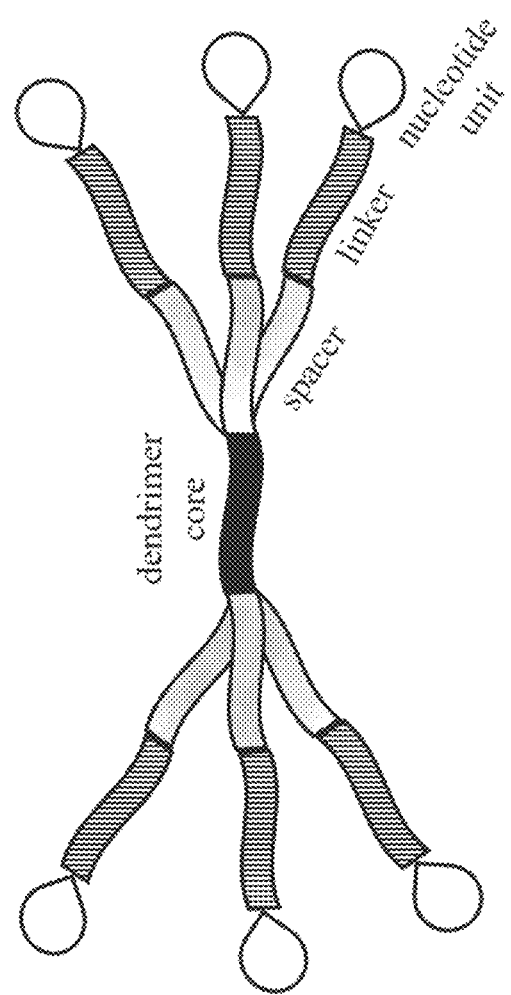
FIG. 18 is a schematic of an exemplary multivalent molecule comprising a dendrimer core attached to a plurality of nucleotide-arms.

FIG. 18 is a schematic of an exemplary multivalent molecule comprising a dendrimer core attached to a plurality of nucleotide-arms.

Figure 19:
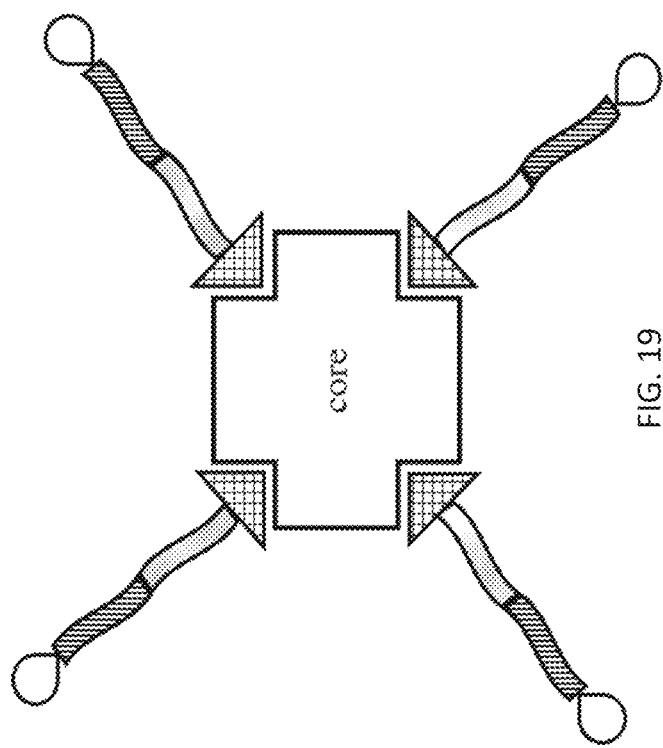
FIG. 19 shows a schematic of an exemplary multivalent molecule comprising a core attached to a plurality of nucleotide-arms, where the nucleotide arms comprise biotin, spacer, linker and a nucleotide unit.
Figure 20:
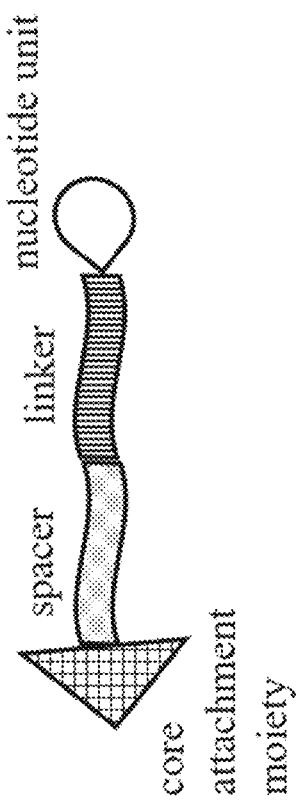
FIG. 20 is a schematic of an exemplary nucleotide-arm comprising a core attachment moiety, spacer, linker and nucleotide unit.

FIG. 19 shows a schematic of an exemplary multivalent molecule comprising a core attached to a plurality of nucleotide-arms, where the nucleotide arms comprise biotin, spacer, linker and a nucleotide unit.

FIG. 20 is a schematic of an exemplary nucleotide-arm comprising a core attachment moiety, spacer, linker and nucleotide unit.

FIG. 21 shows the chemical structure of an exemplary spacer (TOP), and the chemical structures of various exemplary linkers, including an 11-atom Linker, 16-atom Linker, 23-atom Linker and an N3 Linker (BOTTOM).

Figure 22:
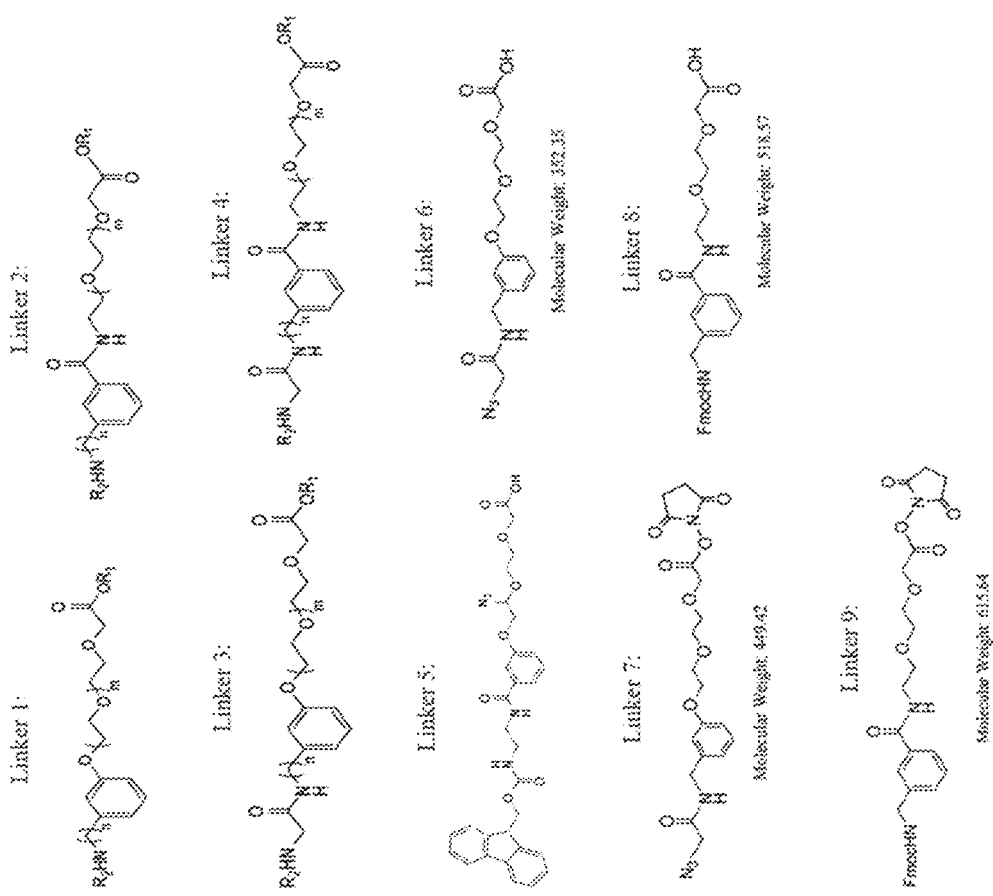
FIG. 22 shows the chemical structures of various exemplary linkers, including Linkers 1-9.

FIG. 22 shows the chemical structures of various exemplary linkers, including Linkers 1-9.

FIG. 23A shows the chemical structures of various exemplary linkers joined/attached to nucleotide units.

FIG. 23B shows the chemical structures of various exemplary linkers joined/attached to nucleotide units.

FIG. 23C shows the chemical structures of various exemplary linkers joined/attached to nucleotide units.

Figure 23D:
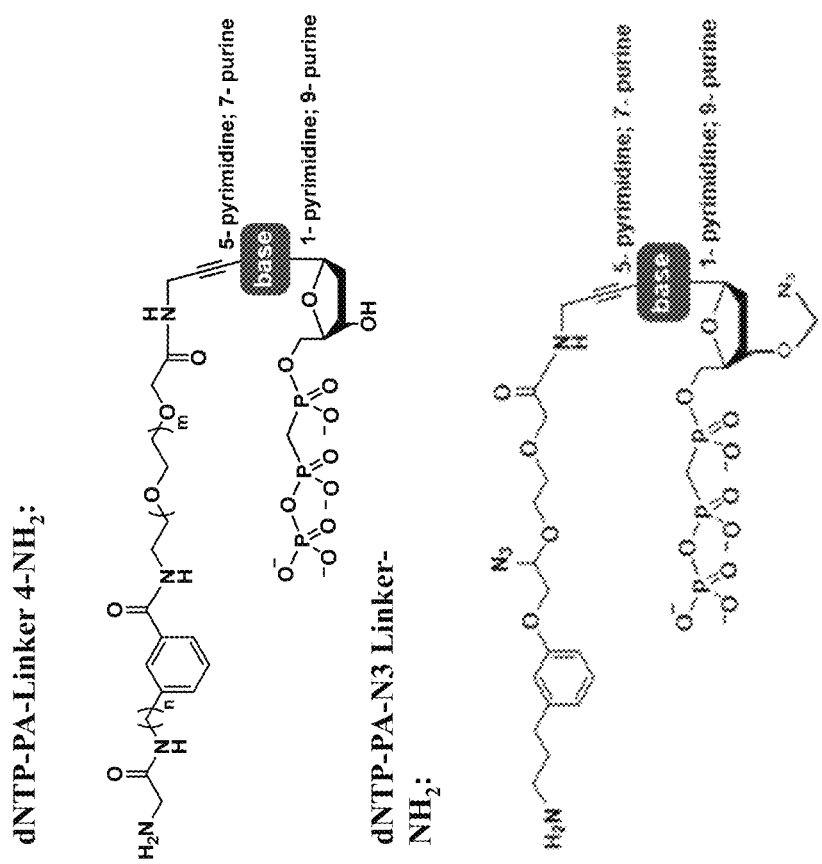
FIG. 23D shows the chemical structures of various exemplary linkers joined/attached to nucleotide units.
Figure 24:
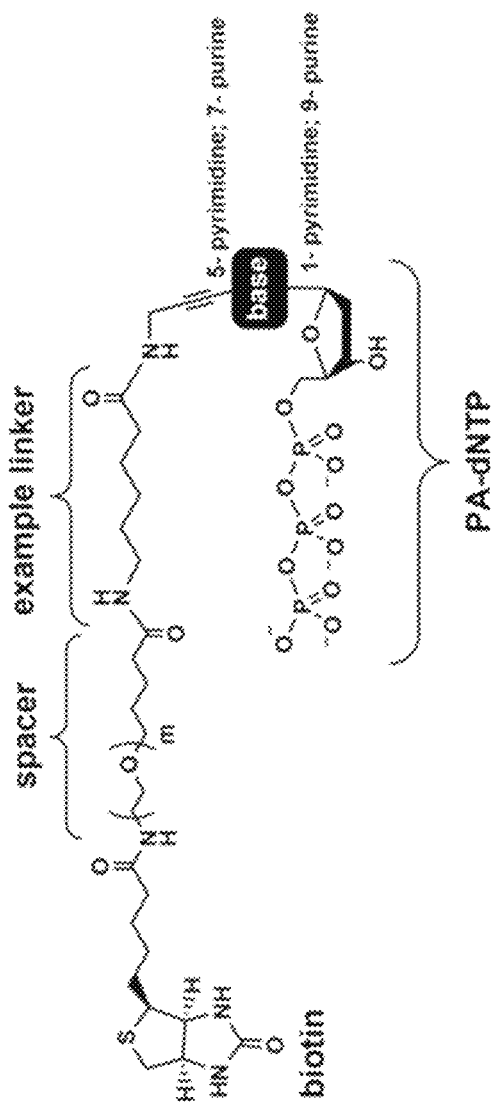
FIG. 24 shows the chemical structure of an exemplary biotinylated nucleotide-arm.

FIG. 23D shows the chemical structures of various exemplary linkers joined/attached to nucleotide units.

FIG. 24 shows the chemical structure of an exemplary biotinylated nucleotide-arm. In this example, the nucleotide unit is connected to the linker via a propargyl amine attachment at the 5 position of a pyrimidine base or the 7 position of a purine base.

FIG. 25 is a schematic of a guanine tetrad (e.g., G-tetrad).

FIG. 26 is a schematic of an exemplary intramolecular G-quadruplex structure.

Flowcells

In any of the methods described herein, the cellular sample can be deposited onto a solid support (e.g., a flowcell). In some aspects, the cellular sample is deposited onto a flowcell having walls (e.g., top or first wall, and bottom or second wall) and a gap in-between, where the gap can be filled with a fluid, where the flowcell is positioned in a fluorescence optical imaging system. The cellular sample has a thickness that may require using the imaging system to focus separately on the first and second surfaces of the flowcell, when using a traditional imaging system. For improved imaging of the sequencing reaction of the concatemers in the cellular sample, the flowcell can be positioned in a high performance fluorescence imaging system, which comprises two or more tube lenses which are designed to provide optimal imaging performance for the first and second surfaces of the flowcell at two or more fluorescence wavelengths. In some aspects, the high-performance imaging system further comprises a focusing mechanism configured to refocus the optical system between acquiring images of the first and second surfaces of the flowcell. In some aspects, the high performance imaging system is configured to image two or more fields-of-view on at least one of the first flowcell surface or the second flowcell surface.

Supports and Coatings

Figure 15:
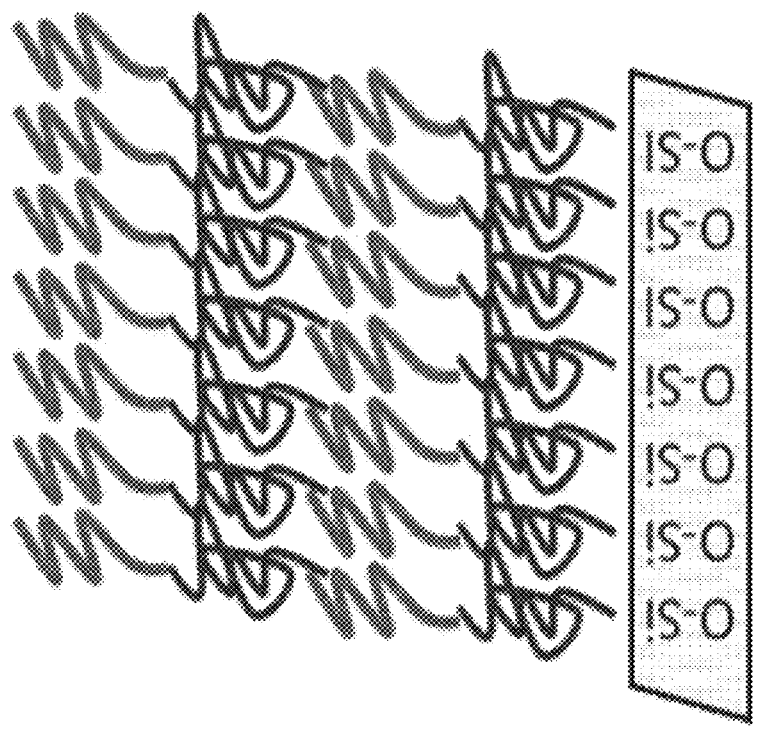
FIG. 15 is a schematic of an exemplary low binding support comprising a glass substrate and alternating layers of hydrophilic coatings which are covalently or non-covalently adhered to the glass, and which further comprises chemically-reactive functional groups that serve as attachment sites for oligonucleotide primers (e.g., capture oligonucleotides).

In any of the methods described herein, the solid support comprises a flowcell having a coating that promotes cell adhesion. In some aspects, the flowcell comprises a support which can be a planar or non-planar support. The support can be solid or semi-solid. In some aspects, the support can be porous, semi-porous or non-porous. The support can be made of any material such as glass, plastic or a polymer material. In some aspects, the surface of the support can be coated with one or more compounds to produce a passivated layer on the support (FIG. 15). In some aspects, the passivated layer forms a porous or semi-porous layer. In some aspects, the support is coated with a lysine compound, poly-lysine compound, arginine compound or an amino-terminated compound. The support can be coated with an unbranched compound, a branched compound, or a mixture of unbranched and branched compounds. In some aspects, the support is coated with surface primers for capturing nucleic acids from the cellular sample. Alternatively, the support lacks surface primers.

FIG. 15 is a schematic of an exemplary low binding support comprising a glass substrate and alternating layers of hydrophilic coatings which are covalently or non-covalently adhered to the glass, and which further comprises chemically-reactive functional groups that serve as attachment sites for oligonucleotide primers (e.g., capture oligonucleotides). In an alternative aspect, the support can be made of any material such as glass, plastic or a polymer material.

The support can comprise one or more substrates. The support can include a glass or plastic substrate. The support can include a transparent top substrate that is closest to the objective lens of the optical system. The support can include one or more microfluidic channels and the concatemer molecules and the cellular sample are immobilized to a surface of the microfluidic channels. In some aspects, the support is comprised in a flow cell device.

The imager 116 in FIG. 1 can include one or more optical systems. Further disclosed herein are optical system design guidelines and high-performance fluorescence imaging methods and systems that provide improved optical resolution and image quality for fluorescence imaging-based genomics applications. The disclosed optical imaging system designs provide for larger fields-of-view, increased spatial resolution, improved modulation transfer, contrast-to-noise ratio, and image quality, higher spatial sampling frequency, faster transitions between image capture when repositioning the sample plane to capture a series of images (e.g., of different fields-of-view), and improved imaging system duty cycle, and thus enable higher throughput image acquisition and analysis.

In some instances, improvements in imaging performance, e.g., for dual-side (flow cell) imaging applications, may be achieved by using an electro-optical phase plate in combination with an objective lens to compensate for the optical aberrations induced by the layer of fluid separating the upper (near) and lower (far) interior surfaces of a flow cell. In some instances, this design approach may also compensate for vibrations introduced by, e.g., a motion-actuated compensator that is moved in or out of the optical path depending on which surface of the flow cell is being images.

In some instances, improvements in imaging performance, e.g., for dual-side (flow cell) imaging applications comprising the use of thick flow cell walls (e.g., wall (or coverslip) thickness>700 µm) and fluid channels (e.g., fluid channel height or thickness of 50-200 µm) may be achieved even when using commercially-available, off-the-shelf objectives by using a tube lens design that corrects for the optical aberrations induced by the thick flow cell walls and/or intervening fluid layer in combination with the objective.

In some instances, improvements in imaging performance, e.g., for multichannel (e.g., two-color or four-color) imaging applications, may be achieved by using multiple tube lenses, one for each imaging channel, where each tube lens design has been optimized for the specific wavelength range used in that imaging channel.

Exemplary aspects disclosed herein may comprise fluorescence imaging systems, said systems comprising: a) at least one light source configured to provide excitation light within one or more specified wavelength ranges; b) an objective lens configured to collect fluorescence arising from within a specified field-of-view of a sample plane upon exposure of the sample plane to the excitation light, wherein a numerical aperture of the objective lens is at least 0.1, at least 0.2, at least 0.3, at least 0.4, at least 0.5, at least 0.6, at least 0.7, at least 0.8, or at least 0.9 or a numerical aperture value falling within a range defined by any two of the foregoing; wherein a working distance of the objective lens is at least 400 m, at least 500 m, at least 600 m, at least 700 m, at least 800 m, at least 900 m, at least 1000 m, or a working distance falling within a range defined by any two of the foregoing; and wherein the field-of-view has an area of at least 0.1 mm2, at least 0.2 mm2, at least 0.5 mm2, at least 0.7 mm2, at least 1 mm2, at least 2 mm2, at least 3 mm2, at least 5 mm2, or at least 10 mm2, or a field of view falling within a range defined by any two of the foregoing; and c) at least one image sensor, wherein the fluorescence collected by the objective lens is imaged onto the image sensor, and wherein a pixel dimension for the image sensor is chosen such that a spatial sampling frequency for the fluorescence imaging system is at least twice an optical resolution of the fluorescence imaging system.

In some aspects, the numerical aperture may be at least 0.75. In some aspects, the numerical aperture is at least 1.0. In some aspects, the working distance is at least 850 m. In some aspects, the working distance is at least 1,000 am. In some aspects, the field-of-view may have an area of at least 2.5 mm2. In some aspects, the field-of-view may have an area of at least 3 mm2. In some aspects, the spatial sampling frequency may be at least 2.5 times the optical resolution of the fluorescence imaging system. In some aspects, the spatial sampling frequency may be at least 3 times the optical resolution of the fluorescence imaging system. In some aspects, the system may further comprise an X-Y-Z translation stage such that the system is configured to acquire a series of two or more fluorescence images in an automated fashion, wherein each image of the series is or can be acquired for a different field-of-view. In some aspects, a position of the sample plane may be simultaneously adjusted in an X direction, a Y direction, and a Z direction to match the position of an objective lens focal plane in between acquiring images for different fields-of-view. In some aspects, the time required for the simultaneous adjustments in the X direction, Y direction, and Z direction may be less than 0.3 seconds, less than 0.4 seconds, less than 0.5 seconds, less than 0.7 seconds, or less than 1 second, or a time falling within a range defined by any two of the foregoing. In some aspects, the system further comprises an autofocus mechanism configured to adjust the focal plane position prior to acquiring an image of a different field-of-view if an error signal indicates that a difference in the position of the focal plane and the sample plane in the Z direction is greater than a specified error threshold. In some aspects, the specified error threshold is 100 nm or greater. In some aspects, the specified error threshold is 50 nm or less. In some aspects, the system comprises three or more image sensors, and wherein the system is configured to image fluorescence in each of three or more wavelength ranges onto a different image sensor. In some aspects, a difference in the position of a focal plane for each of the three or more image sensors and the sample plane is less than 100 nm. In some aspects, a difference in the position of a focal plane for each of the three or more image sensors and the sample plane is less than 50 nm. In some aspects, the total time required to reposition the sample plane, adjust focus if necessary, and acquire an image is less than 0.4 seconds per field-of-view. In some aspects, the total time required to reposition the sample plane, adjust focus if necessary, and acquire an image is less than 0.3 seconds per field-of-view.

Also discloser herein are fluorescence imaging systems for dual-side imaging of a flow cell comprising: a) an objective lens configured to collect fluorescence arising from within a specified field-of-view of a sample plane within the flow cell; b) at least one tube lens positioned between the objective lens and at least one image sensor, wherein the at least one tube lens is configured to correct an imaging performance metric for a combination of the objective lens, the at least one tube lens, and the at least one image sensor when imaging an interior surface of the flow cell, and wherein the flow cell has a wall thickness of at least 700 μm and a gap between an upper interior surface and a lower interior surface of at least 50 μm; wherein the imaging performance metric is substantially the same for imaging the upper interior surface or the lower interior surface of the flow cell without moving an optical compensator into or out of an optical path between the flow cell and the at least one image sensor, without moving one or more optical elements of the tube lens along the optical path, and without moving one or more optical elements of the tube lens into or out of the optical path.

In some aspects, the objective lens may be a commercially-available microscope objective. In some aspects, the commercially-available microscope objective may have a numerical aperture of at least 0.3. In some aspects, the objective lens may have a working distance of at least 700 μm. In some aspects, the objective lens may be corrected to compensate for a cover slip thickness (or flow cell wall thickness) of 0.17 mm or of greater or lesser thickness than 0.17 mm. In some aspects, the optical system may be corrected to compensate for cover slip thickness, flow cell thickness, or distance between desired focal planes. In some aspects, said correction may be made by inserting a corrective optic, such as a lens or optical assembly into the light path of the optical system. In some aspects, said correction may be made without inserting a corrective optic, such as a lens or optical assembly into the light path of the optical system. In some aspects, the fluorescence imaging system may further comprise an electro-optical phase plate positioned adjacent to the objective lens and between the objective lens and the tube lens, wherein the electro-optical phase plate may provide correction for optical aberrations caused by a fluid filling the gap between the upper interior surface and the lower interior surface of the flow cell. In some aspects, the at least one tube lens may be a compound lens comprising three or more optical components. In some aspects, the at least one tube lens is a compound lens comprising four optical components, which may comprise one or more of a first asymmetric convex-convex lens, a second convex-plano lens, a third asymmetric concave-concave lens, and a fourth asymmetric convex-concave lens which may be present in the order as listed above, or in any alternate order. In some aspects, the at least one tube lens is configured to correct an imaging performance metric for a combination of the objective lens, the at least one tube lens, and the at least one image sensor when imaging an interior surface of a flow cell having a wall thickness of at least 1 mm. In some aspects, the at least one tube lens is configured to correct an imaging performance metric for a combination of the objective lens, the at least one tube lens, and the at least one image sensor when imaging an interior surface of a flow cell having a gap of at least 100 μm. In some aspects, the at least one tube lens is configured to correct an imaging performance metric for a combination of the objective lens, the at least one tube lens, and the at least one image sensor when imaging an interior surface of a flow cell having a gap of at least 200 μm. In some aspects, the system comprises a single objective lens, two tube lenses, and two image sensors, and each of the two tube lenses is designed to provide optimal imaging performance at a different fluorescence wavelength. In some aspects, the system comprises a single objective lens, three tube lenses, and three image sensors, and each of the three tube lenses is designed to provide optimal imaging performance at a different fluorescence wavelength. In some aspects, the system comprises a single objective lens, four tube lenses, and four image sensors, and each of the four tube lenses is designed to provide optimal imaging performance at a different fluorescence wavelength. In some aspects, the design of the objective lens or the at least one tube lens is configured to optimize the modulation transfer function in the mid to high spatial frequency range. In some aspects, the imaging performance metric comprises a measurement of modulation transfer function (MTF) at one or more specified spatial frequencies, defocus, spherical aberration, chromatic aberration, coma, astigmatism, field curvature, image distortion, contrast-to-noise ratio (CNR), or any combination thereof. In some aspects, the difference in the imaging performance metric for imaging the upper interior surface and the lower interior surface of the flow cell is less than 10%. In some aspects, the difference in imaging performance metric for imaging the upper interior surface and the lower interior surface of the flow cell is less than 5%. In some aspects, the use of the at least one tube lens provides for an at least equivalent or better improvement in the imaging performance metric for dual-side imaging compared to that for a conventional system comprising an objective lens, a motion-actuated compensator, and an image sensor. In some aspects, the use of the at least one tube lens provides for an at least 10% improvement in the imaging performance metric for dual-side imaging compared to that for a conventional system comprising an objective lens, a motion-actuated compensator, and an image sensor.

Disclosed herein are illumination systems for use in imaging-based solid-phase genotyping and sequencing applications, the illumination system comprising: a) a light source; and b) a liquid light-guide configured to collect light emitted by the light source and deliver it to a specified field-of-illumination on a support surface comprising tethered biological macromolecules.

In some aspects, the illumination system further comprises a condenser lens. In some aspects, the specified field-of-illumination has an area of at least 2 mm2. In some aspects, the light delivered to the specified field-of-illumination is of uniform intensity across a specified field-of-view for an imaging system used to acquire images of the support surface. In some aspects, the specified field-of-view has an area of at least 2 mm2. In some aspects, the light delivered to the specified field-of-illumination is of uniform intensity across the specified field-of-view when a coefficient of variation (CV) for light intensity is less than 10%. In some aspects, the light delivered to the specified field-of-illumination is of uniform intensity across the specified field-of-view when a coefficient of variation (CV) for light intensity is less than 5%. In some aspects, the light delivered to the specified field-of-illumination has a speckle contrast value of less than 0.1. In some aspects, the light delivered to the specified field-of-illumination has a speckle contrast value of less than 0.05.

Imaging modules and systems: It will be understood by those of skill in the art that the disclosed optical systems, imaging systems, or modules may, in some instances, be stand-alone optical systems designed for imaging a sample or substrate surface. In some instances, they may comprise one or more processors or computers. In some instances, they may comprise one or more software packages that provide instrument control functionality and/or image processing functionality. In some instances, in addition to optical components such as light sources (e.g., solid-state lasers, dye lasers, diode lasers, arc lamps, tungsten-halogen lamps, etc.), lenses, prisms, mirrors, dichroic reflectors, optical filters, optical bandpass filters, apertures, and image sensors (e.g., complementary metal oxide semiconductor (CMOS) image sensors and cameras, charge-coupled device (CCD) image sensors and cameras, etc.), they may also include mechanical and/or optomechanical components, such as an X-Y translation stage, an X-Y-Z translation stage, a piezoelectic focusing mechanism, and the like. In some instances, they may function as modules, components, sub-assemblies, or sub-systems of larger systems designed for genomics applications (e.g., genetic testing and/or nucleic acid sequencing applications). For example, in some instances, they may function as modules, components, sub-assemblies, or sub-systems of larger systems that further comprise light-tight and/or other environmental control housings, temperature control modules, fluidics control modules, fluid dispensing robotics, pick-and-place robotics, one or more processors or computers, one or more local and/or cloud-based software packages (e.g., instrument/ system control software packages, image processing software packages, data analysis software packages), data storage modules, data communication modules (e.g., Bluetooth, WiFi, intranet, or internet communication hardware and associated software), display modules, or any combination thereof.

Methods for Sequencing

Some aspects of the present disclosure provide methods for sequencing immobilized or non-immobilized template molecules. The methods can be operated in system 100, for example, in sequencer 114. In some aspects, the immobilized template molecules comprise a plurality of nucleic acid template molecules having one copy of a target sequence of interest. In some aspects, nucleic acid template molecules having one copy of a target sequence of interest can be generated by conducting bridge amplification using linear library molecules. In some aspects, the immobilized template molecules comprise a plurality of nucleic acid template molecules each having two or more tandem copies of a target sequence of interest (e.g., concatemers). In some aspects, nucleic acid template molecules comprising concatemer molecules can be generated by conducting rolling circle amplification of circularized linear library molecules. In some aspects, the non-immobilized template molecules comprise circular molecules. In some aspects, methods for sequencing employ soluble (e.g., non-immobilized) sequencing polymerases or sequencing polymerases that are immobilized to a support.

In some aspects, the sequencing reactions employ detectably labeled nucleotide analogs. In some aspects, the sequencing reactions employ a two-stage sequencing reaction comprising binding detectably labeled multivalent molecules, and incorporating nucleotide analogs. In some aspects, the sequencing reactions employ non-labeled nucleotide analogs. In some aspects, the sequencing reactions employ phosphate chain labeled nucleotides.

In some aspects, the immobilized concatemers each comprise tandem repeat units of the sequence-of-interest (e.g., insert region) and any adaptor sequences. For example, the tandem repeat unit comprises: (i) a left universal adaptor sequence having a binding sequence for a first surface primer (720) (e.g., surface pinning primer), (ii) a left universal adaptor sequence having a binding sequence for a first sequencing primer (740) (e.g., forward sequencing primer), (iii) a sequence-of-interest (710), (iv) a right universal adaptor sequence having a binding sequence for a second sequencing primer (750) (e.g., reverse sequencing primer), (v) a right universal adaptor sequence having a binding sequence for a second surface primer (730) (e.g., surface capture primer), and (vii) a left sample index sequence (760) and/or a right sample index sequence (770). In some aspects, the tandem repeat unit further comprises a left unique identification sequence (780) and/or a right unique identification sequence (790). In some aspects, the tandem repeat unit further comprises at least one binding sequence for a compaction oligonucleotide. In some aspects, FIGS. 6 and 7 show linear library molecules or a unit of a concatemer molecule.

The immobilized concatemer can self-collapse into a compact nucleic acid nanoball. Inclusion of one or more compaction oligonucleotides during the RCA reaction can further compact the size and/or shape of the nanoball. An increase in the number of tandem repeat units in a given concatemer increases the number of sites along the concatemer for hybridizing to multiple sequencing primers (e.g., sequencing primers having a universal sequence) which serve as multiple initiation sites for polymerase-catalyzed sequencing reactions. When the sequencing reaction employs detectably labeled nucleotides and/or detectably labeled multivalent molecules (e.g., having nucleotide units), the signals emitted by the nucleotides or nucleotide units that participate in the parallel sequencing reactions along the concatemer yields an increased signal intensity for each concatemer. Multiple portions of a given concatemer can be simultaneously sequenced. Furthermore, a plurality of binding complexes can form along a particular concatemer molecule, each binding complex comprising a sequencing polymerase bound to a template/primer duplex and bound to a multivalent molecule, wherein the plurality of binding complexes remain stable without dissociation resulting in increased persistence time which increases signal intensity and reduces imaging time.

Methods for Sequencing using Nucleotide Analogs

Some aspects of the present disclosure provide methods for sequencing any of the immobilized template molecules described herein, the methods comprising step (a): contacting a sequencing polymerase to (i) a nucleic acid template molecule and (ii) a nucleic acid sequencing primer, wherein the contacting is conducted under a condition suitable to bind the sequencing polymerase to the nucleic acid template molecule which is hybridized to the nucleic acid primer, wherein the nucleic acid template molecule hybridized to the nucleic acid primer forms the nucleic acid duplex. In some aspects, the sequencing polymerase comprises a recombinant mutant sequencing polymerase that can bind and incorporate nucleotide analogs.

In some aspects, in the methods for sequencing template molecules, the sequencing primer comprises a 3' extendible end or a 3' non-extendible end. In some aspects, the plurality of nucleic acid template molecules comprise amplified template molecules (e.g., clonally amplified template molecules). In some aspects, the plurality of nucleic acid template molecules comprise one copy of a target sequence of interest. In some aspects, the plurality of nucleic acid molecules comprise two or more tandem copies of a target sequence of interest (e.g., concatemers). In some aspects, the plurality of nucleic acid template molecules comprise the same target sequence of interest or different target sequences of interest. In some aspects, the plurality of nucleic acid primers are in solution or are immobilized to a support. In some aspects, when the plurality of nucleic acid template molecules and/or the plurality of nucleic acid primers are immobilized to a support, the binding with the first sequencing polymerase generates a plurality of immobilized first complexed polymerases. In some aspects, the plurality of nucleic acid template molecules and/or nucleic acid primers are immobilized to 102-1015 different sites on a support. In some aspects, the binding of the plurality of template molecules and nucleic acid primers with the plurality of first sequencing polymerases generates a plurality of first complexed polymerases immobilized to 102-1015 different sites on the support. In some aspects, the plurality of immobilized first complexed polymerases on the support are immobilized to pre-determined or to random sites on the support. In some aspects, the plurality of immobilized first complexed polymerases are in fluid communication with each other to permit flowing a solution of reagents (e.g., enzymes including sequencing polymerases, multivalent molecules, nucleotides, and/or divalent cations) onto the support so that the plurality of immobilized complexed polymerases on the support are reacted with the solution of reagents in a massively parallel manner.

In some aspects, the methods for sequencing further comprise step (b): contacting the sequencing polymerase with a plurality of nucleotides under a condition suitable for binding at least one nucleotide to the sequencing polymerase which is bound to the nucleic acid duplex and suitable for polymerase-catalyzed nucleotide incorporation which extends the sequencing primer by one nucleotide. In some aspects, the sequencing polymerase is contacted with the plurality of nucleotides in the presence of at least one catalytic cation comprising magnesium and/or manganese. In some aspects, the plurality of nucleotides comprises at least one nucleotide analog having a chain terminating moiety at the sugar 2' or 3' position. In some aspects, the chain terminating moiety is removable from the sugar 2' or 3' position to convert the chain terminating moiety to an OH or H group. In some aspects, the plurality of nucleotides comprises at least one nucleotide that lacks a chain terminating moiety. In some aspects, at least on nucleotide is labeled with a detectable reporter moiety (e.g., fluorophore) that emits a detectable signal. The detectable reporter moiety comprises a fluorophore. In some aspects, the fluorophore is attached to the nucleo-base. In some aspects, the fluorophore is attached to the nucleo-base with a linker which is cleavable/removable from the base. In some aspects, at least one of the nucleotides in the plurality is not labeled with a detectable reporter moiety. In some aspects, a particular detectable reporter moiety (e.g., fluorophore) that is attached to the nucleotide can correspond to the nucleotide base (e.g., dATP, dGTP, dCTP, dTTP or dUTP) to permit detection and identification of the nucleo-base. When the incorporated chain terminating nucleotide is detectably labeled, step (b) further comprises detecting the emitted signal from the incorporated chain terminating nucleotide. In some aspects, step (b) further comprises identifying the nucleo-based of the incorporated chain terminating nucleotide.

In some aspects, the methods for sequencing further comprise step (c): removing the chain terminating moiety from the incorporated chain terminating nucleotide to generate an extendible 3'OH group. In some aspects, step (c) further comprises removing the detectable label from the incorporated chain terminating nucleotide. In some aspects, the sequencing polymerase remains bound to the template molecule which is hybridized to the sequencing primer which is extended by one nucleo-base.

In some aspects, the methods for sequencing further comprise step (d): repeating steps (b) and (c) at least once.

Two-Stage Methods for Nucleic Acid Sequencing

Some aspects of the present disclosure provide a two-stage method for sequencing any of the immobilized template molecules described herein. In some aspects, the first stage generally comprises binding multivalent molecules to complexed polymerases to form multivalent-complexed polymerases, and detecting the multivalent-complexed polymerases.

In some aspects, the first stage comprises step (a): contacting a plurality of a first sequencing polymerase to (i) a plurality of nucleic acid template molecules and (ii) a plurality of nucleic acid sequencing primers, wherein the contacting is conducted under a condition suitable to bind the plurality of first sequencing polymerases to the plurality of nucleic acid template molecules and the plurality of nucleic acid primers thereby forming a plurality of first complexed polymerases each comprising a first sequencing polymerase bound to a nucleic acid duplex wherein the nucleic acid duplex comprises a nucleic acid template molecule hybridized to a nucleic acid primer. In some aspects, the first polymerase comprises a recombinant mutant sequencing polymerase.

In some aspects, in the methods for sequencing template molecules, the sequencing primer comprises an oligonucleotide having a 3' extendible end or a 3' non-extendible end. In some aspects, the plurality of nucleic acid template molecules comprise amplified template molecules (e.g., clonally amplified template molecules). In some aspects, the plurality of nucleic acid template molecules comprise one copy of a target sequence of interest. In some aspects, the plurality of nucleic acid molecules comprise two or more tandem copies of a target sequence of interest (e.g., concatemers). In some aspects, the nucleic acid template molecules in the plurality of nucleic acid template molecules comprise the same target sequence of interest or different target sequences of interest. In some aspects, the plurality of nucleic acid template molecules and/or the plurality of nucleic acid primers are in solution or are immobilized to a support. In some aspects, when the plurality of nucleic acid template molecules and/or the plurality of nucleic acid primers are immobilized to a support, the binding with the first sequencing polymerase generates a plurality of immobilized first complexed polymerases. In some aspects, the plurality of nucleic acid template molecules and/or nucleic acid primers are immobilized to 102-1015 different sites on a support. In some aspects, the binding of the plurality of template molecules and nucleic acid primers with the plurality of first sequencing polymerases generates a plurality of first complexed polymerases immobilized to 102-1015 different sites on the support. In some aspects, the plurality of immobilized first complexed polymerases on the support are immobilized to pre-determined or to random sites on the support. In some aspects, the plurality of immobilized first complexed polymerases are in fluid communication with each other to permit flowing a solution of reagents (e.g., enzymes including sequencing polymerases, multivalent molecules, nucleotides, and/or divalent cations) onto the support so that the plurality of immobilized complexed polymerases on the support are reacted with the solution of reagents in a massively parallel manner.

In some aspects, the methods for sequencing further comprise step (b): contacting the plurality of first complexed polymerases with a plurality of multivalent molecules to form a plurality of multivalent-complexed polymerases (e.g., binding complexes). In some aspects, individual multivalent molecules in the plurality of multivalent molecules comprise a core attached to multiple nucleotide arms and each nucleotide arm is attached to a nucleotide (e.g., nucleotide unit) (e.g., FIGS. 9-13). In some aspects, the contacting of step (b) is conducted under a condition suitable for binding complementary nucleotide units of the multivalent molecules to at least two of the plurality of first complexed polymerases thereby forming a plurality of multivalent-complexed polymerases. In some aspects, the condition is suitable for inhibiting polymerase-catalyzed incorporation of the complementary nucleotide units into the primers of the plurality of multivalent-complexed polymerases. In some aspects, the plurality of multivalent molecules comprise at least one multivalent molecule having multiple nucleotide arms (e.g., FIGS. 9-12) each attached with a nucleotide analog (e.g., nucleotide analog unit), where the nucleotide analog includes a chain terminating moiety at the sugar 2' and/or 3' position. In some aspects, the plurality of multivalent molecules comprises at least one multivalent molecule comprising multiple nucleotide arms each attached with a nucleotide unit that lacks a chain terminating moiety. In some aspects, at least one of the multivalent molecules in the plurality of multivalent molecules is labeled with a detectable reporter moiety that emits a signal. In some aspects, the detectable reporter moiety comprises a fluorophore. In some aspects, the contacting of step (b) is conducted in the presence of at least one non-catalytic cation comprising strontium, barium and/or calcium.

In some aspects, the methods for sequencing further comprise step (c): detecting the plurality of multivalent-complexed polymerases. In some aspects, the detecting includes detecting the signals emitted by the multivalent molecules that are bound to the complexed polymerases, where the complementary nucleotide units of the multivalent molecules are bound to the primers but incorporation of the complementary nucleotide units is inhibited. In some aspects, the multivalent molecules are labeled with a detectable reporter moiety to permit detection. In some aspects, the labeled multivalent molecules comprise a fluorophore attached to the core, linker and/or nucleotide unit of the multivalent molecules.

In some aspects, the methods for sequencing further comprise step (d): identifying the nucleo-base of the complementary nucleotide units that are bound to the plurality of first complexed polymerases, thereby determining the sequence of the template molecule. In some aspects, the multivalent molecules are labeled with a detectable reporter moiety that corresponds to the particular nucleotide units attached to the nucleotide arms to permit identification of the complementary nucleotide units (e.g., nucleotide base adenine, guanine, cytosine, thymine or uracil) that are bound to the plurality of first complexed polymerases.

In some aspects, the methods for sequencing further comprise step (e): dissociating the plurality of multivalent-complexed polymerases and removing the plurality of first sequencing polymerases and their bound multivalent molecules, and retaining the plurality of nucleic acid duplexes.

In some aspects, the second stage of the two-stage sequencing method generally comprises nucleotide incorporation. In some aspects, the methods for sequencing further comprises step (f): contacting the plurality of the retained nucleic acid duplexes of step (e) with a plurality of second sequencing polymerases, wherein the contacting is conducted under a condition suitable for binding the plurality of second sequencing polymerases to the plurality of the retained nucleic acid duplexes, thereby forming a plurality of second complexed polymerases each comprising a second sequencing polymerase bound to a nucleic acid duplex. In some aspects, the second sequencing polymerase comprises a recombinant mutant sequencing polymerase.

In some aspects, the plurality of first sequencing polymerases of step (a) have an amino acid sequence that is 100% identical to the amino acid sequence as the plurality of the second sequencing polymerases of step (f). In some aspects, the plurality of first sequencing polymerases of step (a) have an amino acid sequence that differs from the amino acid sequence of the plurality of the second sequencing polymerases of step (f).

In some aspects, the methods for sequencing further comprise step (g): contacting the plurality of second complexed polymerases with a plurality of nucleotides, wherein the contacting is conducted under a condition suitable for binding complementary nucleotides from the plurality of nucleotides to at least two of the second complexed polymerases thereby forming a plurality of nucleotide-complexed polymerases. In some aspects, the contacting of step (g) is conducted under a condition that is suitable for promoting polymerase-catalyzed incorporation of the bound complementary nucleotides into the primers of the nucleotide-complexed polymerases thereby extending the sequencing primer by one nucleo-base. In some aspects, the incorporating the nucleotide into the 3' end of the sequencing primer in step (g) comprises a primer extension reaction. In some aspects, the contacting of step (g) is conducted in the presence of at least one catalytic cation comprising magnesium and/or manganese. In some aspects, the plurality of nucleotides comprise native nucleotides (e.g., non-analog nucleotides) or nucleotide analogs. In some aspects, the plurality of nucleotides comprise a 2' and/or 3' chain terminating moiety which is removable or is not removable. In some aspects, at least one of the nucleotides in the plurality is not labeled with a detectable reporter moiety. In some aspects, the plurality of nucleotides are non-labeled. In some aspects, the plurality of nucleotides comprises a plurality of nucleotides labeled with detectable reporter moiety. The detectable reporter moiety comprises a fluorophore. In some aspects, the fluorophore is attached to the nucleotide base. In some aspects, the fluorophore is attached to the nucleotide base with a linker which is cleavable/removable from the base or is not removable from the base. In some aspects, a particular detectable reporter moiety (e.g., fluorophore) that is attached to the nucleotide can correspond to the nucleotide base (e.g., dATP, dGTP, dCTP, dTTP or dUTP) to permit detection and identification of the nucleotide base.

In some aspects, when the plurality of nucleotides in step (g) are detectably labeled, the methods for sequencing further comprise step (h): detecting the complementary nucleotides which are incorporated into the primers of the nucleotide-complexed polymerases. In some aspects, the plurality of nucleotides are labeled with a detectable reporter moiety to permit detection. In some aspects, when the plurality of nucleotides in step (g) are non-labeled, the detecting of step (h) is omitted.

In some aspects, when the plurality of nucleotides in step (g) are detectably labeled, the methods for sequencing further comprise step (i): identifying the bases of the complementary nucleotides which are incorporated into the primers of the nucleotide-complexed polymerases. In some aspects, the identification of the incorporated complementary nucleotides in step (i) can be used to confirm the identity of the complementary nucleotides of the multivalent molecules that are bound to the plurality of first complexed polymerases in step (d). In some aspects, the identifying of step (i) can be used to determine the sequence of the nucleic acid template molecules. In some aspects, when the plurality of nucleotides in step (g) are non-labeled, the identifying of step (i) is omitted.

In some aspects, the methods for sequencing further comprise step (j): removing the chain terminating moiety from the incorporated nucleotide when step (g) is conducted by contacting the plurality of second complexed polymerases with a plurality of nucleotides that comprise at least one nucleotide having a 2' and/or 3' chain terminating moiety.

In some aspects, the methods for sequencing further comprise step (k): repeating steps (a)-(j) at least once. In some aspects, the sequence of the nucleic acid template molecules can be determined by detecting and identifying the multivalent molecules that bind the sequencing polymerases but do not incorporate into the 3' end of the primer at steps (c) and (d). In some aspects, the sequence of the nucleic acid template molecule can be determined (or confirmed) by detecting and identifying the nucleotide that incorporates into the 3' end of the primer at steps (h) and (i).

In some aspects, in any of the methods for sequencing nucleic acid molecules, the binding of the plurality of first complexed polymerases with the plurality of multivalent molecules forms at least one avidity complex, the method comprising the steps: (a) binding a first nucleic acid primer, a first sequencing polymerase, and a first multivalent molecule to a first portion of a concatemer template molecule thereby forming a first binding complex, wherein a first nucleotide unit of the first multivalent molecule binds to the first sequencing polymerase; and (b) binding a second nucleic acid primer, a second sequencing polymerase, and the first multivalent molecule to a second portion of the same concatemer template molecule thereby forming a second binding complex, wherein a second nucleotide unit of the first multivalent molecule binds to the second sequencing polymerase, wherein the first and second binding complexes which include the same multivalent molecule forms an avidity complex. In some aspects, the first sequencing polymerase comprises any wild type or mutant polymerase described herein. In some aspects, the second sequencing polymerase comprises any wild type or mutant polymerase described herein. The concatemer template molecule comprises tandem repeat sequences of a sequence of interest and at least one universal sequencing primer binding site. The first and second nucleic acid primers can bind to a sequencing primer binding site along the concatemer template molecule. Exemplary multivalent molecules are shown in FIGS. 9-12.

In some aspects, in any of the methods for sequencing nucleic acid molecules, wherein the method includes binding the plurality of first complexed polymerases with the plurality of multivalent molecules to form at least one avidity complex, the method comprising the steps: (a) contacting the plurality of sequencing polymerases and the plurality of nucleic acid primers with different portions of a concatemer nucleic acid concatemer molecule to form at least first and second complexed polymerases on the same concatemer template molecule; (b) contacting a plurality of multivalent molecules to the at least first and second complexed polymerases on the same concatemer template molecule, under conditions suitable to bind a single multivalent molecule from the plurality to the first and second complexed polymerases, wherein at least a first nucleotide unit of the single multivalent molecule is bound to the first complexed polymerase which includes a first primer hybridized to a first portion of the concatemer template molecule thereby forming a first binding complex (e.g., first ternary complex), and wherein at least a second nucleotide unit of the single multivalent molecule is bound to the second complexed polymerase which includes a second primer hybridized to a second portion of the concatemer template molecule thereby forming a second binding complex (e.g., second ternary complex), wherein the contacting is conducted under a condition suitable to inhibit polymerase-catalyzed incorporation of the bound first and second nucleotide units in the first and second binding complexes, and wherein the first and second binding complexes which are bound to the same multivalent molecule forms an avidity complex; and (c) detecting the first and second binding complexes on the same concatemer template molecule, and (d) identifying the first nucleotide unit in the first binding complex thereby determining the sequence of the first portion of the concatemer template molecule, and identifying the second nucleotide unit in the second binding complex thereby determining the sequence of the second portion of the concatemer template molecule. In some aspects, the plurality of sequencing polymerases comprise any wild type or mutant sequencing polymerase described herein. The concatemer template molecule comprises tandem repeat sequences of a sequence of interest and at least one universal sequencing primer binding site. The plurality of nucleic acid primers can bind to a sequencing primer binding site along the concatemer template molecule. Exemplary multivalent molecules are shown in FIGS. 10-13.

Sequencing-by-Binding

Some aspects of the present disclosure provide methods for sequencing any of the immobilized template molecules described herein, wherein the sequencing methods comprise a sequencing-by-binding (SBB) procedure which employs non-labeled chain-terminating nucleotides. In some aspects, the sequencing-by-binding (SBB) method comprises the steps of (a) sequentially contacting a primed template nucleic acid with at least two separate mixtures under ternary complex stabilizing conditions, wherein the at least two separate mixtures each include a polymerase and a nucleotide, whereby the sequentially contacting results in the primed template nucleic acid being contacted, under the ternary complex stabilizing conditions, with nucleotide cognates for first, second and third base type base types in the template; (b) examining the at least two separate mixtures to determine whether a ternary complex formed; and (c) identifying the next correct nucleotide for the primed template nucleic acid molecule, wherein the next correct nucleotide is identified as a cognate of the first, second or third base type if ternary complex is detected in step (b), and wherein the next correct nucleotide is imputed to be a nucleotide cognate of a fourth base type based on the absence of a ternary complex in step (b); (d) adding a next correct nucleotide to the primer of the primed template nucleic acid after step (b), thereby producing an extended primer; and (e) repeating steps (a) through (d) at least once on the primed template nucleic acid that comprises the extended primer. Exemplary sequencing-by-binding methods are described in U.S. Pat. Nos. 10,246,744 and 10,731,141 (where the contents of both patents are hereby incorporated by reference in their entireties).

Methods for Sequencing using Phosphate-Chain Labeled Nucleotides

Some aspects of the present disclosure provide methods for sequencing using immobilized sequencing polymerases which bind non-immobilized template molecules, wherein the sequencing reactions are conducted with phosphate-chain labeled nucleotides. In some aspects, the sequencing methods comprise step (a): providing a support having a plurality of sequencing polymerases immobilized thereon. In some aspects, the sequencing polymerase comprises a processive DNA polymerase. In some aspects, the sequencing polymerase comprises a wild type or mutant DNA polymerase, including for example a Phi29 DNA polymerase. In some aspects, the support comprise a plurality of separate compartments and a sequencing polymerase is immobilized to the bottom of a compartment. In some aspects, the separate compartments comprise a silica bottom through which light can penetrate. In some aspects, the separate compartments comprise a silica bottom configured with a nanophotonic confinement structure comprising a hole in a metal cladding film (e.g., aluminum cladding film). In some aspects, the hole in the metal cladding has a small aperture, for example, approximately 70 nm. In some aspects, the height of the nanophotonic confinement structure is approximately 100 nm. In some aspects, the nanophotonic confinement structure comprises a zero mode waveguide (ZMW). In some aspects, the nanophotonic confinement structure contains a liquid.

In some aspects, the sequencing method further comprises step (b): contacting the plurality of immobilized sequencing polymerases with a plurality of single stranded circular nucleic acid template molecules and a plurality of oligonucleotide sequencing primers, under a condition suitable for individual immobilized sequencing polymerases to bind a single stranded circular template molecule, and suitable for individual sequencing primers to hybridize to individual single stranded circular template molecules, thereby generating a plurality of polymerase/template/primer complexes. In some aspects, the individual sequencing primers hybridize to a universal sequencing primer binding site on the single stranded circular template molecule.

In some aspects, the sequencing method further comprises step (c): contacting the plurality of polymerase/template/primer complexes with a plurality of phosphate chain labeled nucleotides each comprising an aromatic base, a five carbon sugar (e.g., ribose or deoxyribose), and phosphate chain comprising 3-20 phosphate groups, where the terminal phosphate group is linked to a detectable reporter moiety (e.g., a fluorophore). The first, second and third phosphate groups can be referred to as alpha, beta and gamma phosphate groups. In some aspects, a particular detectable reporter moiety which is attached to the terminal phosphate group corresponds to the nucleotide base (e.g., dATP, dGTP, dCTP, dTTP or dUTP) to permit detection and identification of the nucleo-base. In some aspects, the plurality of polymerase/template/primer complexes are contacted with the plurality of phosphate chain labeled nucleotides under a condition suitable for polymerase-catalyzed nucleotide incorporation. In some aspects, the sequencing polymerases are capable of binding a complementary phosphate chain labeled nucleotide and incorporating the complementary nucleotide opposite a nucleotide in a template molecule. In some aspect, the polymerase-catalyzed nucleotide incorporation reaction cleaves between the alpha and beta phosphate groups thereby releasing a multi-phosphate chain linked to a fluorophore.

In some aspects, the sequencing method further comprises step (d): detecting the fluorescent signal emitted by the phosphate chain labeled nucleotide that is bound by the sequencing polymerase, and incorporated into the terminal end of the sequencing primer. In some aspects, step (d) further comprises identifying the phosphate chain labeled nucleotide that is bound by the sequencing polymerase, and incorporated into the terminal end of the sequencing primer.

In some aspects, the sequencing method further comprises step (d): repeating steps (c)-(d) at least once. In some aspects, sequencing methods that employ phosphate chain labeled nucleotides can be conducted according to the methods described in U.S. Pat. Nos. 7,170,050; 7,302,146; and/or 7,405,281.

Sequencing Polymerases

Some aspects of the present disclosure provide methods for sequencing nucleic acid molecules, where any of the sequencing methods described herein employ at least one type of sequencing polymerase and a plurality of nucleotides, or employ at least one type of sequencing polymerase and a plurality of nucleotides and a plurality of multivalent molecules. In some aspects, the sequencing polymerase(s) is/are capable of incorporating a complementary nucleotide opposite a nucleotide in a template molecule. In some aspects, the sequencing polymerase(s) is/are capable of binding a complementary nucleotide unit of a multivalent molecule opposite a nucleotide in a template molecule. In some aspects, the plurality of sequencing polymerases comprise recombinant mutant polymerases.

Examples of suitable polymerases for use in sequencing with nucleotides and/or multivalent molecules include but are not limited to: Klenow DNA polymerase; *Thermus aquaticus* DNA polymerase I (Taq polymerase); KlenTaq polymerase; Candidatus altiarchaeales archaeon; Candidatus Hadarchaeum Yellowstonense; Hadesarchaea archaeon; Euryarchaeota archaeon; Thermoplasmata archaeon; *Thermococcus* polymerases such as *Thermococcus litoralis*, bacteriophage T7 DNA polymerase; human alpha, delta and epsilon DNA polymerases; bacteriophage polymerases such as T4, RB69 and phi29 bacteriophage DNA polymerases; *Pyrococcus furiosus* DNA polymerase (Pfu polymerase); *Bacillus subtilis* DNA polymerase III; *E. coli* DNA polymerase III alpha and epsilon; 9 degree N polymerase; reverse transcriptases such as HIV type M or O reverse transcriptases; avian myeloblastosis virus reverse transcriptase; Moloney Murine Leukemia Virus (MMLV) reverse transcriptase; or telomerase. Further non-limiting examples of DNA polymerases include those from various Archaea genera, such as, Aeropyrum, Archaeglobus, Desulfurococcus, *Pyrobaculum, Pyrococcus*, Pyrolobus, Pyrodictium, *Staphylothermus, Stetteria, Sulfolobus, Thermococcus*, and Vulcanisaeta and the like or variants thereof, including such polymerases as are known in the art such as 9 degrees N, VENT, DEEP VENT, THERMINATOR, Pfu, KOD, Pfx, Tgo and RB69 polymerases.

Nucleotides

Some aspects of the present disclosure provide methods for sequencing nucleic acid molecules, where any of the sequencing methods described herein employ at least one nucleotide. The nucleotides comprise a base, sugar and at least one phosphate group. In some aspects, at least one nucleotide in the plurality comprises an aromatic base, a five carbon sugar (e.g., ribose or deoxyribose), and one or more phosphate groups (e.g., 1-10 phosphate groups). The plurality of nucleotides can comprise at least one type of nucleotide selected from a group consisting of dATP, dGTP, dCTP, dTTP and dUTP. The plurality of nucleotides can comprise at a mixture of any combination of two or more types of nucleotides selected from a group consisting of dATP, dGTP, dCTP, dTTP and/or dUTP. In some aspects, at least one nucleotide in the plurality is not a nucleotide analog. In some aspects, at least one nucleotide in the plurality comprises a nucleotide analog.

In some aspects, in any of the methods for sequencing nucleic acid molecules described herein, at least one nucleotide in the plurality of nucleotides comprise a chain of one, two or three phosphorus atoms where the chain is typically attached to the 5' carbon of the sugar moiety via an ester or phosphoramide linkage. In some aspects, at least one nucleotide in the plurality is an analog having a phosphorus chain in which the phosphorus atoms are linked together with intervening O, S, NH, methylene or ethylene. In some aspects, the phosphorus atoms in the chain include substituted side groups including O, S or BH3. In some aspects, the chain includes phosphate groups substituted with analogs including phosphoramidate, phosphorothioate, phosphordithioate, and O-methylphosphoroamidite groups.

In some aspects, in any of the methods for sequencing nucleic acid molecules described herein, at least one nucleotide in the plurality of nucleotides comprises a terminator nucleotide analog having a chain terminating moiety (e.g., blocking moiety) at the sugar 2' position, at the sugar 3' position, or at the sugar 2' and 3' position. In some aspects, the chain terminating moiety can inhibit polymerase-catalyzed incorporation of a subsequent nucleotide unit or free nucleotide in a nascent strand during a primer extension reaction. In some aspects, the chain terminating moiety is attached to the 3' sugar position where the sugar comprises a ribose or deoxyribose sugar moiety. In some aspects, the chain terminating moiety is removable/cleavable from the 3' sugar position to generate a nucleotide having a 3'OH sugar group which is extendible with a subsequent nucleotide in a polymerase-catalyzed nucleotide incorporation reaction. In some aspects, the chain terminating moiety comprises an alkyl group, alkenyl group, alkynyl group, allyl group, aryl group, benzyl group, azide group, amine group, amide group, keto group, isocyanate group, phosphate group, thio group, disulfide group, carbonate group, urea group, silyl or acetal group. In some aspects, the chain terminating moiety is cleavable/removable from the nucleotide, for example by reacting the chain terminating moiety with a chemical agent, pH change, light or heat. In some aspects, the chain terminating moieties alkyl, alkenyl, alkynyl and allyl are cleavable with tetrakis(triphenylphosphine)palladium(0) (Pd (PPh3)4) with piperidine, or with 2,3-Dichloro-5,6-dicyano-1,4-benzo-quinone (DDQ). In some aspects, the chain terminating moieties aryl and benzyl are cleavable with H2 Pd/C. In some aspects, the chain terminating moieties amine, amide, keto, isocyanate, phosphate, thio, disulfide are cleavable with phosphine or with a thiol group including beta-mercaptoethanol or dithiothritol (DTT). In some aspects, the chain terminating moiety carbonate is cleavable with potassium carbonate (K2CO3) in MeOH, with triethylamine in pyridine, or with Zn in acetic acid (AcOH). In some aspects, the chain terminating moieties urea and silyl are cleavable with tetrabutylammonium fluoride, pyridine-HF, with ammonium fluoride, or with triethylamine trihydrofluoride. In some aspects, the chain terminating moiety may be cleavable/removable with nitrous acid. In some aspects, a chain terminating moiety may be cleavable/removable using a solution comprising nitrite, such as, for example, a combination of nitrite with an acid such as acetic acid, sulfuric acid, or nitric acid. In some further aspects, said solution may comprise an organic acid.

In some aspects, in any of the methods for sequencing nucleic acid molecules described herein, at least one nucleotide in the plurality of nucleotides comprises a terminator nucleotide analog having a chain terminating moiety (e.g., blocking moiety) at the sugar 2' position, at the sugar 3' position, or at the sugar 2' and 3' position. In some aspects, the chain terminating moiety comprises an azide, azido or azidomethyl group. In some aspects, the chain terminating moiety comprises a 3'-O-azido or 3'-O-azidomethyl group. In some aspects, the chain terminating moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl)phosphine (THPP). In some aspects, the cleaving agent comprises 4-dimethylaminopyridine (4-DMAP). In some aspects, the chain terminating moiety comprising one or more of a 3'-O-amino group, a 3'-O-aminomethyl group, a 3'-O-methylamino group, or derivatives thereof may be cleaved with nitrous acid, through a mechanism utilizing nitrous acid, or using a solution comprising nitrous acid. In some aspects, the chain terminating moiety comprising one or more of a 3'-O-amino group, a 3'-O-aminomethyl group, a 3'-O-methylamino group, or derivatives thereof may be cleaved using a solution comprising nitrite. In some aspects, for example, nitrite may be combined with or contacted with an acid such as acetic acid, sulfuric acid, or nitric acid. In some further aspects, for example, nitrite may be combined with or contacted with an organic acid such as, for example, formic acid, acetic acid, propionic acid, butyric acid, isobutyric acid, or the like. In some aspects, the chain terminating moiety comprises a 3'-acetal moiety which can be cleaved with a palladium deblocking reagent (e.g., Pd(O)).

In some aspects, in any of the methods for sequencing nucleic acid molecules described herein, the nucleotide comprises a chain terminating moiety which is selected from a group consisting of 3'-deoxy nucleotides, 2',3'-dideoxynucleotides, 3'-methyl, 3'-azido, 3'-azidomethyl, 3'-O-azidoalkyl, 3'-O-ethynyl, 3'-O-aminoalkyl, 3'-O-fluoroalkyl, 3'-fluoromethyl, 3'-difluoromethyl, 3'-trifluoromethyl, 3'-sulfonyl, 3'-malonyl, 3'-amino, 3'-O-amino, 3'-sulfhydral, 3'-aminomethyl, 3'-ethyl, 3'butyl, 3'-tert butyl, 3'-Fluorenylmethyloxycarbonyl, 3' tert-Butyloxycarbonyl, 3'-O-alkyl hydroxylamino group, 3'-phosphorothioate, 3-O-benzyl, and 3'-O-benzyl, 3-acetal moiety or derivatives thereof.

In some aspects, in any of the methods for sequencing nucleic acid molecules described herein, the plurality of nucleotides comprises a plurality of nucleotides labeled with detectable reporter moiety. The detectable reporter moiety comprises a fluorophore. In some aspects, the fluorophore is attached to the nucleotide base. In some aspects, the fluorophore is attached to the nucleotide base with a linker which is cleavable/removable from the base. In some aspects, at least one of the nucleotides in the plurality is not labeled with a detectable reporter moiety. In some aspects, a particular detectable reporter moiety (e.g., fluorophore) that is attached to the nucleotide can correspond to the nucleotide base (e.g., dATP, dGTP, dCTP, dTTP or dUTP) to permit detection and identification of the nucleotide base.

In some aspects, in any of the methods for sequencing nucleic acid molecules described herein, the cleavable linker on the nucleotide base comprises a cleavable moiety comprising an alkyl group, alkenyl group, alkynyl group, allyl group, aryl group, benzyl group, azide group, amine group, amide group, keto group, isocyanate group, phosphate group, thio group, disulfide group, carbonate group, urea group, or silyl group. In some aspects, the cleavable linker on the base is cleavable/removable from the base by reacting the cleavable moiety with a chemical agent, pH change, light or heat. In some aspects, the cleavable moieties alkyl, alkenyl, alkynyl and allyl are cleavable with tetrakis(triphenylphosphine)palladium(0) (Pd(PPh3)4) with piperidine, or with 2,3-Dichloro-5,6-dicyano-1,4-benzo-quinone (DDQ). In some aspects, the cleavable moieties aryl and benzyl are cleavable with H2 Pd/C. In some aspects, the cleavable moieties amine, amide, keto, isocyanate, phosphate, thio, disulfide are cleavable with phosphine or with a thiol group including beta-mercaptoethanol or dithiothritol (DTT). In some aspects, the cleavable moiety carbonate is cleavable with potassium carbonate (K2CO3) in MeOH, with triethylamine in pyridine, or with Zn in acetic acid (AcOH). In some aspects, the cleavable moieties urea and silyl are cleavable with tetrabutylammonium fluoride, pyridine-HF, with ammonium fluoride, or with triethylamine trihydrofluoride.

In some aspects, in any of the methods for sequencing nucleic acid molecules described herein, the cleavable linker on the nucleotide base comprises cleavable moiety including an azide, azido or azidomethyl group. In some aspects, the cleavable moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl) phosphine (THPP). In some aspects, the cleaving agent comprises 4-dimethylaminopyridine (4-DMAP).

In some aspects, in any of the methods for sequencing nucleic acid molecules described herein, the chain terminating moiety (e.g., at the sugar 2' and/or sugar 3' position) and the cleavable linker on the nucleotide base have the same or different cleavable moieties. In some aspects, the chain terminating moiety (e.g., at the sugar 2' and/or sugar 3' position) and the detectable reporter moiety linked to the base are chemically cleavable/removable with the same chemical agent. In some aspects, the chain terminating moiety (e.g., at the sugar 2' and/or sugar 3' position) and the detectable reporter moiety linked to the base are chemically cleavable/removable with different chemical agents.

Multivalent Molecules

Some aspects of the present disclosure provide methods for sequencing nucleic acid molecules, where any of the sequencing methods described herein employ at least one multivalent molecule. In some aspects, the multivalent molecule comprises a plurality of nucleotide arms attached to a core and having any configuration including a starburst, helter skelter, or bottle brush configuration (e.g., FIG. 9). The multivalent molecule comprises: (1) a core; and (2) a plurality of nucleotide arms which comprise (i) a core attachment moiety, (ii) a spacer comprising a PEG moiety, (iii) a linker, and (iv) a nucleotide unit, wherein the core is attached to the plurality of nucleotide arms, wherein the spacer is attached to the linker, wherein the linker is attached to the nucleotide unit. In some aspects, the nucleotide unit comprises a base, sugar and at least one phosphate group, and the linker is attached to the nucleotide unit through the base. In some aspects, the linker comprises an aliphatic chain or an oligo ethylene glycol chain where both linker chains having 2-6 subunits. In some aspects, the linker also includes an aromatic moiety. An exemplary nucleotide arm is shown in FIG. 13. Exemplary multivalent molecules are shown in FIGS. 9-12. An exemplary spacer is shown in FIG. 14 (top) and exemplary linkers are shown in FIG. 15 (bottom) and FIG. 15. Exemplary nucleotides attached to a linker are shown in FIGS. 16-19. An exemplary biotinylated nucleotide arm is shown in FIG. 20.

In some aspects, a multivalent molecule comprises a core attached to multiple nucleotide arms, and wherein the multiple nucleotide arms have the same type of nucleotide unit which is selected from a group consisting of dATP, dGTP, dCTP, dTTP and dUTP.

In some aspects, a multivalent molecule comprises a core attached to multiple nucleotide arms, where each arm includes a nucleotide unit. The nucleotide unit comprises an aromatic base, a five carbon sugar (e.g., ribose or deoxyribose), and one or more phosphate groups (e.g., 1-10 phosphate groups). The plurality of multivalent molecules can comprise one type multivalent molecule having one type of nucleotide unit selected from a group consisting of dATP, dGTP, dCTP, dTTP and dUTP. The plurality of multivalent molecules can comprise at a mixture of any combination of two or more types of multivalent molecules, where individual multivalent molecules in the mixture comprise nucleotide units selected from a group consisting of dATP, dGTP, dCTP, dTTP and/or dUTP.

In some aspects, the nucleotide unit comprises a chain of one, two or three phosphorus atoms where the chain is typically attached to the 5' carbon of the sugar moiety via an ester or phosphoramide linkage. In some aspects, at least one nucleotide unit is a nucleotide analog having a phosphorus chain in which the phosphorus atoms are linked together with intervening O, S, NH, methylene or ethylene. In some aspects, the phosphorus atoms in the chain include substituted side groups including O, S or BH3. In some aspects, the chain includes phosphate groups substituted with analogs including phosphoramidate, phosphorothioate, phosphordithioate, and O-methylphosphoroamidite groups.

In some aspects, the multivalent molecule comprises a core attached to multiple nucleotide arms, and wherein individual nucleotide arms comprise a nucleotide unit which is a nucleotide analog having a chain terminating moiety (e.g., blocking moiety) at the sugar 2' position, at the sugar 3' position, or at the sugar 2' and 3' position. In some aspects, the nucleotide unit comprises a chain terminating moiety (e.g., blocking moiety) at the sugar 2' position, at the sugar 3' position, or at the sugar 2' and 3' position. In some aspects, the chain terminating moiety can inhibit polymerase-catalyzed incorporation of a subsequent nucleotide unit or free nucleotide in a nascent strand during a primer extension reaction. In some aspects, the chain terminating moiety is attached to the 3' sugar position where the sugar comprises a ribose or deoxyribose sugar moiety. In some aspects, the chain terminating moiety is removable/cleavable from the 3' sugar position to generate a nucleotide having a 3'OH sugar group which is extendible with a subsequent nucleotide in a polymerase-catalyzed nucleotide incorporation reaction. In some aspects, the chain terminating moiety comprises an alkyl group, alkenyl group, alkynyl group, allyl group, aryl group, benzyl group, azide group, amine group, amide group, keto group, isocyanate group, phosphate group, thio group, disulfide group, carbonate group, urea group, or silyl group. In some aspects, the chain terminating moiety is cleavable/removable from the nucleotide unit, for example by reacting the chain terminating moiety with a chemical agent, pH change, light or heat. In some aspects, the chain terminating moieties alkyl, alkenyl, alkynyl and allyl are cleavable with tetrakis(triphenylphosphine)palladium(0) (Pd(PPh3)4) with piperidine, or with 2,3-Dichloro-5,6-dicyano-1,4-benzo-quinone (DDQ). In some aspects, the chain terminating moieties aryl and benzyl are cleavable with H2 Pd/C. In some aspects, the chain terminating moieties amine, amide, keto, isocyanate, phosphate, thio, disulfide are cleavable with phosphine or with a thiol group including beta-mercaptoethanol or dithiothritol (DTT). In some aspects, the chain terminating moiety carbonate is cleavable with potassium carbonate (K2CO3) in MeOH, with triethylamine in pyridine, or with Zn in acetic acid (AcOH). In some aspects, the chain terminating moieties urea and silyl are cleavable with tetrabutylammonium fluoride, pyridine-HF, with ammonium fluoride, or with triethylamine trihydrofluoride.

In some aspects, the nucleotide unit comprises a chain terminating moiety (e.g., blocking moiety) at the sugar 2' position, at the sugar 3' position, or at the sugar 2' and 3' position. In some aspects, the chain terminating moiety comprises an azide, azido or azidomethyl group. In some aspects, the chain terminating moiety comprises a 3'-O-azido or 3'-O-azidomethyl group. In some aspects, the chain terminating moieties azide, azido and azidomethyl group are cleavable/removable with a phosphine compound. In some aspects, the phosphine compound comprises a derivatized tri-alkyl phosphine moiety or a derivatized tri-aryl phosphine moiety. In some aspects, the phosphine compound comprises Tris(2-carboxyethyl)phosphine (TCEP) or bis-sulfo triphenyl phosphine (BS-TPP) or Tri(hydroxyproyl) phosphine (THPP). In some aspects, the cleaving agent comprises 4-dimethylaminopyridine (4-DMAP).

In some aspects, the nucleotide unit comprising a chain terminating moiety which is selected from a group consisting of 3'-deoxy nucleotides, 2',3'-dideoxynucleotides, 3'-methyl, 3'-azido, 3'-azidomethyl, 3'-O-azidoalkyl, 3'-O-ethynyl, 3'-O-aminoalkyl, 3'-O-fluoroalkyl, 3'-fluoromethyl, 3'-difluoromethyl, 3'-trifluoromethyl, 3'-sulfonyl, 3'-malonyl, 3'-amino, 3'-O-amino, 3'-sulfhydral, 3'-aminomethyl, 3'-ethyl, 3'butyl, 3'-tert butyl, 3'-Fluorenylmethyloxycarbonyl, 3' tert-Butyloxycarbonyl, 3'-O-alkyl hydroxylamino group, 3'-phosphorothioate, and 3-O-benzyl, or derivatives thereof.

In some aspects, the multivalent molecule comprises a core attached to multiple nucleotide arms, wherein the nucleotide arms comprise a spacer, linker and nucleotide unit, and wherein the core, linker and/or nucleotide unit is labeled with detectable reporter moiety. In some aspects, the detectable reporter moiety comprises a fluorophore. In some aspects, a particular detectable reporter moiety (e.g., fluorophore) that is attached to the multivalent molecule can correspond to the base (e.g., dATP, dGTP, dCTP, dTTP or dUTP) of the nucleotide unit to permit detection and identification of the nucleotide base.

In some aspects, at least one nucleotide arm of a multivalent molecule has a nucleotide unit that is attached to a detectable reporter moiety. In some aspects, the detectable reporter moiety is attached to the nucleotide base. In some aspects, the detectable reporter moiety comprises a fluorophore. In some aspects, a particular detectable reporter moiety (e.g., fluorophore) that is attached to the multivalent molecule can correspond to the base (e.g., dATP, dGTP, dCTP, dTTP or dUTP) of the nucleotide unit to permit detection and identification of the nucleotide base.

In some aspects, the core of a multivalent molecule comprises an avidin-like or streptavidin-like moiety and the core attachment moiety comprises biotin. In some aspects, the core comprises an streptavidin-type or avidin-type moiety which includes an avidin protein, as well as any derivatives, analogs and other non-native forms of avidin that can bind to at least one biotin moiety. Other forms of avidin moieties include native and recombinant avidin and streptavidin as well as derivatized molecules, e.g. non-glycosylated avidin and truncated streptavidins. For example, avidin moiety includes de-glycosylated forms of avidin, bacterial streptavidin produced by *Streptomyces* (e.g., *Streptomyces avidinii*), as well as derivatized forms, for example, N-acyl avidins, e.g., N-acetyl, N-phthalyl and N-succinyl avidin, and the commercially-available products EXTRAVIDIN, CAPTAVIDIN, NEUTRAVIDIN and NEUTRALITE AVIDIN.

In some aspects, any of the methods for sequencing nucleic acid molecules described herein can include forming a binding complex, where the binding complex comprises (i) a polymerase, a nucleic acid template molecule duplexed with a primer, and a nucleotide, or the binding complex comprises (ii) a polymerase, a nucleic acid template molecule duplexed with a primer, and a nucleotide unit of a multivalent molecule. In some aspects, the binding complex has a persistence time of greater than about 0.1, 0.2, 0.3, 0.4, 0.5, 0.6, 0.7, 0.8, 0.9 or 1 second. The binding complex has a persistence time of greater than about 0.1-0.25 seconds, or about 0.25-0.5 seconds, or about 0.5-0.75 seconds, or about 0.75-1 second, or about 1-2 seconds, or about 2-3 seconds, or about 3-4 second, or about 4-5 seconds, and/or wherein the method is or may be carried out at a temperature of at or above 15° C., at or above 20° C., at or above 25° C., at or above 35° C., at or above 37° C., at or above 42° C. at or above 55° C. at or above 60° C., or at or above 72° C., or at or above 80° C., or within a range defined by any of the foregoing. The binding complex (e.g., ternary complex) remains stable until subjected to a condition that causes dissociation of interactions between any of the polymerase, template molecule, primer and/or the nucleotide unit or the nucleotide. For example, a dissociating condition comprises contacting the binding complex with any one or any combination of a detergent, EDTA and/or water. In some aspects, the present disclosure provides said method wherein the binding complex is deposited on, attached to, or hybridized to, a surface showing a contrast to noise ratio in the detecting step of greater than 20. In some aspects, the present disclosure provides said method wherein the contacting is performed under a condition that stabilizes the binding complex when the nucleotide or nucleotide unit is complementary to a next base of the template nucleic acid, and destabilizes the binding complex when the nucleotide or nucleotide unit is not complementary to the next base of the template nucleic acid.

Compaction Oligonucleotides

A compaction oligonucleotide comprises a single-stranded linear oligonucleotide having a 5' region that can hybridize to a first portion of a concatemer molecule and the compaction oligonucleotide having a 3' region that can hybridize to a second portion of the concatemer molecule (e.g., the same concatemer molecule). In some aspects, hybridization of the compaction oligonucleotides to individual concatemer molecules causes the concatemer molecule to collapse or fold into a DNA nanoball which is more compact in shape and size compared to a non-collapsed DNA molecule. A spot image of a DNA nanoball can be represented as a Gaussian spot and the size can be measured as a full width half maximum (FWHM). A smaller spot size as indicated by a smaller FWHM typically correlates with an improved image of the spot. In some aspects, the FWHM of a DNA nanoball spot can be about 10 um or smaller. The DNA nanoball can be a compact nucleic acid structure having a full width half maximum (FWHM) that is smaller compared to a concatemer that is not collapsed/folded into a DNA nanoball.

In some aspects, compaction oligonucleotides comprise a single stranded oligonucleotides comprising DNA, RNA, or a combination of DNA and RNA. The compaction oligonucleotides can be any length, including 20-150 nucleotides, or 30-100 nucleotides, or 40-80 nucleotides in length.

In some aspects, the compaction oligonucleotides comprises a 5' region and a 3' region, and optionally an intervening region between the 5' and 3' regions. The intervening region can be any length, for example about 2-20 nucleotides in length. The intervening region comprises a homopolymer having consecutive identical bases (e.g., AAA, GGG, CCC, TTT or UUU). The intervening region comprises a non-homopolymer sequence.

The 5' region of the compaction oligonucleotides can be wholly complementary or partially complementary along its length to a first portion of a concatemer molecule. The 3' region of the compaction oligonucleotides can be wholly complementary or partially complementary along its length to a second portion of a concatemer molecule. The 5' region of the compaction oligonucleotides can hybridize to a first universal sequence portion of a concatemer molecule. The 3' region of the compaction oligonucleotides can hybridize to a second universal sequence portion of a concatemer molecule. The 5' and 3' regions of the compaction oligonucleotide can hybridize to the concatemer to pull together distal portions of the concatemer causing compaction of the concatemer to form a DNA nanoball.

The 5' region of the compaction oligonucleotide can have the same sequence as the 3' region. The 5' region of the compaction oligonucleotide can have a sequence that is different from the 3' region. The 3' region of the compaction oligonucleotide can have a sequence that is a reverse sequence of the 5' region.

In some aspects sequence data may be derived through nanopore sequencing, which comprises sequencing of a nucleic acid by translocating said nucleic acid across a membrane, such as through a pore, and wherein sequence reads or base calls are made by measuring one or more signals during the translocation event, such as impedance, current, voltage, or capacitance. In some aspects, the identity of a nucleotide may be determined by distinctive electrical signatures, such as the timing, duration, extent, or lineshape of a current block, impedance change, voltage change, or capacitance change. Sequencing of nucleic acids by translocation across a membrane and/or through a pore does not foreclose alternative detection methods, such as optical, chemical, biochemical, fluorescent, luminescent, magnetic, electromagnetic, acoustic, or electroacoustic detection.

Supports and Low Non-Specific Coatings

In some aspects, the flow cell 112 in FIG. 1 can include a support, e.g., a solid support as disclosed herein. Some aspects of the present disclosure provide pairwise sequencing compositions and methods which employ a support comprising a plurality of oligonucleotide surface primers immobilized thereon. In some aspects, the support is passivated with a low non-specific binding coating. The surface coatings described herein exhibit very low non-specific binding to reagents typically used for nucleic acid capture, amplification and sequencing workflows, such as dyes, nucleotides, enzymes, and nucleic acid primers. The surface coatings exhibit low background fluorescence signals or high contrast-to-noise (CNR) ratios compared to conventional surface coatings.

The low non-specific binding coating comprises one layer or multiple layers (FIG. 20). In some aspects, the plurality of surface primers are immobilized to the low non-specific binding coating. In some aspects, at least one surface primer is embedded within the low non-specific binding coating. The low non-specific binding coating enables improved nucleic acid hybridization and amplification performance. In general, the supports comprise a substrate (or support structure), one or more layers of a covalently or non-covalently attached low-binding, chemical modification layers, e.g., silane layers, polymer films, and one or more covalently or non-covalently attached surface primers that can be used for tethering single-stranded nucleic acid library molecules to the support. In some aspects, the formulation of the coating, e.g., the chemical composition of one or more layers, the coupling chemistry used to cross-link the one or more layers to the support and/or to each other, and the total number of layers, may be varied such that non-specific binding of proteins, nucleic acid molecules, and other hybridization and amplification reaction components to the coating is minimized or reduced relative to a comparable monolayer. The formulation of the coating described herein may be varied such that non-specific hybridization on the coating is minimized or reduced relative to a comparable monolayer. The formulation of the coating may be varied such that non-specific amplification on the coating is minimized or reduced relative to a comparable monolayer. The formulation of the coating may be varied such that specific amplification rates and/or yields on the coating are maximized. Amplification levels suitable for detection are achieved in no more than 2, 3, 4, 5, 6, 7, 8, 9, 10, 15, 20, 25, 30, or more than 30 amplification cycles in some cases disclosed herein.

The support structure that comprises the one or more chemically-modified layers, e.g., layers of a low non-specific binding polymer, may be independent or integrated into another structure or assembly. For example, in some aspects, the support structure may comprise one or more surfaces within an integrated or assembled microfluidic flow cell. The support structure may comprise one or more surfaces within a microplate format, e.g., the bottom surface of the wells in a microplate. In some aspects, the support structure comprises the interior surface (such as the lumen surface) of a capillary. In some aspects, the support structure comprises the interior surface (such as the lumen surface) of a capillary etched into a planar chip.

The attachment chemistry used to graft a first chemically-modified layer to the surface of the support will generally be dependent on both the material from which the surface is fabricated and the chemical nature of the layer. In some aspects, the first layer may be covalently attached to the surface. In some aspects, the first layer may be non-covalently attached, e.g., adsorbed to the support through non-covalent interactions such as electrostatic interactions, hydrogen bonding, or van der Waals interactions between the support and the molecular components of the first layer. In either case, the support may be treated prior to attachment or deposition of the first layer. Any of a variety of surface preparation techniques known to those of skill in the art may be used to clean or treat the surface. For example, glass or silicon surfaces may be acid-washed using a Piranha solution (a mixture of sulfuric acid (H2SO4) and hydrogen peroxide (H2O2)), base treatment in KOH and NaOH, and/or cleaned using an oxygen plasma treatment method.

Silane chemistries constitute non-limiting approaches for covalently modifying the silanol groups on glass or silicon surfaces to attach more reactive functional groups (e.g., amines or carboxyl groups), which may then be used in coupling linker molecules (e.g., linear hydrocarbon molecules of various lengths, such as C6, C12, C18 hydrocarbons, or linear polyethylene glycol (PEG) molecules) or layer molecules (e.g., branched PEG molecules or other polymers) to the surface. Examples of suitable silanes that may be used in creating any of the disclosed low binding coatings include, but are not limited to, (3-Aminopropyl) trimethoxysilane (APTMS), (3-Aminopropyl) triethoxysilane (APTES), any of a variety of PEG-silanes (e.g., comprising molecular weights of 1K, 2K, 5K, 10K, 20K, etc.), amino-PEG silane (i.e., comprising a free amino functional group), maleimide-PEG silane, biotin-PEG silane, and the like.

Any of a variety of molecules known to those of skill in the art including, but not limited to, amino acids, peptides, nucleotides, oligonucleotides, other monomers or polymers, or combinations thereof may be used in creating the one or more chemically-modified layers on the support, where the choice of components used may be varied to alter one or more properties of the layers, e.g., the surface density of functional groups and/or tethered oligonucleotide primers, the hydrophilicity/hydrophobicity of the layers, or the three three-dimensional nature (i.e., "thickness") of the layer. Examples of polymers that may be used to create one or more layers of low non-specific binding material in any of the disclosed coatings include, but are not limited to, poly-ethylene glycol (PEG) of various molecular weights and branching structures, streptavidin, polyacrylamide, polyester, dextran, poly-lysine, and poly-lysine copolymers, or any combination thereof. Examples of conjugation chemistries that may be used to graft one or more layers of material (e.g. polymer layers) to the surface and/or to cross-link the layers to each other include, but are not limited to, biotin-streptavidin interactions (or variations thereof), his tag-Ni/NTA conjugation chemistries, methoxy ether conjugation chemistries, carboxylate conjugation chemistries, amine conjugation chemistries, NHS esters, maleimides, thiol, epoxy, azide, hydrazide, alkyne, isocyanate, and silane.

The low non-specific binding surface coating may be applied uniformly across the support. Alternatively, the surface coating may be patterned, such that the chemical modification layers are confined to one or more discrete regions of the support. For example, the coating may be patterned using photolithographic techniques to create an ordered array or random pattern of chemically-modified regions on the support. Alternately or in combination, the coating may be patterned using, e.g., contact printing and/or ink-jet printing techniques. In some aspects, an ordered array or random pattern of chemically-modified regions may comprise at least 1, 5, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10,000 or more discrete regions.

In some aspects, the low nonspecific binding coatings comprise hydrophilic polymers that are non-specifically adsorbed or covalently grafted to the support. Typically, passivation is performed utilizing poly(ethylene glycol) (PEG, also known as polyethylene oxide (PEO) or polyoxyethylene) or other hydrophilic polymers with different molecular weights and end groups that are linked to a support using, for example, silane chemistry. The end groups distal from the surface can include, but are not limited to, biotin, methoxy ether, carboxylate, amine, NHS ester, maleimide, and bis-silane. In some aspects, two or more layers of a hydrophilic polymer, e.g., a linear polymer, branched polymer, or multi-branched polymer, may be deposited on the surface. In some aspects, two or more layers may be covalently coupled to each other or internally cross-linked to improve the stability of the resulting coating. In some aspects, surface primers with different nucleotide sequences and/or base modifications (or other biomolecules, e.g., enzymes or antibodies) may be tethered to the resulting layer at various surface densities. In some aspects, for example, both surface functional group density and surface primer concentration may be varied to attain a desired surface primer density range. Additionally, surface primer density can be controlled by diluting the surface primers with other molecules that carry the same functional group. For example, amine-labeled surface primers can be diluted with amine-labeled polyethylene glycol in a reaction with an NHS-ester coated surface to reduce the final primer density. Surface primers with different lengths of linker between the hybridization region and the surface attachment functional group can also be applied to control surface density. Example of suitable linkers include poly-T and poly-A strands at the 5' end of the primer (e.g., 0 to 20 bases), PEG linkers (e.g., 3 to 20 monomer units), and carbon-chain (e.g., C6, C12, C18, etc.). To measure the primer density, fluorescently-labeled primers may be tethered to the surface and a fluorescence reading then compared with that for a dye solution of known concentration.

In some aspects, the low nonspecific binding coatings comprise a functionalized polymer coating layer covalently bound at least to a portion of the support via a chemical group on the support, a primer grafted to the functionalized polymer coating, and a water-soluble protective coating on the primer and the functionalized polymer coating. In some aspects, the functionalized polymer coating comprises a poly(N-(5-azidoacetamidylpentyl)acrylamide-co-acrylamide (PAZAM).

In order to scale primer surface density and add additional dimensionality to hydrophilic or amphoteric coatings, supports comprising multi-layer coatings of PEG and other hydrophilic polymers have been developed. By using hydrophilic and amphoteric surface layering approaches that include, but are not limited to, the polymer/co-polymer materials described below, it is possible to increase primer loading density on the support significantly. Traditional PEG coating approaches use monolayer primer deposition, which have been generally reported for single molecule applications, but do not yield high copy numbers for nucleic acid amplification applications. As described herein "layering" can be accomplished using traditional crosslinking approaches with any compatible polymer or monomer subunits such that a surface comprising two or more highly crosslinked layers can be built sequentially. Examples of suitable polymers include, but are not limited to, streptavidin, poly acrylamide, polyester, dextran, poly-lysine, and copolymers of poly-lysine and PEG. In some aspects, the different layers may be attached to each other through any of a variety of conjugation reactions including, but not limited to, biotin-streptavidin binding, azide-alkyne click reaction, amine-NHS ester reaction, thiol-maleimide reaction, and ionic interactions between positively charged polymer and negatively charged polymer. In some aspects, high primer density materials may be constructed in solution and subsequently layered onto the surface in multiple steps.

Examples of materials from which the support structure may be fabricated include, but are not limited to, glass, fused-silica, silicon, a polymer (e.g., polystyrene (PS), macroporous polystyrene (MPPS), polymethylmethacrylate (PMMA), polycarbonate (PC), polypropylene (PP), polyethylene (PE), high density polyethylene (HDPE), cyclic olefin polymers (COP), cyclic olefin copolymers (COC), polyethylene terephthalate (PET)), or any combination thereof. Various compositions of both glass and plastic support structures are contemplated.

The support structure may be rendered in any of a variety of geometries and dimensions known to those of skill in the art, and may comprise any of a variety of materials known to those of skill in the art. For example, the support structure may be locally planar (e.g., comprising a microscope slide or the surface of a microscope slide). Globally, the support structure may be cylindrical (e.g., comprising a capillary or the interior surface of a capillary), spherical (e.g., comprising the outer surface of a non-porous bead), or irregular (e.g., comprising the outer surface of an irregularly-shaped, non-porous bead or particle). In some aspects, the surface of the support structure used for nucleic acid hybridization and amplification may be a solid, non-porous surface. In some aspects, the surface of the support structure used for nucleic acid hybridization and amplification may be porous, such that the coatings described herein penetrate the porous surface, and nucleic acid hybridization and amplification reactions performed thereon may occur within the pores.

The support structure that comprises the one or more chemically-modified layers, e.g., layers of a low non-specific binding polymer, may be independent or integrated into another structure or assembly. For example, the support structure may comprise one or more surfaces within an integrated or assembled microfluidic flow cell. The support structure may comprise one or more surfaces within a microplate format, e.g., the bottom surface of the wells in a microplate. In some aspects, the support structure comprises the interior surface (such as the lumen surface) of a capillary. In some aspects the support structure comprises the interior surface (such as the lumen surface) of a capillary etched into a planar chip.

As noted, the low non-specific binding supports of some aspects of the present disclosure exhibit reduced non-specific binding of proteins, nucleic acids, and other components of the hybridization and/or amplification formulation used for solid-phase nucleic acid amplification. The degree of non-specific binding exhibited by a given support surface may be assessed either qualitatively or quantitatively. For example, exposure of the surface to fluorescent dyes (e.g., cyanins such as Cy3, or Cy5, etc., fluoresceins, coumarins, rhodamines, etc. or other dyes disclosed herein), fluorescently-labeled nucleotides, fluorescently-labeled oligonucleotides, and/or fluorescently-labeled proteins (e.g. polymerases) under a standardized set of conditions, followed by a specified rinse protocol and fluorescence imaging may be used as a qualitative tool for comparison of non-specific binding on supports comprising different surface formulations. In some aspects, exposure of the surface to fluorescent dyes, fluorescently-labeled nucleotides, fluorescently-labeled oligonucleotides, and/or fluorescently-labeled proteins (e.g. polymerases) under a standardized set of conditions, followed by a specified rinse protocol and fluorescence imaging may be used as a quantitative tool for comparison of non-specific binding on supports comprising different surface formulations-provided that care has been taken to ensure that the fluorescence imaging is performed under conditions where fluorescence signal is linearly related (or related in a predictable manner) to the number of fluorophores on the support surface (e.g., under conditions where signal saturation and/or self-quenching of the fluorophore is not an issue) and suitable calibration standards are used. In some aspects, other techniques known to those of skill in the art, for example, radioisotope labeling and counting methods may be used for quantitative assessment of the degree to which non-specific binding is exhibited by the different support surface formulations of some aspects of the present disclosure.

Some surfaces disclosed herein exhibit a ratio of specific to nonspecific binding of a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein. Some surfaces disclosed herein exhibit a ratio of specific to nonspecific fluorescence of a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein.

The degree of non-specific binding exhibited by the disclosed low-binding supports may be assessed using a standardized protocol for contacting the surface with a labeled protein (e.g., bovine serum albumin (BSA), streptavidin, a DNA polymerase, a reverse transcriptase, a helicase, a single-stranded binding protein (SSB), etc., or any combination thereof), a labeled nucleotide, a labeled oligonucleotide, etc., under a standardized set of incubation and rinse conditions, followed be detection of the amount of label remaining on the surface and comparison of the signal resulting therefrom to an appropriate calibration standard. In some aspects, the label may comprise a fluorescent label. In some aspects, the label may comprise a radioisotope. In some aspects, the label may comprise any other detectable label known to one of skill in the art. In some aspects, the degree of non-specific binding exhibited by a given support surface formulation may thus be assessed in terms of the number of non-specifically bound protein molecules (or nucleic acid molecules or other molecules) per unit area. In some aspects, the low-binding supports of the present disclosure may exhibit non-specific protein binding (or non-specific binding of other specified molecules, (e.g., cyanins such as Cy3, or Cy5, etc., fluoresceins, coumarins, rhodamines, etc. or other dyes disclosed herein)) of less than 0.001 molecule per µm2, less than 0.01 molecule per µm2, less than 0.1 molecule per µm2, less than 0.25 molecule per µm2, less than 0.5 molecule per µm2, less than 1 molecule per µm2, less than 10 molecules per µm2, less than 100 molecules per µm2, or less than 1,000 molecules per µm2. Those of skill in the art will realize that a given support surface of aspects of the present disclosure may exhibit non-specific binding falling anywhere within this range, for example, of less than 86 molecules per µm2. For example, some modified surfaces disclosed herein exhibit nonspecific protein binding of less than 0.5 molecule/m2 following contact with a 1 µM solution of Cy3 labeled streptavidin (GE Amersham) in phosphate buffered saline (PBS) buffer for 15 minutes, followed by 3 rinses with deionized water. Some modified surfaces disclosed herein exhibit nonspecific binding of Cy3 dye molecules of less than 0.25 molecules per µm2. In independent nonspecific binding assays, 1 µM labeled Cy3 SA (ThermoFisher), 1 µM Cy5 SA dye (ThermoFisher), 10 µM Aminoallyl-dUTP-ATTO-647N (Jena Biosciences), 10 µM Aminoallyl-dUTP-ATTO-Rho1 1 (Jena Biosciences), 10 µM Aminoallyl-dUTP-ATTO-Rho1 1 (Jena Biosciences), 10 µM 7-Propargylamino-7-deaza-dGTP-Cy5 (Jena Biosciences, and 10 µM 7-Propargylamino-7-deaza-dGTP-Cy3 (Jena Biosciences) were incubated on the low binding coated supports at 37° C. for 15 minutes in a 384 well plate format. Each well was rinsed 2-3× with 50 ul deionized RNase/DNase Free water and 2-3× with 25 mM ACES buffer pH 7.4. The 384 well plates were imaged on a GE Typhoon instrument using the Cy3, AF555, or Cy5 filter sets (according to dye test performed) as specified by the manufacturer at a PMT gain setting of 800 and resolution of 50-100 μm. For higher resolution imaging, images were collected on an Olympus IX83 microscope (e.g., inverted fluorescence microscope) (Olympus Corp., Center Valley, Pa.) with a total internal reflectance fluorescence (TTRF) objective (100×, 1.5 NA, Olympus), a CCD camera (e.g., an Olympus EM-CCD monochrome camera, Olympus XM-10 monochrome camera, or an Olympus DP80 color and monochrome camera), an illumination source (e.g., an Olympus 100 W Hg lamp, an Olympus 75 W Xe lamp, or an Olympus U-HGLGPS fluorescence light source), and excitation wavelengths of 532 nm or 635 nm. Dichroic mirrors were purchased from Semrock (IDEX Health & Science, LLC, Rochester, N.Y.), e.g., 405, 488, 532, or 633 nm dichroic reflectors/beamsplitters, and band pass filters were chosen as 532 LP or 645 LP concordant with the appropriate excitation wavelength. Some modified surfaces disclosed herein exhibit nonspecific binding of dye molecules of less than 0.25 molecules per μm2. In some aspects, the coated support was immersed in a buffer (e.g., 25 mM ACES, pH 7.4) while the image was acquired.

In some aspects, the surfaces disclosed herein exhibit a ratio of specific to nonspecific binding of a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein. In some aspects, the surfaces disclosed herein exhibit a ratio of specific to nonspecific fluorescence signals for a fluorophore such as Cy3 of at least 2, 3, 4, 5, 6, 7, 8, 9, 10, 11, 12, 13, 14, 15, 16, 17, 18, 19, 20, 25, 30, 35, 40, 50, 75, 100, or greater than 100, or any intermediate value spanned by the range herein.

The low-background surfaces consistent with the disclosure herein may exhibit specific dye attachment (e.g., Cy3 attachment) to non-specific dye adsorption (e.g., Cy3 dye adsorption) ratios of at least 4:1, 5:1, 6:1, 7:1, 8:1, 9:1, 10:1, 15:1, 20:1, 30:1, 40:1, 50:1, or more than 50 specific dye molecules attached per molecule nonspecifically adsorbed. Similarly, when subjected to an excitation energy, low-background surfaces consistent with the disclosure herein to which fluorophores, e.g., Cy3, have been attached may exhibit ratios of specific fluorescence signal (e.g., arising from Cy3-labeled oligonucleotides attached to the surface) to non-specific adsorbed dye fluorescence signals of at least 4:1, 5:1, 6:1, 7:1, 8:1, 9:1, 10:1, 15:1, 20:1, 30:1, 40:1, 50:1, or more than 50:1.

In some aspects, the degree of hydrophilicity (or "wettability" with aqueous solutions) of the disclosed support surfaces may be assessed, for example, through the measurement of water contact angles in which a small droplet of water is placed on the surface and its angle of contact with the surface is measured using, e.g., an optical tensiometer. In some aspects, a static contact angle may be determined. In some aspects, an advancing or receding contact angle may be determined. In some aspects, the water contact angle for the hydrophilic, low-binding support surfaced disclosed herein may range from about 0 degrees to about 30 degrees. In some aspects, the water contact angle for the hydrophilic, low-binding support surfaced disclosed herein may no more than 50 degrees, 40 degrees, 30 degrees, 25 degrees, 20 degrees, 18 degrees, 16 degrees, 14 degrees, 12 degrees, 10 degrees, 8 degrees, 6 degrees, 4 degrees, 2 degrees, or 1 degree. In many cases the contact angle is no more than 40 degrees. Those of skill in the art will realize that a given hydrophilic, low-binding support surface of some aspects of the present disclosure may exhibit a water contact angle having a value of anywhere within this range.

In some aspects, the hydrophilic surfaces disclosed herein facilitate reduced wash times for bioassays, often due to reduced nonspecific binding of biomolecules to the low-binding surfaces. In some aspects, adequate wash steps may be performed in less than 60, 50, 40, 30, 20, 15, 10, or less than 10 seconds. For example, adequate wash steps may be performed in less than 30 seconds.

Some low-binding surfaces of the present disclosure exhibit significant improvement in stability or durability to prolonged exposure to solvents and elevated temperatures, or to repeated cycles of solvent exposure or changes in temperature. For example, the stability of the disclosed surfaces may be tested by fluorescently labeling a functional group on the surface, or a tethered biomolecule (e.g., an oligonucleotide primer) on the surface, and monitoring fluorescence signal before, during, and after prolonged exposure to solvents and elevated temperatures, or to repeated cycles of solvent exposure or changes in temperature. In some aspects, the degree of change in the fluorescence used to assess the quality of the surface may be less than 1%, 2%, 3%, 4%, 5%, 10%, 15%, 20%, or 25% over a time period of 1 minute, 2 minutes, 3 minutes, 4 minutes, 5 minutes, 10 minutes, 20 minutes, 30 minutes, 40 minutes, 50 minutes, 60 minutes, 2 hours, 3 hours, 4 hours, 5 hours, 6 hours, 7 hours, 8 hours, 9 hours, 10 hours, 15 hours, 20 hours, 25 hours, 30 hours, 35 hours, 40 hours, 45 hours, 50 hours, or 100 hours of exposure to solvents and/or elevated temperatures (or any combination of these percentages as measured over these time periods). In some aspects, the degree of change in the fluorescence used to assess the quality of the surface may be less than 1%, 2%, 3%, 4%, 5%, 10%, 15%, 20%, or 25% over 5 cycles, 10 cycles, 20 cycles, 30 cycles, 40 cycles, 50 cycles, 60 cycles, 70 cycles, 80 cycles, 90 cycles, 100 cycles, 200 cycles, 300 cycles, 400 cycles, 500 cycles, 600 cycles, 700 cycles, 800 cycles, 900 cycles, or 1,000 cycles of repeated exposure to solvent changes and/or changes in temperature (or any combination of these percentages as measured over this range of cycles).

In some aspects, the surfaces disclosed herein may exhibit a high ratio of specific signal to nonspecific signal or other background. For example, when used for nucleic acid amplification, some surfaces may exhibit an amplification signal that is at least 4, 5, 6, 7, 8, 9, 10, 15, 20, 30, 40, 50, 75, 100, or greater than 100 fold greater than a signal of an adjacent unpopulated region of the surface. Similarly, some surfaces exhibit an amplification signal that is at least 4, 5, 6, 7, 8, 9, 10, 15, 20, 30, 40, 50, 75, 100, or greater than 100 fold greater than a signal of an adjacent amplified nucleic acid population region of the surface.

In some aspects, fluorescence images of the disclosed low background surfaces when used in nucleic acid hybridization or amplification applications to create polonies of hybridized or clonally-amplified nucleic acid molecules (e.g., that have been directly or indirectly labeled with a fluorophore) exhibit contrast-to-noise ratios (CNRs) of at least 10, 20, 30, 40, 50, 60, 70, 80, 90, 100, 110, 120, 130, 140, 150, 160, 170, 180, 190, 20, 210, 220, 230, 240, 250, or greater than 250.

One or more types of primer may be attached or tethered to the support surface. In some aspects, the one or more types of adapters or primers may comprise spacer sequences, adapter sequences for hybridization to adapter-ligated target library nucleic acid sequences, forward amplification primers, reverse amplification primers, sequencing primers, and/or molecular barcoding sequences, or any combination thereof. In some aspects, 1 primer or adapter sequence may be tethered to at least one layer of the surface. In some aspects, at least 2, 3, 4, 5, 6, 7, 8, 9, 10, or more than 10 different primer or adapter sequences may be tethered to at least one layer of the surface.

In some aspects, the tethered adapter and/or primer sequences may range in length from about 10 nucleotides to about 100 nucleotides. In some aspects, the tethered adapter and/or primer sequences may be at least 10, at least 20, at least 30, at least 40, at least 50, at least 60, at least 70, at least 80, at least 90, or at least 100 nucleotides in length. In some aspects, the tethered adapter and/or primer sequences may be at most 100, at most 90, at most 80, at most 70, at most 60, at most 50, at most 40, at most 30, at most 20, or at most 10 nucleotides in length. Any of the lower and upper values described in this paragraph may be combined to form a range included within the present disclosure, for example, in some aspects the length of the tethered adapter and/or primer sequences may range from about 20 nucleotides to about 80 nucleotides. Those of skill in the art will recognize that the length of the tethered adapter and/or primer sequences may have any value within this range, e.g., about 24 nucleotides.

In some aspects, the resultant surface density of primers (e.g., capture primers) on the low binding support surfaces of the present disclosure may range from about 100 primer molecules per µm2 to about 100,000 primer molecules per µm2. In some aspects, the resultant surface density of primers on the low binding support surfaces of the present disclosure may range from about 1,000 primer molecules per µm2 to about 1,000,000 primer molecules per µm2. In some aspects, the surface density of primers may be at least 1,000, at least 10,000, at least 100,000, or at least 1,000,000 molecules per µm2. In some aspects, the surface density of primers may be at most 1,000,000, at most 100,000, at most 10,000, or at most 1,000 molecules per µm2. Any of the lower and upper values described in this paragraph may be combined to form a range included within the present disclosure, for example, in some aspects the surface density of primers may range from about 10,000 molecules per µm2 to about 100,000 molecules per µm2. Those of skill in the art will recognize that the surface density of primer molecules may have any value within this range, e.g., about 455,000 molecules per µm2. In some aspects, the surface density of target library nucleic acid sequences initially hybridized to adapter or primer sequences on the support surface may be less than or equal to that indicated for the surface density of tethered primers. In some aspects, the surface density of clonally-amplified target library nucleic acid sequences hybridized to adapter or primer sequences on the support surface may span the same range as that indicated for the surface density of tethered primers.

Local densities as listed above do not preclude variation in density across a surface, such that a surface may comprise a region having an oligo density of, for example, 500,000/µm2, while also comprising at least a second region having a substantially different local density.

In some aspects, the performance of nucleic acid hybridization and/or amplification reactions using the disclosed reaction formulations and low-binding supports may be assessed using fluorescence imaging techniques, where the contrast-to-noise ratio (CNR) of the images provides a key metric in assessing amplification specificity and non-specific binding on the support. CNR is commonly defined as: CNR=(Signal−Background)/Noise. The background term is commonly taken to be the signal measured for the interstitial regions surrounding a particular feature (diffraction limited spot, DLS) in a specified region of interest (ROI). While signal-to-noise ratio (SNR) is often considered to be a benchmark of overall signal quality, it can be shown that improved CNR can provide a significant advantage over SNR as a benchmark for signal quality in applications that require rapid image capture (e.g., sequencing applications for which cycle times must be minimized), as shown in the example below. At high CNR the imaging time required to reach accurate discrimination (and thus accurate base-calling in the case of sequencing applications) can be drastically reduced even with moderate improvements in CNR. Improved CNR in imaging data on the imaging integration time provides a method for more accurately detecting features such as clonally-amplified nucleic acid colonies on the support surface.

In most ensemble-based sequencing approaches, the background term is typically measured as the signal associated with 'interstitial' regions. In addition to "interstitial" background (Binter), "intrastitial" background (Bintra) exists within the region occupied by an amplified DNA colony. The combination of these two background signals dictates the achievable CNR, and subsequently directly impacts the optical instrument requirements, architecture costs, reagent costs, run-times, cost/genome, and ultimately the accuracy and data quality for cyclic array-based sequencing applications. The Binter background signal arises from a variety of sources; a few examples include auto-fluorescence from consumable flow cells, non-specific adsorption of detection molecules that yield spurious fluorescence signals that may obscure the signal from the ROI, the presence of non-specific DNA amplification products (e.g., those arising from primer dimers). In typical next generation sequencing (NGS) applications, this background signal in the current field-of-view (FOV) is averaged over time and subtracted. The signal arising from individual DNA colonies (i.e., (Signal)-B(interstial) in the FOV) yields a discernable feature that can be classified. In some aspects, the intrastitial background (B(intrastitial)) can contribute a confounding fluorescence signal that is not specific to the target of interest, but is present in the same ROI thus making it far more difficult to average and subtract.

Nucleic acid amplification on the low-binding coated supports described herein may decrease the B(interstitial) background signal by reducing non-specific binding, may lead to improvements in specific nucleic acid amplification, and may lead to a decrease in non-specific amplification that can impact the background signal arising from both the interstitial and intrastitial regions. In some aspects, the disclosed low-binding coated supports, optionally used in combination with the disclosed hybridization and/or amplification reaction formulations, may lead to improvements in CNR by a factor of 2, 5, 10, 100, 250, 500 or 1000-fold over those achieved using conventional supports and hybridization, amplification, and/or sequencing protocols. Although described here in the context of using fluorescence imaging as the read-out or detection mode, the same principles apply to the use of the disclosed low-binding coated supports and nucleic acid hybridization and amplification formulations for other detection modes as well, including both optical and non-optical detection modes.

The headings provided herein are not limitations of the various aspects of the disclosure, which aspects can be understood by reference to the specification as a whole.

Unless defined otherwise, technical and scientific terms used herein have meanings that are commonly understood by those of ordinary skill in the art unless defined otherwise.

Generally, terminologies pertaining to techniques of molecular biology, nucleic acid chemistry, protein chemistry, genetics, microbiology, transgenic cell production, and hybridization described herein are those well-known and commonly used in the art. Techniques and procedures described herein are generally performed according to conventional methods well known in the art and as described in various general and more specific references that are cited and discussed throughout the instant specification. For example, see Sambrook et al., Molecular Cloning: A Laboratory Manual (Third ed., Cold Spring Harbor Laboratory Press, Cold Spring Harbor, N.Y. 2000). See also Ausubel et al., Current Protocols in Molecular Biology, Greene Publishing Associates (1992). The nomenclatures utilized in connection with, and the laboratory procedures and techniques described herein are those well-known and commonly used in the art.

Unless otherwise required by context herein, singular terms shall include pluralities and plural terms shall include the singular. Singular forms "a", "an" and "the", and singular use of any word, include plural referents unless expressly and unequivocally limited on one referent.

It is understood the use of the alternative term (e.g., "or") is taken to mean either one or both or any combination thereof of the alternatives.

The term "and/or" used herein is to be taken mean specific disclosure of each of the specified features or components with or without the other. For example, the term "and/or" as used in a phrase such as "A and/or B" herein is intended to include: "A and B"; "A or B"; "A" (A alone); and "B" (B alone). In a similar manner, the term "and/or" as used in a phrase such as "A, B, and/or C" is intended to encompass each of the following aspects: "A, B, and C"; "A, B, or C"; "A or C"; "A or B"; "B or C"; "A and B"; "B and C"; "A and C"; "A" (A alone); "B" (B alone); and "C" (C alone).

As used herein and in the appended claims, terms "comprising", "including", "having" and "containing", and their grammatical variants, as used herein are intended to be non-limiting so that one item or multiple items in a list do not exclude other items that can be substituted or added to the listed items. It is understood that wherever aspects are described herein with the language "comprising," otherwise analogous aspects described in terms of "consisting of" and/or "consisting essentially of" are also provided.

As used herein, the terms "about," "approximately," and "substantially" refer to a value or composition that is within an acceptable error range for the particular value or composition as determined by one of ordinary skill in the art, which will depend in part on how the value or composition is measured or determined, i.e., the limitations of the measurement system. For example, "about," "approximately," or "substantially" can mean within one or more than one standard deviation per the practice in the art. Alternatively, "about" or "approximately" can mean a range of up to 10% (i.e., ±10%) or more depending on the limitations of the measurement system. For example, about 5 mg can include any number between 4.5 mg and 5.5 mg. Furthermore, particularly with respect to biological systems or processes, the terms can mean up to an order of magnitude or up to 5-fold of a value. When particular values or compositions are provided in the instant disclosure, unless otherwise stated, the meaning of "about," "approximately," "substantially" should be assumed to be within an acceptable error range for that particular value or composition. Also, where ranges and/or subranges of values are provided, the ranges and/or subranges can include the endpoints of the ranges and/or subranges.

The term "polony" used herein refers to a nucleic acid library molecule can be clonally amplified in-solution or on-support to generate an amplicon that can serve as a template molecule for sequencing. In some aspects, a linear library molecule can be circularized to generate a circularized library molecule, and the circularized library molecule can be clonally amplified in-solution or on-support to generate a concatemer. In some aspects, the concatemer can serve as a nucleic acid template molecule which can be sequenced. The concatemer is sometimes referred to as a polony. In some aspects, a polony includes nucleotide strands.

The terms "peptide", "polypeptide" and "protein" and other related terms used herein are used interchangeably and refer to a polymer of amino acids and are not limited to any particular length. Polypeptides may comprise natural and non-natural amino acids. Polypeptides include recombinant or chemically-synthesized forms. Polypeptides also include precursor molecules that have not yet been subjected to post-translation modification such as proteolytic cleavage, cleavage due to ribosomal skipping, hydroxylation, methylation, lipidation, acetylation, SUMOylation, ubiquitination, glycosylation, phosphorylation and/or disulfide bond formation. These terms encompass native and artificial proteins, protein fragments and polypeptide analogs (such as muteins, variants, chimeric proteins and fusion proteins) of a protein sequence as well as post-translationally, or otherwise covalently or non-covalently, modified proteins.

The term "polymerase" and its variants, as used herein, comprises any enzyme that can catalyze polymerization of nucleotides (including analogs thereof) into a nucleic acid strand. Typically but not necessarily such nucleotide polymerization can occur in a template-dependent fashion. Typically, a polymerase comprises one or more active sites at which nucleotide binding and/or catalysis of nucleotide polymerization can occur. In some aspects, a polymerase includes other enzymatic activities, such as for example, 3' to 5' exonuclease activity or 5' to 3' exonuclease activity. In some aspects, a polymerase has strand displacing activity. A polymerase can include without limitation naturally occurring polymerases and any subunits and truncations thereof, mutant polymerases, variant polymerases, recombinant, fusion or otherwise engineered polymerases, chemically modified polymerases, synthetic molecules or assemblies, and any analogs, derivatives or fragments thereof that retain the ability to catalyze nucleotide polymerization (e.g., catalytically active fragment). In some aspects, a polymerase can be isolated from a cell, or generated using recombinant DNA technology or chemical synthesis methods. In some aspects, a polymerase can be expressed in prokaryote, eukaryote, viral, or phage organisms. In some aspects, a polymerase can be post-translationally modified proteins or fragments thereof. A polymerase can be derived from a prokaryote, eukaryote, virus or phage. A polymerase comprises DNA-directed DNA polymerase and RNA-directed DNA polymerase.

As used herein, the term "fidelity" refers to the accuracy of DNA polymerization by template-dependent DNA polymerase. The fidelity of a DNA polymerase is typically measured by the error rate (the frequency of incorporating an inaccurate nucleotide, i.e., a nucleotide that is not complementary to the template nucleotide). The accuracy or fidelity of DNA polymerization is maintained by both the polymerase activity and the 3'-5' exonuclease activity of a DNA polymerase.

As used herein, the term "binding complex" refers to a complex formed by binding together a nucleic acid duplex, a polymerase, and a free nucleotide or a nucleotide unit of a multivalent molecule, where the nucleic acid duplex comprises a nucleic acid template molecule hybridized to a nucleic acid primer. In the binding complex, the free nucleotide or nucleotide unit may or may not be bound to the 3' end of the nucleic acid primer at a position that is opposite a complementary nucleotide in the nucleic acid template molecule. A "ternary complex" is an example of a binding complex which is formed by binding together a nucleic acid duplex, a polymerase, and a free nucleotide or nucleotide unit of a multivalent molecule, where the free nucleotide or nucleotide unit is bound to the 3' end of the nucleic acid primer (as part of the nucleic acid duplex) at a position that is opposite a complementary nucleotide in the nucleic acid template molecule.

The term "persistence time" and related terms refers to the length of time that a binding complex remains stable without dissociation of any of the components, where the components of the binding complex include a nucleic acid template and nucleic acid primer, a polymerase, a nucleotide unit of a multivalent molecule or a free (e.g., unconjugated) nucleotide. The nucleotide unit or the free nucleotide can be complementary or non-complementary to a nucleotide residue in the template molecule. The nucleotide unit or the free nucleotide can bind to the 3' end of the nucleic acid primer at a position that is opposite a complementary nucleotide residue in the nucleic acid template molecule. The persistence time is indicative of the stability of the binding complex and strength of the binding interactions. Persistence time can be measured by observing the onset and/or duration of a binding complex, such as by observing a signal from a labeled component of the binding complex. For example, a labeled nucleotide or a labeled reagent comprising one or more nucleotides may be present in a binding complex, thus allowing the signal from the label to be detected during the persistence time of the binding complex. One exemplary label is a fluorescent label. The binding complex (e.g., ternary complex) remains stable until subjected to a condition that causes dissociation of interactions between any of the polymerase, template molecule, primer and/or the nucleotide unit or the nucleotide. For example, a dissociating condition comprises contacting the binding complex with any one or any combination of a detergent, EDTA and/or water.

The terms "nucleic acid", "polynucleotide" and "oligonucleotide" and other related terms used herein are used interchangeably and refer to polymers of nucleotides and are not limited to any particular length. Nucleic acids include recombinant and chemically-synthesized forms. Nucleic acids include DNA molecules (e.g., cDNA or genomic DNA), RNA molecules (e.g., mRNA), analogs of the DNA or RNA generated using nucleotide analogs (e.g., peptide nucleic acids and non-naturally occurring nucleotide analogs), and chimeric forms containing DNA and RNA. Nucleic acids can be single-stranded or double-stranded. Nucleic acids comprise polymers of nucleotides, where the nucleotides include natural or non-natural bases and/or sugars. Nucleic acids comprise naturally-occurring internucleosidic linkages, for example phosphdiester linkages. Nucleic acids comprise non-natural internucleoside linkages, including phosphorothioate, phosphorothiolate, or peptide nucleic acid (PNA) linkages. In some aspects, nucleic acids comprise a one type of polynucleotides or a mixture of two or more different types of polynucleotides.

The term "primer" and related terms used herein refers to an oligonucleotide, either natural or synthetic, that is capable of hybridizing with a DNA and/or RNA polynucleotide template to form a duplex molecule. Primers may have any length, but typically range from 4-50 nucleotides. A typical primer comprises a 5' end and 3' end. The 3' end of the primer can include a 3' OH moiety which serves as a nucleotide polymerization initiation site in a polymerase-mediated primer extension reaction. Alternatively, the 3' end of the primer can lack a 3' OH moiety, or can include a terminal 3' blocking group that inhibits nucleotide polymerization in a polymerase-mediated reaction. Any one nucleotide, or more than one nucleotide, along the length of the primer can be labeled with a detectable reporter moiety. A primer can be in solution (e.g., a soluble primer) or can be immobilized to a support (e.g., a capture primer).

The term "template nucleic acid", "template polynucleotide", "target nucleic acid" "target polynucleotide", "template strand" and other variations refer to a nucleic acid strand that serves as the basis nucleic acid molecule for generating a complementary nucleic acid strand. The template nucleic acid can be single-stranded or double-stranded, or the template nucleic acid can have single-stranded or double-stranded portions. The sequence of the template nucleic acid can be partially or wholly complementary to the sequence of the complementary strand. The template nucleic acid can be obtained from a naturally-occurring source, recombinant form, or chemically synthesized to include any type of nucleic acid analog. The template nucleic acid can be linear, circular, or other forms. The template nucleic acids can include an insert region having an insert sequence which is also known as a sequence of interest. The template nucleic acids can also include at least one adaptor sequence. The template nucleic acid can be a concatemer having two or tandem copies of a sequence of interest and at least one adaptor sequence. The insert region can be isolated in any form, including chromosomal, genomic, organellar (e.g., mitochondrial, chloroplast or ribosomal), recombinant molecules, cloned, amplified, cDNA, RNA such as precursor mRNA or mRNA, oligonucleotides, whole genomic DNA, obtained from fresh frozen paraffin embedded tissue, needle biopsies, cell free circulating DNA, or any type of nucleic acid library. The insert region can be isolated from any source including from organisms such as prokaryotes, eukaryotes (e.g., humans, plants and animals), fungus, viruses cells, tissues, normal or diseased cells or tissues, body fluids including blood, urine, serum, lymph, tumor, saliva, anal and vaginal secretions, amniotic samples, perspiration, semen, environmental samples, culture samples, or synthesized nucleic acid molecules prepared using recombinant molecular biology or chemical synthesis methods. The insert region can be isolated from any organ, including head, neck, brain, breast, ovary, cervix, colon, rectum, endometrium, gallbladder, intestines, bladder, prostate, testicles, liver, lung, kidney, esophagus, pancreas, thyroid, pituitary, thymus, skin, heart, larynx, or other organs. The template nucleic acid can be subjected to nucleic acid analysis, including sequencing and composition analysis.

When used in reference to nucleic acid molecules, the terms "hybridize" or "hybridizing" or "hybridization" or other related terms refers to hydrogen bonding between two different nucleic acids to form a duplex nucleic acid. Hybridization also includes hydrogen bonding between two different regions of a single nucleic acid molecule to form a self-hybridizing molecule having a duplex region. Hybridization can comprise Watson-Crick or Hoogstein binding to form a duplex double-stranded nucleic acid, or a double-stranded region within a nucleic acid molecule. The double-stranded nucleic acid, or the two different regions of a single nucleic acid, may be wholly complementary, or partially complementary. Complementary nucleic acid strands need not hybridize with each other across their entire length. The complementary base pairing can be the standard A-T or C-G base pairing, or can be other forms of base-pairing interactions. Duplex nucleic acids can include mismatched base-paired nucleotides.

The term "nucleotides" and related terms refers to a molecule comprising an aromatic base, a five carbon sugar (e.g., ribose or deoxyribose), and at least one phosphate group. Canonical or non-canonical nucleotides are consistent with use of the term. The phosphate in some aspects comprises a monophosphate, diphosphate, or triphosphate, or corresponding phosphate analog. In some aspects, the nucleotide comprises 1, 2, 3, 4, 5, 6, 7, 8, 9 or 10 phosphate groups. The term "nucleoside" refers to a molecule comprising an aromatic base and a sugar.

Nucleotides (and nucleosides) typically comprise a hetero cyclic base including substituted or unsubstituted nitrogen-containing parent heteroaromatic ring which are commonly found in nucleic acids, including naturally-occurring, substituted, modified, or engineered variants, or analogs of the same. The base of a nucleotide (or nucleoside) is capable of forming Watson-Crick and/or Hoogstein hydrogen bonds with an appropriate complementary base. Exemplary bases include, but are not limited to, purines and pyrimidines such as: 2-aminopurine, 2,6-diaminopurine, adenine (A), etheno-adenine, N6-Δ2-isopentenyladenine (6iA), N6-Δ2-isopentenyl-2-methylthioadenine (2ms6iA), N6-methyladenine, guanine (G), isoguanine, N2-dimethylguanine (dmG), 7-methylguanine (7mG), 2-thiopyrimidine, 6-thioguanine (6sG), hypoxanthine and 06-methylguanine; 7-deaza-purines such as 7-deazaadenine (7-deaza-A) and 7-deazaguanine (7-deaza-G); pyrimidines such as cytosine (C), 5-propynylcytosine, isocytosine, thymine (T), 4-thiothymine (4sT), 5,6-dihydrothymine, O4-methylthymine, uracil (U), 4-thiouracil (4sU) and 5,6-dihydrouracil (dihydrouracil; D); indoles such as nitroindole and 4-methylindole; pyrroles such as nitropyrrole; nebularine; inosines; hydroxymethylcytosines; 5-methycytosines; base (Y); as well as methylated, glycosylated, and acylated base moieties; and the like. Additional exemplary bases can be found in Fasman, 1989, in "Practical Handbook of Biochemistry and Molecular Biology", pp. 385-394, CRC Press, Boca Raton, Fla.

Nucleotides (and nucleosides) typically comprise a sugar moiety, such as carbocyclic moiety (Ferraro and Gotor 2000 Chem. Rev. 100: 4319-48), acyclic moieties (Martinez, et al., 1999 Nucleic Acids Research 27: 1271-1274; Martinez, et al., 1997 Bioorganic & Medicinal Chemistry Letters vol. 7: 3013-3016), and other sugar moieties (Joeng, et al., 1993 J. Med. Chem. 36: 2627-2638; Kim, et al., 1993 J. Med. Chem. 36: 30-7; Eschenmosser 1999 Science 284:2118-2124; and U.S. Pat. No. 5,558,991). The sugar moiety comprises: ribosyl; 2'-deoxyribosyl; 3'-deoxyribosyl; 2',3'-dideoxyribosyl; 2',3'-didehydrodideoxyribosyl; 2'-alkoxyribosyl; 2'-azidoribosyl; 2'-aminoribosyl; 2'-fluororibosyl; 2'-mercaptoriboxyl; 2'-alkylthioribosyl; 3'-alkoxyribosyl; 3'-azidoribosyl; 3'-aminoribosyl; 3'-fluororibosyl; 3'-mercaptoriboxyl; 3'-alkylthioribosyl carbocyclic; acyclic or other modified sugars.

In some aspects, nucleotides comprise a chain of one, two or three phosphorus atoms where the chain is typically attached to the 5' carbon of the sugar moiety via an ester or phosphoramide linkage. In some aspects, the nucleotide is an analog having a phosphorus chain in which the phosphorus atoms are linked together with intervening O, S, NH, methylene or ethylene. In some aspects, the phosphorus atoms in the chain include substituted side groups including O, S or BH3. In some aspects, the chain includes phosphate groups substituted with analogs including phosphoramidate, phosphorothioate, phosphordithioate, and O-methylphosphoroamidite groups.

When used in reference to nucleic acids, the terms "extend", "extending", "extension" and other variants, refers to incorporation of one or more nucleotides into a nucleic acid molecule. Nucleotide incorporation comprises polymerization of one or more nucleotides into the terminal 3' OH end of a nucleic acid strand, resulting in extension of the nucleic acid strand. Nucleotide incorporation can be conducted with natural nucleotides and/or nucleotide analogs. Typically, but not necessarily, nucleotide incorporation occurs in a template-dependent fashion. Any suitable method of extending a nucleic acid molecule may be used, including primer extension catalyzed by a DNA polymerase or RNA polymerase.

The term "reporter moiety", "reporter moieties" or related terms refers to a compound that generates, or causes to generate, a detectable signal. A reporter moiety is sometimes called a "label". Any suitable reporter moiety may be used, including luminescent, photoluminescent, electroluminescent, bioluminescent, chemiluminescent, fluorescent, phosphorescent, chromophore, radioisotope, electrochemical, mass spectrometry, Raman, hapten, affinity tag, atom, or an enzyme. A reporter moiety generates a detectable signal resulting from a chemical or physical change (e.g., heat, light, electrical, pH, salt concentration, enzymatic activity, or proximity events). A proximity event includes two reporter moieties approaching each other, or associating with each other, or binding each other. It is well known to one skilled in the art to select reporter moieties so that each absorbs excitation radiation and/or emits fluorescence at a wavelength distinguishable from the other reporter moieties to permit monitoring the presence of different reporter moieties in the same reaction or in different reactions. Two or more different reporter moieties can be selected having spectrally distinct emission profiles, or having minimal overlapping spectral emission profiles. Reporter moieties can be linked (e.g., operably linked) to nucleotides, nucleosides, nucleic acids, enzymes (e.g., polymerases or reverse transcriptases), or support (e.g., surfaces).

A reporter moiety (or label) comprises a fluorescent label or a fluorophore. Exemplary fluorescent moieties which may serve as fluorescent labels or fluorophores include, but are not limited to fluorescein and fluorescein derivatives such as carboxyfluorescein, tetrachlorofluorescein, hexachlorofluorescein, carboxynapthofluorescein, fluorescein isothiocyanate, NHS-fluorescein, iodoacetamidofluorescein, fluorescein maleimide, SAMSA-fluorescein, fluorescein thiosemicarbazide, carbohydrazinomethylthioacetyl-amino fluorescein, rhodamine and rhodamine derivatives such as TRITC, TMR, lissamine rhodamine, Texas Red, rhodamine B, rhodamine 6G, rhodamine 10, NHS-rhodamine, TMR-iodoacetamide, lissamine rhodamine B sulfonyl chloride, lissamine rhodamine B sulfonyl hydrazine, Texas Red sulfonyl chloride, Texas Red hydrazide, coumarin and coumarin derivatives such as AMCA, AMCA-NHS, AMCA-sulfoNHS, AMCA-HPDP, DCIA, AMCE-hydrazide, BODIPY and derivatives such as BODIPY FL C3-SE, BODIPY 530/550 C3, BODIPY 530/550 C3-SE, BODIPY 530/550 C3 hydrazide, BODIPY 493/503 C3 hydrazide, BODIPY FL C3 hydrazide, BODIPY FL IA, BODIPY 530/551 IA, Br-BODIPY 493/503, Cascade Blue and derivatives such as Cascade Blue acetyl azide, Cascade Blue cadaverine, Cascade Blue ethylenediamine, Cascade Blue hydrazide, Lucifer Yellow and derivatives such as Lucifer Yellow iodoacetamide, Lucifer Yellow CH, cyanine and derivatives such as indolium based cyanine dyes, benzo-indolium based cyanine dyes, pyridium based cyanine dyes, thiozolium based cyanine dyes, quinolinium based cyanine dyes, imidazolium based cyanine dyes, Cy 3, Cy5, lanthanide chelates and derivatives such as BCPDA, TBP, TMT, BHHCT, BCOT, Europium chelates, Terbium chelates, Alexa Fluor dyes, DyLight dyes, Atto dyes, LightCycler Red dyes, CAL Flour dyes, JOE and derivatives thereof, Oregon Green dyes, WellRED dyes, IRD dyes, phycoerythrin and phycobilin dyes, Malachite green, stilbene, DEG dyes, NR dyes, near-infrared dyes and others known in the art such as those described in Haugland, Molecular Probes Handbook, (Eugene, Oreg.) 6th Edition; Lakowicz, Principles of Fluorescence Spectroscopy, 2nd Ed., Plenum Press New York (1999), or Hermanson, Bioconjugate Techniques, 2nd Edition, or derivatives thereof, or any combination thereof. Cyanine dyes may exist in either sulfonated or non-sulfonated forms, and consist of two indolenin, benzoindolium, pyridium, thiozolium, and/or quinolinium groups separated by a polymethine bridge between two nitrogen atoms. Commercially available cyanine fluorophores include, for example, Cy3, (which may comprise 1-[6-(2,5-dioxopyrrolidin-1-yloxy)-6-oxohexyl]-2-(3-{1-[6-(2,5-dioxopyrrolidin-1-yloxy)-6-oxohexyl]-3,3-dimethyl-1,3-dihydro-2H-indol-2-ylidene}prop-1-en-1-yl)-3,3-dimethyl-3H-indolium or 1-[6-(2,5-dioxopyrrolidin-1-yloxy)-6-oxohexyl]-2-(3-{1-[6-(2,5-dioxopyrrolidin-1-yloxy)-6-oxohexyl]-3,3-dimethyl-5-sulfo-1,3-dihydro-2H-indol-2-ylidene}prop-1-en-1-yl)-3,3-dimethyl-3H-indolium-5-sulfonate), Cy5 (which may comprise 1-(6-((2,5-dioxopyrrolidin-1-yl)oxy)-6-oxohexyl)-2-((1E,3E)-5-((E)-1-(6-((2,5-dioxopyrrolidin-1-yl)oxy)-6-oxohexyl)-3,3-dimethyl-5-indolin-2-ylidene)penta-1,3-dien-1-yl)-3,3-dimethyl-3H-indol-1-ium or 1-(6-((2,5-dioxopyrrolidin-1-yl)oxy)-6-oxohexyl)-2-((1E,3E)-5-((E)-1-(6-((2,5-dioxopyrrolidin-1-yl)oxy)-6-oxohexyl)-3,3-dimethyl-5-sulfoindolin-2-ylidene)penta-1,3-dien-1-yl)-3,3-dimethyl-3H-indol-1-ium-5-sulfonate), and Cy7 (which may comprise 1-(5-carboxypentyl)-2-[(1E,3E,5E,7Z)-7-(1-ethyl-1,3-dihydro-2H-indol-2-ylidene)hepta-1,3,5-trien-1-yl]-3H-indolium or 1-(5-carboxypentyl)-2-[(1E,3E,5E,7Z)-7-(1-ethyl-5-sulfo-1,3-dihydro-2H-indol-2-ylidene)hepta-1,3,5-trien-1-yl]-3H-indolium-5-sulfonate), where "Cy" stands for 'cyanine', and the first digit identifies the number of carbon atoms between two indolenine groups. Cy2 which is an oxazole derivative rather than indolenin, and the benzo-derivatized Cy3.5, Cy5.5 and Cy7.5 are exceptions to this rule.

In some aspects, the reporter moiety can be a FRET pair, such that multiple classifications can be performed under a single excitation and imaging step. As used herein, FRET may comprise excitation exchange (Forster) transfers, or electron-exchange (Dexter) transfers.

The terms "linked", "joined", "attached", and variants thereof comprise any type of fusion, bond, adherence or association between any combination of compounds or molecules that is of sufficient stability to withstand use in the particular procedure. The procedure can include but are not limited to: nucleotide transient-binding; nucleotide incorporation; de-blocking; washing; removing; flowing; detecting; imaging and/or identifying. Such linkage can comprise, for example, covalent, ionic, hydrogen, dipole-dipole, hydrophilic, hydrophobic, or affinity bonding, bonds or associations involving van der Waals forces, mechanical bonding, and the like. In some aspects, such linkage occurs intramolecularly, for example linking together the ends of a single-stranded or double-stranded linear nucleic acid molecule to form a circular molecule. In some aspects, such linkage can occur between a combination of different molecules, or between a molecule and a non-molecule, including but not limited to: linkage between a nucleic acid molecule and a solid surface; linkage between a protein and a detectable reporter moiety; linkage between a nucleotide and detectable reporter moiety; and the like. Some examples of linkages can be found, for example, in Hermanson, G., "Bioconjugate Techniques", Second Edition (2008); Aslam, M., Dent, A., "Bioconjugation: Protein Coupling Techniques for the Biomedical Sciences", London: Macmillan (1998); Aslam, M., Dent, A., "Bioconjugation: Protein Coupling Techniques for the Biomedical Sciences", London: Macmillan (1998).

The term "operably linked" and "operably joined" or related terms as used herein refers to juxtaposition of components. The juxtapositioned components can be linked together covalently. For example, two nucleic acid components can be enzymatically ligated together where the linkage that joins together the two components comprises phosphodiester linkage. A first and second nucleic acid component can be linked together, where the first nucleic acid component can confer a function on a second nucleic acid component. For example, linkage between a primer binding sequence and a sequence of interest forms a nucleic acid library molecule having a portion that can bind to a primer. In another example, a transgene (e.g., a nucleic acid encoding a polypeptide or a nucleic acid sequence of interest) can be ligated to a vector where the linkage permits expression or functioning of the transgene sequence contained in the vector. In some aspects, a transgene is operably linked to a host cell regulatory sequence (e.g., a promoter sequence) that affects expression of the transgene. In some aspects, the vector comprises at least one host cell regulatory sequence, including a promoter sequence, enhancer, transcription and/or translation initiation sequence, transcription and/or translation termination sequence, polypeptide secretion signal sequences, and the like. In some aspects, the host cell regulatory sequence controls expression of the level, timing and/or location of the transgene.

The term "adaptor" and related terms refers to oligonucleotides that can be operably linked (appended) to a target polynucleotide, where the adaptor confers a function to the co-joined adaptor-target molecule. Adaptors comprise DNA, RNA, chimeric DNA/RNA, or analogs thereof. Adaptors can include at least one ribonucleoside residue. Adaptors can be single-stranded, double-stranded, or have single-stranded and/or double-stranded portions. Adaptors can be configured to be linear, stem-looped, hairpin, or Y-shaped forms. Adaptors can be any length, including 4-100 nucleotides or longer. Adaptors can have blunt ends, overhang ends, or a combination of both. Overhang ends include 5' overhang and 3' overhang ends. The 5' end of a single-stranded adaptor, or one strand of a double-stranded adaptor, can have a 5' phosphate group or lack a 5' phosphate group. Adaptors can include a 5' tail that does not hybridize to a target polynucleotide (e.g., tailed adaptor), or adaptors can be non-tailed. An adaptor can include a sequence that is complementary to at least a portion of a primer, such as an amplification primer, a sequencing primer, or a capture primer (e.g., soluble or immobilized capture primers). Adaptors can include a random sequence or degenerate sequence. Adaptors can include at least one inosine residue. Adaptors can include at least one phosphorothioate, phosphorothiolate and/or phosphoramidate linkage. Adaptors can include a barcode sequence which can be used to distinguish polynucleotides (e.g., insert sequences) from different sample sources in a multiplex assay. Adaptors can include a unique identification sequence (e.g., unique molecular index, UMI; or a unique molecular tag) that can be used to uniquely identify a nucleic acid molecule to which the adaptor is appended. In some aspects, a unique identification sequence can be used to increase error correction and accuracy, reduce the rate of false-positive variant calls and/or increase sensitivity of variant detection. Adaptors can include at least one restriction enzyme recognition sequence, including any one or any combination of two or more selected from a group consisting of type I, type II, type III, type IV, type IIs or type IIB.

The term "universal sequence", "universal adaptor sequences" and related terms refers to a sequence in a nucleic acid molecule that is common among two or more polynucleotide molecules. For example, adaptors having the same universal sequence can be joined to a plurality of polynucleotides so that the population of co-joined molecules carry the same universal adaptor sequence. Examples of universal adaptor sequences include an amplification primer sequence, a sequencing primer sequence or a capture primer sequence (e.g., soluble or support-immobilized capture primers).

Some aspects of the present disclosure provide a plurality (e.g., two or more) of nucleic acid templates immobilized to a support. In some aspects, the immobilized plurality of nucleic acid templates have the same sequence or have different sequences. In some aspects, individual nucleic acid template molecules in the plurality of nucleic acid templates are immobilized to a different site on the support. In some aspects, two or more individual nucleic acid template molecules in the plurality of nucleic acid templates are immobilized to a site on the support. In some aspects, the support comprises a plurality of sites arranged in an array. The term "array" refers to a support comprising a plurality of sites located at pre-determined locations on the support to form an array of sites. The sites can be discrete and separated by interstitial regions. In some aspects, the pre-determined sites on the support can be arranged in one dimension in a row or a column, or arranged in two dimensions in rows and columns. In some aspects, the plurality of pre-determined sites is arranged on the support in an organized fashion. In some aspects, the plurality of pre-determined sites is arranged in any organized pattern, including rectilinear, hexagonal patterns, grid patterns, patterns having reflective symmetry, patterns having rotational symmetry, or the like. The pitch between different pairs of sites can be that same or can vary. In some aspects, the support can have nucleic acid template molecules immobilized at a plurality of sites at a surface density of about $10^2$-$10^{15}$ sites per mm$^2$, or more, to form a nucleic acid template array. In some aspects, the support comprises at least $10^2$ sites, at least $10^3$ sites, at least $10^4$ sites, at least $10^5$ sites, at least $10^6$ sites, at least $10^7$ sites, at least $10^8$ sites, at least $10^9$ sites, at least $10^{10}$ sites, at least $10^{11}$ sites, at least $10^{12}$ sites, at least $10^{13}$ sites, at least $10^{14}$ sites, at least $10^{15}$ sites, or more, where the sites are located at pre-determined locations on the support. In some aspects, a plurality of pre-determined sites on the support (e.g., $10^2$-$10^{15}$ sites or more) are immobilized with nucleic acid templates to form a nucleic acid template array. In some aspects, the nucleic acid templates that are immobilized at a plurality of pre-determined sites by hybridization to immobilized surface capture primers, or the nucleic acid templates are covalently attached to the surface capture primers. In some aspects, the nucleic acid templates that are immobilized at a plurality of pre-determined sites, for example immobilized at $10^2$-$10^{15}$ sites or more. In some aspects, the nucleic acid templates that are immobilized at a plurality of sites on the support comprise linear or circular nucleic acid template molecules or a mixture of both linear and circular molecules. In some aspects, the immobilized nucleic acid templates are clonally-amplified to generate immobilized nucleic acid polonies at the plurality of pre-determined sites. In some aspects, individual immobilized nucleic acid template molecules comprise one copy of a target sequence of interest, or comprise concatemers having two or more tandem copies of a target sequence of interest.

In some aspects, a support comprising a plurality of sites located at random locations on the support is referred to herein as a support having randomly located sites thereon. The location of the randomly located sites on the support are not pre-determined. The plurality of randomly-located sites is arranged on the support in a disordered and/or unpredictable fashion. In some aspects, the support comprises at least $10^2$ sites, at least $10^3$ sites, at least $10^4$ sites, at least $10^5$ sites, at least $10^6$ sites, at least $10^7$ sites, at least $10^8$ sites, at least $10^9$ sites, at least $10^{10}$ sites, at least $10^{11}$ sites, at least $10^{12}$ sites, at least $10^{13}$ sites, at least $10^{14}$ sites, at least $10^{15}$ sites, or more, where the sites are randomly located on the support. In some aspects, a plurality of randomly located sites on the support (e.g., $10^2$-$10^{15}$ sites or more) are immobilized with nucleic acid templates to form a support immobilized with nucleic acid templates. In some aspects, the nucleic acid templates that are immobilized at a plurality of randomly located sites by hybridization to immobilized surface capture primers, or the nucleic acid templates are covalently attached to the surface capture primer. In some aspects, the nucleic acid templates that are immobilized at a plurality of randomly located sites, for example immobilized at $10^2$-$10^{15}$ sites or more. In some aspects, the nucleic acid templates that are immobilized at a plurality of sites on the support comprise linear or circular nucleic acid template molecules or a mixture of both linear and circular molecules. In some aspects, the immobilized nucleic acid templates are clonally-amplified to generate immobilized nucleic acid polonies at the plurality of randomly located sites. In some aspects, individual immobilized nucleic acid template molecules comprise one copy of a target sequence of interest, or comprise concatemers having two or more tandem copies of a target sequence of interest.

In some aspects, with respect to nucleic acid template molecules immobilized to pre-determined or random sites on the support, the plurality of immobilized nucleic acid template molecules on the support are in fluid communication with each other to permit flowing a solution of reagents (e.g., enzymes including polymerases, multivalent molecules, nucleotides, divalent cations and/or buffers and the like) onto the support so that the plurality of immobilized nucleic acid template molecules on the support can be reacted with the reagents in a massively parallel manner. In some aspects, the fluid communication of the plurality of immobilized nucleic acid template molecules can be used to conduct nucleotide binding assays and/or conduct nucleotide polymerization reactions (e.g., primer extension or sequencing) on the plurality of immobilized nucleic acid template molecules, and to conduct detection and imaging for massively parallel sequencing. In some aspects, the term "immobilized" and related terms refer to nucleic acid molecules or enzymes (e.g., polymerases) that are attached to the support at pre-determined or random locations, where the nucleic acid molecules or enzymes are attached directly to a support through covalent bond or non-covalent interaction, or the nucleic acid molecules or enzymes are attached to a coating on the support.

When used in reference to a low binding surface coating, one or more layers of a multi-layered surface coating may comprise a branched polymer or may be linear. Examples of suitable branched polymers include, but are not limited to, branched PEG, branched poly(vinyl alcohol) (branched PVA), branched poly(vinyl pyridine), branched poly(vinyl pyrrolidone) (branched PVP), branched), poly(acrylic acid) (branched PAA), branched polyacrylamide, branched poly (N-isopropylacrylamide) (branched PNIPAM), branched poly(methyl methacrylate) (branched PMA), branched poly (2-hydroxylethyl methacrylate) (branched PHEMA), branched poly(oligo(ethylene glycol) methyl ether methacrylate) (branched POEGMA), branched polyglutamic acid (branched PGA), branched poly-lysine, branched poly-glucoside, and dextran.

In some aspects, the branched polymers used to create one or more layers of any of the multi-layered surfaces disclosed herein may comprise at least 4 branches, at least 5 branches, at least 6 branches, at least 7 branches, at least 8 branches, at least 9 branches, at least 10 branches, at least 12 branches, at least 14 branches, at least 16 branches, at least 18 branches, at least 20 branches, at least 22 branches, at least 24 branches, at least 26 branches, at least 28 branches, at least 30 branches, at least 32 branches, at least 34 branches, at least 36 branches, at least 38 branches, or at least 40 branched.

Linear, branched, or multi-branched polymers used to create one or more layers of any of the multi-layered surfaces disclosed herein may have a molecular weight of at least 500, at least 1,000, at least 2,000, at least 3,000, at least 4,000, at least 5,000, at least 10,000, at least 15,000, at least 20,000, at least 25,000, at least 30,000, at least 35,000, at least 40,000, at least 45,000, or at least 50,000 daltons.

In some aspects, e.g., wherein at least one layer of a multi-layered surface comprises a branched polymer, the number of covalent bonds between a branched polymer molecule of the layer being deposited and molecules of the previous layer may range from about one covalent linkage per molecule and about 32 covalent linkages per molecule. In some aspects, the number of covalent bonds between a branched polymer molecule of the new layer and molecules of the previous layer may be at least 1, at least 2, at least 3, at least 4, at least 5, at least 6, at least 7, at least 8, at least 9, at least 10, at least 12, at least 14, at least 16, at least 18, at least 20, at least 22, at least 24, at least 26, at least 28, at least 30, or at least 32 covalent linkages per molecule.

Any reactive functional groups that remain following the coupling of a material layer to the surface may optionally be blocked by coupling a small, inert molecule using a high yield coupling chemistry. For example, in the case that amine coupling chemistry is used to attach a new material layer to the previous one, any residual amine groups may subsequently be acetylated or deactivated by coupling with a small amino acid such as glycine.

The number of layers of low non-specific binding material, e.g., a hydrophilic polymer material, deposited on the surface, may range from 1 to about 10. In some aspects, the number of layers is at least 1, at least 2, at least 3, at least 4, at least 5, at least 6, at least 7, at least 8, at least 9, or at least 10. In some aspects, the number of layers may be at most 10, at most 9, at most 8, at most 7, at most 6, at most 5, at most 4, at most 3, at most 2, or at most 1. Any of the lower and upper values described in this paragraph may be combined to form a range included within the present disclosure, for example, in some aspects the number of layers may range from about 2 to about 4. In some aspects, all of the layers may comprise the same material. In some aspects, each layer may comprise a different material. In some aspects, the plurality of layers may comprise a plurality of materials. In some aspects at least one layer may comprise a branched polymer. In some aspects, all of the layers may comprise a branched polymer.

One or more layers of low non-specific binding material may in some cases be deposited on and/or conjugated to the substrate surface using a polar protic solvent, a polar or polar aprotic solvent, a nonpolar solvent, or any combination thereof. In some aspects the solvent used for layer deposition and/or coupling may comprise an alcohol (e.g., methanol, ethanol, propanol, etc.), another organic solvent (e.g., acetonitrile, dimethyl sulfoxide (DMSO), dimethyl formamide (DMF), etc.), water, an aqueous buffer solution (e.g., phosphate buffer, phosphate buffered saline, 3-(N-morpholino)propanesulfonic acid (MOPS), etc.), or any combination thereof. In some aspects, an organic component of the solvent mixture used may comprise at least 1%, 5%, 10%, 15%, 20%, 25%, 30%, 35%, 40%, 45%, 50%, 55%, 60%, 70%, 75%, 80%, 85%, 90%, 95%, 98%, or 99% of the total, with the balance made up of water or an aqueous buffer solution. In some aspects, an aqueous component of the solvent mixture used may comprise at least 1%, 5%, 10%, 15%, 20%, 25%, 30%, 35%, 40%, 45%, 50%, 55%, 60%, 70%, 75%, 80%, 85%, 90%, 95%, 98%, or 99% of the total, with the balance made up of an organic solvent. The pH of the solvent mixture used may be less than 6, about 6, 6.5, 7, 7.5, 8, 8.5, 9, or greater than pH 9.

The term "branched polymer" and related terms refers to a polymer having a plurality of functional groups that help conjugate a biologically active molecule such as a nucleotide, and the functional group can be either on the side chain of the polymer or directly attaches to a central core or central backbone of the polymer. The branched polymer can have linear backbone with one or more functional groups coming off the backbone for conjugation. The branched polymer can also be a polymer having one or more sidechains, wherein the side chain has a site suitable for conjugation. Examples of the functional group include but are limited to hydroxyl, ester, amine, carbonate, acetal, aldehyde, aldehyde hydrate, alkenyl, acrylate, methacrylate, acrylamide, active sulfone, hydrazide, thiol, alkanoic acid, acid halide, isocyanate, isothiocyanate, maleimide, vinylsulfone, dithiopyridine, vinylpyridine, iodoacetamide, epoxide, glyoxal, dione, mesylate, tosylate, and tresylate.

As used herein, the term "clonally amplified" and it variants refers to a nucleic acid template molecule that has been subjected to one or more amplification reactions either in-solution or on-support. In the case of in-solution amplified template molecules, the resulting amplicons are distributed onto the support. Prior to amplification, the template molecule comprises a sequence of interest and at least one universal adaptor sequence. In some aspects, clonal amplification comprises the use of a polymerase chain reaction (PCR), multiple displacement amplification (MDA), transcription-mediated amplification (TMA), nucleic acid sequence-based amplification (NASBA), strand displacement amplification (SDA), real-time SDA, bridge amplification, isothermal bridge amplification, rolling circle amplification (RCA), circle-to-circle amplification, helicase-dependent amplification, recombinase-dependent amplification, single-stranded binding (SSB) protein-dependent amplification, or any combination thereof.

As used herein, the term "sequencing" and its variants comprise obtaining sequence information from a nucleic acid strand, typically by determining the identity of at least some nucleotides (including their nucleobase components)

within the nucleic acid template molecule. While in some aspects, "sequencing" a given region of a nucleic acid molecule includes identifying/reading each and every nucleotide within the region that is sequenced, in some aspects "sequencing" comprises methods whereby the identity of only some of the nucleotides in the region is determined, while the identity of some nucleotides remains undetermined or incorrectly determined. Any suitable method of sequencing may be used. In an exemplary aspect, sequencing can include label-free or ion based sequencing methods. In some aspects, sequencing can include labeled or dye-containing nucleotide or fluorescent based nucleotide sequencing methods. In some aspects, sequencing can include polony-based sequencing or bridge sequencing methods. In some aspects, sequencing includes massively parallel sequencing platforms that employ sequence-by-synthesis, sequence-by-hybridization or sequence-by-binding procedures. Examples of massively parallel sequence-by-synthesis procedures include polony sequencing, pyrosequencing (e.g., from 454 Life Sciences; U.S. Pat. Nos. 7,211,390, 7,244,559 and 7,264,929), chain-terminator sequencing (e.g., from Illumina; U.S. Pat. No. 7,566,537; Bentley 2006 Current Opinion Genetics and Development 16:545-552; and Bentley, et al., 2008 Nature 456:53-59, ion-sensitive sequencing (e.g., from Ion Torrent), probe-anchor ligation sequencing (e.g., Complete Genomics), DNA nanoball sequencing, nanopore DNA sequencing. Examples of single molecule sequencing include Heliscope single molecule sequencing, and single molecule real time (SMRT) sequencing from Pacific Biosciences (Levene, et al., 2003 Science 299(5607):682-686; Eid, et al., 2009 Science 323(5910): 133-138; U.S. Pat. Nos. 7,170,050; 7,302,146; and 7,405,281). An example of sequence-by-hybridization includes SOLiD sequencing (e.g., from Life Technologies; WO 2006/084132). An example of sequence-by-binding includes Omniome sequencing (e.g., U.S. Pat. No. 10,246,744).

While some aspects of the present disclosure have been shown and described herein, it will be obvious to those skilled in the art that such aspects are provided by way of example only. The breadth and scope of this disclosure should not be limited by any of the above-described exemplary aspects, but should be defined only in accordance with the following claims and their equivalents. Numerous variations, changes, and substitutions will now occur to those skilled in the art without departing from the present disclosure. It should be understood that various alternatives to the aspects of the present disclosure described herein may be employed in practicing the present disclosure. It is intended that the following claims define the scope of the present disclosure and that methods and structures within the scope of these claims and their equivalents be covered thereby.

What is claimed is:

1. A method comprising:
generating, by a sequencing system, a first plurality of flow cell images of a cellular sample immobilized on a support by conducting one or more cycles of sequencing reactions, the cellular sample comprising a plurality of concatemer molecules therewithin, wherein a first concatemer molecule of the plurality of concatemer molecules corresponds to a first target RNA molecule of the cellular sample, and a second concatemer molecule of the plurality of concatemer molecules corresponds to a second target RNA molecule of the cellular sample;
determining, by a processor, for pixels of the first plurality of flow cell images, pixel intensities and a respective color purity of each of the pixel intensities; and
determining, by the processor and based on the pixel intensities and the respective color purity of the pixel intensities, a base calling template comprising base calling locations of the cellular sample at different axial locations along an axial axis, wherein the base calling template is configured for registering a second plurality of flow cell images of the cellular sample in one or more subsequent cycles of the one or more cycles.

2. The method of claim 1, wherein the first or second plurality of flow cell images of the cellular sample are generated at different axial locations along an axial axis.

3. The method of claim 2, wherein the axial axis is orthogonal to an image plane, and wherein a field of view of the first or second plurality of flow cell images is within the image plane.

4. The method of claim 1, further comprising:
registering, by the processor, the second plurality of flow cell images of the one or more subsequent cycles of the one or more cycles to the base calling template.

5. The method of claim 1, further comprising:
performing, by the processor, base calling of the second plurality of flow cell images based on the base calling locations of the base calling template.

6. The method of claim 1, wherein the first or second plurality of flow cell images are acquired at a plurality of predetermined axial locations and wherein at least some of the different axial locations of the base calling locations are different from any of the plurality of predetermined axial locations.

7. The method of claim 1, wherein each of the plurality of concatemer molecules immobilized on the support corresponds to a base calling location.

8. The method of claim 1, wherein the first or second plurality of flow cell images comprises an identical image resolution.

9. The method of claim 1, wherein the first plurality of flow cell images or the second plurality of flow cell images

SEQUENCE LISTING

```
Sequence total quantity: 1
SEQ ID NO: 1          moltype = DNA   length = 53
FEATURE               Location/Qualifiers
source                1..53
                      mol_type = other DNA
                      organism = unidentified
SEQUENCE: 1
catgtaatgc acgtactttc agggtaaaca tgtaatgcac gtactttcag ggt          53
``` comprises optical signals emitted from nucleotide reagents bound to an unbalanced diversity of nucleotide bases of A, G, C and T/U among the plurality of concatemer molecules immobilized on the support.

10. The method of claim 9, wherein the unbalanced diversity of nucleotide bases of A, G, C and T/U among the plurality of concatemer molecules comprises:
   a percentage of (1) a number of at least one type of nucleotide bases to (2) a total number of all four types of bases is less than 20%, 15%, 10%, or 5% in the one or more cycles.

11. The method of claim 1, wherein each of the pixel intensities comprises one or more subpixel intensities of a corresponding pixel.

12. The method of claim 1, wherein the respective color purity of each of the pixel intensities comprises:
   one or more color purities corresponding to one or more subpixel intensities of a corresponding pixel.

13. The method of claim 1, wherein the respective color purity of each of the pixel intensities comprise: the respective color purity for one or more color channels.

14. The method of claim 13, wherein determining the respective color purity of each of the pixel intensities comprises: determining a ratio of (1) a signal corresponding to a particular type of nucleotide base to (2) a total amount of signal for other types of nucleotide bases.

15. The method of claim 13, wherein determining, for the pixels of the first plurality of flow cell images, the pixel intensities comprises:
   determining, based on a comparison of a set of channel intensities at a corresponding pixel or a subpixel location, each channel intensity in the set of channel intensities corresponding to a respective different fluorescent wavelength.

16. The method of claim 13, wherein determining the base calling template based on the pixel intensities and the respective color purity of the pixel intensities comprises:
   for each of the pixels or subpixels, determining whether or not the respective color purity is greater than a color purity of other pixels or subpixels within a threshold distance;
   in response to determining that the respective color purity is greater than the color purity of the other pixels or subpixels within the threshold distance, adding a location of a corresponding pixel or subpixel to the base calling template; and
   in response to determining that the respective color purity is no greater than the color purity of the other pixels or subpixels within the threshold distance, making no changes to the base calling template.

17. The method of claim 16, wherein the threshold distance is in three dimensions.

18. The method of claim 1, wherein the support comprises a flow cell.

19. A system comprising:
   one or more hardware processors;
   one or more data storage devices storing instructions executable by the one or more hardware processors that, when executed, cause the one or more hardware processors to perform operations, the operations comprising:
      generating, by a sequencing system, a first plurality of flow cell images of a cellular sample immobilized on a support by conducting one or more cycles of sequencing reactions, the cellular sample comprising a plurality of concatemer molecules therewithin, wherein a first concatemer molecule of the plurality of concatemer molecules corresponds to a first target RNA molecule of the cellular sample, and a second concatemer molecule of the plurality of concatemer molecules corresponds to a second target RNA molecule of the cellular sample;
      determining, by a processor, for pixels of the first plurality of flow cell image, pixel intensities and a respective color purity of each of the pixel intensities; and
      determining, by the processor and based on the pixel intensities and the respective color purity of the pixel intensities, a base calling template comprising base calling locations, wherein the base calling template is configured for registering a second plurality of flow cell images of the cellular sample in one or more subsequent cycles of the one or more cycles.

20. One or more non-transitory computer storage media encoded with instructions executable by one or more hardware processors that, when executed, cause the one or more hardware processors to perform operations, the operations comprising:
   generating, by a sequencing system, a first plurality of flow cell images of a cellular sample immobilized on a support by conducting one or more cycles of sequencing reactions, the cellular sample comprising a plurality of concatemer molecules therewithin, wherein a first concatemer molecule of the plurality of concatemer molecules corresponds to a first target RNA molecule of the cellular sample, and a second concatemer molecule of the plurality of concatemer molecules corresponds to a second target RNA molecule of the cellular sample;
   determining, by a processor, for pixels of the first plurality of flow cell image, pixel intensities and a respective color purity of each of the pixel intensities; and
   determining, by the processor and based on the pixel intensities and the respective color purity of the pixel intensities, a base calling template comprising base calling locations, wherein the base calling template is configured for registering a second plurality of flow cell images of the cellular sample in one or more subsequent cycles of the one or more cycles.

* * * * *